United States Patent [19]

Fraser

[11] E Re. 31,319

[45] Reissued Jul. 19, 1983

[54] DIGITAL DATA COMMUNICATION SYSTEM

[75] Inventor: Alexander G. Fraser, Bernardsville, N.J.

[73] Assignee: Bell Telephone Laboratories, Incorporated, Murray Hill, N.J.

[21] Appl. No.: 123,970

[22] Filed: Feb. 25, 1980

Related U.S. Patent Documents

Reissue of:

[64] Patent No.: 3,749,845
Issued: Jul. 31, 1983
Appl. No.: 175,678
Filed: Aug. 27, 1971

[51] Int. Cl.[3] ..... H04J 3/16

[52] U.S. Cl. ..... 370/80; 370/84; 370/88; 370/89; 179/18 EA; 364/200

[58] Field of Search ..... 370/89, 86, 88, 94, 370/60, 85, 118, 84, 80; 179/18 EA; 364/200

[56] References Cited

U.S. PATENT DOCUMENTS

| | | | |
|---|---|---|---|
| 3,466,397 | 9/1969 | Benowitz | 370/84 |
| 3,632,882 | 1/1972 | Ciecierski | 370/84 |
| 3,639,904 | 2/1972 | Arulpragasam | 370/89 |

OTHER PUBLICATIONS

*AFIPS Conference Proceedings*, vol. 38, 1971 Spring Joint Computer Conference, May 18-20, 1971, pp. 211-216, "TYMNET . . . Communication Network" by L. Tymes.

*AFIPS Conference Proceedings*, vol. 36, 1970 Spring Joint Computer Conference, May 5-7, 1970, pp. 551-567, " . . . Interface Message Processor . . . ARPA Computer Network".

*Primary Examiner*—Douglas W. Olms
*Attorney, Agent, or Firm*—Roy C. Lipton

[57] ABSTRACT

A digital data transmission system comprising a plurality of interconnected switching units, each such unit having connected thereto at least one transmission loop, and each such loop having at least one digital device attached thereto. The system provides controllable buffering of digital data thereby allowing digital devices having different data transfer speeds and storage capabilities to communicate asynchronously. The system allocates communication resources upon request but only creates actual communication paths when the requesting device is transmitting data. Thus system resources need not remain committed between bursts of data.

19 Claims, 103 Drawing Figures

INPUT
10-BIT SHIFT REGISTER
SHIFT
171
171A
171B
173
2-BIT COMPARATOR
A
B
A=B
$\overline{D}_{36}$
BS
147
148
146
V
J
Q
C
K
R
$\overline{Q}$
2-BIT REGISTER
LOAD RESET
174
175A
175B
166A
175
172
167
MEMORY
WRITE ADD
161
159
160
186
CLOCK
+V
158
102
CLOCK STROBE INHIBIT
149
RISING EDGE TRIGGER 164
165
163
COMMAND
ACKNOWLEDGE
169
170
30
150
CONTROL COMPUTER BS
$\overline{D}_{36}$
$D_{36}$
185
186
184
BYTE DISASSEMBLER
40
151
166A
LOAD
8-BIT REGISTER
156
178
177
149
166
A=B
A=B+32
A
6-BIT COMPARATOR
B
155
154
152
SELECT
SELECT
MEMORY
ADD
WRITE
D
179
182
181
180
183
179A
179E
150
6-BIT COUNTER
RESET
+1
176
168
6-BIT COUNTER
RESET
+1

INTERFACE COMPUTER INSTRUCTION WORD FORMAT

| | |
|---|---|
| FIG. 6A | FIG. 6E |
| FIG. 6B | FIG. 6F |
| FIG. 6C | FIG. 6G |
| FIG. 6D | FIG. 6H |

| | | |
|---|---|---|
| FIG. 9C | FIG. 9D | FIG. 9E |

609
608
SELECT CIRCUIT
T
SELECT
611
8-BIT REGISTER CLOCK
D
640
MDO
626
MDI
C4
635
628
636
629
625
641
RCH
642
RBL
624
SBC
637
630
623
SBL
631
638A
643
631A
622
STSB
CMDB
621
TID
638H
631H
STSA
620
639A
632A
632
644
CMDA
632H
639H
BS
674
672
673
S
Q
R
I 609
602
A
D
REGISTER
C
CA
627
614
$O_1$
$\bar{A}$
$S_0$
FUNCTION
GENER-
ATOR
$S_1$
$S_2$
$S_3$
V
C
$\bar{B}$
M
616
603
I
$O_0$
615
619
GATING CIRCUIT
619A
INH
ADR
619B
619H
610
604
WORKING
STORE
D
WRITE
ADR
609
$R_0$
SELECT
$R_1$
$R_2$
$R_3$
$R_4$
618
C2
$O_0$
$O_1$ 940-1
938-1

941
RESULT=1
YES
NO
956
DIN=0
NO
YES
COMPUTE FIN AND $PC
957
958
RESULT=RSEQ
YES
NO
961
RCH=NIN
DERR=8
959
962
SELCH=NIN
YES
NO
DIN=4
960
DERR=4
963
SEND A BREAK COMMAND
964
DIN=8
965
942
RESULT=2
YES
NO
966
NIN=0
YES
RESTART
754
NO
967
NIN=1
NO
START
750
YES
SOUT=2
968
END
943

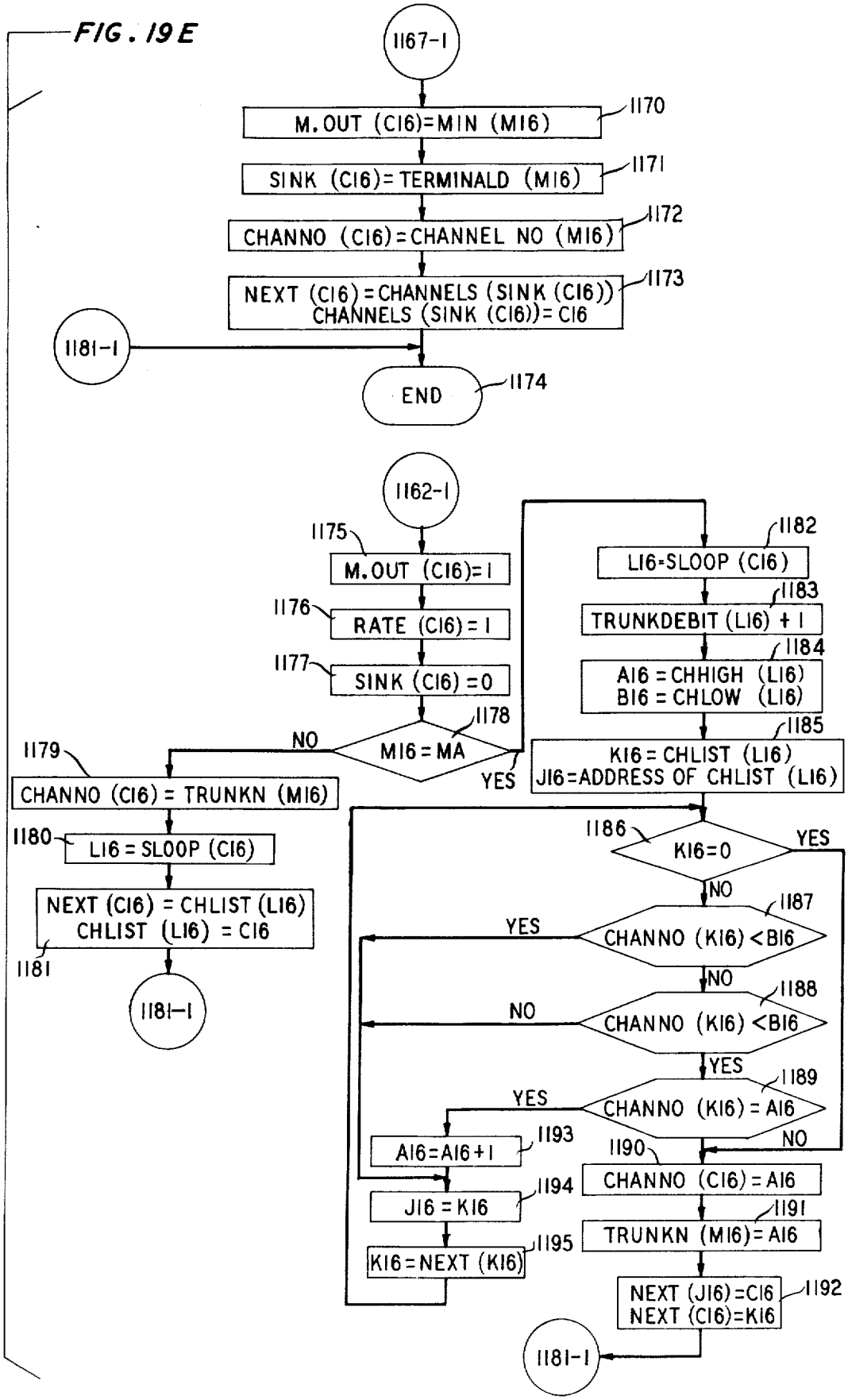
FIG. 19E
1167-1
M.OUT (CI6)=MIN (MI6)
1170
SINK (CI6)=TERMINALD (MI6)
1171
CHANNO (CI6)=CHANNEL NO (MI6)
1172
NEXT (CI6)=CHANNELS (SINK (CI6))
CHANNELS (SINK (CI6))=CI6
1173
1181-1
END
1174
1162-1
1175
M.OUT (CI6)=1
1176
RATE (CI6)=1
1177
SINK (CI6)=0
1178
MI6=MA
NO
YES
1179
CHANNO (CI6)=TRUNKN (MI6)
1180
LI6=SLOOP (CI6)
NEXT (CI6)=CHLIST (LI6)
CHLIST (LI6)=CI6
1181
1181-1
1182
LI6=SLOOP (CI6)
1183
TRUNKDEBIT (LI6)+1
1184
AI6=CHHIGH (LI6)
BI6=CHLOW (LI6)
1185
KI6=CHLIST (LI6)
JI6=ADDRESS OF CHLIST (LI6)
1186
KI6=0
YES
NO
1187
CHANNO (KI6)<BI6
YES
NO
1188
CHANNO (KI6)<BI6
NO
YES
1189
CHANNO (KI6)=AI6
YES
NO
1193
AI6=AI6+1
1190
CHANNO (CI6)=AI6
1194
JI6=KI6
1191
TRUNKN (MI6)=AI6
1195
KI6=NEXT (KI6)
NEXT (JI6)=CI6
NEXT (CI6)=KI6
1192
1181-1

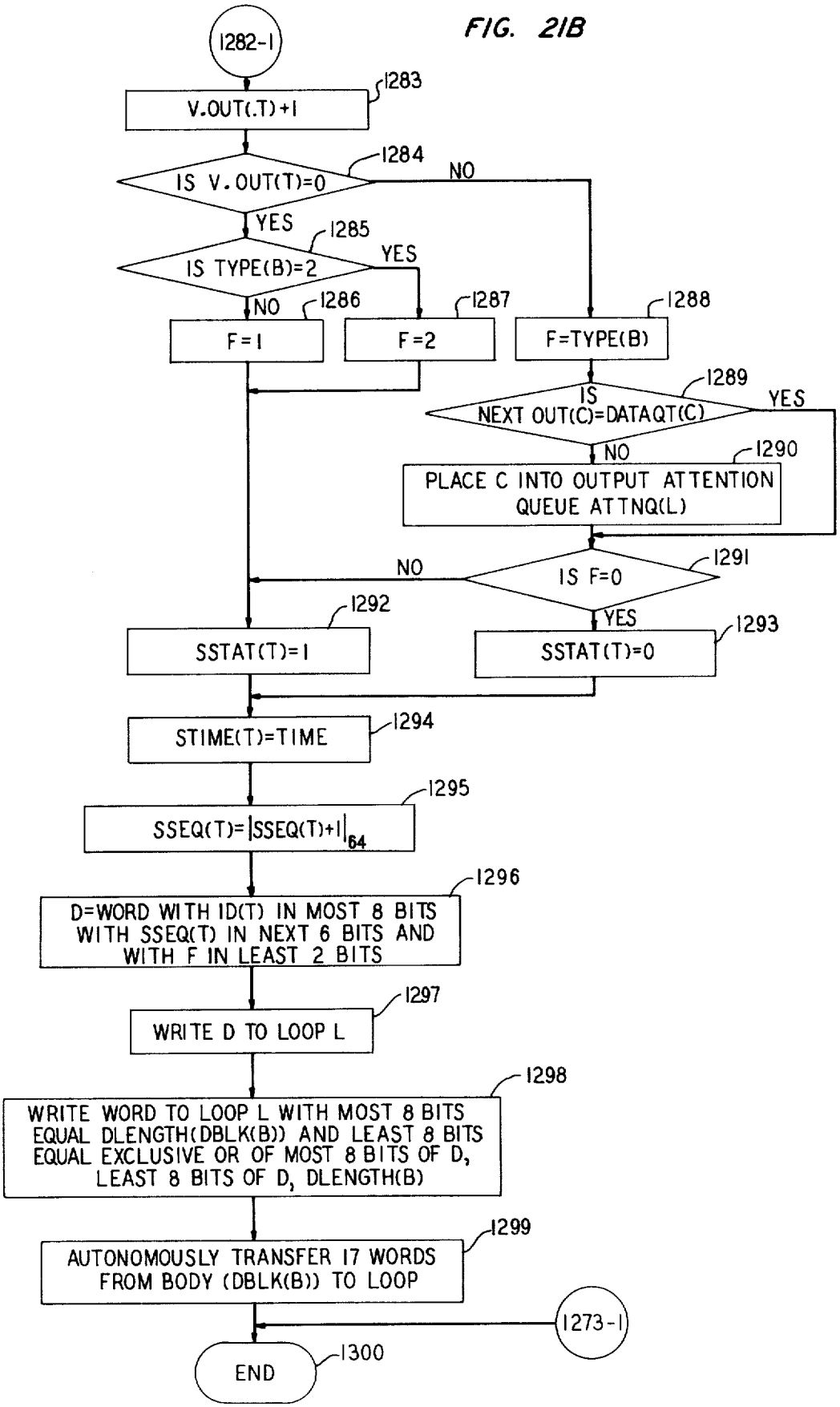
FIG. 21B
1282-1
1283
V.OUT(.T)+1
1284
IS V.OUT(T)=0
NO
YES
1285
IS TYPE(B)=2
YES
NO
1286
1287
1288
F=1
F=2
F=TYPE(B)
1289
IS NEXT OUT(C)=DATAQT(C)
YES
NO
1290
PLACE C INTO OUTPUT ATTENTION QUEUE ATTNQ(L)
1291
IS F=0
NO
YES
1292
1293
SSTAT(T)=1
SSTAT(T)=0
1294
STIME(T)=TIME
1295
SSEQ(T)=|SSEQ(T)+1|64
1296
D=WORD WITH ID(T) IN MOST 8 BITS WITH SSEQ(T) IN NEXT 6 BITS AND WITH F IN LEAST 2 BITS
1297
WRITE D TO LOOP L
1298
WRITE WORD TO LOOP L WITH MOST 8 BITS EQUAL DLENGTH(DBLK(B)) AND LEAST 8 BITS EQUAL EXCLUSIVE OR OF MOST 8 BITS OF D, LEAST 8 BITS OF D, DLENGTH(B)
1299
AUTONOMOUSLY TRANSFER 17 WORDS FROM BODY (DBLK(B)) TO LOOP
1273-1
1300
END

DIGITAL DATA COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to digital transmission systems and, more particularly, to digital transmission by asynchronous message switching on a common time-divided transmission loop.

2. Description of the Prior Art

It is often desirable to exchange digital information between digital machines. If such machines are separated by any significant geographic distance, it has heretofore been necessary to either purchase or lease a dedicated transmission facility between such machines, or to arrange a temporary connection between such machines by means of common carrier, switched transmission facilities. Since it is the nature of digital machines to require large amounts of digital channel capacity, but only for brief periods and only occasionally, the heretofore available facilities described above have proven very inefficient for this use. Dedicated transmission facilities, for example, remain unused the vast majority of the time. Switched, common carrier facilities tend to be restricted in bandwidth to voice frequencies and hence are not immediately adaptable to high speed digital transmission.

A further problem with switched facilities is the fact that it often takes more time to set up the transmission path than is required for the entire transmission of data. The telephone network requires real time transmission in the sense that signals must be delivered substantially at the same time they are generated. It therefore is standard procedure to set up the communication path in its entirety before any signals are transmitted. As a result, centralized switching has been used in the telephone plant. Digital transmission of data, on the other hand, need not be done in real time and hence it is wasteful to set up an entire connection prior to transmission. These facts tend to make presently available interconnection facilities uneconomical for intermachine digital communications.

It is therefore an object of the present invention to provide improved digital transmission between digital machines.

It is another object of the present invention to allow digital machines having widely varying data handling capabilities to communicate efficiently and ecomonically.

It is a further object of this invention to provide a system which allows a digital machine to communicate with a plurality of other digital machines without the need for reprogramming that machine when the number or capabilities of machines in the system is changed.

It is a still further object of this invention to provide an algorithm which takes advantage of the inherent characteristics of digital machines to provide a more efficient method of using transmission resources.

SUMMARY OF THE INVENTION

These objects are achieved in accordance with this invention by a system of interconnected transmission loops. The system includes a plurality of interconnected switching units which comprise general-purpose programmable digital computers. Each switching unit has at least one transmission loop connected to it. Each loop includes at least one loop access module and each module has attached to it a terminal interface unit to which a digital device is connected.

Each switching unit controls the data transmission to and from the digital devices that are attached to its transmission loops. Each digital device may be allocated up to 256 different channels, one of which is used solely for signalling between the digital device and its associated switching unit. The switching unit controls the allocation and actual implementation of the remaining 255 of these channels by a process that may be termed "virtual allocation."

When a request to make a connection is received, the switching unit determines and stores the characteristics of the transmission path required to honor the request. No actual transmission paths are set up at this time and no actual system resources are assigned except for the amount of the switching unit memory used to store the transmission path characteristics. The transmission path is actually set up only when the digital device begins to transmit data. The data flow is then controlled in accordance with the previously determined characteristics by a novel algorithm embodying a request-acknowledge process. A transmission path is actually maintained only as long as data is being transmitted. The transmission path otherwise remains only virtually allocated. Since it is characteristic of digital devices to transmit data in bursts with pauses between bursts, this method of controlling the system eliminates idle transmission paths. This more efficient use of transmission resources allows a greater volume of data to be handled.

The loop access modules serve to keep data flowing around the transmission loops and to provide an interface between the loops and the terminal interface units. The terminal interface units transfer data on a full duplex basis between their associated digital device and the rest of the system. Each terminal interface unit includes a small programmable digital computer which interacts with the computer in the switching unit to control the signaling between the switching unit and the associated digital device and which serves to control the transfer of data to and from the digital device.

The algorithm that governs the transmission of data in the system comprises two program portions, one stored in and executed by the switching unit, the other stored in and executed by the computer contained in the terminal interface unit. This algorithm utilizes the characteristics of the requested data transfer to determine the system resources that will be required. During the actual data transmission, the algorithm provides for the buffering that is required to allow the requesting digital device to transmit data to the receiving digital device. Thus the algorithm serves to match the data transmission characteristics of the transmitting digital device to the data reception characteristics of the receiving digital device.

Figure 1A:
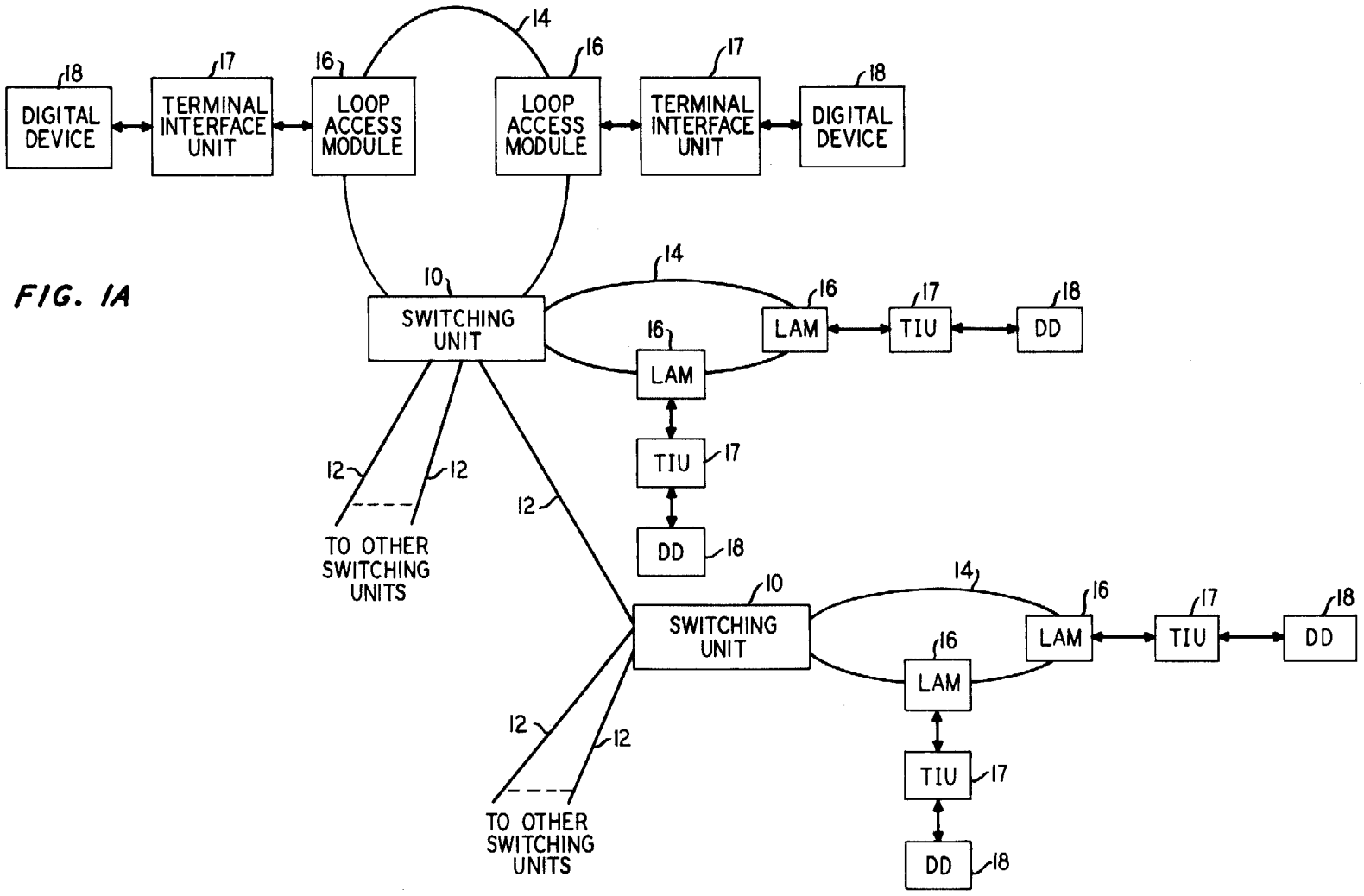
FIG. 1A is a general block diagram of a digital transmission system in accordance with this invention.
Figure 5C:
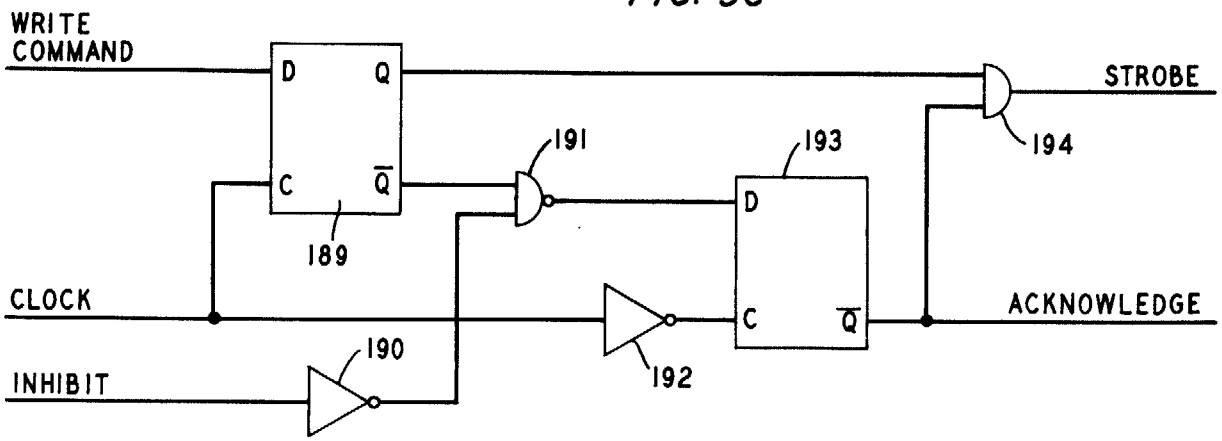
Figure 2A:
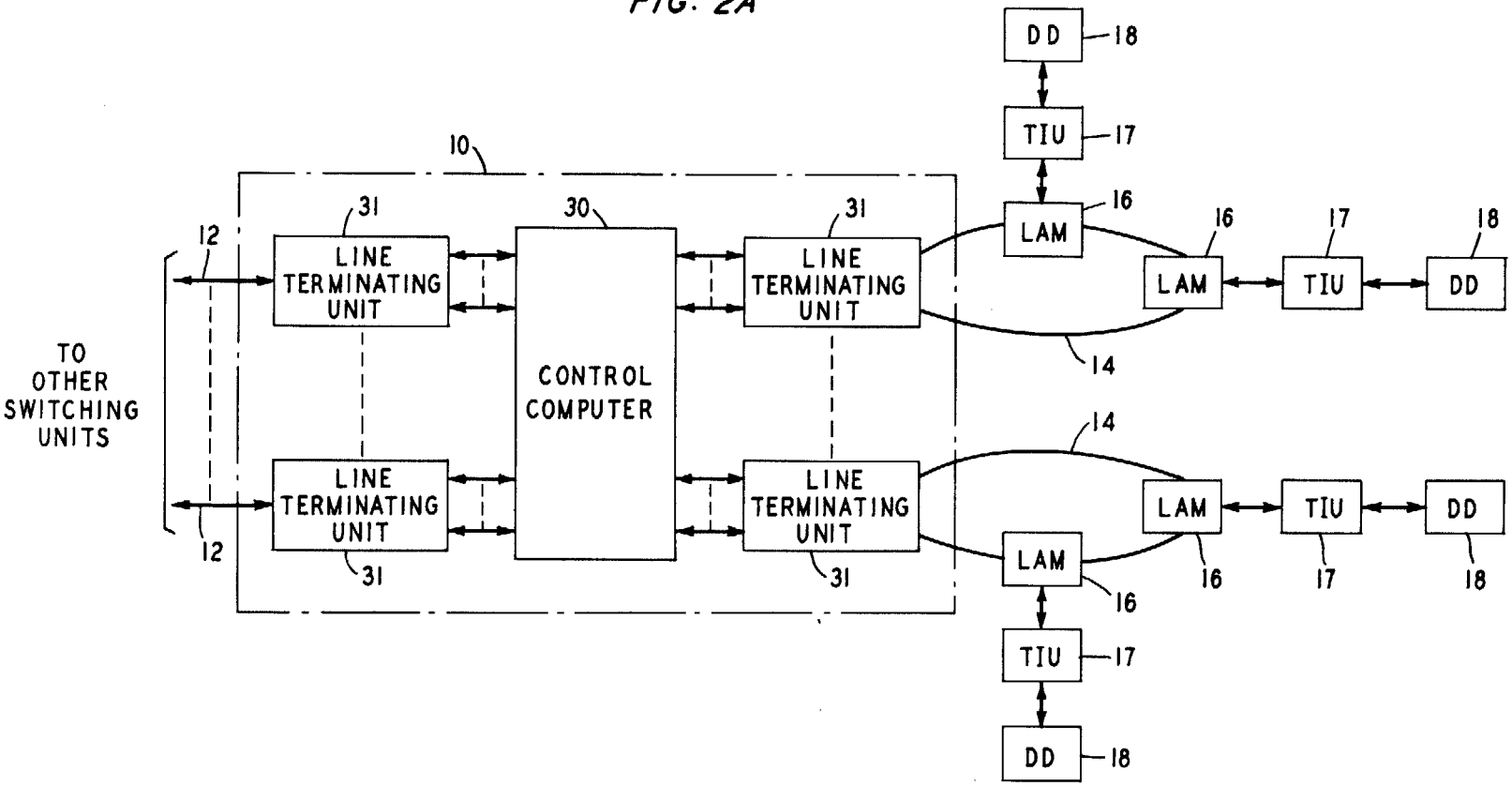
Figure 2B:
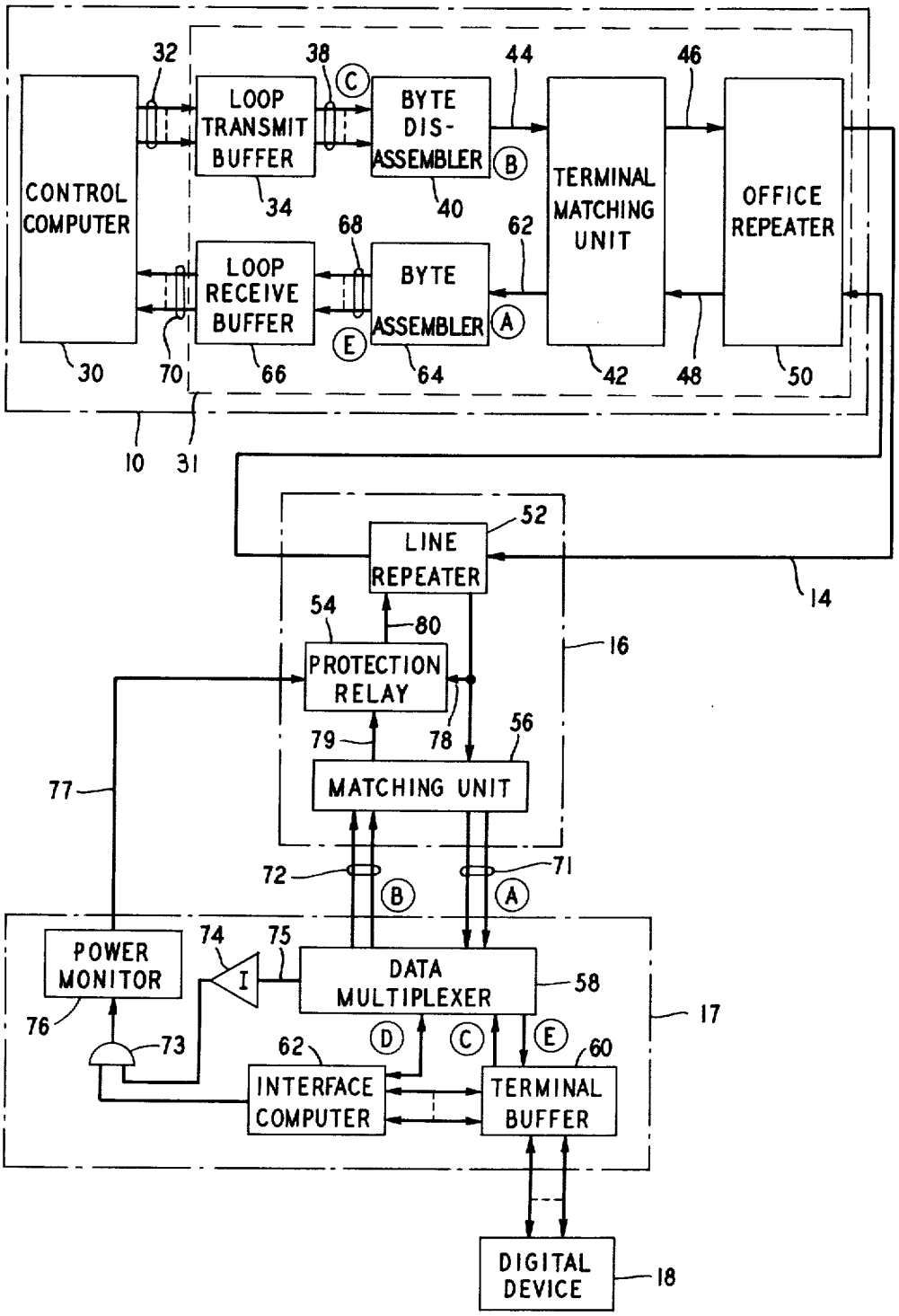
Figure 3A:
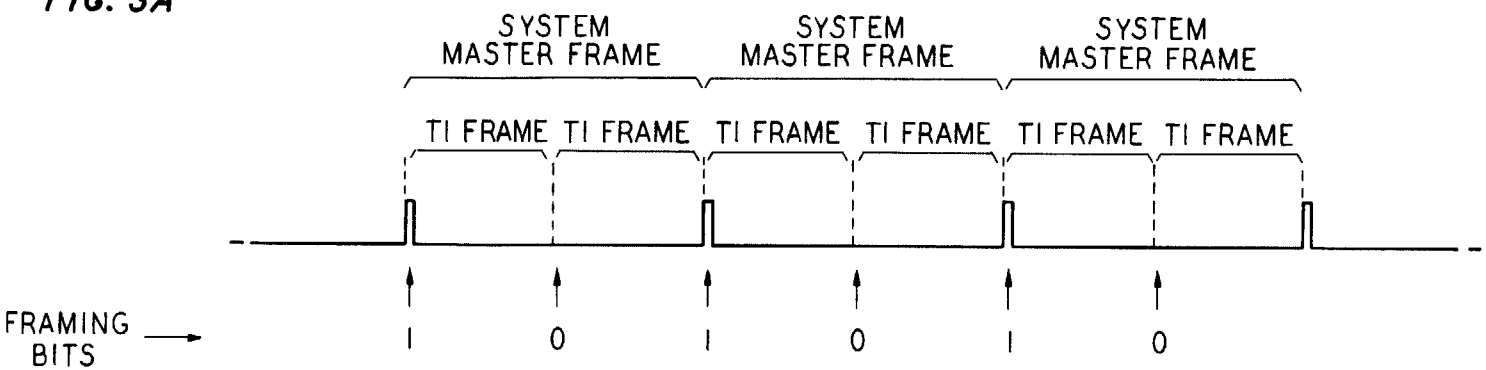
Figure 3B:
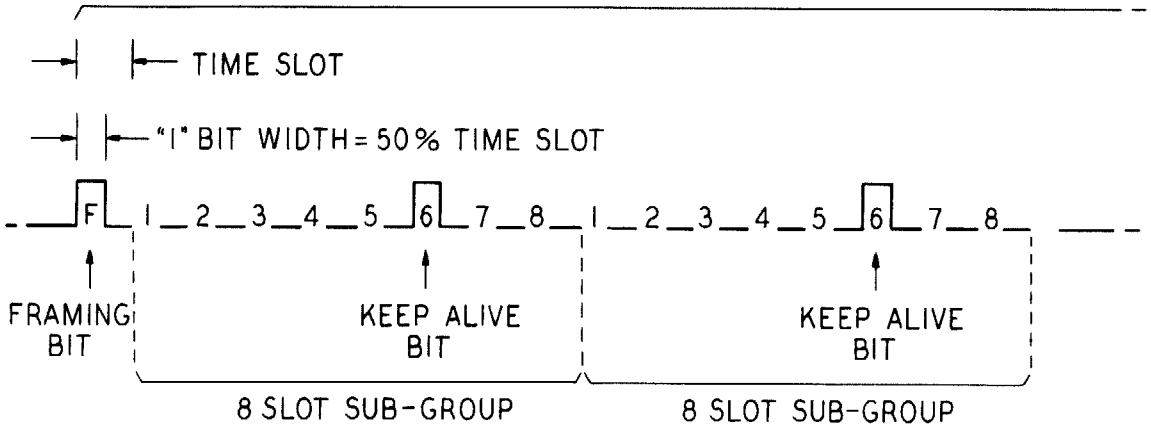
Figure 4A:
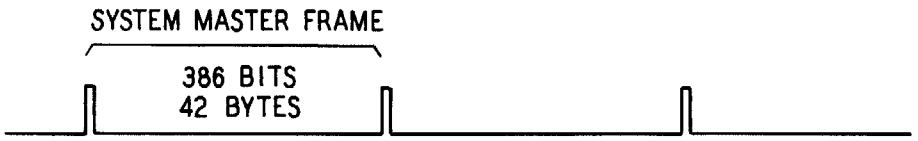
Figure 4B:
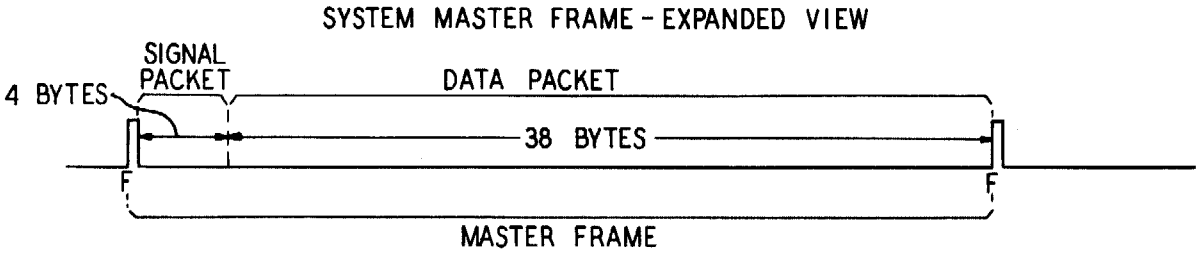
Figure 4C:
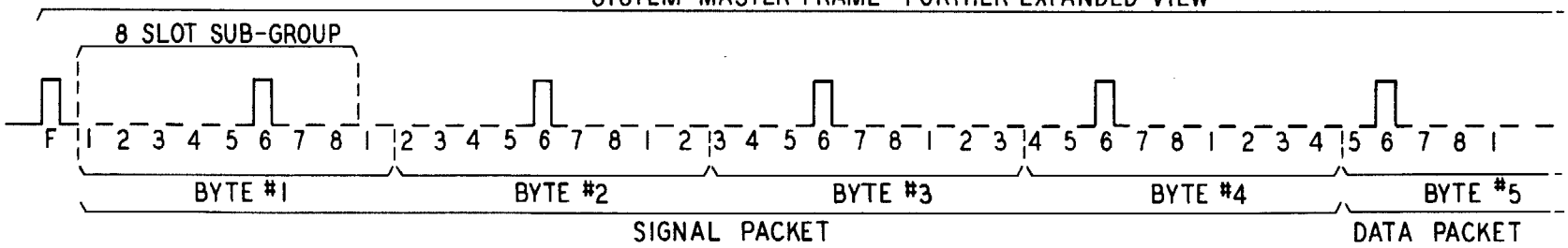
Figure 5A:
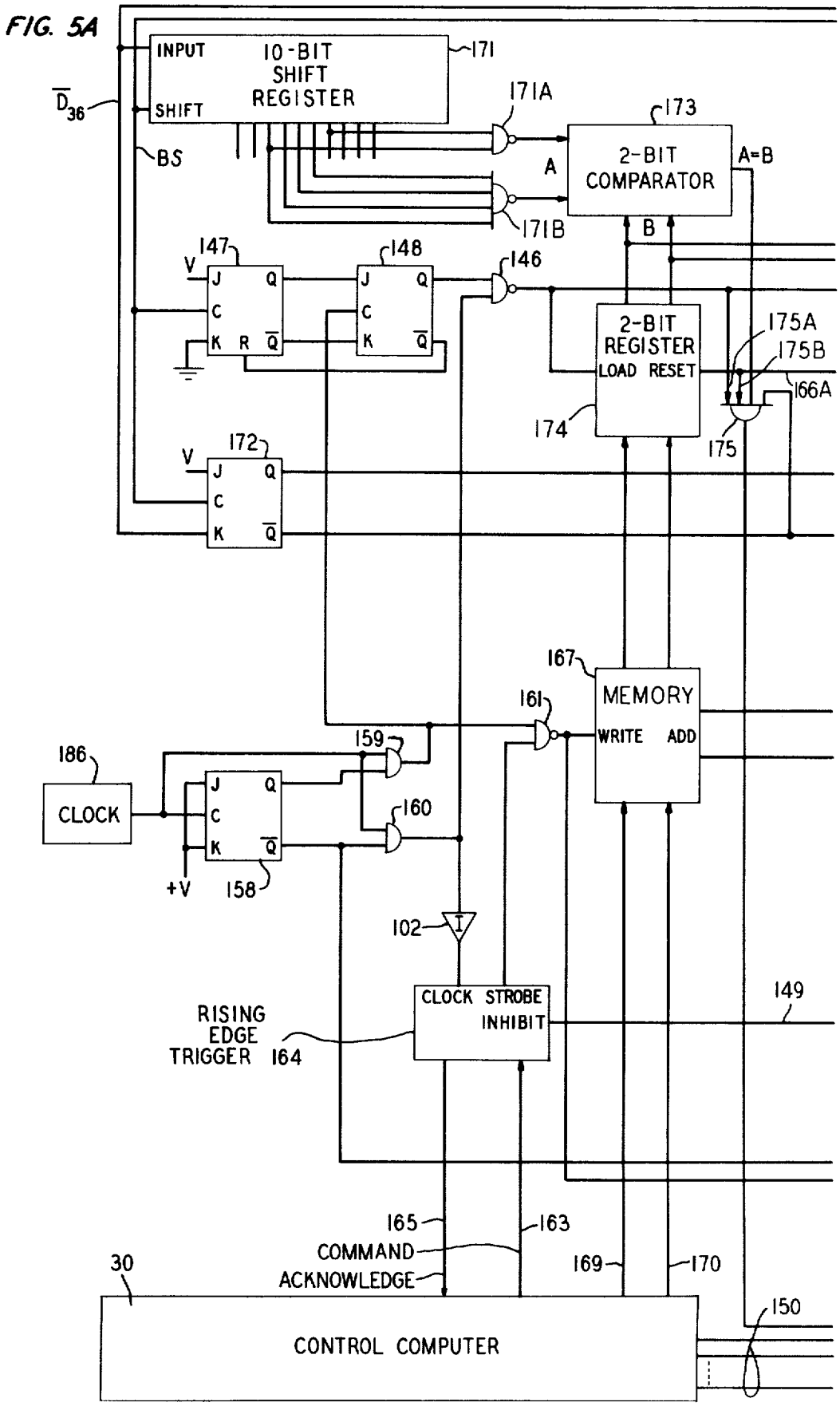
Figure 5B:
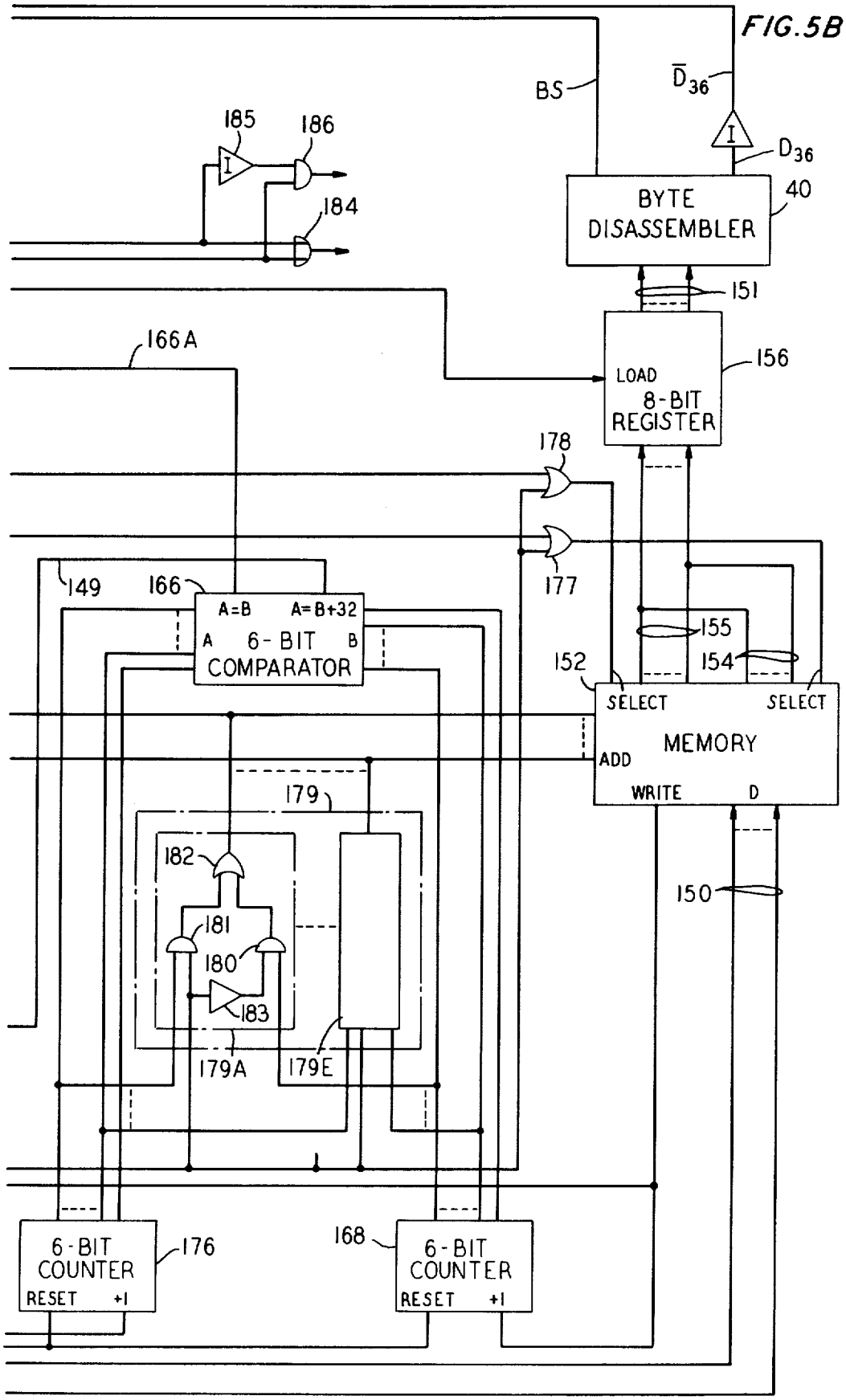
Figure 5D:
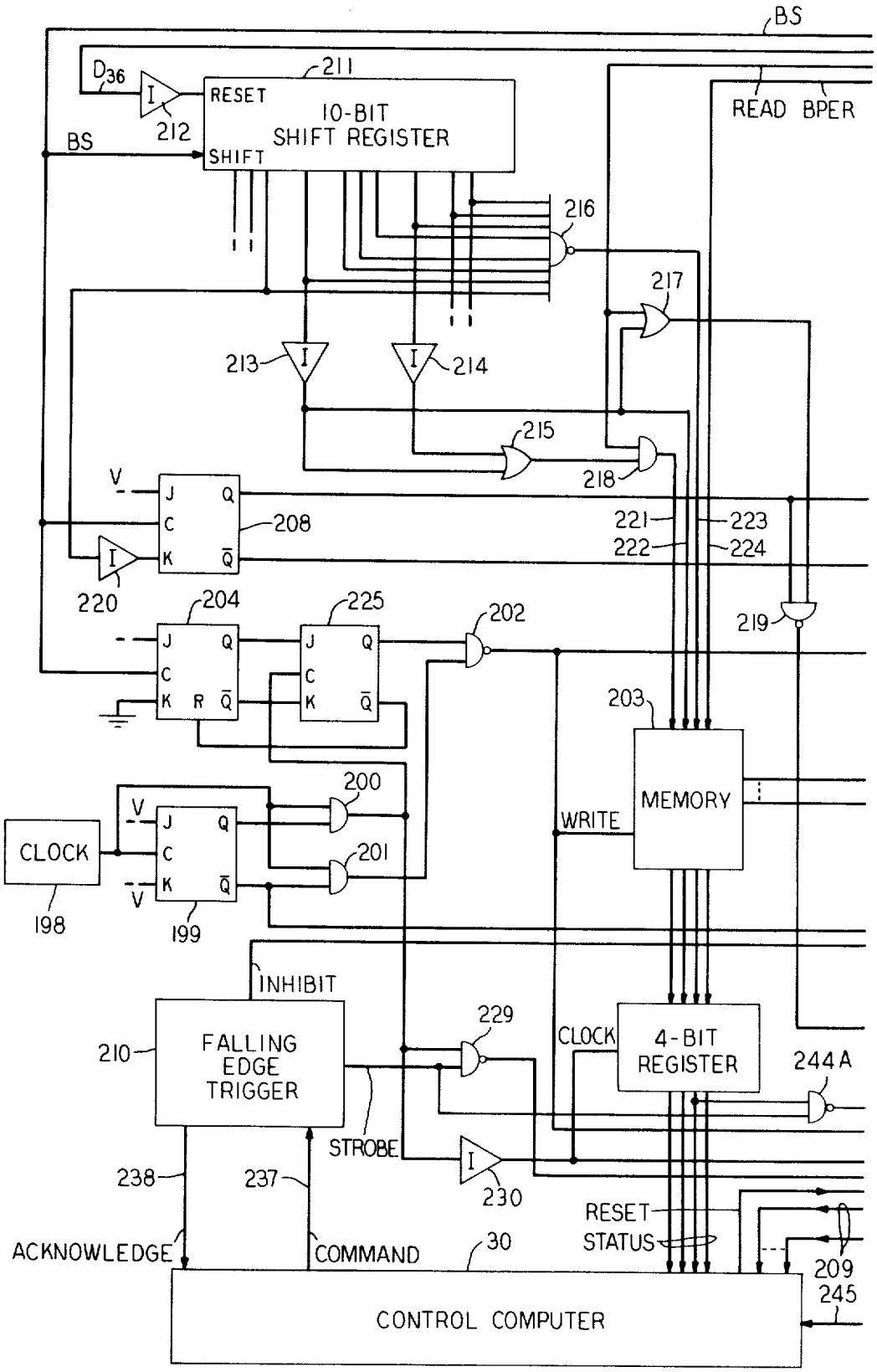
Figure 5E:
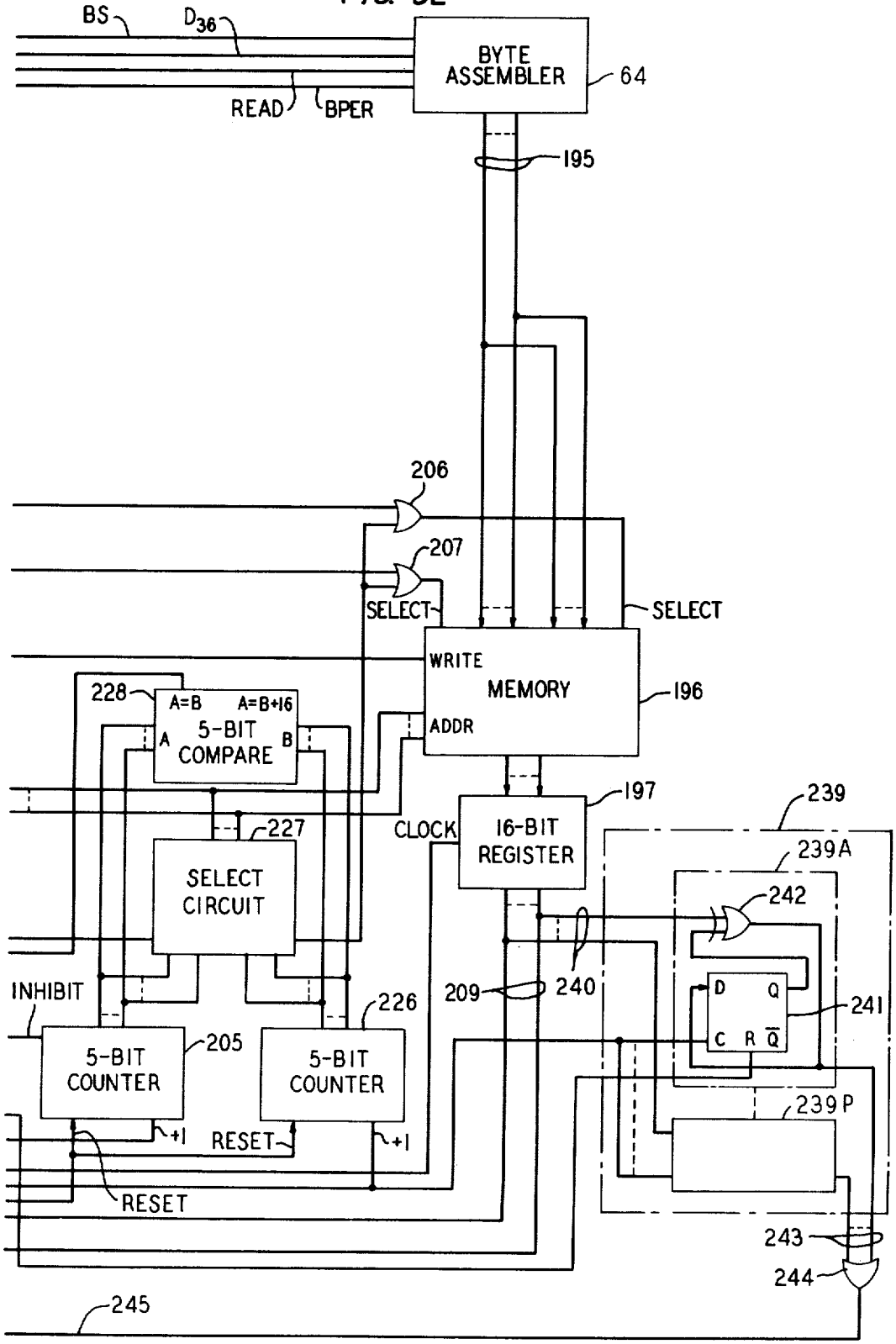
Figure 5F:
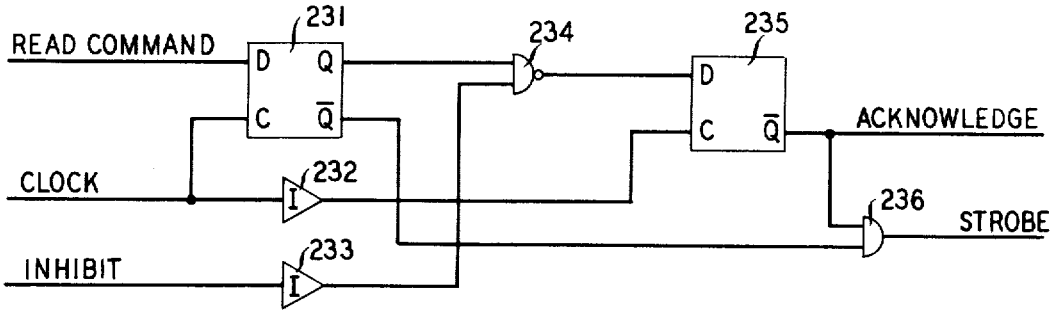
Figure 7B:
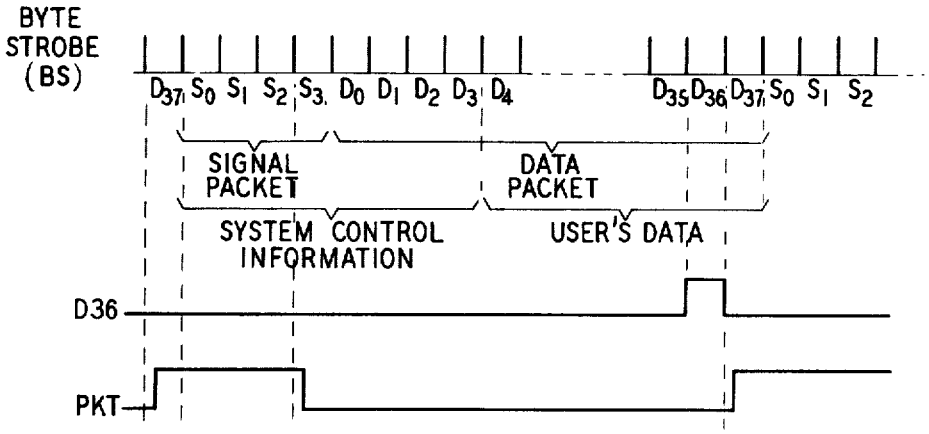
Figure 8:
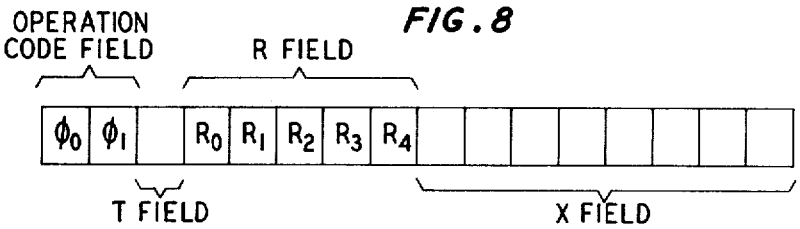
Figure 6A:
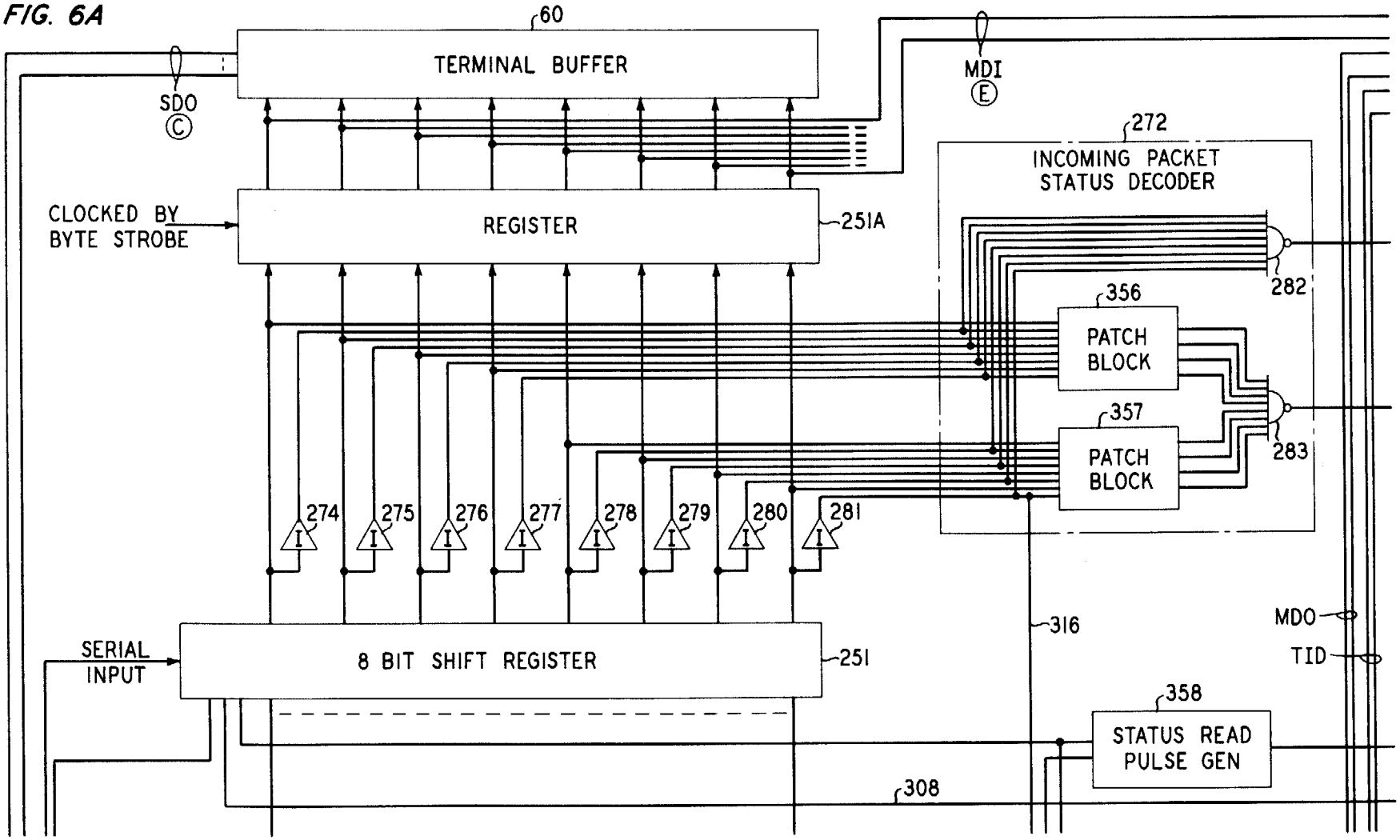
Figure 6B:
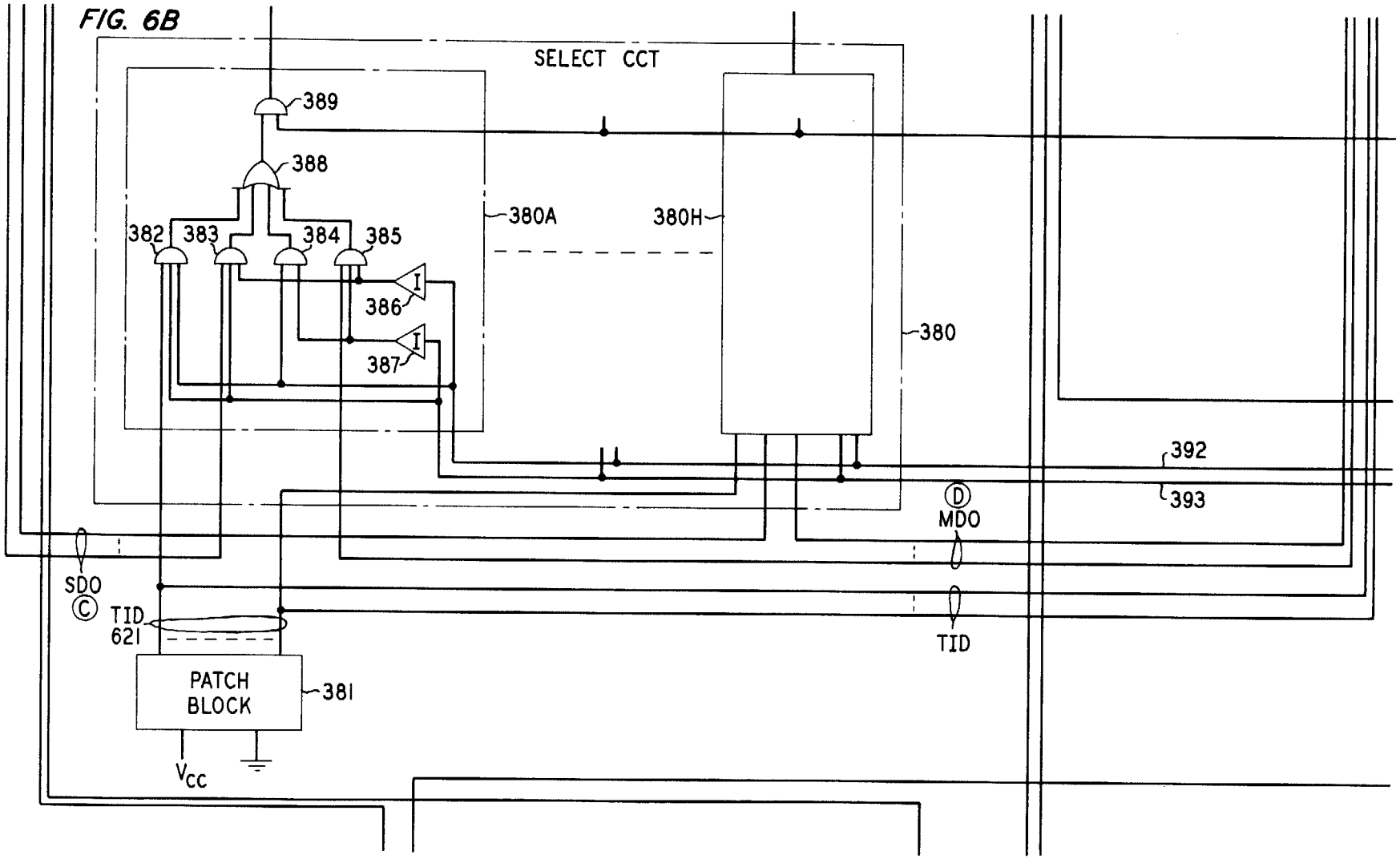
Figure 6C:
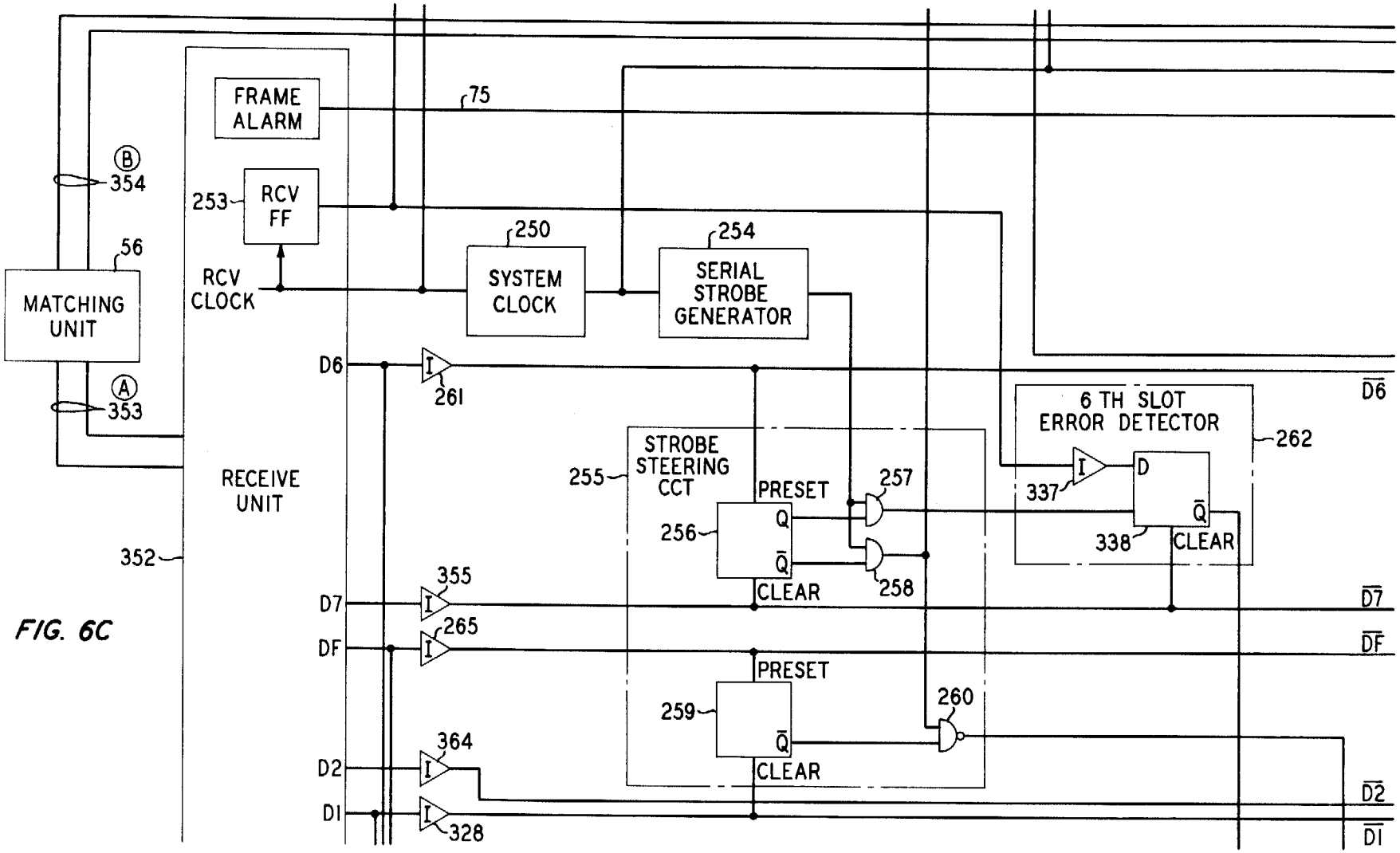
Figures 6D, 6I:
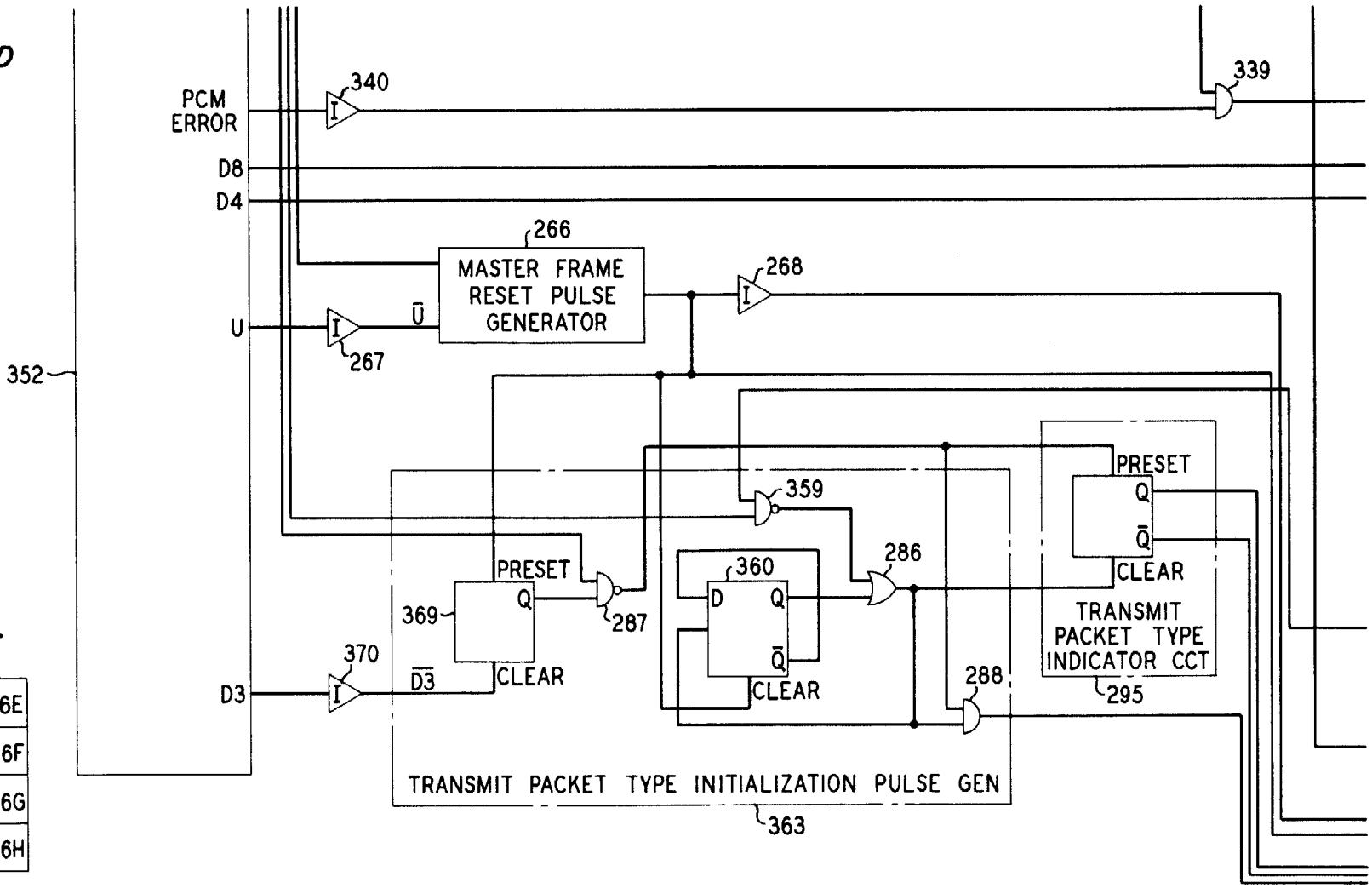
Figure 7A:
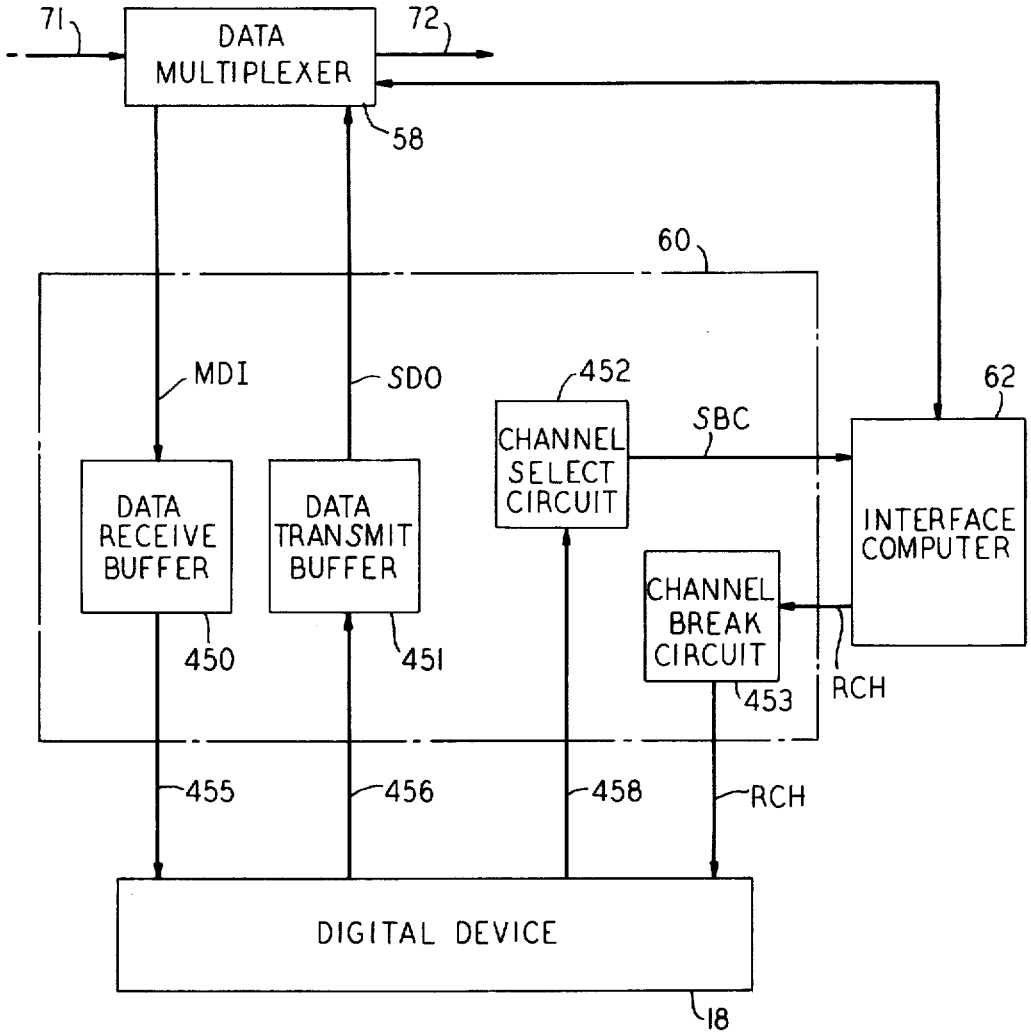
Figure 7C:
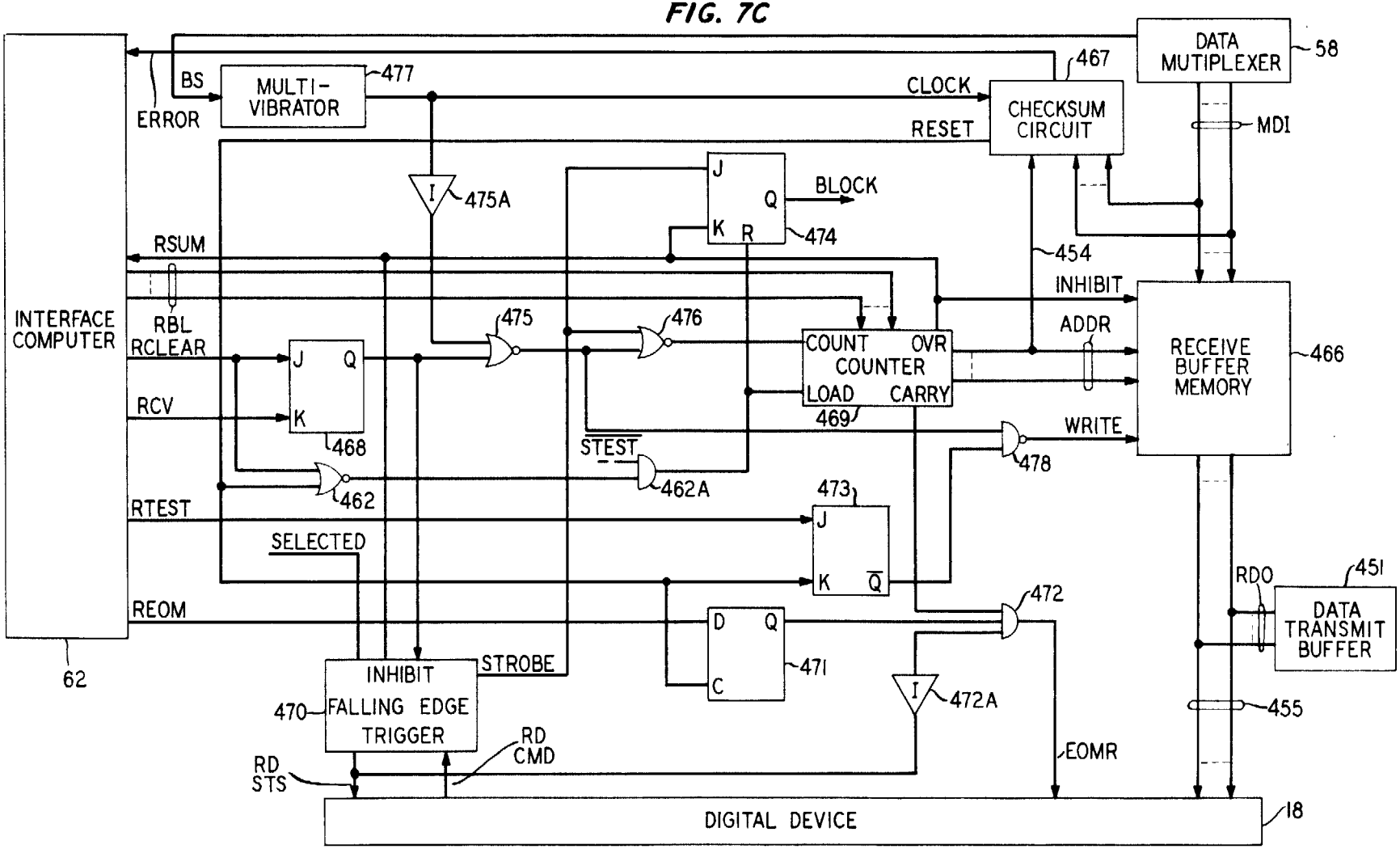
Figure 7D:
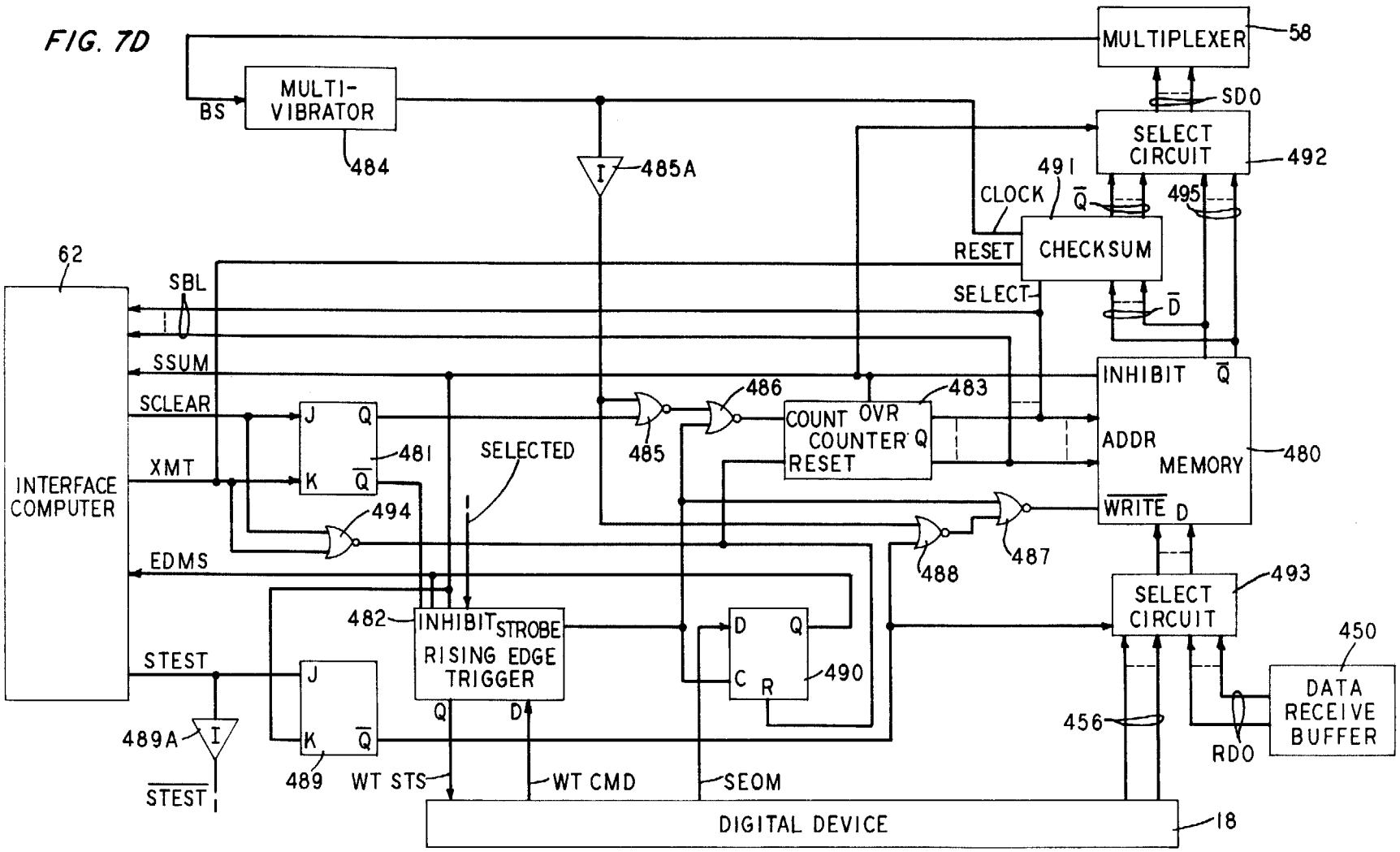
Figure 7E:
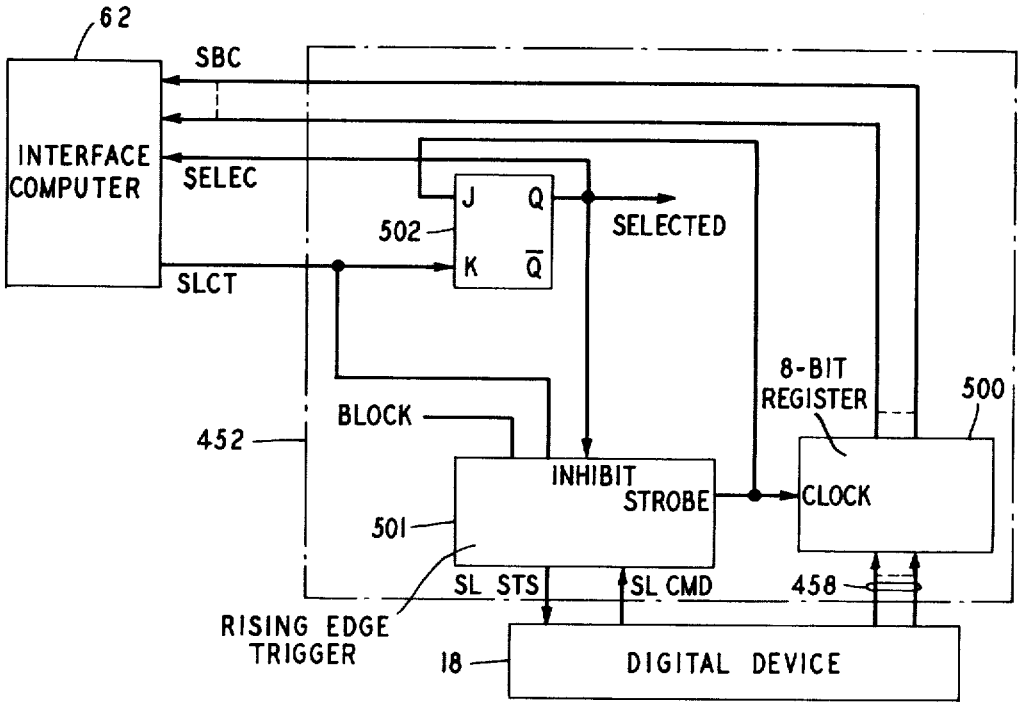
Figure 7F:
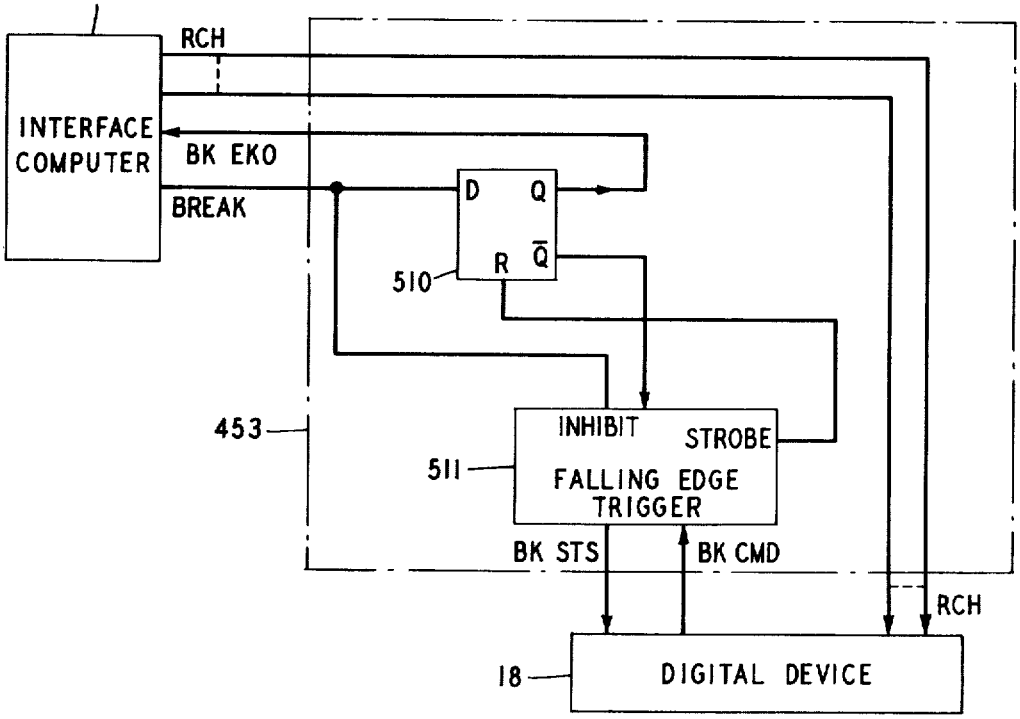
Figure 9A:
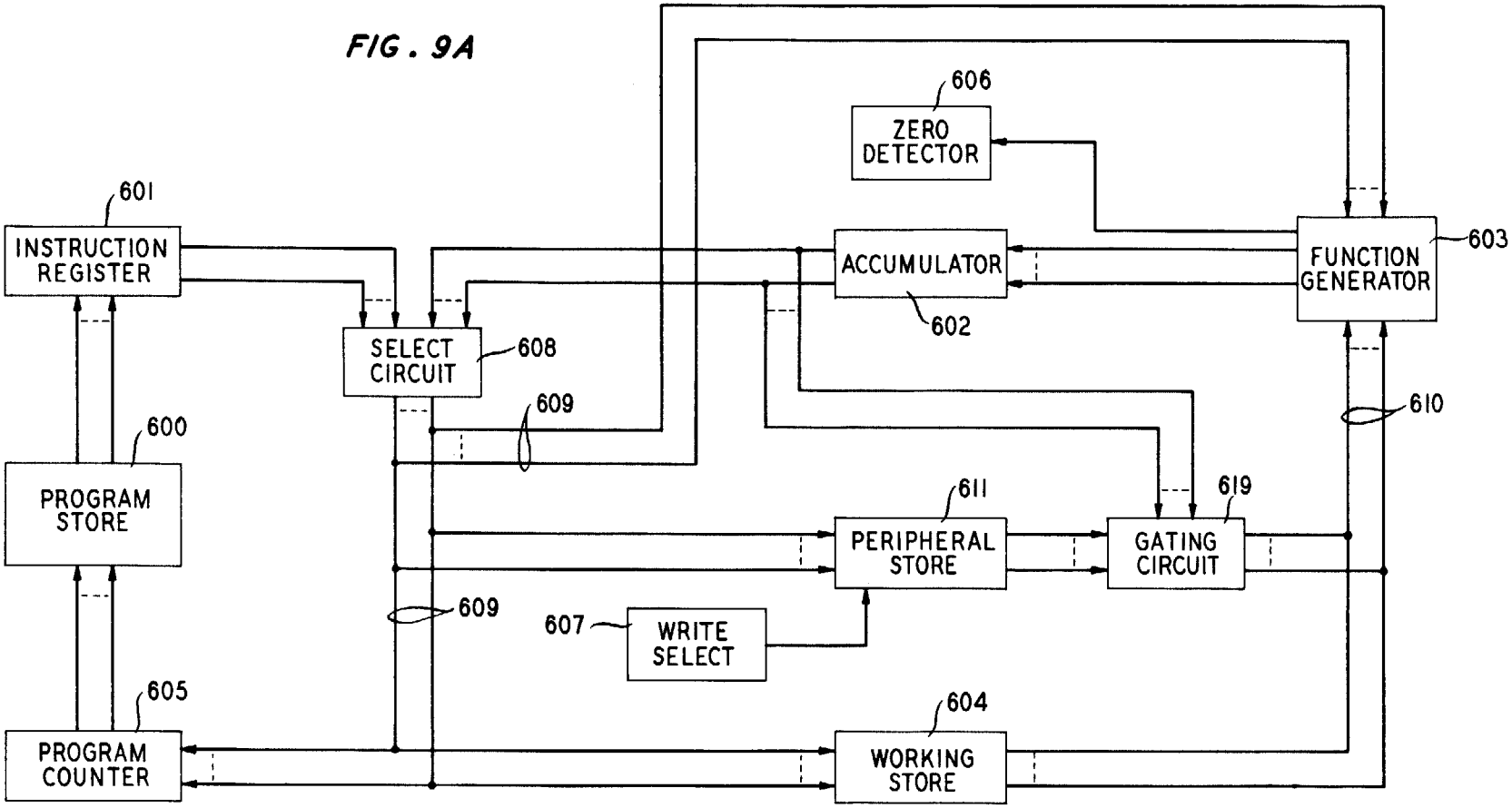
Figure 9B:
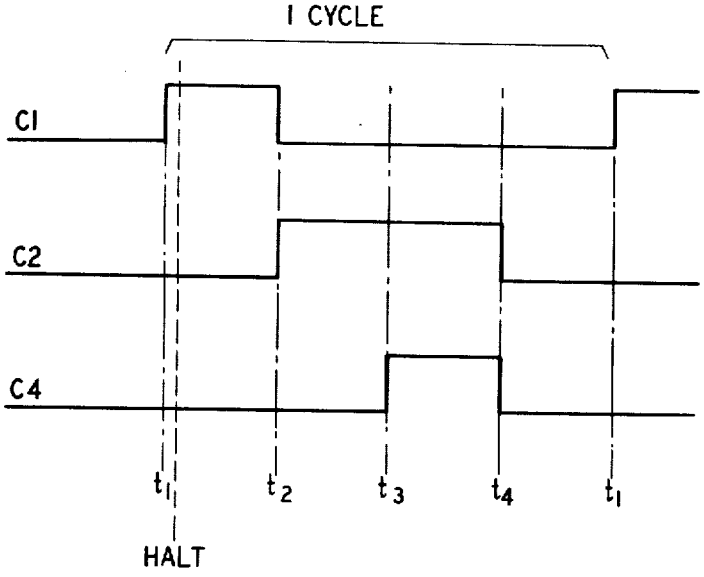
Figure 9G:
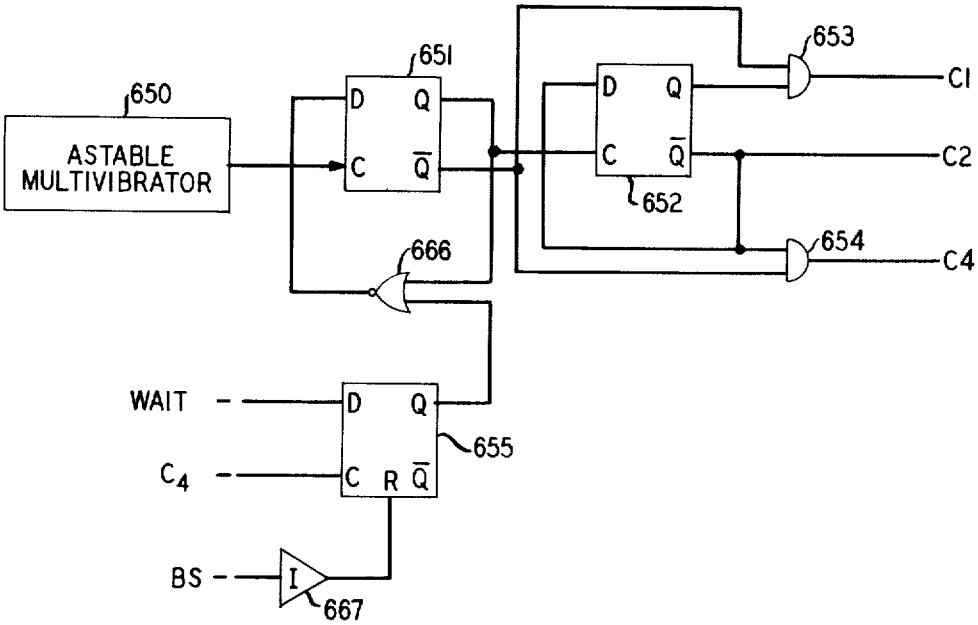
Figures 9C, 9F:
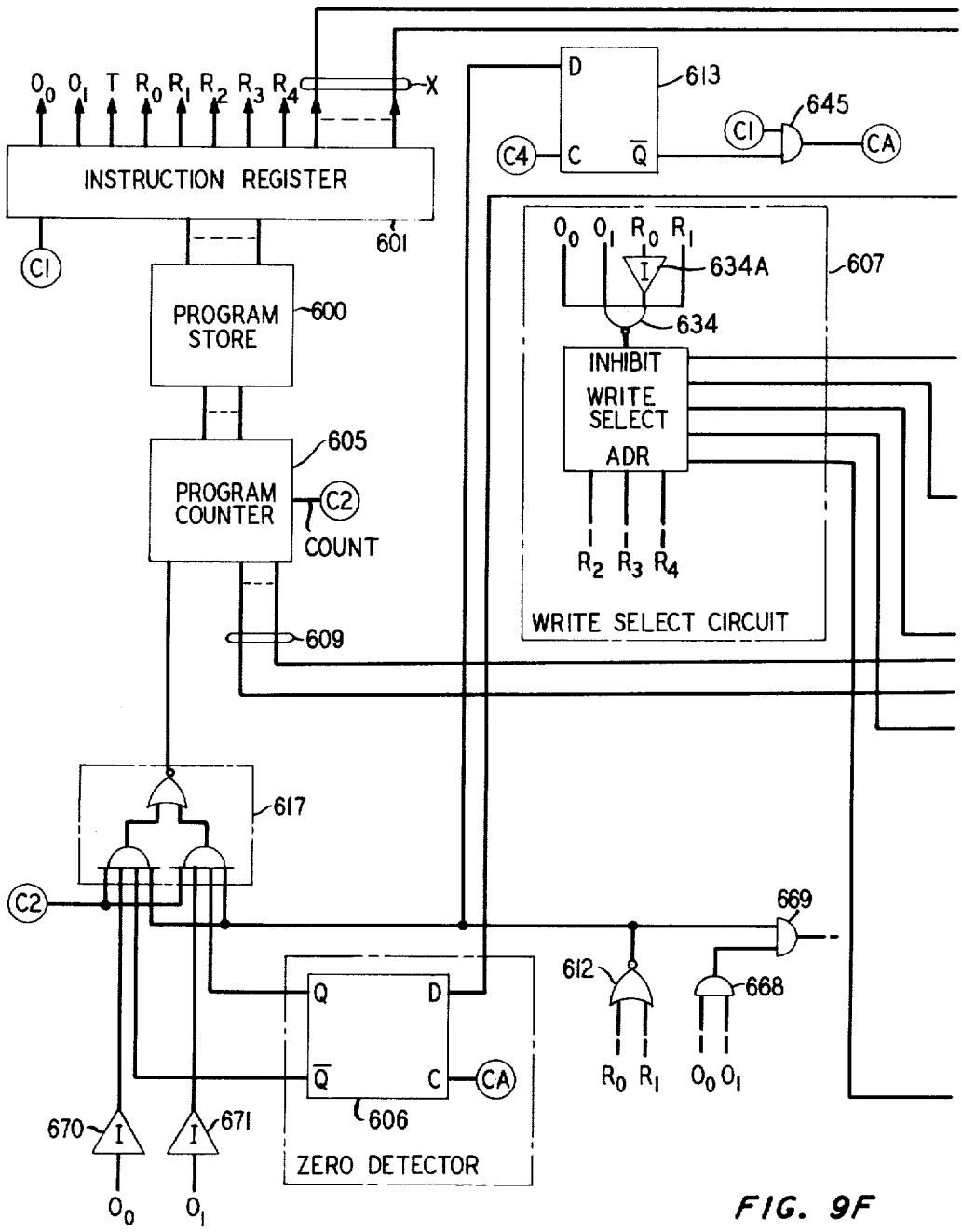
Figure 9D:
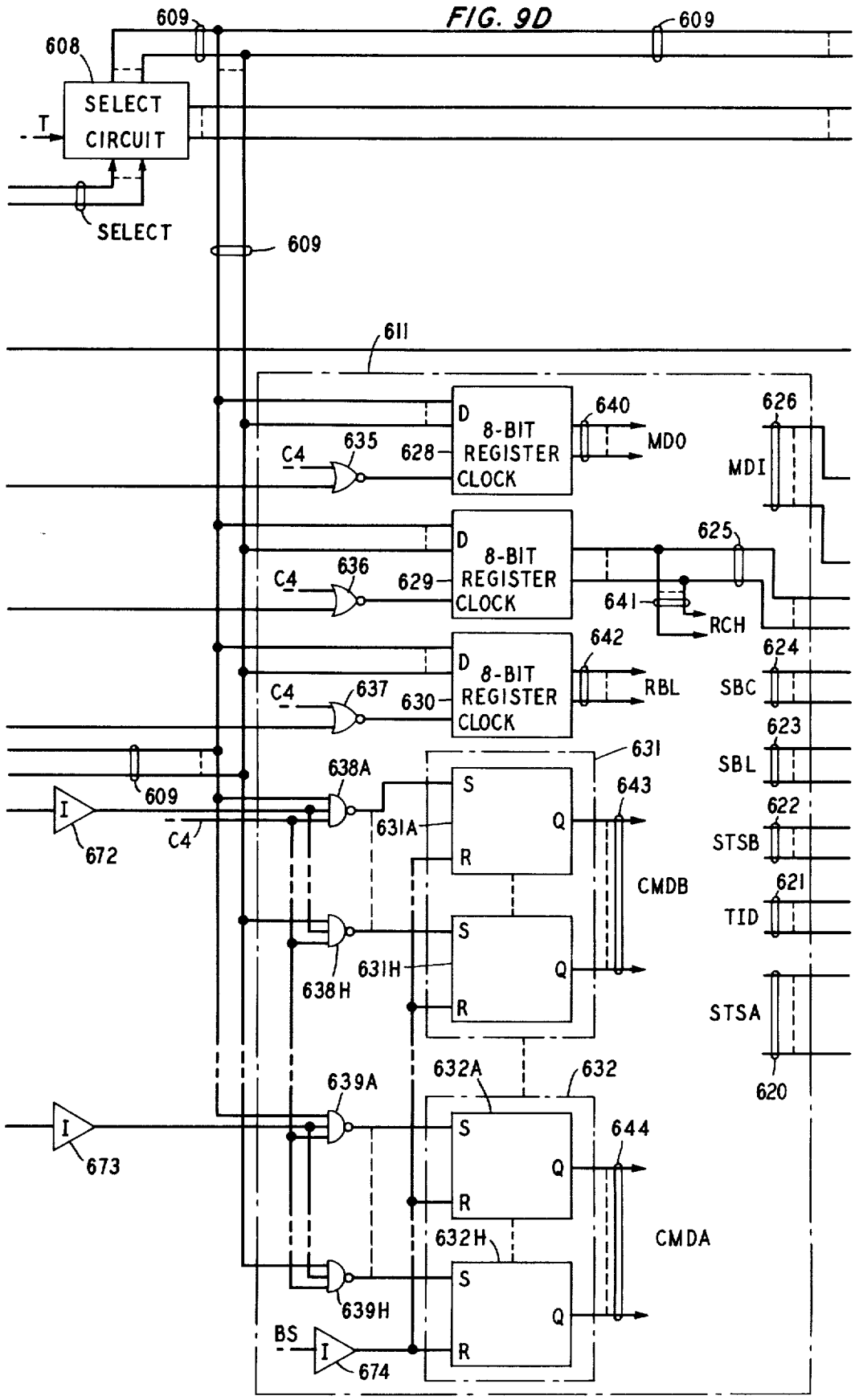
Figure 9E:
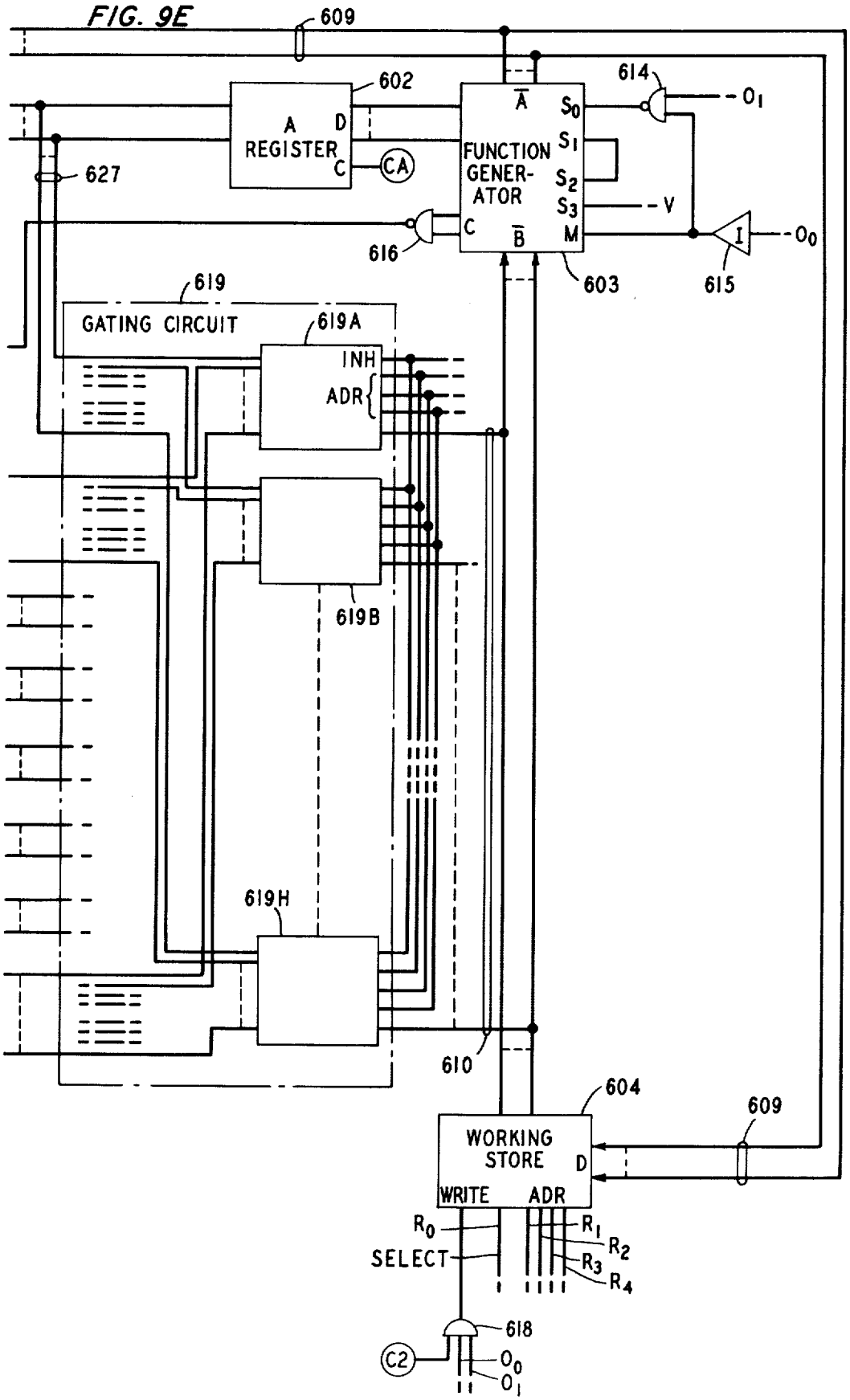
Figure 10A:
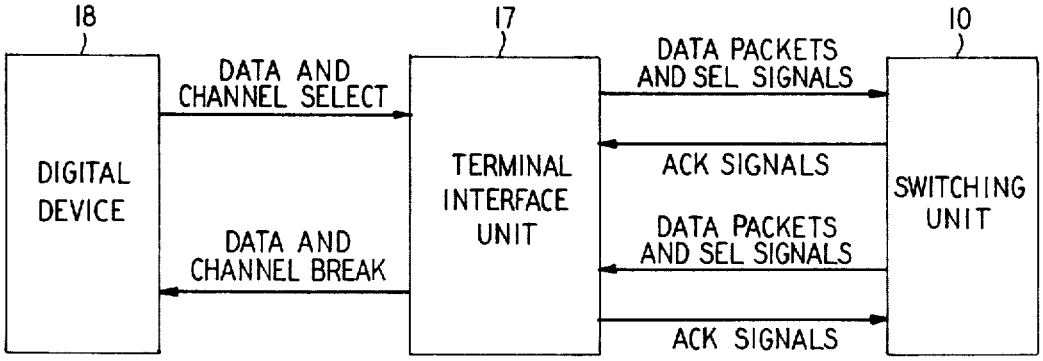
Figure 10B:
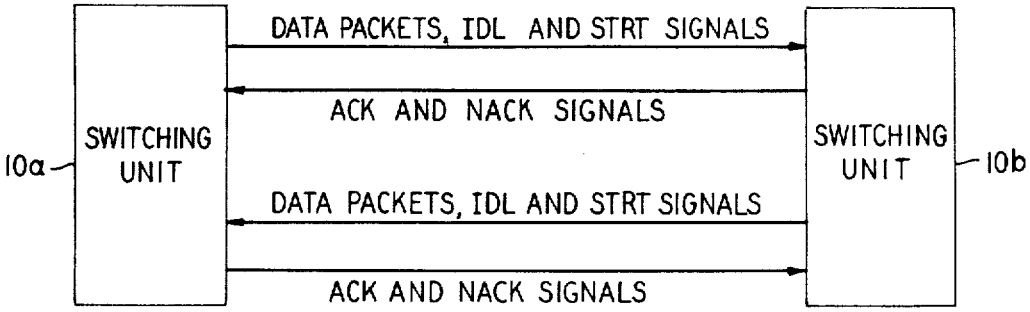
Figure 11A:
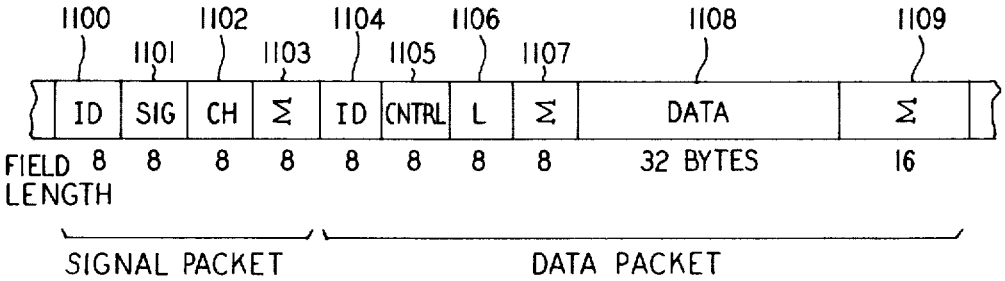
Figure 11B:
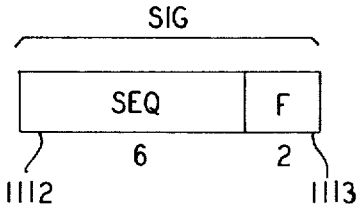
Figure 11C:
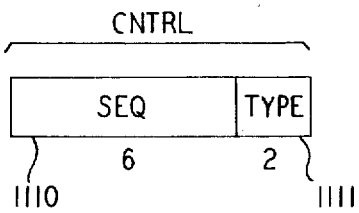
Figure 12:
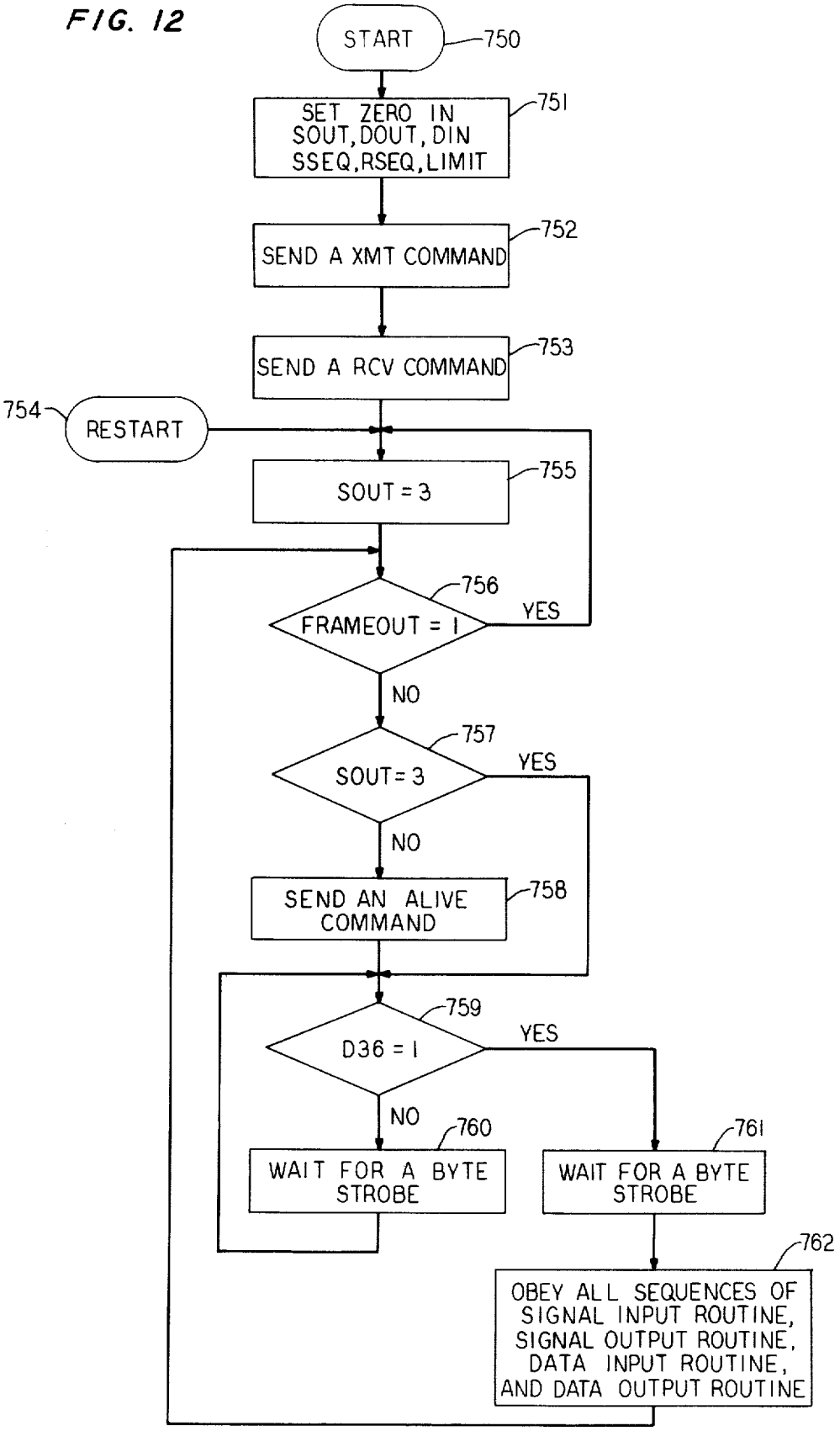
Figure 13A:
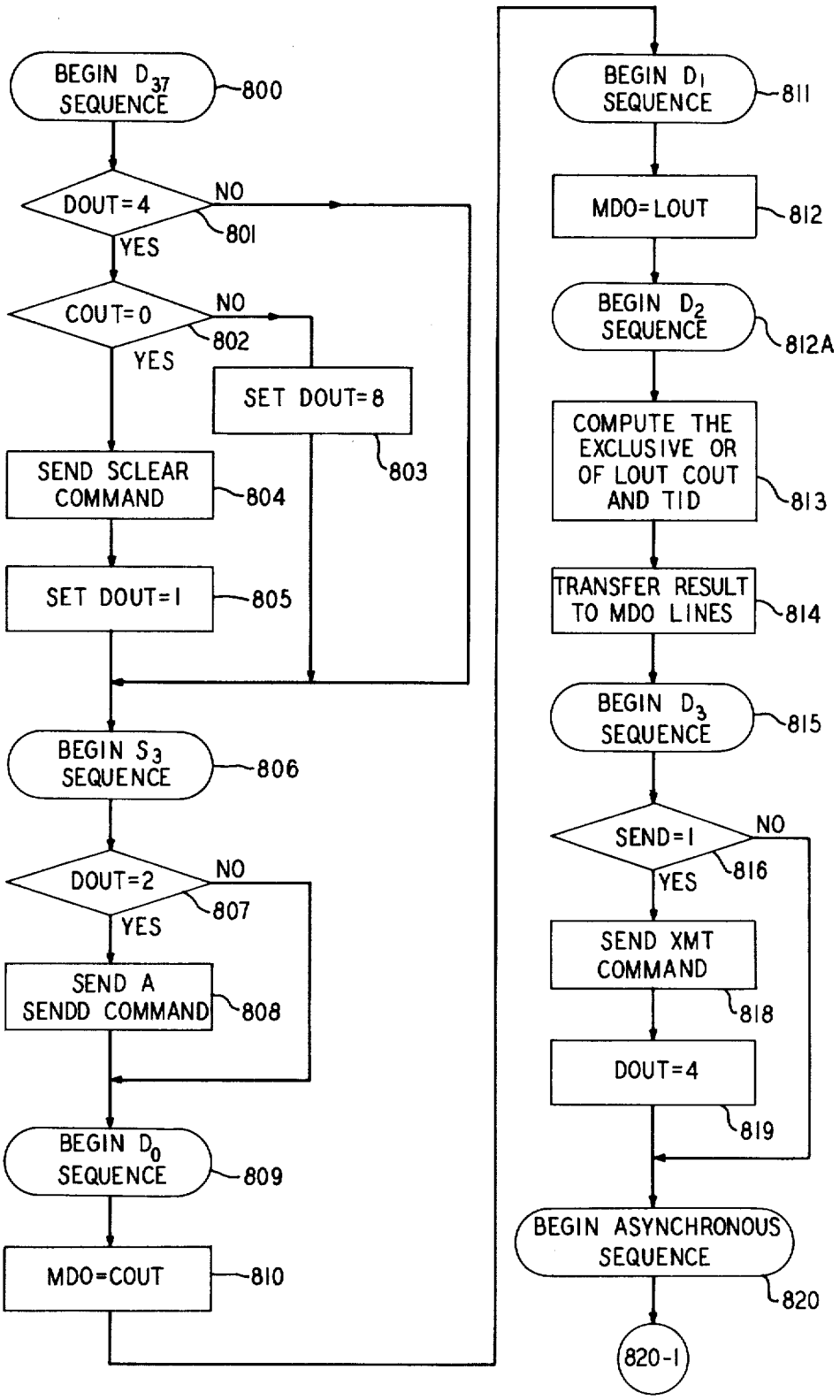
Figure 13B:
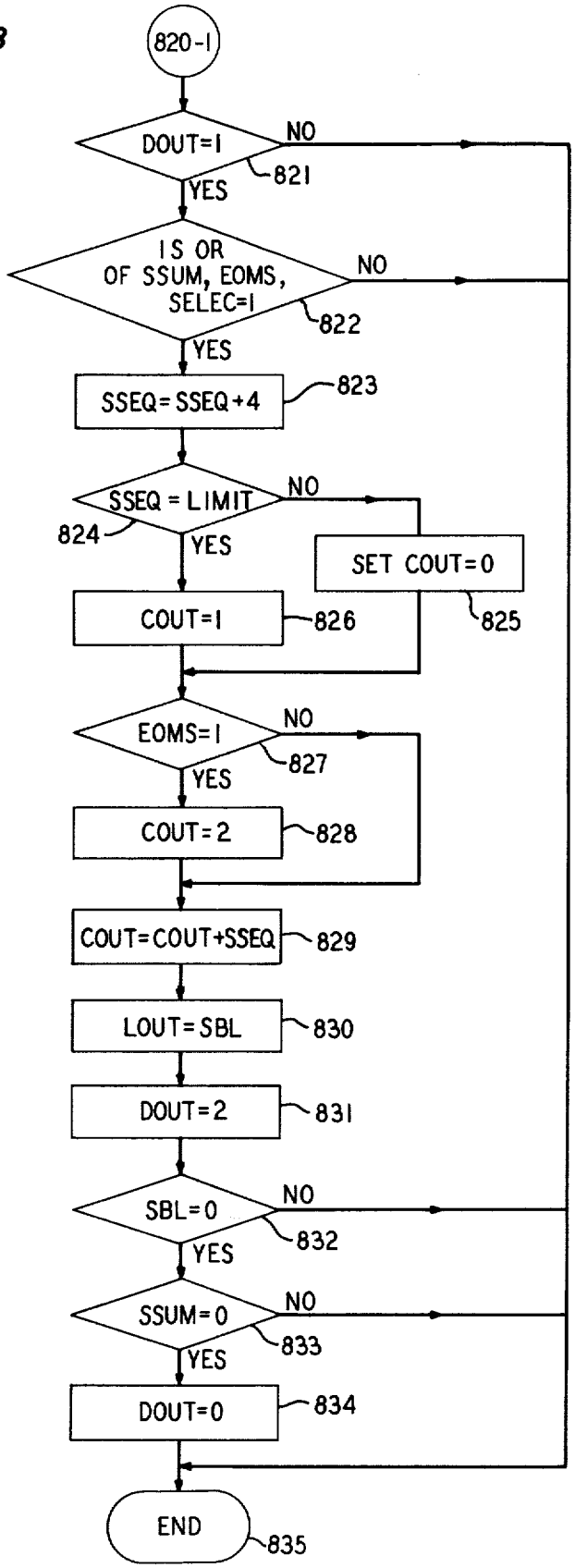
Figure 15:
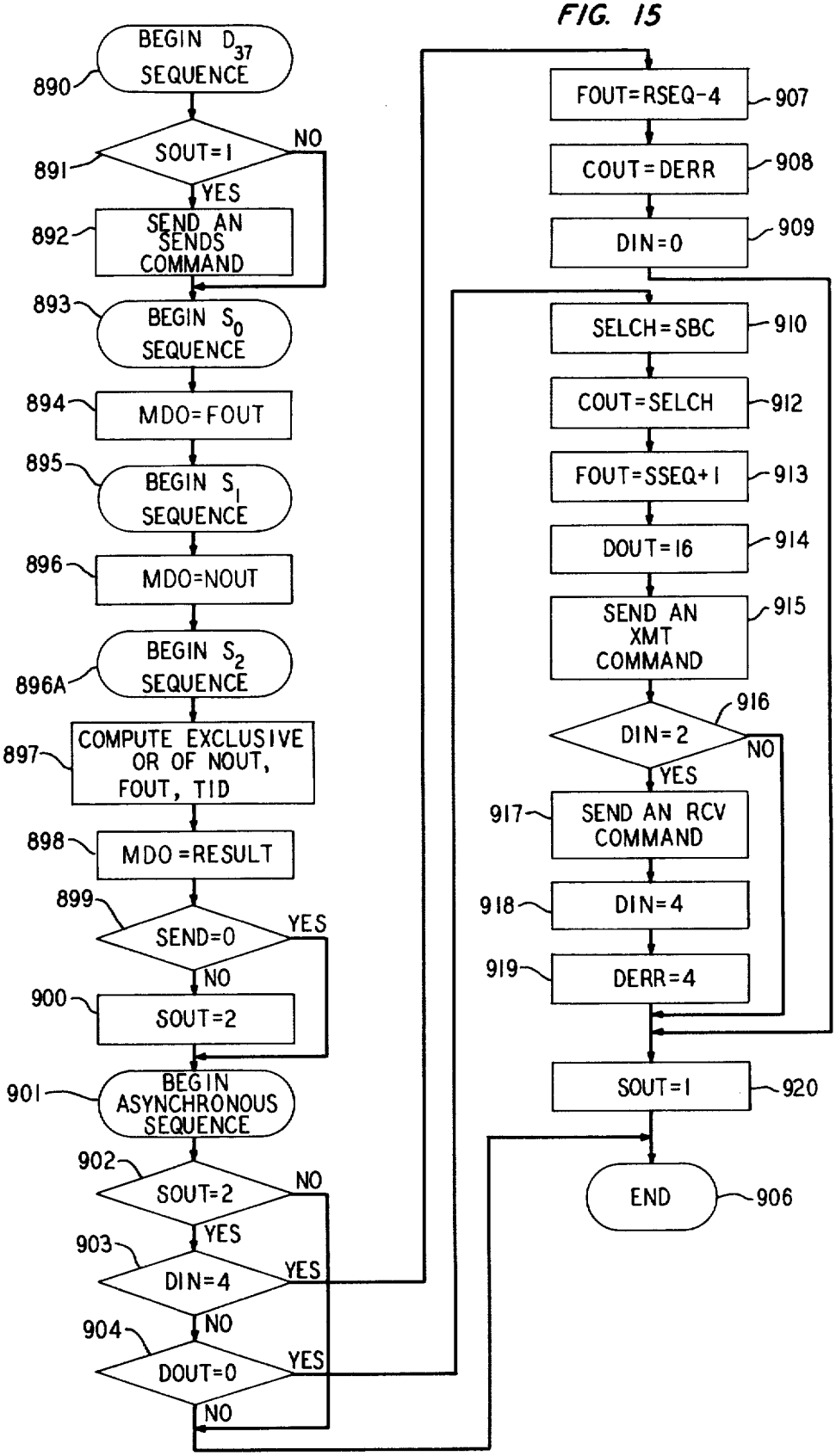
Figure 16A:
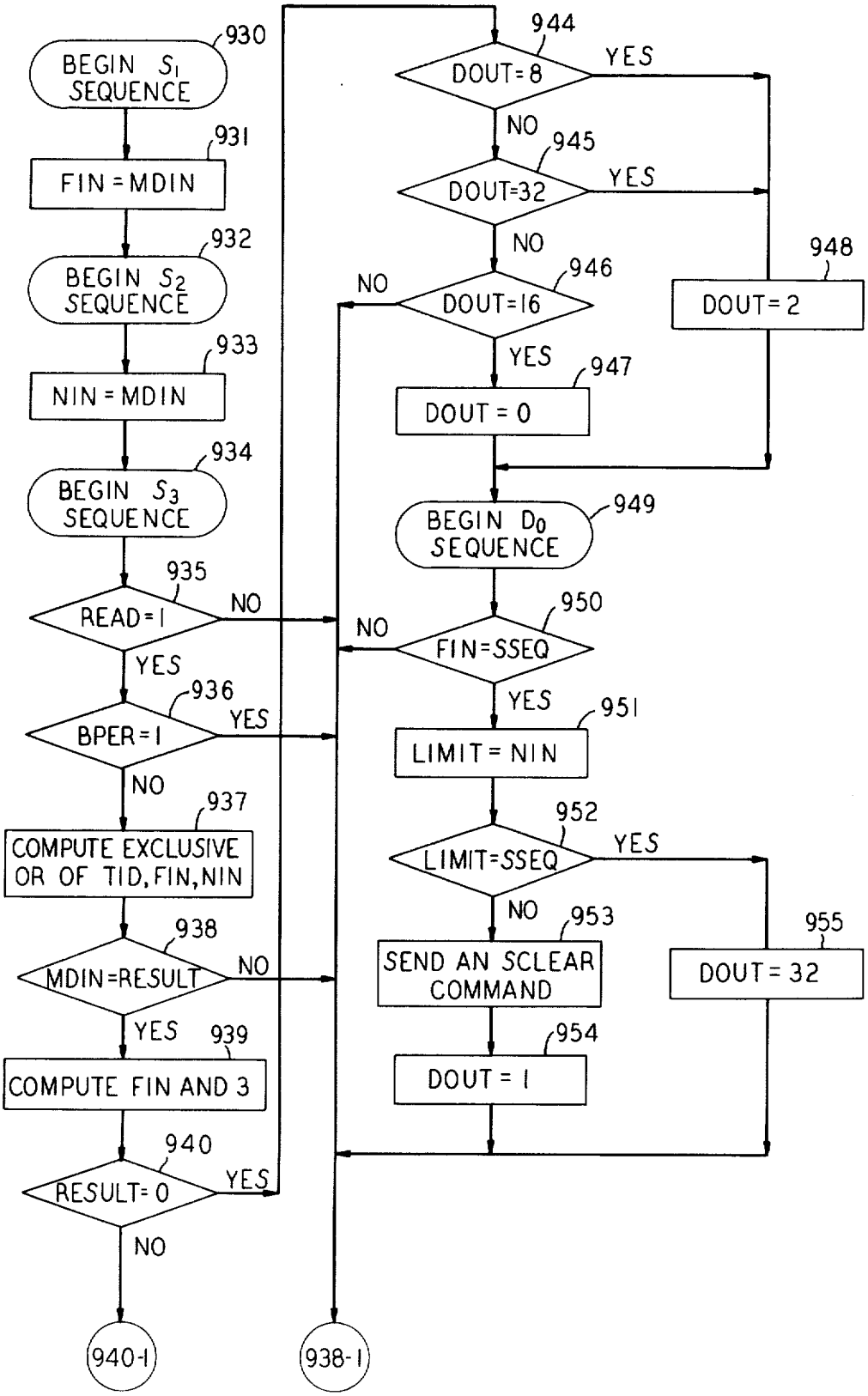
Figure 16B:
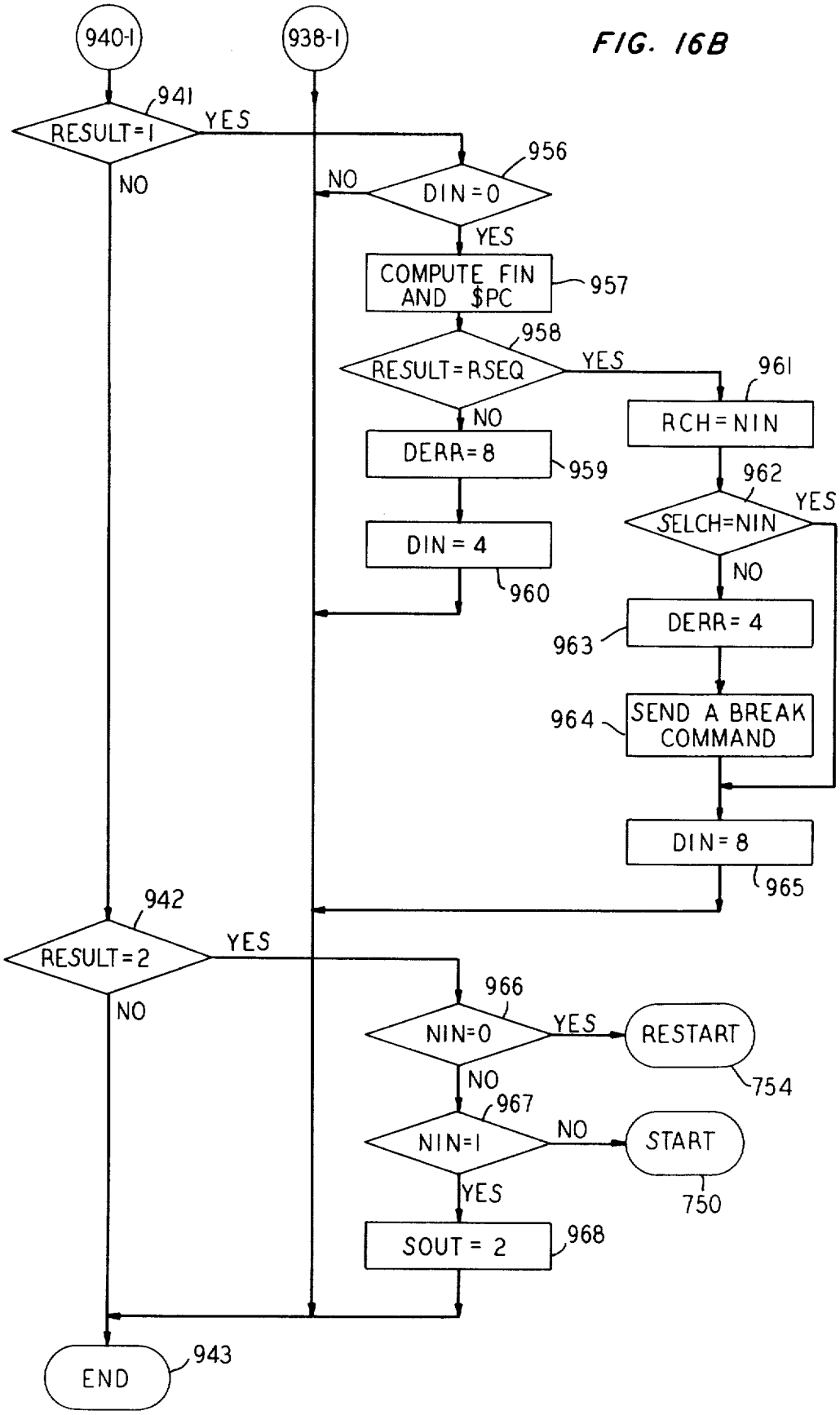
Figure 19A:
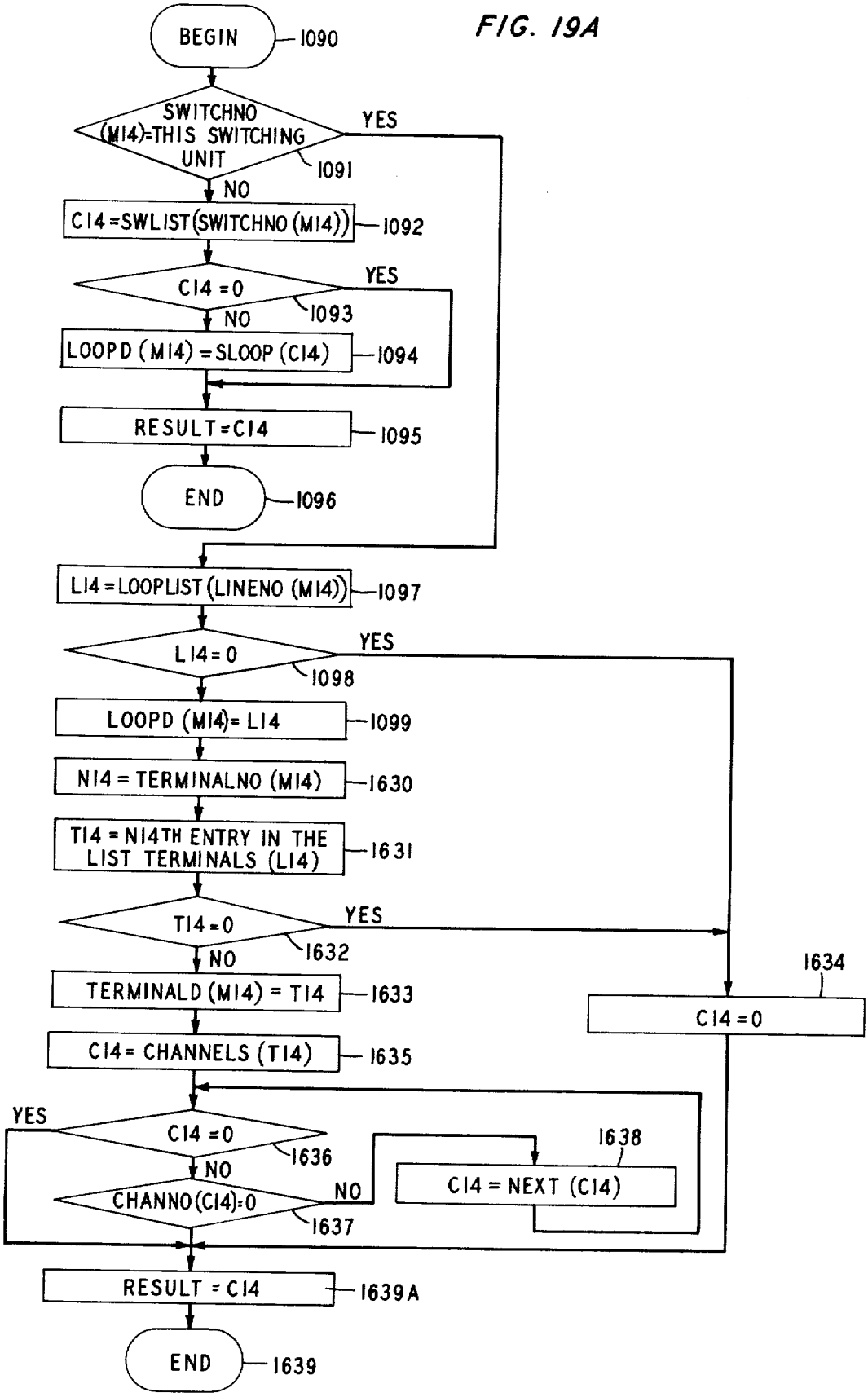
Figure 19B:
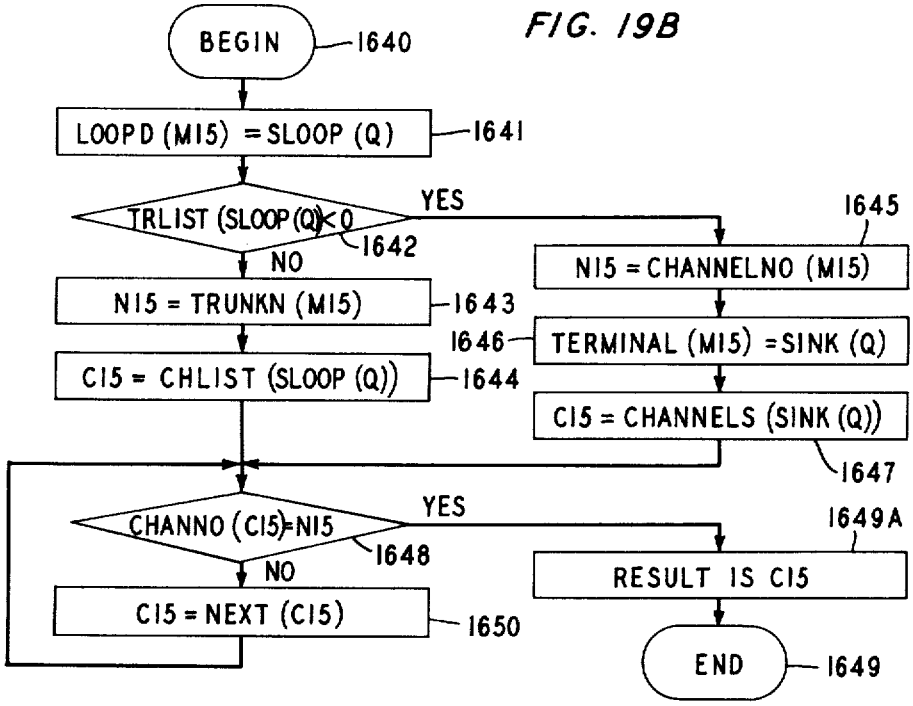
Figure 19C:
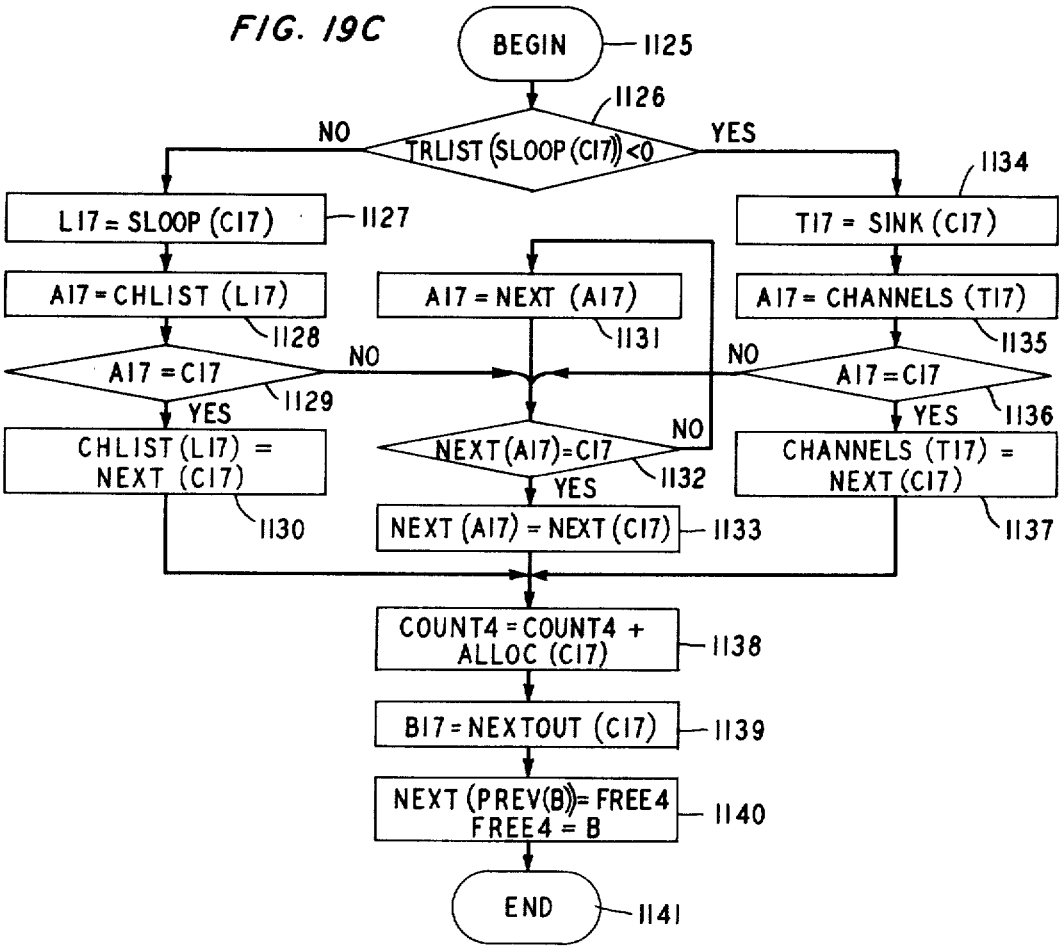
Figure 19D:
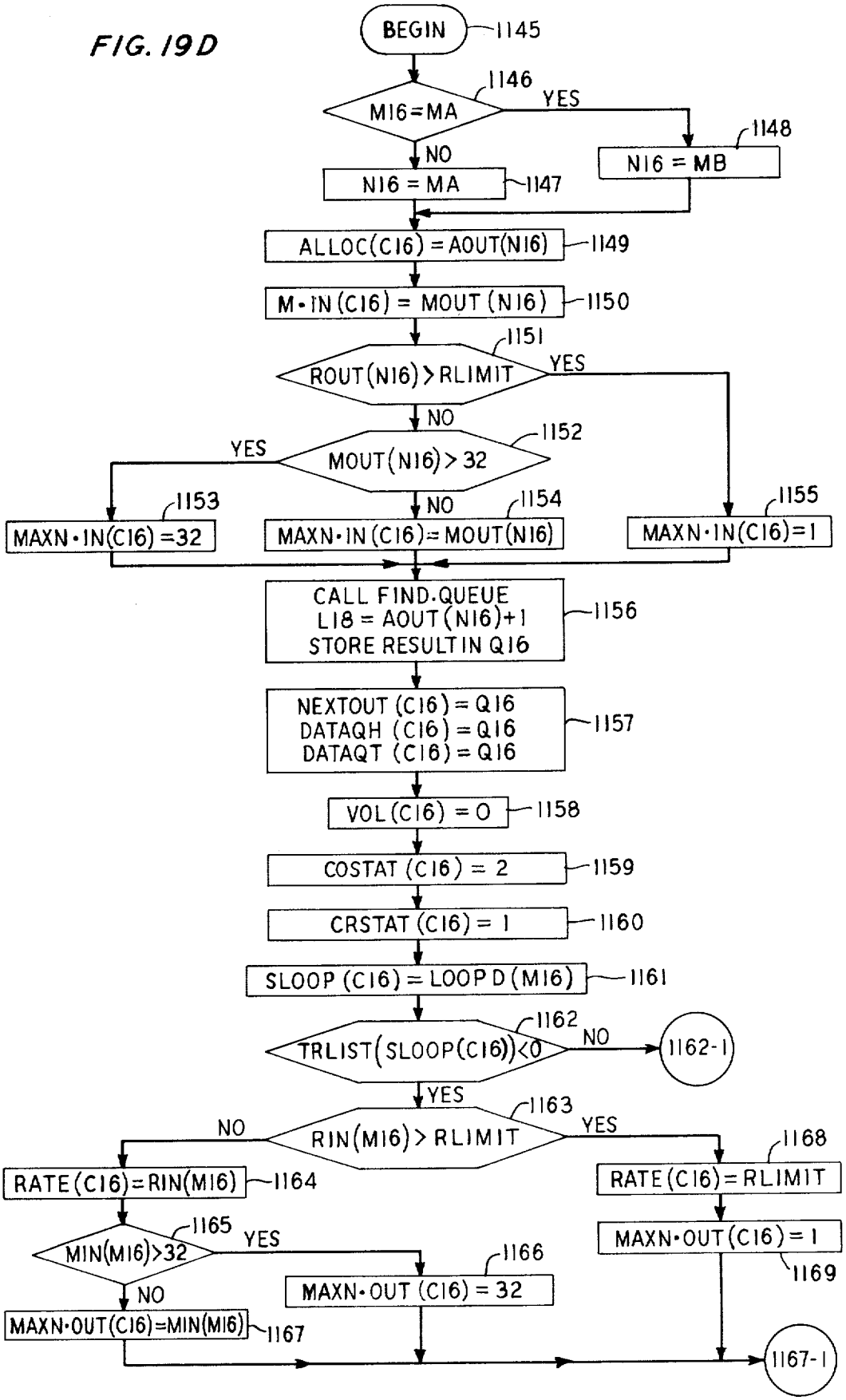
Figure 19F:
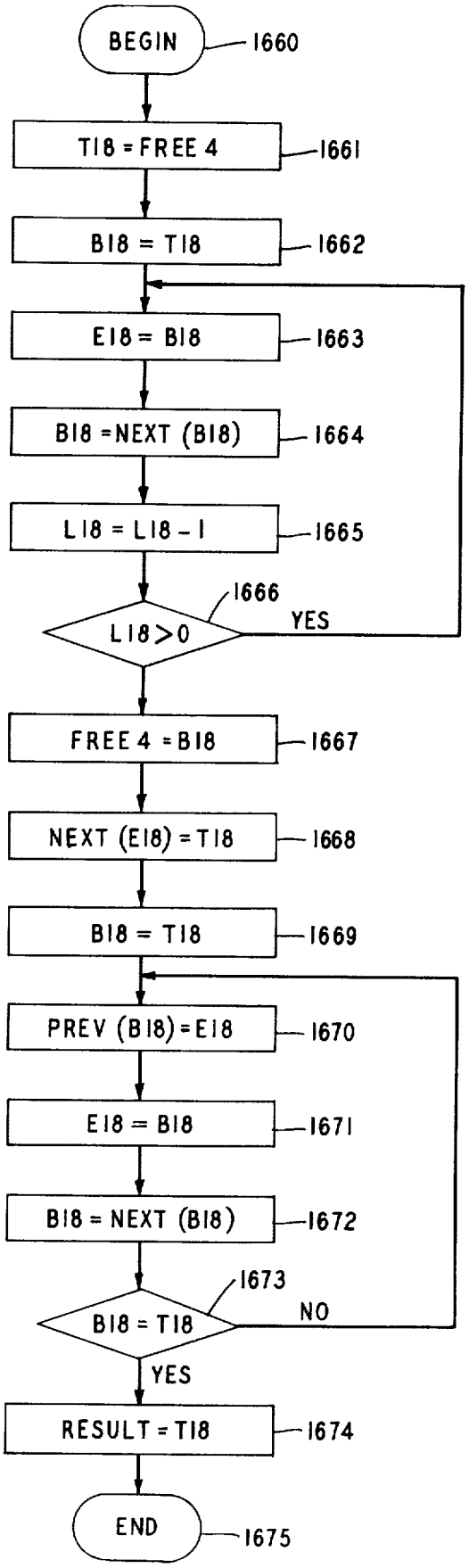
Figure 21A:
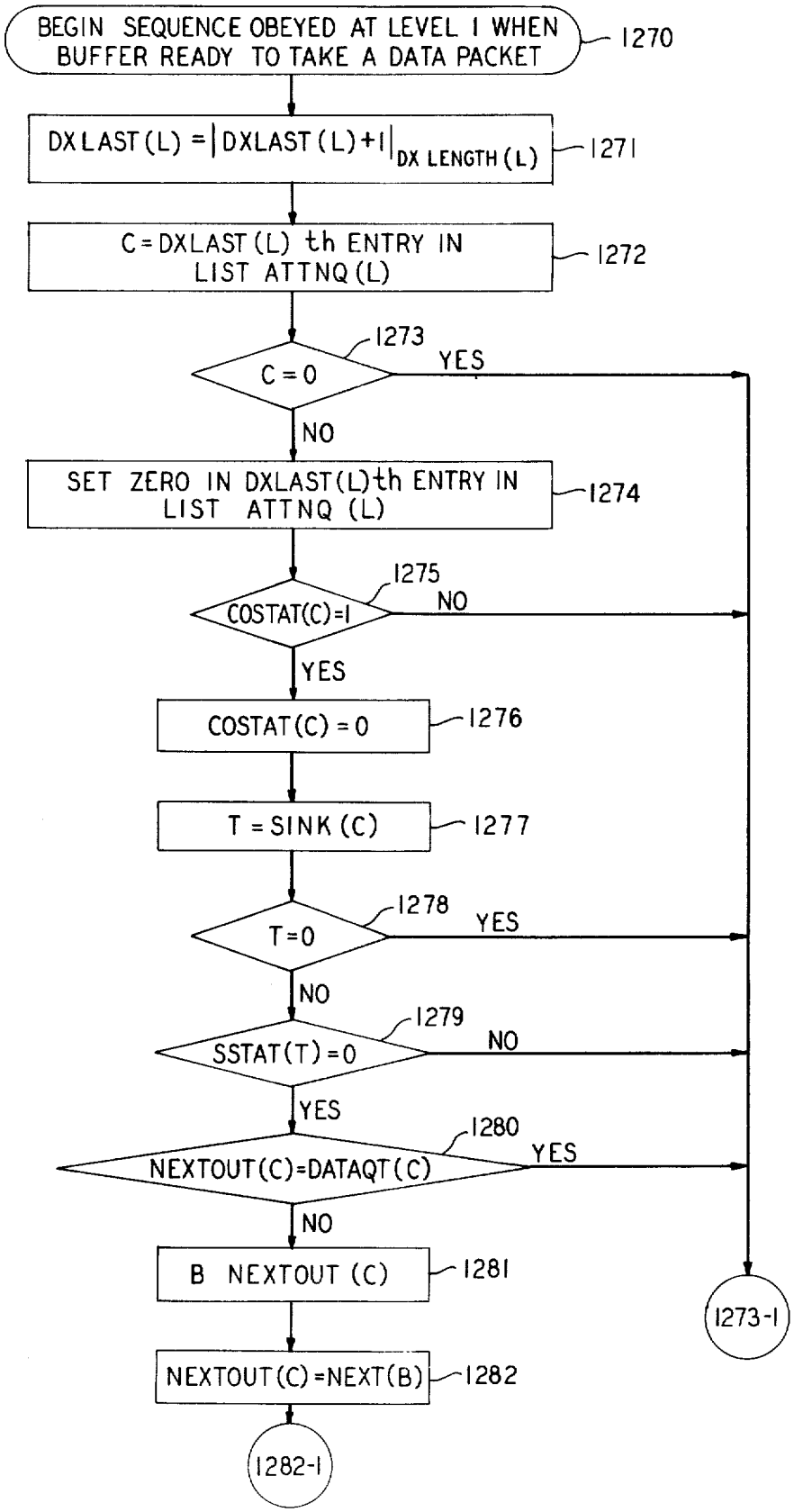
Figure 23A:
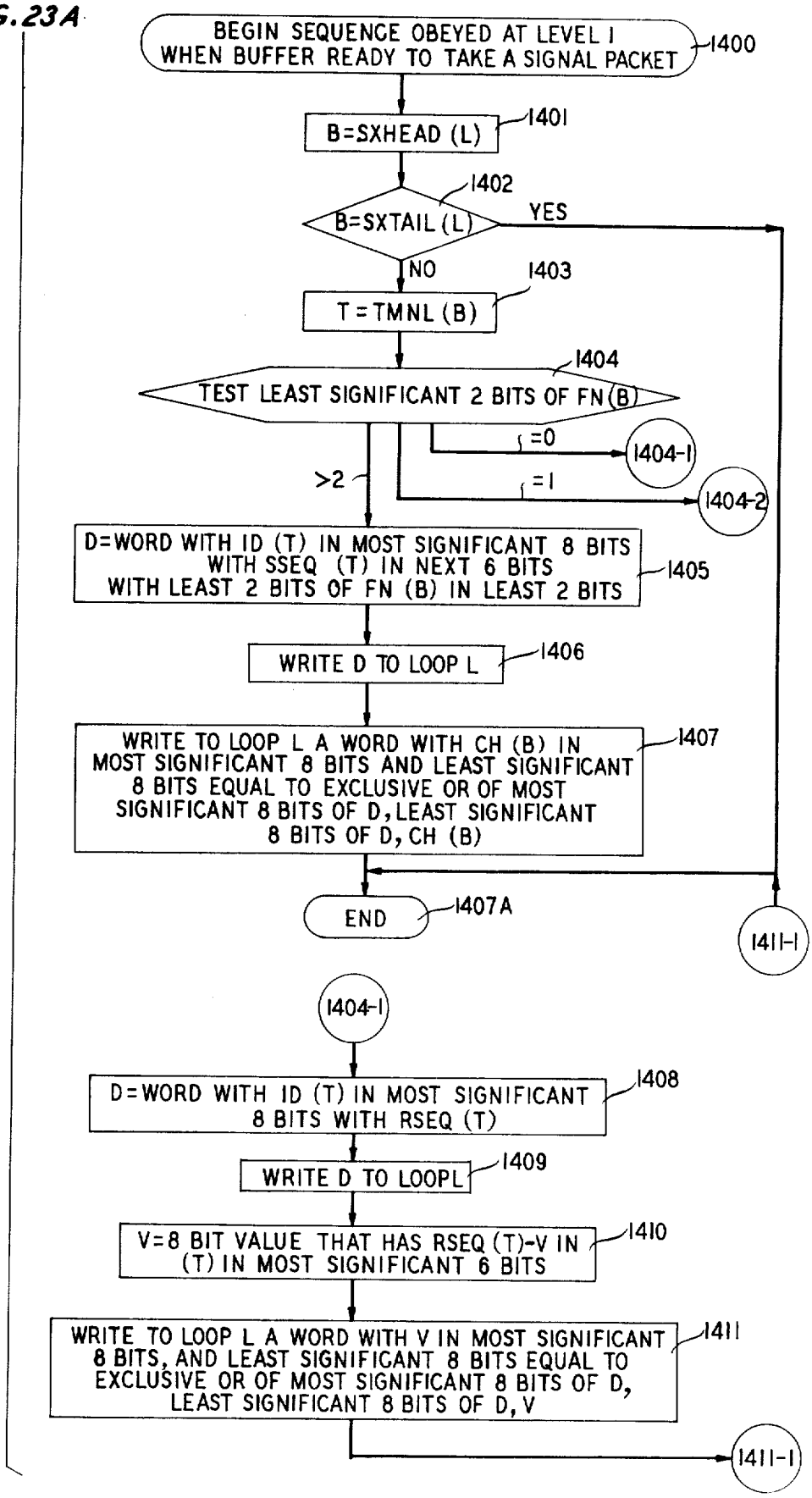
Figure 23B:
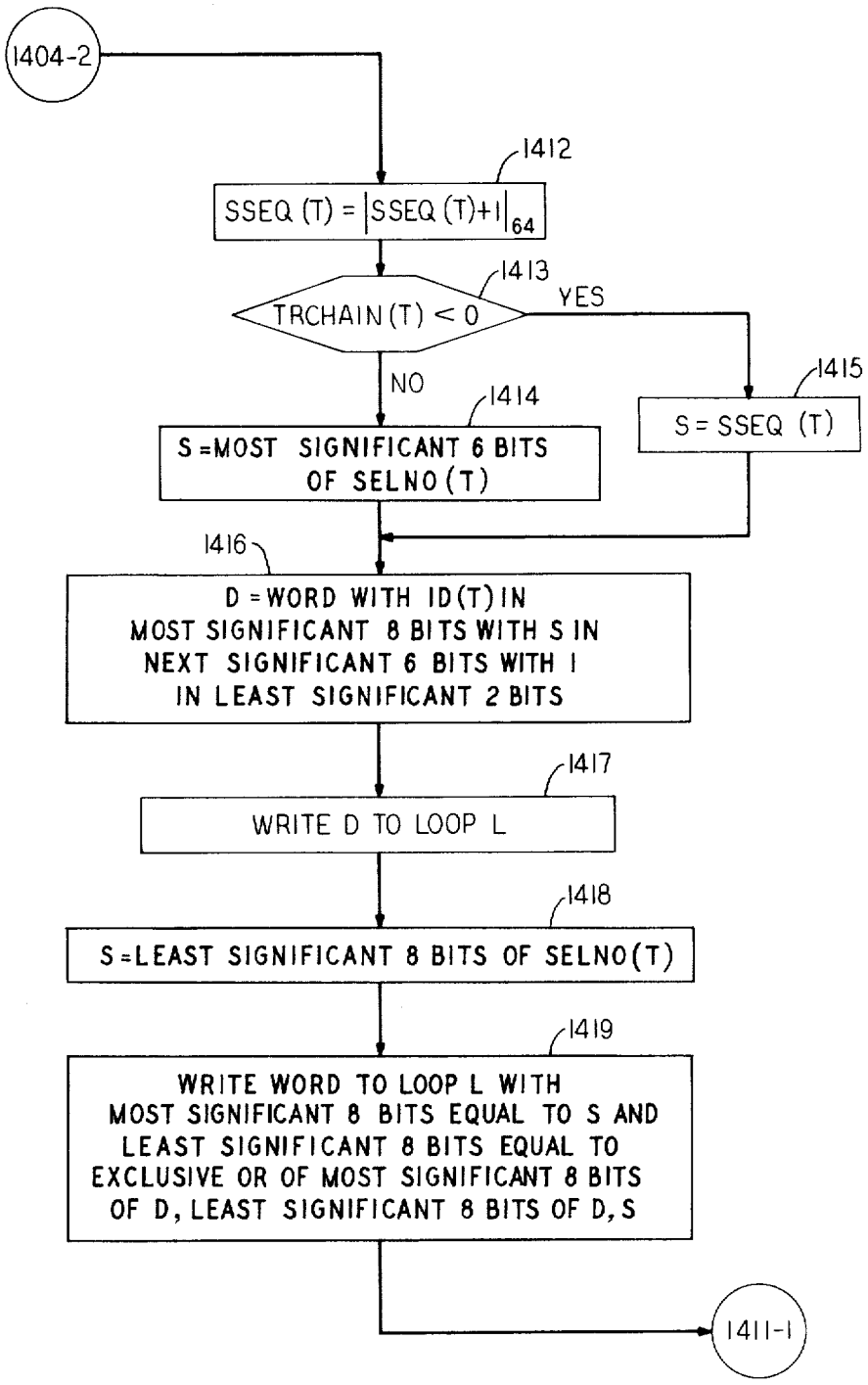
Figure 24A:
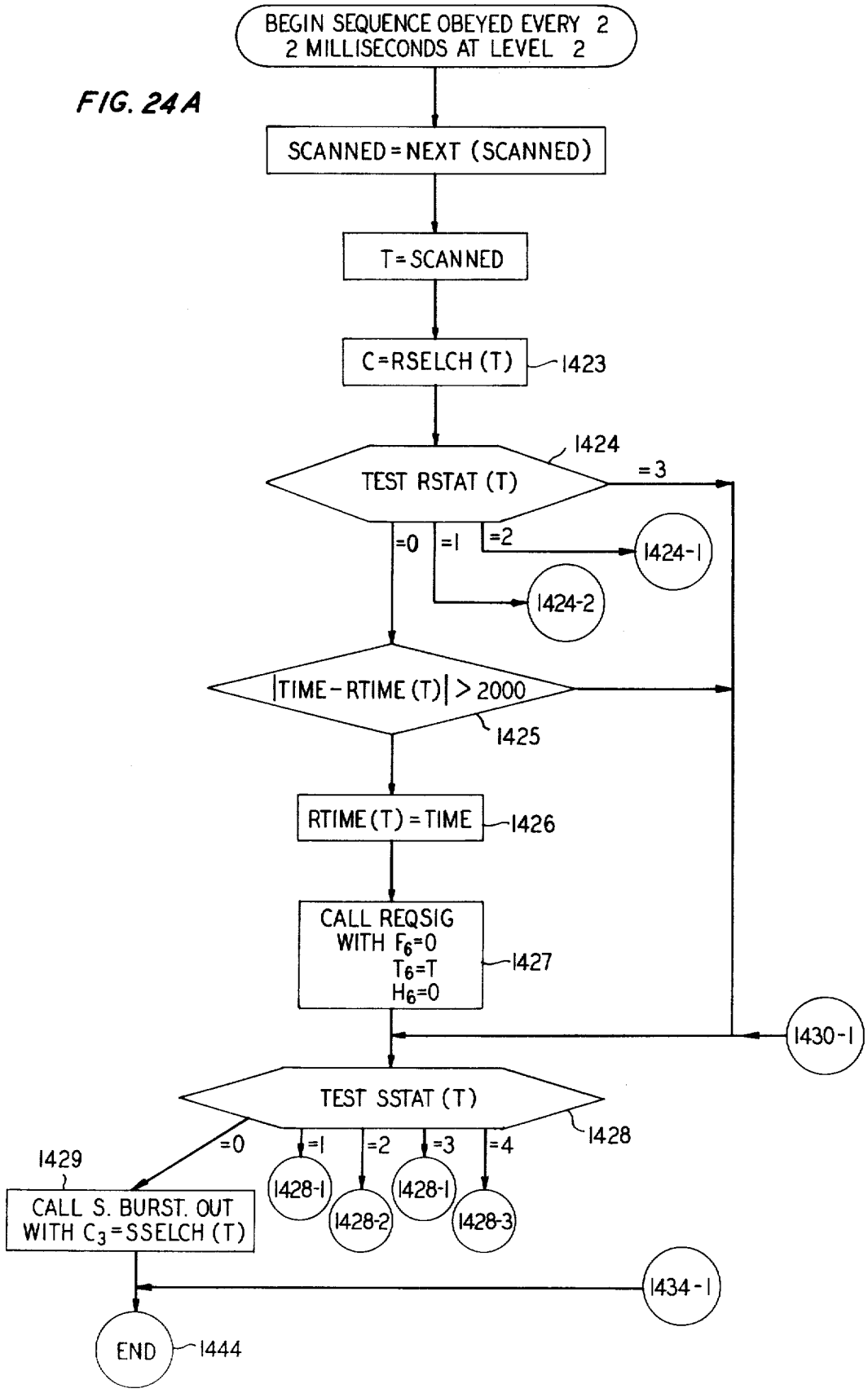
Figure 24B:
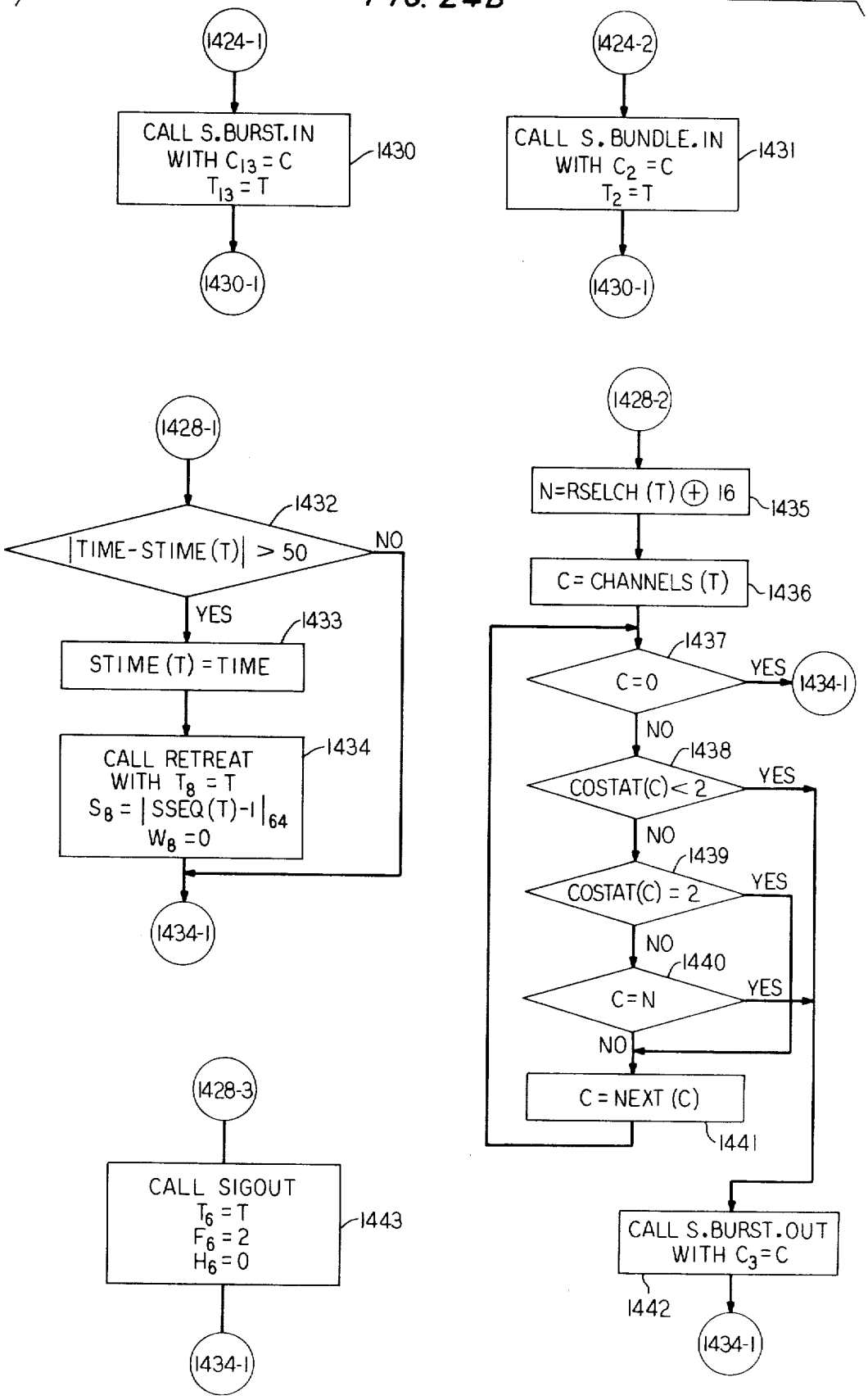
Figure 25A:
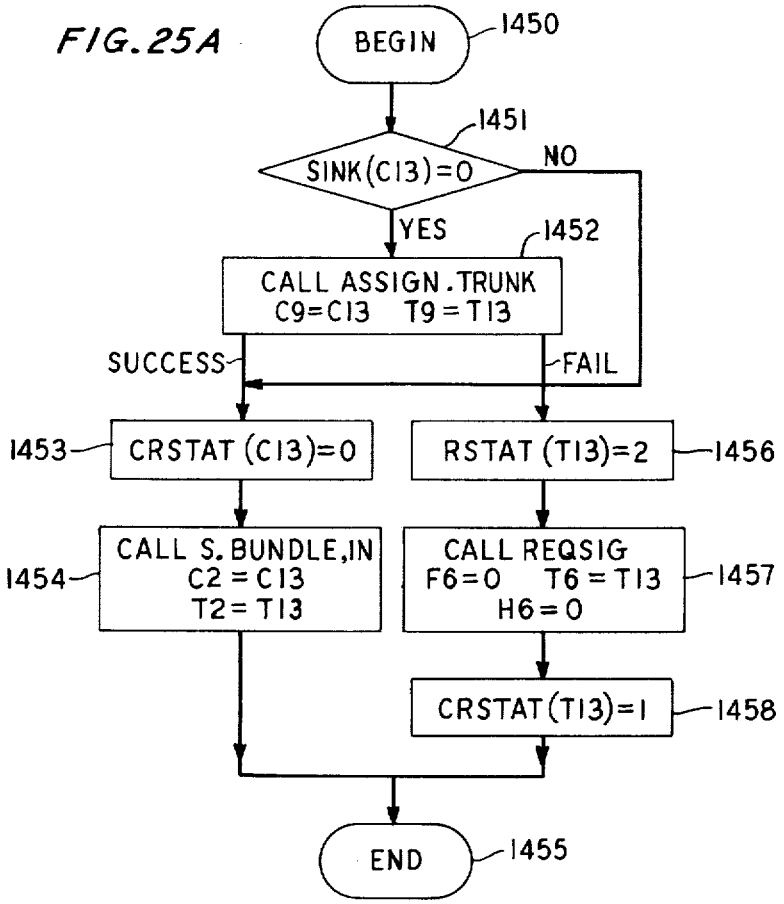
Figure 25B:
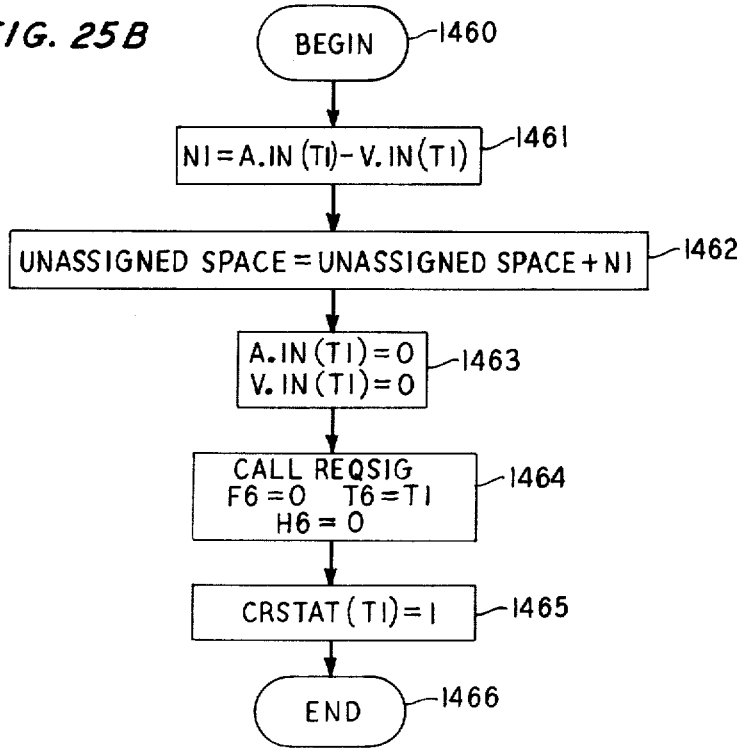
Figure 25C:
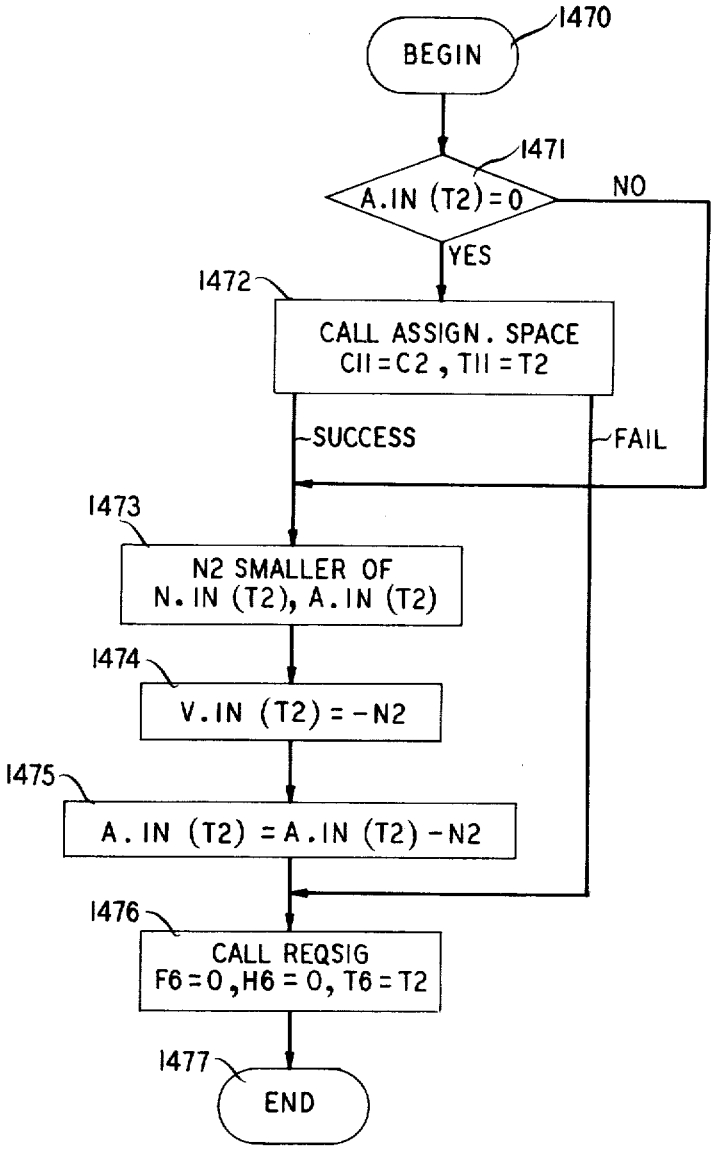
Figure 25D:
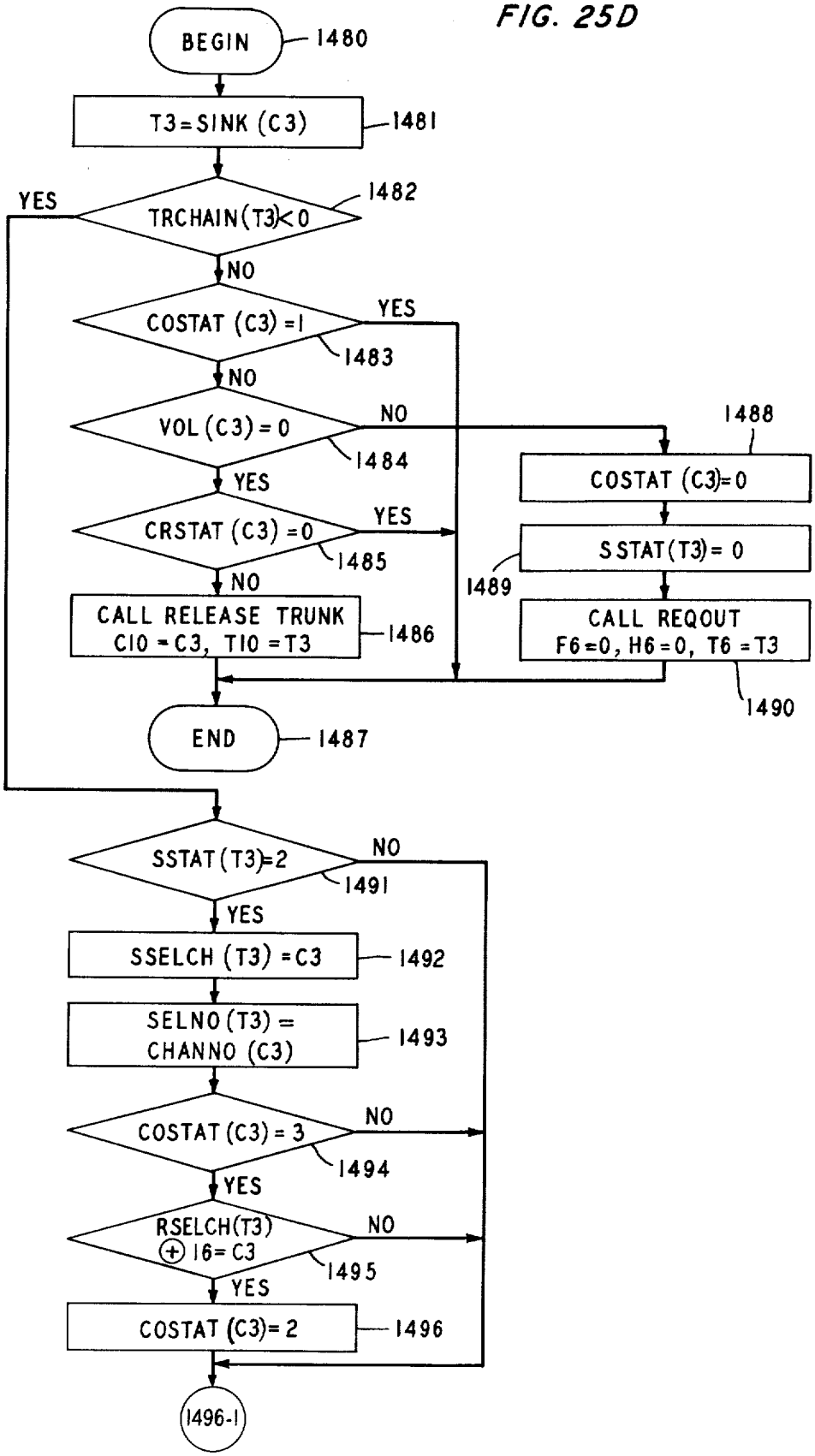
Figure 25E:
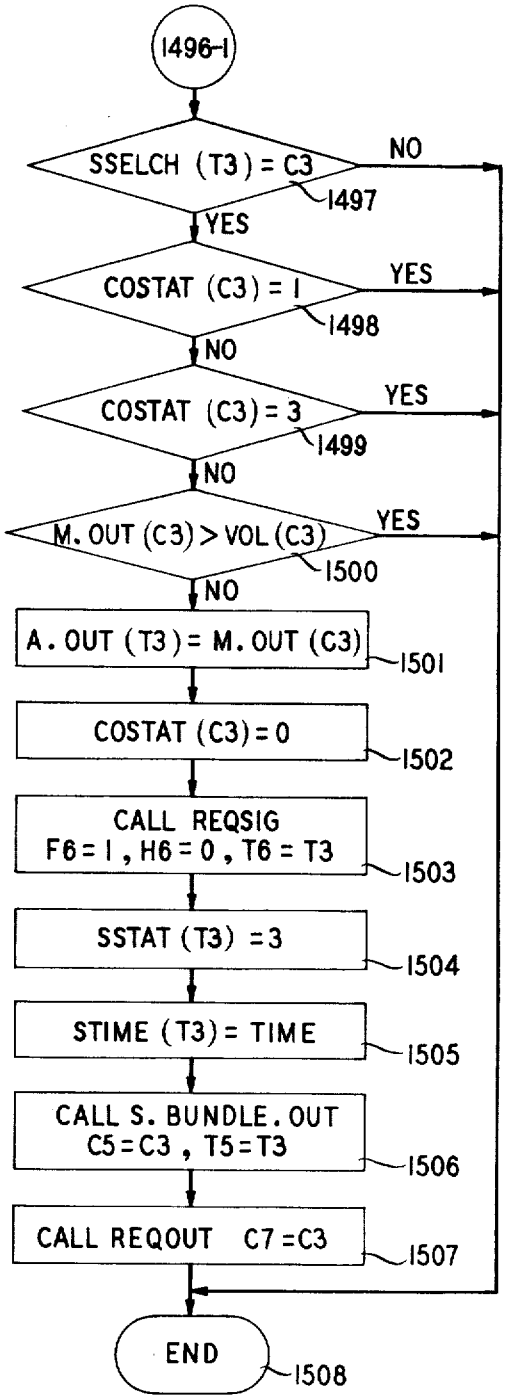
Figure 25F:
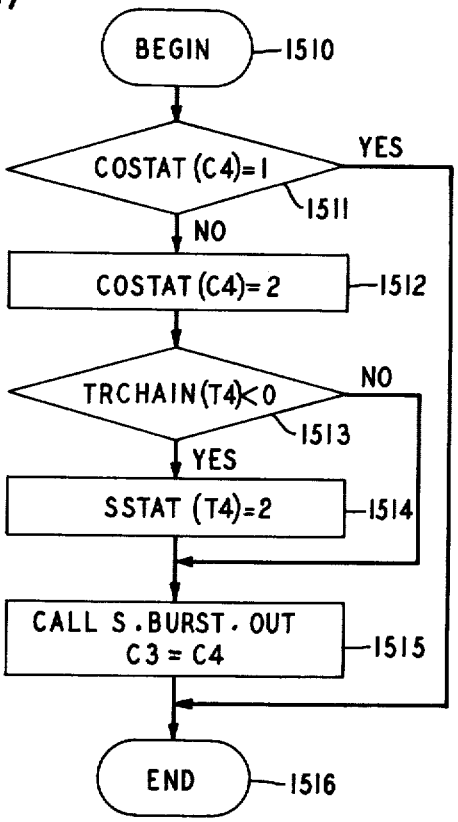
Figure 25G:
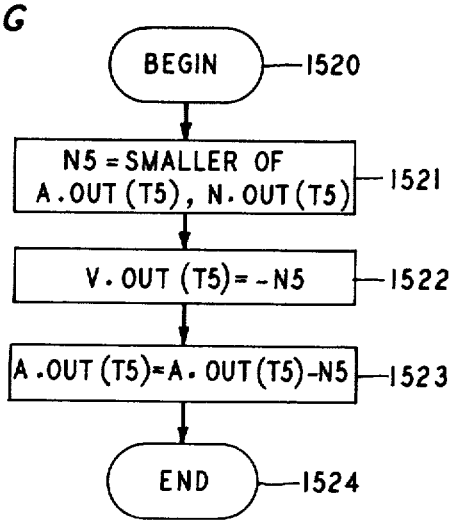
Figure 25H:
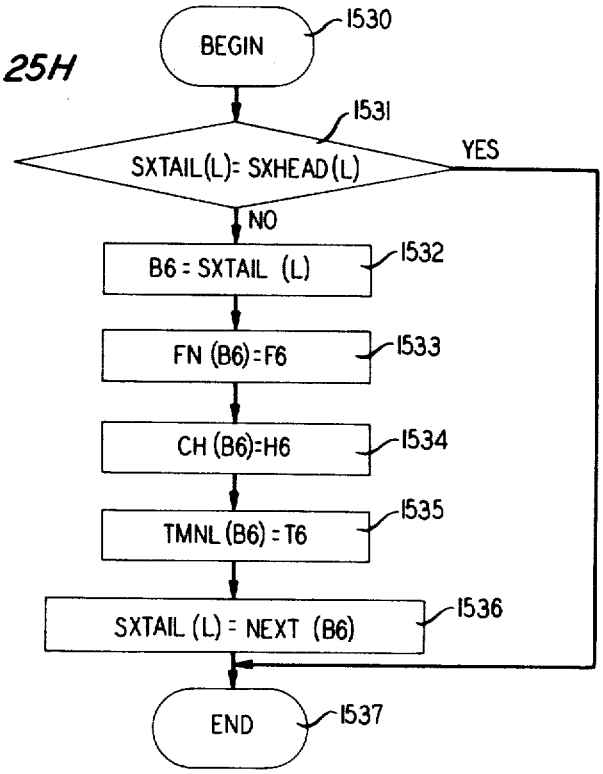
Figure 25I:
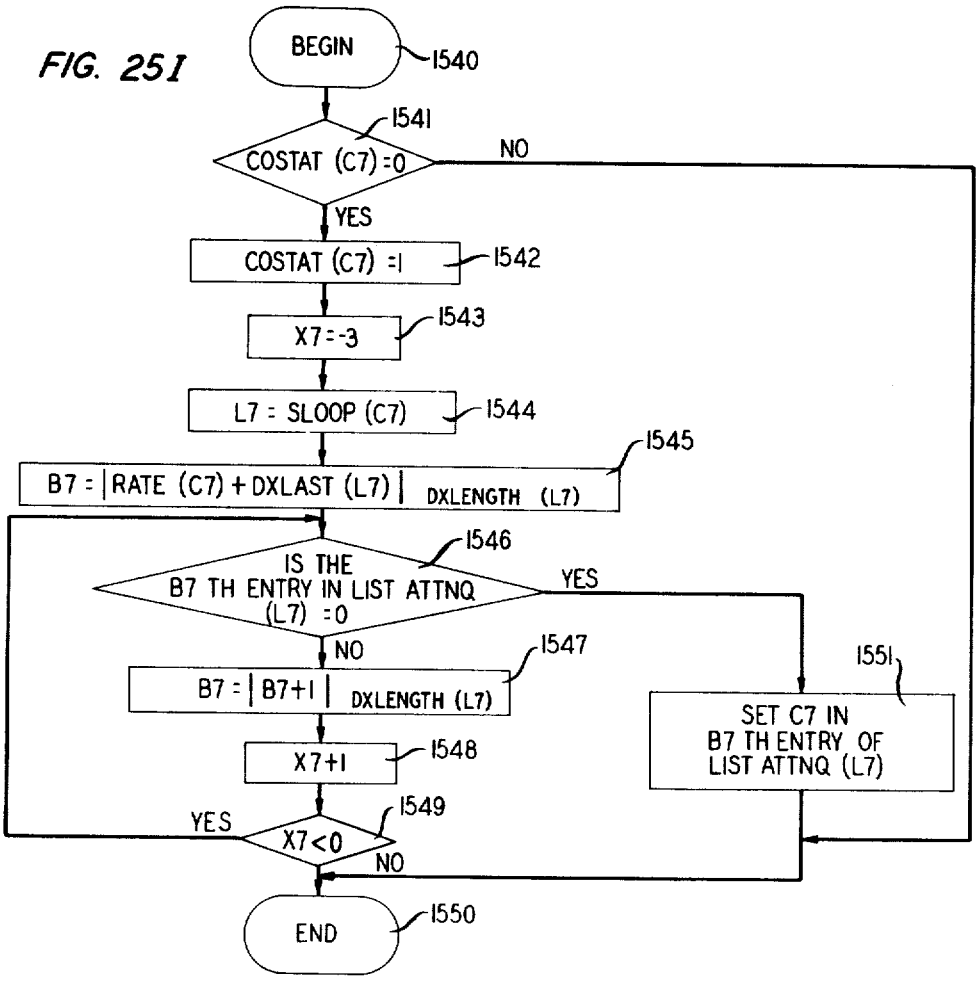
Figure 25J:
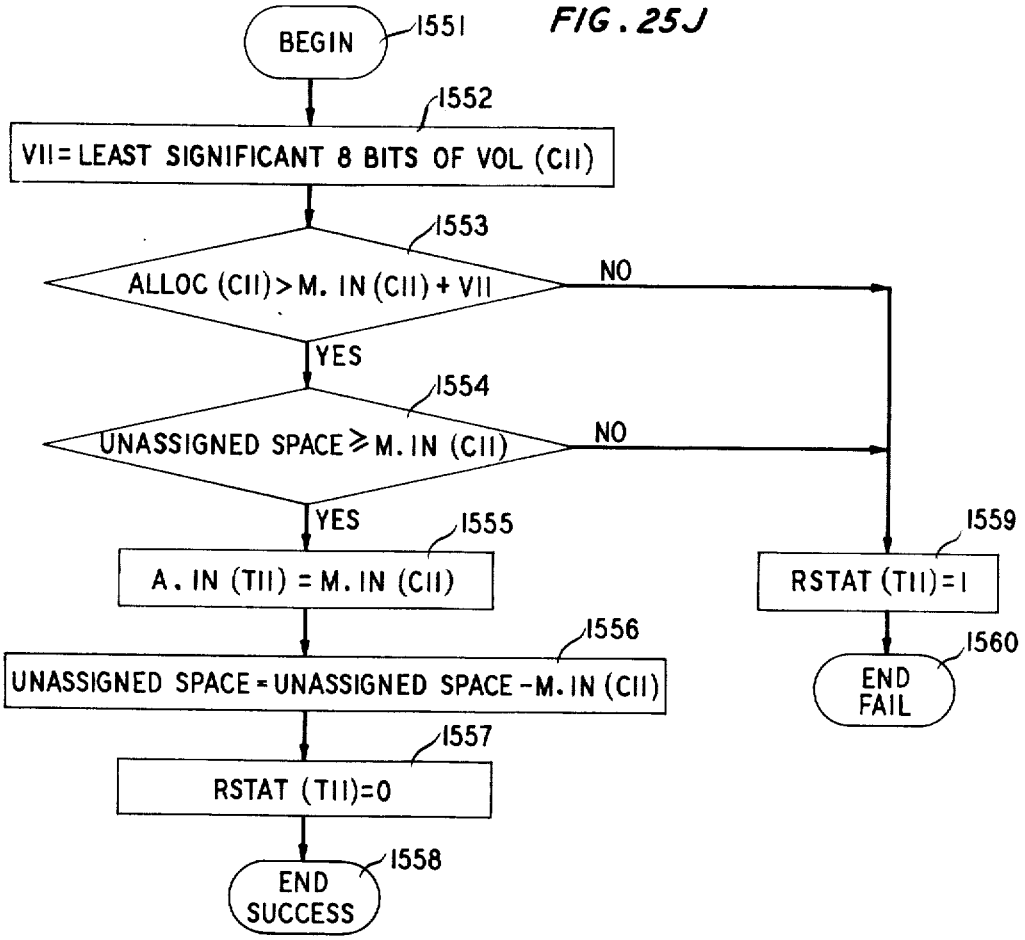
Figure 25K:
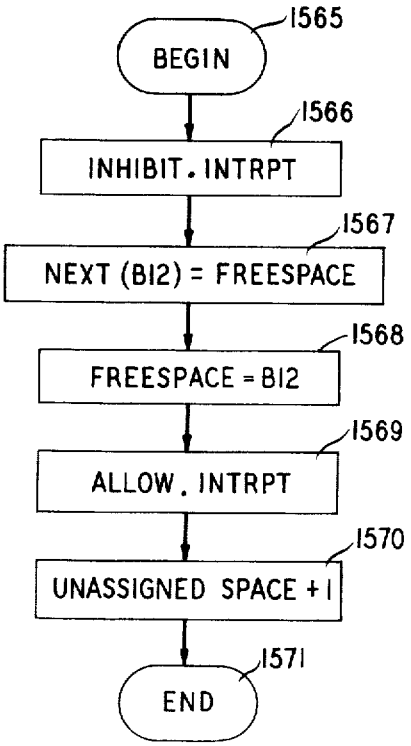
Figure 25L:
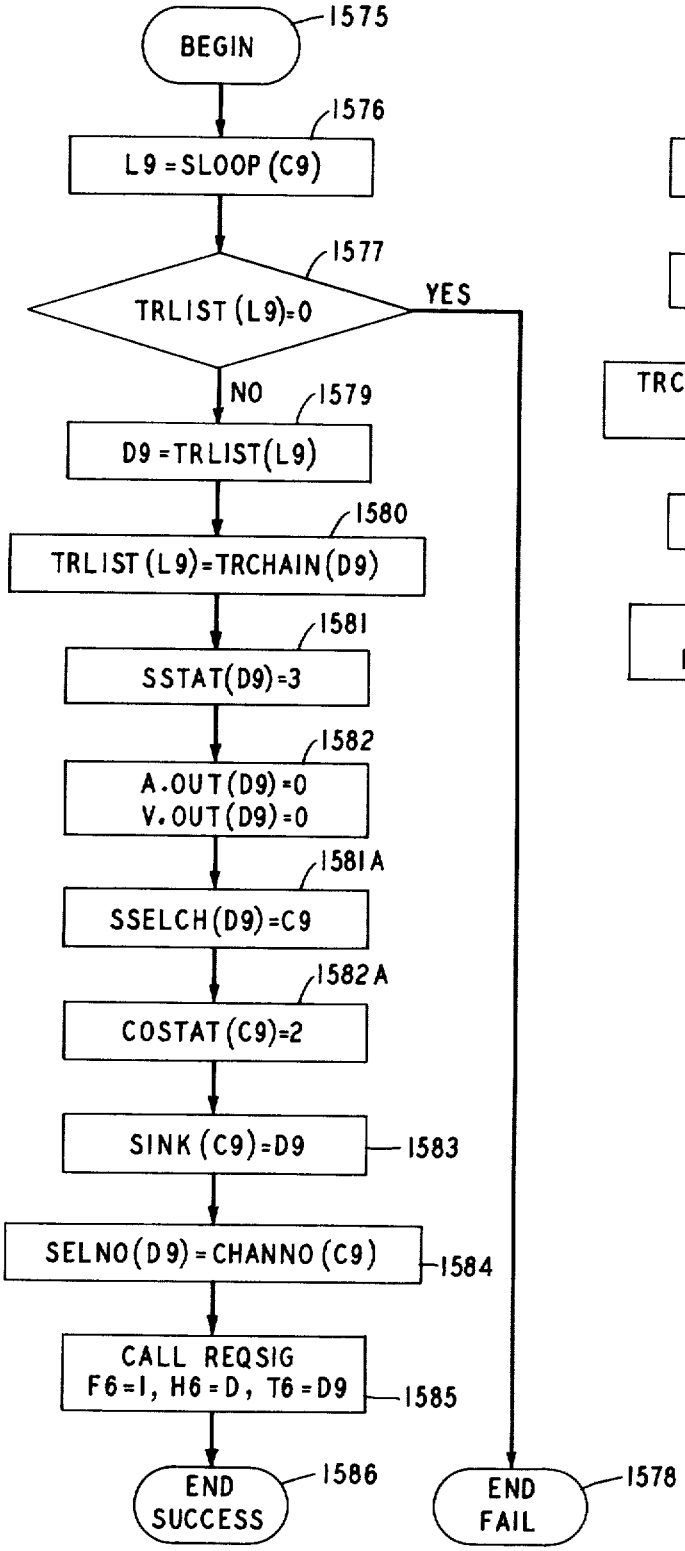
Figure 25M:
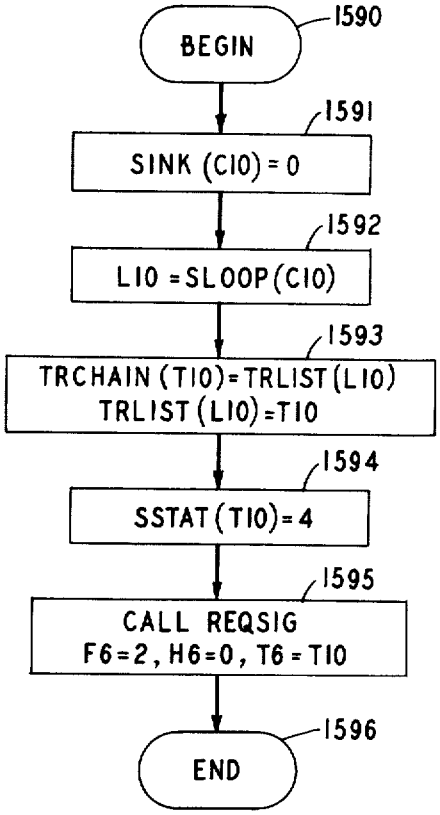
Figure 25N:
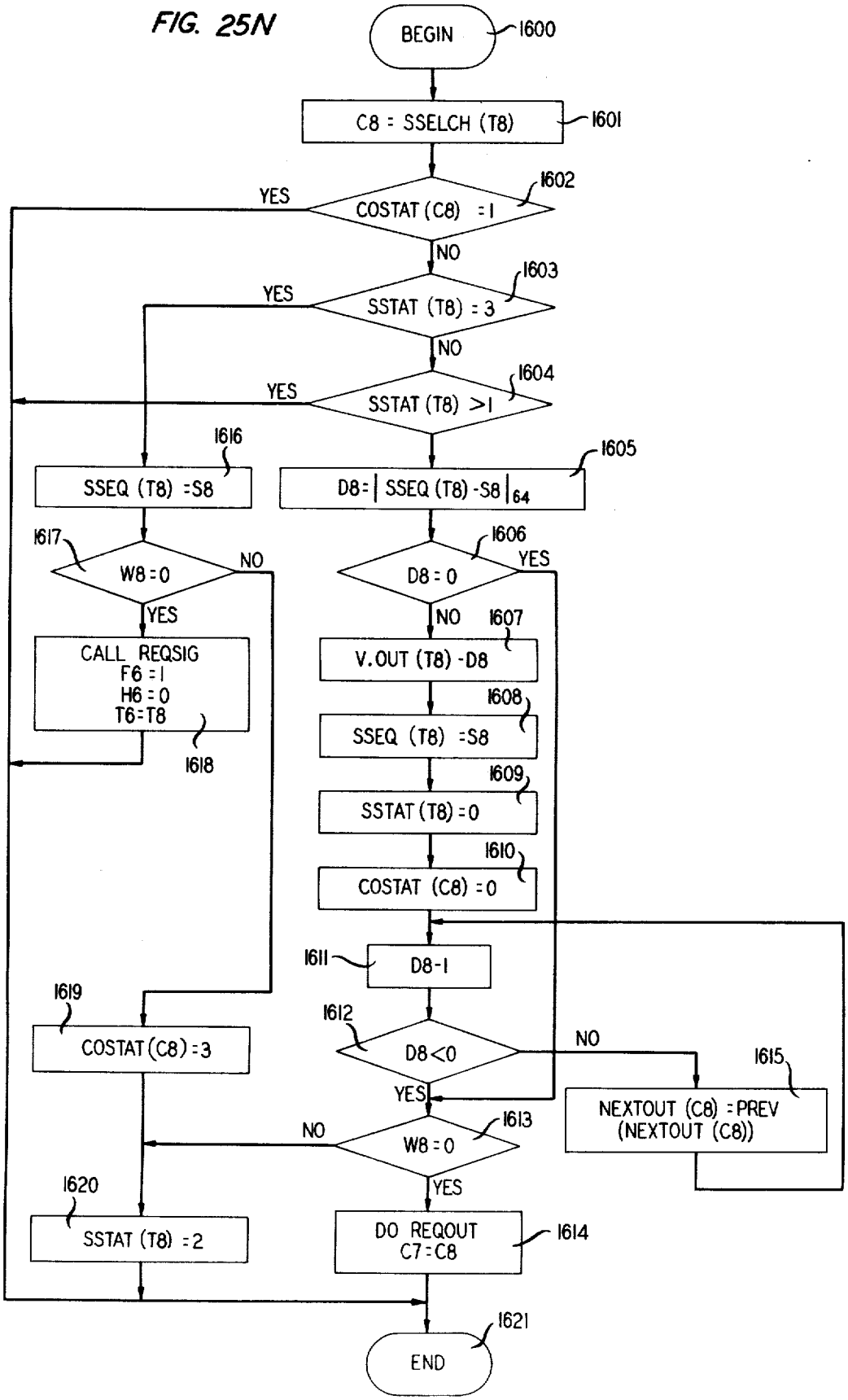

2A is a more detailed diagram of the switching unit shown in FIG. 1A;

FIG. 2B is a more detailed diagram of a part of the transmission system shown in FIG. 1A;

FIG. 3A illustrates the format of the signals appearing on the transmission lines and transmission loops shown in FIG. 1A;

FIG. 3B is an expanded view of a portion of FIG. 3A;

FIG. 4A shows the manner in which the line format shown in FIG. 3A is utilized in this invention;

FIG. 4B is an expanded view of a portion of FIG. 4A;

FIG. 4C is a further expanded view of a portion of FIG. 4A;

FIGS. 5A and 5B are a logic diagram of the loop transmit buffer shown in FIG. 2B;

FIG. 5C is a logic diagram of the rising edge trigger circuit used in the loop transmit buffer shown in FIG. 5A;

FIGS. 5D and 5E are a logic diagram of the loop receive buffer shown in FIG. 2B;

FIG. 5F is a logic diagram of the falling edge trigger circuit used in the loop receive buffer shown in FIG. 5D;

FIGS. 6A through 6H are a logic diagram of the data multiplexer shown in FIG. 2B;

FIG. 6I shows the interconnection of FIGS. 6A through 6H;

FIG. 7A is a block diagram of the terminal buffer shown in FIG. 2B;

FIG. 7B is a timing diagram useful in understanding the operation of the terminal buffer shown in FIG. 7A;

FIG. 7C is a more detailed diagram of the data receive buffer shown in FIG. 7A;

FIG. 7D is a more detailed diagram of the data transmit buffer shown in FIG. 7A;

FIG. 7E is a more detailed diagram of the channel select circuit shown in FIG. 7A;

FIG. 7F is a more detailed diagram of the channel break circuit shown in FIG. 7A;

FIG. 8 is a representation of an instruction word used by the interface computer shown in FIG. 2B;

FIG. 9A is a block diagram of the interface computer shown in FIG. 2B;

FIG. 9B is a timing diagram useful in understanding the operation of the interface computer shown in FIG. 9A;

FIGS. 9C, 9D, and 9E are a logic diagram of the interface computer shown in FIG. 9A;

FIG. 9F shows the interconnection of FIGS. 9C, 9D, and 9E;

FIG. 9G is a logic diagram of a clock circuit used in the interface computer shown in FIG. 9A;

FIG. 10A is a functional diagram that illustrates the data and signal transfer between the digital device, terminal interface unit, and switching unit shown in FIG. 1A;

FIG. 10B is a functional diagram that illustrates the data and signal transfer between the switching units shown in FIG. 1A;

FIGS. 11A, 11B, and 11C show the formats of the data and signals that are transmitted in the system of FIG. 1A;

FIG. 12 is a flow chart of the initialization instructions executed by the interface computer shown in FIG. 2B;

FIGS. 13A and 13B are a flow chart of the data output routine executed by the interface computer shown in FIG. 2B;

14A and 14B are a flow chart of the data input routine executed by the interface computer shown in FIG. 2B;

FIG. 15 is a flow chart of the signal output routine executed by the interface computer shown in FIG. 2B;

FIGS. 16A and 16B are a flow chart of the signal input routine executed by the interface computer shown in FIG. 2B;

FIGS. 17A through 17L show the data structures used by the control computer shown in FIG. 2B;

FIGS. 18A, 18B, 18C and 18D are a flow chart of the call management routine executed by the control computer shown in FIG. 2B;

FIG. 19A is a flow chart of the decode route routine executed by the control computer shown in FIG. 2B;

FIG. 19B is a flow chart of the trace route routine executed by the control computer shown in FIG. 2B;

FIG. 19C is a flow chart of the remove subchannel routine executed by the control computer shown in FIG. 2B;

FIGS. 19D and 19E are a flow chart of the create subchannel routine executed by the control computer shown in FIG. 2B;

FIG. 19F is a flow chart of the find queue routine executed by the control computer shown in FIG. 2B;

FIGS. 20A–20D are a flow chart of the data input routine executed by the control computer shown in FIG. 2B;

FIGS. 21A and 21B are a flow chart of the data output routine executed by the control computer shown in FIG. 2B;

FIGS. 22A through 22F are a flow chart of the signal input routine executed by the control computer shown in FIG. 2B;

FIGS. 23A and 23B are a flow chart of the signal output routine executed by the control computer shown in FIG. 2B;

FIGS. 24A and 24B are a flow chart of the timeout routine executed by the control computer shown in FIG. 2B;

FIG. 25A is a flow chart of the S.BURST.IN subroutine executed by the control computer shown in FIG. 2B;

FIG. 25B is a flow chart of the E.BURST.IN subroutine executed by the control computer shown in FIG. 2B;

FIG. 25C is a flow chart of the S.BUNDLE.IN subroutine executed by the control computer shown in FIG. 2B;

FIGS. 25D and 25E are a flow chart of the S.BURST.OUT subroutine executed by the control computer shown in FIG. 2B;

FIG. 25F is a flow chart of the E.BURST.OUT subroutine executed by the control computer shown in FIG. 2B;

FIG. 25G is a flow chart of the S.BUNDLE.OUT subroutine executed by the control computer shown in FIG. 2B;

FIG. 25H is a flow chart of the REQSIG subroutine executed by the control computer shown in FIG. 2B;

FIG. 25I is a flow chart of the REQOUT subroutine executed by the control computer shown in FIG. 2B;

FIG. 25J is a flow chart of the ASSIGN.SPACE subroutine executed by the control computer shown in FIG. 2B;

FIG. 25K is a flow chart of the RELEASE.SPACE subroutine executed by the control computer shown in FIG. 2B;

FIG. 25L is a flow chart of the ASSIGN.TRUNK subroutine executed by the control computer shown in FIG. 2B;

FIG. 25M is a flow chart of the RELEASE.TRUNK subroutine executed by the control computer shown in FIG. 2B; and FIG. 25N is a flow chart of the RETREAT subroutine executed by the control computer shown in FIG. 2B.

DETAILED DESCRIPTION

Before proceeding to a detailed description of the drawings, it should be noted that all of the circuits described herein may be realized, in the illustrative embodiment, by using integrated circuits. Suitable circuits can be found, for example, in "The Integrated Circuit Catalog," first edition, Catalog CC401, published by Texas Instruments, Inc. and, alternatively, in "The Microelectronics Data Book," second edition, by Motorola Semiconductor Products, Inc., dated December, 1969.

Referring more particularly to FIG. 1A, there is shown a graphical representation of a data transmission system in accordance with the present invention. The system comprises a plurality of switching units 10 which are interconnected by means of transmission lines 12. Each switching unit 10 has attached thereto at least one transmission loop 14. Each such transmission loop 14 is connected to at least one loop access module 16. Loop access module 16 serves to steer data around loop 14 and to take data from the loop and place data on the loop in the manner to be described in greater detail hereinbelow. Each loop access module 16 is connected to a terminal interface unit 17 which provides an interface between an attached digital device 18 and the remainder of the system. Data transmission in the system is primarily controlled by the interaction of terminal interface unit 17 and switching unit 10.

Figure 1B:
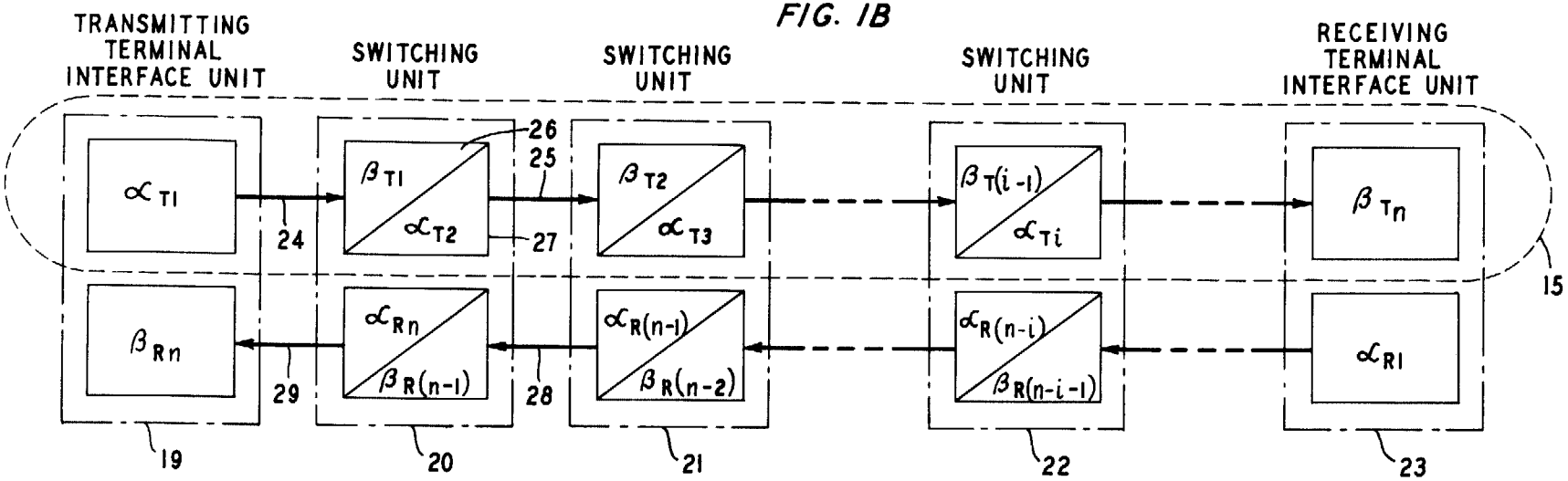
FIG. 1B illustrates the manner in which data and signalling information is transmitted in the system of FIG. 1A.

This interaction is shown schematically in FIG. 1B. FIG. 1B illustrates a full-duplex transmission path in which one terminal interface unit 19 of the type shown in FIG. 1A transmits data to another terminal interface unit 23 which receives it. The receiving terminal interface unit 23 responds by sending either data or signals or both back to the transmitting terminal interface unit 19. Since the transmission path is full-duplex, these actions can occur simultaneously.

While it is possible for two terminal interface units 17 (FIG. 1A) on the same transmission loop 14 to communicate, a typical communication will, as shown in FIG. 1B, involve more than one switching unit. The detailed system algorithm by which this communication takes place is described hereinbelow following the detailed descriptions of the apparatus shown in FIG. 1A. However, a consideration of the following brief description of the process of communication in the system of FIG. 1A will make the apparatus description more readily understandable.

The digital transmission system of FIG. 1A provides each digital device 18 that uses the system with the capability of selecting up to 256 other devices in the system to which it can transmit data or from which it can receive data. Each such selection comprises a "channel" which is used herein to mean a previously selected route. Thus it is as if each digital device had attached to it 256 full-duplex channels each of which it could use on a one-at-a-time basis to send or receive data. Although each device has only 256 channels, the destinations of these channels can be changed by the device as desired. One of these channels is reserved for communication with the switching unit that controls the transmission loop to which the particular device is attached. This channel, termed the "control channel," is used by the terminal interface unit associated with the digital device to set up a data transmission path by providing the most immediately associated switching unit with the full address of the intended destination of the data appearing on each of the remaining 255 channels. The control channel is also used by the switching unit to command the digital device to pick the channel on which it wishes to receive data being sent by another digital device. The switching unit maintains a list showing the correspondence between the absolute addresses and the 256 channels of each of the digital devices connected to it. Thus for each transmission or reception, a digital device need only handle an eight bit address. FIG. 1B illustrates a single full-duplex channel between a transmitting terminal unit 19 and a receiving terminal unit 23. Terminal interface units 19 and 23 and the switching units 20, 21, and 22 are shown as comprising components labeled with subscripted $\alpha$'s and $\beta$'s. The label "$\alpha$" is associated with the transmission of data while the label "$\beta$" is associated with the reception of data. The connection between a particular $\alpha$ and the $\beta$ to which it transmits is termed a "link." The subscript "T" is associated with that half of the full-duplex path, which is termed a "subchannel" and shown in FIG. 1B as path 15, that transmits data from the transmitting terminal interface unit 19 to the receiving terminal interface unit 23. The subscript "R" is associated with the other subchannel of the full-duplex path.

The $\alpha$ and $\beta$ "components" referred to above and shown in FIG. 1B refer not to apparatus but to stored processes and parameters which serve to control the transmission and reception of data between the terminal interface units and the switching units. The $\alpha$ processes use the $\alpha$ parameters to control transmission of data while the $\beta$ processes use the $\beta$ parameters to control reception of data. The exact manner in which these processes provide the desired data communication will be discussed in greater detail below. In general, a terminal interface unit will only have a single set of $\alpha$ parameters and a single set of $\beta$ parameters, both sets of which are uniquely determined by the characteristics of the particular associated digital device. Hence the $\alpha$ and $\beta$ parameters of a terminal interface unit remain the same for each of the 256 channels on which it can communicate.

This is not true, however, for the switching units. Each switching unit will, at any instant, be communicating on only a particular one of the 256 full-duplex channels of a specified terminal interface unit. Each half of this channel has an associated $\alpha$-$\beta$ pair which need not correspond to the $\alpha$-$\beta$ pair on the other half of the channel. In the example shown in FIG. 1B, $\alpha_{T1}$ represents the transmitting characteristics of transmitting terminal interface unit 19, while $\beta_{Rn}$ represents the receiving characteristics of that unit. Switching unit 20 receives data on link 24 from terminal interface unit 19 in accordance with the parameters $\beta_{T1}$ and retransmits the data to switching unit 21 on link 25 in accordance with parameters $\alpha_{T2}$. Similarly, switching unit 20 receives data sent by receiving terminal interface unit 23 from switching unit 21 on link 28 in accordance with parameters $\beta_{R(n-1)}$ and retransmit it to transmitting terminal interface unit 19 on link 29 in accordance with parameters $\alpha_{Rn}$.

Each switching unit has two $\alpha$-$\beta$ pairs for each full-duplex channel which is routed through it. Thus switching unit 22 may have, for example, not only the two $\alpha$-$\beta$ pairs shown in FIG. 1B, but also other such pairs allocated for other channels from other terminal interface units associated with both switching unit 20 and switching unit 21. The allocation of such pairs in various switching units is termed "virtual allocation" since all that need be done is to store the correct $\alpha$-$\beta$ pairs. Thus many channels may be virtually allocated at any one time. A particular channel may be actually activated by directing the pertinent switching units to begin receiving and retransmitting data on a half duplex basis in accordance with that particular channel's $\alpha$-$\beta$ appropriate pair.

Continuing then with the description of the apparatus of FIG. 1A, FIG. 2A is seen to be a more detailed description of a single switching unit 10. Each switching unit 10 comprises a single control computer 30 which communicates with a plurality of line terminating units 31. One line terminating unit 31 is required for each transmission loop 14 and each transmission line 12 that is connected to switching unit 10. These units serve to output data from control computer 30 onto transmission loops 14 and transmission lines 12. Transmission lines 12 as well as transmission loops 14 are of the type suitable for synchronous, digital, fixed-frame transmission. In the following discussion of the exemplary embodiment of this invention, it will be assumed that transmission lines 12 and transmission loops 14 comprise standard T1 carrier lines of the type well known in the prior art.

FIG. 2B is a more detailed diagram of the apparatus required to control a single transmission loop to which is connected a single loop access module 16. Since each line terminating unit 31 operates in the same manner irrespective of whether it is connected to a transmission line 12 or a transmission loop 14, a detailed description of the apparatus shown in FIG. 2B will suffice to explain the operation of the system shown in FIG. 1A.

Turning then to control computer 30 shown in FIG. 2B, it is this device that performs the aforementioned processes of virtual allocation and actual activation of channels that is required to enable terminal interface unit 17 to communicate with other terminal interface units in the system. Control computer 30 may be any of the many commercially available general-purpose digital-computers. The computer chosen for any particular implementation will be determined by the size of the system that is desired. In the following discussion, computer 30 is assumed to be a TEMPO 1 computer which is manufactured by TEMPO Computers, Incorporated, a division of General Telephone and Electronics, Incorporated.

Control computer 30 is connected to loop transmit buffer 34 of line terminating unit 31 by means of lines 32. Since the TEMPO 1 computer has a sixteen-bit output, lines 32 shown in FIG. 2B comprise 16 separate wires which interconnect the output register of the TEMPO 1 computer and the loop transmit buffer 34. Loop transmit buffer 34 temporarily stores the sixteen-bit words output by the control computer 30. After buffering this data, the loop transmit buffer 34 outputs it to the byte disassembler 40. Each such output comprises a ten-bit word, eight bits of data from the control computer 30 and two bits of control information which are supplied by the circuitry of the loop transmit buffer 34 in the manner which is described in conjunction with FIGS. 5A and 5B.

These twelve-bit words are transferred from loop transmit buffer 34 to byte disassembler 40 of line terminating unit 31 by means of lines 38 which comprise twelve wires, one for each bit. Byte disassembler 40 serves to transform the output of loop transmit buffer 34 into serial data for transfer to terminal matching unit 42 over line 44.

Terminal matching unit 42 of line terminating unit 31 supplies the interface that connects the input and output of control computer 30 to the transmission loop 14 or, alternatively, to a transmission line 12 for those line terminating units 31 that are connected to transmission lines 12. This terminal matching unit comprises standard T1 equipment which can be commercially obtained from the Vicom division of the Vidar Corporation as the Vicom 2020 Terminal Matching Unit. Terminal matching unit 42 is connected to office repeater 50 by means of lines 46 and 48. Lines 46 comprise a pair of wires which allow data to be transmitted from control computer 30 to transmission loop 14 and lines 48 comprise a pair of wires which allow data to be transmitted from transmission loop 14 to control computer 30.

Office repeater 50 serves to provide power for the T1 line comprising transmission loop 14. This unit is also commercially available under the name of Vicom 2010 Office Repeater.

As can be seen in FIG. 2B, data flows out of office repeater 50 onto transmission loop 14 and is transferred to line repeater 52 which is contained in loop access module 16. Line repeater 52 serves to retransmit data received on transmission loop 14 from office repeater 50 and also serves as the means by which loop access module 16 takes data from line 14 and places data onto loop 14. Line repeater 52 is also a piece of commercial T1 equipment which is obtainable under the name of the Vicom 1550-04 Self-Equalizing Line Repeater. Line repeater 52 is line powered and serves to automatically adjust for variations in the length of cable between adjacent repeaters subject to a range limitation. In those implementations in which loop access modules are very close together and hence out of the compensation range of the repeaters, 15 decibel artificial cable networks may be inserted between repeaters in a manner which will be apparent to those of ordinary skill in the art.

In order to insure proper operation of the system if power should fail at a particular loop access module, each loop access module 16 is provided with a protection relay 54. Protection relay 54 has transfer contacts which when unenergized connect lines 78 and 80, and when energized connect lines 79 and 80. Thus if a signal is not supplied to protection relay 54 on line 77 by power monitors 76, the protection relay will short-circuit loop access module 16 and simply allow data to be retransmitted on transmission loop 14 by line repeater 52.

Power monitor 76 is a triggerable one-shot multivibrator and will hence supply an output signal as long as it is supplied with power from terminal interface unit 17 and is also continuously triggered by AND gate 73. AND gate 73 has two inputs, one from interface computer 62 which is periodically supplied if interface computer 62 is functioning properly, and one from data multiplexer 58 through inverter 74. The signal supplied by data multiplexer 58 indicates that a framing error was detected in the data input on lines 71. Inverter 74 thus inhibits AND gate 73 when an error signal is supplied by data multiplexer 58 on line 75.

Matching unit 56 of loop access module 16 shown in FIG. 2B serves the same function as terminal matching unit 42. Indeed, matching unit 56 may also comprise a Vicom 2020 Terminal Matching Unit.

Data multiplexer 58 of terminal interface unit 17 shown in FIG. 2B serves to receive data from matching unit 56 of loop access module 16 on lines 71, and to transfer data to matching unit 56 on lines 72. Data multiplexer 58, shown in greater detail in FIGS. 6A–6I, serves to assemble the serial data coming from matching unit 56 into eight-bit words for transmission to terminal buffer 60, and also serves to disassemble eight-bit words from terminal buffer 60 into serial data to be transferred back to matching unit 56.

Terminal buffer, 60, which is explained in greater detail in conjunction with FIGS. 7A–7F, serves to buffer data going to and coming from digital device 18. This buffer serves to isolate digital device 18 from the synchronous speed of transmission loop 14.

The control of terminal interface unit 17 is provided by the interface computer 62. Interface computer 62, which is explained in greater detail in conjunction with FIGS. 9A–9F, is a digital computer which has a limited instruction repertoire. This instruction repertoire is, however, sufficiently flexible to allow programming the interface computer 62 to do the variety of tasks which are of critical importance in the implementation of the aforementioned transmission algorithm. In this illustrative embodiment a specially designed digital computer is disclosed; however, the functions performed by interface computer 62 could alternatively be implemented by using a commercial digital computer as will become apparent to those of ordinary skill in the art by the further discussion of interface computer 62.

Serial data emerging from line repeater 52 of loop access module 16 returns to control computer 30 by way of the office repeater 50 and terminal matching unit 42. The data is transferred serially from terminal matching unit 42 by line 6200 to byte assembler 64. Byte assembler 64 performs the converse of the operation performed by byte disassembler 40; that is, it assembles the serial data from terminal matching unit 42 into eight-bit bytes for transmission to loop receive buffer 66 on lines 68.

Loop receive buffer 66 operates in a manner analogous to loop transmit buffer 34 and is explained more fully in conjunction with FIGS. 5D and 5E.

Before proceeding to the more detailed diagrams of the apparatus shown in FIG. 2B, it will be advantageous to consider first the data format of the system as shown in FIGS. 3A and 3B.

The format shown in FIG. 3A is seen to be the standard T1 line format. The bit sequence appearing on the T1 line is divided into standard frames each comprising a framing bit followed by 192 time slots. The framing bit alternates between a "1" and a "0" on successive frames. The concatenation of two successive standard frames will be termed herein a "master frame" and is understood to always begin with a frame whose framing bit is a 1.

The 192 time slots of a standard frame are seen in the expanded view in FIG. 3B to be further subdivided into 24 subgroups of eight slots each. These slots in each subgroup are labeled "1" through "8," respectively. As shown, a 1 line bit occupies fifty percent of the time slot allotted to it, thereby resulting in a fifty percent duty cycle pulse train. As is well known in the prior art, it is necessary when using a T1 line to insure that there are enough 1 bits on the line to keep the system clocks operational. To accomplish this, a 1 bit, which is commonly termed a "keep-alive bit," is inserted into the sixth slot of every eight-slot subgroup.

When the serial data on the transmission line is used in the system, such as by byte assembler 64 and data multiplexer 58 shown in FIG. 2B, the framing and keep-alive bits are ignored in the formation of the byte. Excluding these two types of bits, it can thus be seen that 42 eight-bit bytes are formed in a master frame.

The line format provided by the standard T1 line is utilized by the apparatus of the illustrative embodiment of this invention in the manner shown in FIGS. 4A, 4B, and 4C. Both the network signaling and the transmission of system data are multiplexed onto the same line in the same manner. Of the 42 bytes that exist in a master frame, the first four bytes shown in FIG. 4B are reserved exclusively for network control signaling, and the remaining 38 bytes are reserved for user supplied data. The first four bytes will be termed hereinafter a "signal packet" and the remaining 38 bytes will be termed a "data packet." As can be seen in FIG. 4B, signal packets and data packets are completely independent even though they occur as a pair within a master frame. The first byte of each packet is understood to be reserved for an identification code or a special code indicating that the packet is currently empty. The packet formats are discussed in greater detail hereinbelow in conjunction with FIGS. 11A through 11C.

LOOP TRANSMIT BUFFER

Continuing then with the detailed description of the circuitry shown in FIG. 2B, FIGS. 5A and 5B are seen to comprise a detailed diagram of the loop transmit buffer 34 shown in FIG. 2B. As shown in FIG. 5A, the input to the loop transmit buffer 34 comprises a sixteen lines 150 from control computer 30. The output of the loop transmit buffer comprises eight lines 151 which are applied to byte disassembler 40.

Loop transmit buffer 34 buffers data coming from control computer 30 and outputs it to byte disassembler 40 in the proper sequence at the proper time. This function is accomplished through the control of memory 152 shown in FIG. 5B. Memory 152 is a thirty-two word by sixteen-bit store which can be formed, for example, of eight integrated circuit memories such as bipolar LSI memory 3101 manufactured by Intel Corporation. Under the control of the logic circuitry shown in FIGS. 5A and 5B, sixteen-bit words are read into memory 152 from control computer 30 while, on alternate byte strobe signals issued on line BS from byte disassembler 40, eight-bit words are read out of memory 152 on either of the eight lines 154 or the eight lines 155 into eight-bit register 156 from whence they are clocked out to byte disassembler 40. The manner in which the control logic accomplishes this is as follows.

Clock 186 shown in FIG. 5A provides the basic timing for loop transmit buffer 34. This clock comprises an astable multivibrator which runs at a 5 megahertz rate. The output of clock 186 is applied to flip-flop 158 which is a triggered flip-flop; that is, it changes state each time it receives a pulse from clock 186. Flip-flop 158 serves to divide the pulse train from clock 186 into two pulse trains operating at one-half the frequency of clock 186. The Q output of flip-flop 158 is applied to AND gate 159 while the $\overline{Q}$ output of flip-flop 158 is applied to AND gate 160. Additionally, each of these two gates have as their second input the output of clock 186. Thus the outputs from AND gates 159 and 160 are seen to be two 2.5 megahertz pulse trains that are 180° out of phase. The pulse train from AND gate 159 is used to read sixteen-bit words from control computer 30 into memory 152, while the output from AND gate 160 is used to read eight-bit bytes from memory 152 to byte disassembler 40.

First consider the reading of sixteen-bit words from control computer 30 into memory 152. This process is accomplished on a command-acknowledge basis. Commands from control computer 30 are transferred on line 163 to rising edge trigger 164. This trigger, which is shown in greater detail in FIG. 5C, provides a strobe output to NAND gate 161 upon receipt of a command from control computer 30 unless an inhibit signal has been received from six-bit comparator 166 in accordance with the discussion hereinbelow. The rising edge trigger circuit 164 also serves, unless it is inhibited, to supply an acknowledge signal to control computer 30 on line 165 each time it receives a command.

RISING EDGE TRIGGER CIRCUIT OF THE LOOP TRANSMIT BUFFER

Rising edge trigger circuit 164 is shown in greater detail in FIG. 5C. In the circuit's quiescent state both of D-type flip-flops 189 and 193 have a 1 on their $\overline{Q}$ outputs causing the strobe output to be a 0 and the acknowledge output to be a 1. A strobe pulse is generated in response to a command being applied to the D input of flip-flop 189. When a command is applied, flip-flop 189 changes to its set state the next time a clock pulse is applied to the clock input of flip-flop 189. Since at the time flip-flop 189 becomes set flip-flop 193 is still reset, AND gate 194 goes to a 1 output, thus beginning the strobe pulse output.

The trailing edge of the clock pulse that sets flip-flop 189 is coupled through inverter 192 to the clock input of flip-flop 193. This allows the 0 on the $\overline{Q}$ output of flip-flop 189 to be coupled through NAND gate 191 to the D input of flip-flop 193, causing it to change state. The acknowledge line thus falls, causing the output of AND gate 194 to fall, thereby terminating the strobe pulse output. The circuit remains in this state until the command line falls, at which time it returns to its quiescent state until the command line is again raised.

The generation of the strobe pulse output will be inhibited if a 1 is applied to the inhibit input. Inverter 190 converts this into a 0 which prevents NAND gate 191 from responding to the $\overline{Q}$ output of flip-flop 189. This, in turn, prevents the acknowledge output from going to a 1.

Returning then to FIG. 5A, NAND gate 161 is thus seen to be enabled whenever the strobe signal from rising edge trigger 164 corresponds with the output from gate 159. When both these inputs are simultaneously present at gate 161, it generates an output signal to memories 167 and 152 and to six-bit counter 168. This output signal causes memories 167 and 152 to store the words currently appearing on their inputs.

Memory 167 is a thirty-two-word-by-two-bit memory which serves to store two bits of information which are applied to memory 167 by control computer 30 on lines 169 and 170. These two bits comprise status information which is output to byte disassembler 40 at the appropriate time. The bit appearing on line 169 signifies the type of packet currently being transmitted, either a data packet or a signal packet, and the bit on line 170 serves to indicate when byte zero of either a signal packet or a data packet is being transmitted.

Six-bit counter 168 serves to keep track of the address in each of memories 167 and 152 which is currently being written into by control computer 30. The same addresses in each of memories 167 and 152 are always simultaneously addressed. The output from gate 161 increments six-bit counter 168 each time a command is received from control computer 30 to store another word into memories 167 and 152. This serves to provide the correct address for the storage that follows the next command from control computer 30.

Turning then to the apparatus which transfers eight-bit bytes of the words stored in memories 152 and 167 to byte disassembler 40, this apparatus is seen to be under the control of ten-bit shift register 171. Shift register 171 receives both of its inuts from byte disassembler 40. One of these inputs, the $\overline{D}_{36}$ input, comprises a signal that falls to a 0 ech time byte disassembler 40 requests the thirty-sixth byte of a thirty-eight byte data packet. This input serves to put a 0 into shift register 171. This particular signal is used to provide a reference point from which the type of packet which is currently being transmitted can always be determined. The other input to shift register 171 is the byte strobe signal, BS, which is supplied by byte disassembler 40 each time it requests a new byte to be transferred from the memory 152. The 0 bit that is inserted in the left side of shift register 171 is right-shifted each time the byte strobe signal occurs.

After shift register 171 has been right-shifted twice, once for the $D_{36}$ and $D_{37}$ byte strobes, the next byte strobe will be the beginning of a signal packet. Since the third through the sixth output taps of shift register 171 are connected to NAND gate 171B, the output of this gate, which is applied to two-bit comparator 173, is a 1 when a signal packet is being processed by byte disassembler 40.

A 0 on the third output tap of shift register 171 indicates that the first byte of a signal packet is being processed while a 0 on the seventh output tap of shift register 171 indicates that the first byte of a data packet is being processed. Thus the output of NAND gate 171A is a 1 when the first byte of a packet is being processed. The outputs of NAND gates 171A and 171B are applied to the two-bit comparator circuit 173. Comparator circuit 173 also receives input from register 174 which serves as a holding register for memory 167 in the same manner that register 156 serves as a holding register for memory 152. Comparator circuit 173 thus serves to compare the packet type and byte number which is currently being processed by byte disassembler 40 with the packet type and byte number which are currently resident in register 156.

When these inputs are the same, comparator 173 supplies an output signal through gate 175 to six-bit counter 176. Gate 175 is a four-input AND gate having 2 of its inputs inverted by inverters 175A and 175B. Thus the output signal from comparator 173 passes through gate 175 to counter 176 at the proper time as determined by the inputs to gate 175 which are supplied by flip-flop 172, NAND gate 146, and comparator 166. The output of gate 175 causes counter 176 to be incremented. Counter 176 serves as an address counter which keeps track of the current address in memories 167 and 152 from which the byte disassembler 40 is reading in a manner analogous to that in which counter 168 keeps track of the address into which control computer 30 is writing.

Memory 152 comprises thirty-two memory words each containing sixteen bits. However, since it is desired to read each of these words out to byte disassembler 40 in eight-bit bytes, it is necessary to alternate reading out one-half of the memory on the eight lines 155 and reading the other half of the memory on the eight lines 154. This alternate reading is accomplished by means of flip-flop 172 and OR gates 177 and 178.

Flip-flop 172 receives its clocking input from the BS signal line of byte disassembler 40. Thus flip-flop 172 serves to divide the byte strobe pulses into two pulse trains, one pulse train appearing on the $\overline{Q}$ output of flip-flop 172 and the other on the Q output of flip-flop 172. These two pulse trains are applied respectively, to OR gates 177 and 178; the $\overline{Q}$ output of flip-flop 172 being applied to OR gate 178, and the $\overline{Q}$ output of flip-flop 172 being applied to OR gate 177. The outputs of these two gates go to the "Select" inputs on the aforementioned memory circuits.

The memory circuits which comprise memory 152 are characterized in that the contents of the currently selected addressed location are available as the output whenever the select signal is given. Since the select signals are given in an alternating fashion by the outputs from OR gates 177 and 178, register 156 is loaded first from one-half of memory 152 and then from the other half, and then, in the following time period, from the first half again. Thus it is seen that register 156 is loaded by alternate bytes of each word that is output from memory 152.

The outputs of six-bit counters 176 and 168 are applied to memories 167 and 152 by means of select circuit 179. For simplicity, only one detailed portion of select circuit 179 has been shown in FIG. 5B. in actuality, circuit 179 comprises five sets of circuits 179A through 179E. Each of these comprises, as shown in detail in circuit 179A, AND gates 180, 181, OR gate 182 and inverter 183 that are shown in FIG. 5B. That is, the circuit 179A comprises the circuitry needed to gate one bit of the five least significant bits from each of counters 176 and 168 to the five-bit address inputs of the two memories. AND gate 181 has as its inputs a bit from counter 176 and the $\overline{Q}$ output of flip-flop 158. Thus whenever flip-flop 158 is reset, which occurs during the time which is allocated for byte disassembler 40 to read bytes out of memory 152, AND gate 181 has as its output one bit from counter 176. This is applied by means of OR gate 182 to memories 167 and 152. Thus whenever flip-flop 158 is reset, the address suplied to memories 167 and 152 is that determined by counter 176 which is the counter which keeps track of the correct location from which byte disassembler 40 should be reading. In a similar fashion, AND gate 180 has as its input a bit from counter 168 and the $\overline{Q}$ output of flip-flop 158 as inverted by inverter 183. Thus on alternate cycles of clock 186, AND gate 180 will supply a bit from counter 168 through OR gate 182 to the address inputs of memories 152 and 167. Thus it is seen that select circuit 179 serves to apply addresses to memories 167 and 152 in an alternating fashion, first the address into which control computer 30 is currently writing and then the address from which byte disassembler 40 is currently reading.

Six-bit comparator 166 serves to compare the outputs from counters 176 and 168. When these outputs are equal, indicating that the location into which control computer 30 will next write is the same location from which byte disassembler 40 will next read, this indicates that the memories 167 and 152 are empty and hence a signal is output on line 166A to AND gate 175 through inverter 175B. When comparator 166 determines that the address from which byte disassembler 40 will next read is equal to the sum of the address into which control computer 30 has just written plus thirty-two, which indicates that memories 167 and 152 are full, then an output signal will be generated on line 149 and applied to rising edge trigger circuit 164. This signal will serve to inhibit the generation of an acknowledge command on line 165 in the manner described hereinbefore. This is done because since the memories 167 and 152 are now full, control computer 30 must be prevented from writing any more information into them until room has been provided by means of byte disassembler 40 reading out a word of the stored information.

Flip-flops 147 and 148 serve to synchronize the loop transmission buffer of FIGS. 5A and 5B. The T1 transmission line is a synchronous line while the control computer 30 is an asynchronous device. It is thus necessary to insure that the outputs from control computer 30 are supplied to the transmission line in the proper time sequence. The input to flip-flop 147 is the byte strobe signal on line BS from byte disassembler 40. The output of flip-flop 147 is copied into flip-flop 148 whenever AND gate 159 generates an output. When flip-flop 148 receives its input from flip-flop 147, this is output to NAND gate 146. The next time that gate 160 generates an output, NAND gate 146 generates an output to registers 174 and 156, which causes these registers to read from memories 167 and 152, respectively. The outputs of these registers are then available to byte disassembler 40. Register 174 provides its output by means of inverter 185 and AND gates 184 and 186. Register 156 provides eight bits of output on eight lines 151.

LOOP RECEIVE BUFFER

Continuing with the detailed description of the circuitry shown in FIG. 2B, FIGS. 5D and 5E are seen to be a detailed diagram of the loop receive buffer 66 shown in FIG. 2A. As shown in FIG. 5E, input to the loop receive buffer 66 comprises eight lines 195 from byte assembler 64. The output of the loop receive buffer comprises sixteen lines 209 which are applied to control computer 30.

Loop receive buffer 66 performs the converse of the function performed by loop transmit buffer 34. That is, loop receive buffer 66 stores eight-bit bytes from byte assembler 64, forms them into sixteen-bit words, and transfers them to control computer 30. This function is accomplished through the proper control of memories 196 and 203 in the following manner.

Memory 196 is a sixteen-word-by-sixteen-bit memory which can be formed for example, from eight integrated circuit memories such as bipolar LSI memory 3101 manufactured by Intel, Inc. Under the control of the logic circuitry shown in FIGS. 5D and 5E, eight-bit bytes are written into memory 196 from byte assembler 64 while, on alternate byte strobe signals from byte assembler 64, sixteen bit words are read out of memory 196 into sixteen bit register 197 from whence they are clocked out to control computer 30. The manner in which the control logic accomplishes this is as follows.

Clock 198 provides the basic timing for the loop receive buffer. This clock comprises an astable multivibrator which runs at a 5 megahertz rate. The output of clock 198 is applied to flip-flop 199 which is a triggered flip-flop, that is, it changes state each time it receives a pulse from clock 198. Flip-flop 199 serves to divide the pulse train from clock 198 into two pulse trains operating at one-half the frequency of clock 198. The Q output of flip-flop 199 is applied to AND gate 200 while the Q output of flip-flop 199 is applied to AND gate 201. Additionally, each of these two gates have as their second input the output from clock 198. Thus the outputs from AND gates 200 and 201 are seen to be two 2.5 megahertz pulse trains that are 180 degrees out of phase. The pulse train that is output by AND gate 201 is used to write eight-bit words from byte assembler 64 into memory 196, while the output from AND gate 200 is used to read sixteen-bit words from memory 196 to register 197, from which it is available to control computer 30.

The output of AND gate 201 is applied to NAND gate 202. The other input to gate 202 is the Q output of flip-flop 225. Flip-flop 225 in conjunction with flip-flop 204 serves to synchronize the operation of loop receive buffer 64 with the timing of the T1 transmission line in the same manner as flip-flops 147 and 148 shown in FIG. 5A serve to synchronize the loop transmit buffer 34 with the T1 transmission line. Thus the timing pulse from gate 201 is applied by gate 202 to the write input of memories 196 and 203 immediately after the byte strobe signal is applied from byte disassembler 64 on line BS.

The address into which the current byte from byte assembler 64 will be written is determined by five-bit counter 205. The particular byte of that address into which the current output from byte assembler 64 will be written is determined by gates 206 and 207 under the control of flip-flop 208. This determination is exactly analogous to that made by gates 177 and 178 under the control of flip-flop 172 which is shown in FIG. 5A. That is, the incoming bytes are placed in alternate bytes of the word.

Counter 205 is incremented by the output from NAND gate 202 provided that it is not inhibited by the output of NAND gate 219. The inputs to gate 219 are derived from ten-bit shift register 211.

One input to shift register 211 is the byte strobe signal which is supplied on line BS by byte assembler 64 each time it sends an eight-bit byte out on lines 195. The other input to shift register 211 is the $D_{36}$ pulse, which when applied through inverter 212 puts a 0 into shift register 211. The $D_{36}$ pulse is emitted by byte assembler 64 each time it sends the thiry-seventh byte of a thirty-eight byte data packet. This particular signal is used to provide a reference point from which the type of packet currently being transmitted can be easily determined. The 0 bit that is inserted in the left side of shift register 211 is right-shifted each time the byte strobe signal occurs. The output taps of the register are used as follows.

After shift register 211 has been right-shifted twice, once each for the $D_{36}$ and $D_{37}$ byte strobes, the next byte strobe will be the beginning of a signal packet. Thus the third output tap in FIG. 5D, is connected by means of inverter 200 to the K input of JK flip-flop 208. The outputs of flip-flop 208 are applied to OR gates 206 and 207 which drive the "Select" inputs of memory 196 and thus serve to write eight-bit bytes into alternate halves of a memory word in the same manner that OR gates 177 and 178 shown in FIG. 5B serve to read alternate halves of words out of memory 152.

The fourth output tap of the shift register 211 signifies the second byte in a signal packet. This is applied through inverter 213 to OR gate 215. If a signal is simultaneously present on the READ input line, indicating that the current packet is not an empty one, then AND gate 218 will transfer a 1 to memory 203. The eighth output tap of register 211, which signifies the second byte in a data packet, is also applied to OR gate 215 by means of inverter 214. Thus it can be seen that AND gate 218 will transfer a 1 bit to memory 203 whenever the second byte of either a signal or data packet that is not empty is being stored in memory 196.

NAND gate 216 has as its inputs the third through tenth output taps of shift register 211. NAND gate 216 thus only has an output when any one of the signals on these output taps are 0's. This corresponds to the four bytes of a signal packet and the first four bytes of a data packet. This information is all control information used by the system in the manner discussed hereinbelow and hence the output of NAND gate 216 is transferred on line 223 to memory 203.

Memory 203 is addressed by select circuit 227 which is driven by five-bit counters 205 and 226. Counter 205 controls the address into which byte assembler 64 writes while counter 226 controls the address from which control computer 30 reads. Counter 205 is inhibited by NAND gate 219 when there is no signal on the READ input and when, simultaneously, the packet currently being processed is not the second byte of a signal packet and thus the write addressing of memory 196 is inhibited. Select circuit 227 is exactly the same as select circuit 179 shown in greater detail in FIG. 5B and operates in exactly the same manner to supply the correct read and write addresses to memories 203 and 196.

Next consider the reading of sixteen-bit words from memory 196 into control computer 30. This process is accomplished on a command-acknowledge basis. Commands from control computer 30 are transferred on line 237 to falling edge trigger 210. This trigger, which is shown in greater detail in FIG. 5F, provides a strobe output to NAND gate 229 upon receipt of a command from control computer 30 unless an inhibit signal has been received from five-bit comparator 228 in accordance with the discussion hereinbelow. The falling edge trigger circuit 210 also serves to supply an acknowledge signal to control computer 30 on line 238 each time it receives a command unless it is inhibited.

FALLING EDGE TRIGGER CIRCUIT OF THE LOOP RECEIVE BUFFER

Falling edge trigger circuit 210 is shown in greater detail in FIG. 5F. In the circuit's quiescent state D-type flip-flop 231 is in the set state and flip-flop 235 is in the reset state causing the strobe output to be a 0 and the acknowledge output to be a 1. A strobe pulse is generated in response to a command being applied. Flip-flop 231 changes to its reset state the next time a clock pulse is applied to the clock input of flip-flop 231. Since, at the time flip-flop 231 becomes reset flip-flop 235 is still reset, the output of AND gate 236 goes to a 1, thus beginning the strobe pulse output.

The trailing edge of the clock pulse that sets flip-flop 231 is coupled through inverter 232 to the clock input of flip-flop 235. This causes the 0 on the Q output of flip-flop 231 to be coupled through NAND gate 234 to the D input of flip-flop 235, causing the output of AND gate 236 to fall, thereby terminating the strobe pulse output. The circuit remains in this state until the command line rises, at which time it returns to its quiescent state until the command line is again dropped.

The generation of the strobe pulse output will be inhibited if a 1 is applied to the inhibit input. Inverter 233 converts this into a 0 which prevents NAND gate 234 from responding to the Q output from flip-flop 231 when a 1 is applied to the command input. This, in turn, prevents the acknowledge output from going to a 1.

Reterning then to FIG. 5D and 5E, NAND gate 229 is seen to be enabled whenever the strobe signal from falling edge trigger circuit 210 corresponds with the output from gate 200. When enabled, gate 229 increments counter 226 and provides a clocking signal to checksum circuit 239.

Checksum circuit 239 provides a parity-like check on the sixteen-bit words sent to control computer 30 on lines 209. Checksum circuit 239 serves to EXCLUSIVE OR sixteen data words with the checksum word immediately following it. This checksum word is generated when the data is sent in the manner to be described hereinbelow. In the absence of error, the output of the circuit is zero after each seventeenth word in a data packet. The manner in which the EXCLUSIVE OR between successive bits in the same bit position in successive words is formed can best be appreciated by the following example. Consider for example, the ith bit position of four successive words, N1, N2, N3, and N4. The EXCLUSIVE OR of the bit in the ith bit position in words N1 and N2 is formed. The result of this is EXCLUSIVE ORed with the ith bit position of word N3, the result of which is, in turn, EXCLUSIVE ORed with the ith bit position of word N4. This process is continuously repeated. For simplicity, only one portion of checksum circuit 239 is shown in FIG. 5E. Checksum circuit 239 actually comprises sixteen sets of circuits, 239A through 239P. Each of these, as shown in detail in circuit 239A, comprises EXCLUSIVE OR gate gate 242 and D-type flip-flop 241. Flip-flop 241 stores the result of each output from gate 242 and supplies it as an input to gate 242 for the next word output from register 197, thus achieving the desired result. The outputs from each of gates 242 form the sixteen lines 243 which are all inputs to OR gate 244. If any of these inputs are 1, indicating the presence of a checksum error, then OR gate 244 generates an error signal to control computer 30 on line 245. Checksum circuit 239 is reset to zero by NAND gate 244A when the fourth byte of each data packet is given to control computer 30.

DATA MULTIPLEXER

Byte disassembler 40 and byte assembler 64, shown in FIG. 2B, perform functions analogous to that performed by data multiplexer 58, also shown in FIG. 2B. In fact, a subset of the apparatus of data multiplexer 58 can be used to implement byte disassembler 40 and byte assembler 64. Therefore, before discussing these latter two units, the logic diagram of data multiplexer 58 which is shown in detail in FIGS. 6A through 6H will be discussed. FIG. 6I shows the manner in which FIGS. 6A through 6H are connected.

As shown, data multiplexer 58 serves as an interface between matching unit 56 of loop access module 16, and terminal buffer 60 and interface computer 62 of the terminal interface unit 17. The purpose of the multiplexer 58 is to collect the relevant data and signal packets from the transmission loop and to insert new ones onto the loop when circumstances permit. The general manner in which data multiplexer 58 achieves this purpose is as follows.

All of the timing for the operation of data multiplexer 58 is determined by system clock 250, although functional control is exercised by the interface computer 62. Transmission line bits, excluding the "keep-alive" bit, are serially clocked into shift register 251. When a full byte has been clocked into shift register 251 it may be decoded, left untouched, or removed from the shift register on a parallel basis.

Transmission is accomplished on a packet-by-packet basis. Once transmission of a packet commences, it continues until the entire packet has been transmitted. Transmission from terminal buffer 60 or from interface computer 62 can occur when an empty packet is detected, or where the contents of a packet are removed by the terminal buffer, provided the packet type being processed by the data mltiplexer matches the packet type that interface computer 62 wants to have transmitted. This matching requirement must be observed because signal packets and data packets are not interchangeable, as was discussed in connection with FIG. 4B. In addition, the request from interface computer 62 to transmit information must be detected by the data multiplexer before an appropriate time in order for transmission to be considered during the next packet time interval.

In addition to the basic function mentioned above, the data multiplexer checks for incoming bipolar violations in the T1 line format and provides a means for pulse injection into the outgoing bit stream. This pulse injection inserts the "keep-alive" bit into the outgoing bit stream and is also used to insert a special error format into the outgoing bit stream at the appropriate time. This error format provides a means to signal subsequent stations on a loop that a bipolar violation has occurred in a particular packet.

The manner in which these functions are performed by data multiplexer 58 will now be described in greater detail with specific reference to FIGs. 6A-6H. The order of the description below follows the order in which the various portions of the apparatus actually function during the typical operation of multiplexer 58. In order to facilitate this discussion and to provide better continuity between figures, various ones of the input and output lines shown in FIGS. 6A-6H are labeled in accordance with the signals which they transmit or receive.

Referring then specifically to FIG. 6C, matching unit 56 is seen to provide a two wire input 353 to circuit 352. Circuit 352, which provides an interface between matching unit 58 and data multiplexer 58, is standard T1 equipment obtainable under the name of Vicom 5120 Data Receive Unit. Circuit 352 provides a clocking singla (RCV CLOCK) to system clock 250. Circuit 352 also provides a repetitive set of eight pulses on lines D1 through D8 which correspond to the eight slots in the subgroup in a standard T1 frame. It is to be noted that these pulses correspond to the line slots and not to either the bits in a byte or to the bytes in a data packet. These bytes can be distinguished in that they are referred to by subscripted D's, $D_0$ through $D_{37}$. The RCV CLOCK signal is also applied to receive flip-flop 253 which serves to read the line bits serially into shift register 251.

CLOCKS, COUNTING AND STEERING CIRCUITS OF DATA MULTIPLEXER 58

Data multiplexer 58 has one system clock 250 and three subclocks driven from the system clock. System clock 250 comprises a one-shot multivibrator which serves to regenerate the RCV CLOCK signal from the matching unit 56, and thus its output comprises a near-perfect fifty-percent duty cycle waveform. The subclocks comprise serial strobe generator 254, parallel strobe generator 300, and status read pulse generator 358.

Serial strobe generator 254, which also comprises a one-shot multivibrator, generates a pulse on the falling edge of each pulse from system clock 250 which is used to strobe data serially into shift register 251. The pulse train from serial strobe generator 254 cannot, however, be used directly. As previously mentioned, the standard T1 line format includes a "keep-alive" bit in the line bit stream. In order that this "keep-alive" bit not be permitted into shift register 251, the serial strobe corresponding to the time at which this "keep-alive" bit appears at the input to shift register 251 must be inhibited. This is accomplished by the strobe steering circuit 255.

The strobe steering circuit 255 has applied thereto the inverted D6 output ($\overline{D6}$) from circuit 352. This inversion is obtained by means of inverter 261. When the $\overline{D6}$ signal falls it serves to preset flip-flop 256. When flip-flop 256 is preset, AND gate 257 is enabled and AND gate 258 is disabled. Therefore the strobe signal from serial strobe generator 254 cannot pass through gate 258. During the time that gate 257 is enabled the serial strobe instead passes through gate 257 to the sixth slot error detector 262 enabling it to operate in the manner to be described hereinbelow. When signal D7 is generated by circuit 352, it is passed through inverter 355 and applied to flip-flop 256 thereby clearing it. This enables gate 258 and disables gate 257. Therefore the serial strobe generated by serial strobe generator 254 is again allowed to pass through gate 258 to shift register 251. Gate 258 is disabled only during the time period when the serial strobe corresponding to the "keep-alive" bit appears. Therefore the "keep-alive" bit is the only bit that is not permitted to enter shift register 251. The output of AND gate 258 is also applied to the input of NAND gate 260. The output of NAND gate 260 is applied to three-bit counter 263 which in turn provides its output to six-bit counter 264. The outputs of counters 263 and 264 provide timing signals for data multiplexer 58. One timing signal generated by AND gate 361 is output on line $D_{36}$ to terminal buffer 60 and to interface computer 62. That line is set to a 1 when counter 264 contains the value 41.

NAND gate 260 inhibits the steered serial strobe from AND gate 258 whenever the strobe corresponding to the framing bit occurs. This action is analogous to that in which ther serial strobe corresponding to the "keep-alive" bit is inhibited. NAND gate 260, in conjunction with flip-flop 259, removes the pulse strobe corresponding to the framing bit in order that the framing bit will not be counted as a bit of usable information. Whenever the signal DF is output from circuit 352 to inverter 265, the output of the inverter, $\overline{DF}$, goes to zero, thereby presetting flip-flop 259. During the time that the $\overline{Q}$ output of flip-flop 259 is 0, the output of NAND gate 260 is 1. When the pulse $\overline{DI}$ occurs flip-flop 259 is cleard. Therefore, flip-flop 259 only inhibits NAND gate 260 for the time period in which the strobe corresponding to the framing bit occurs. It is thus seen that the output of NAND gate 260 comprises a series of strobe pulses excluding those corresponding to the "keep-alive" bit and the framing bit. This pulse train is then counted using the beginning of a master frame as a reference point. This counting is initialized in the following manner.

As previously mentioned, the beginning of a master frame occurs when the framing bit is a 1 bit. Data multiplexer 58 is initialized at the beginning of each master frame by the output of master frame reset pulse generator 266, which comprises an AND gate. The inputs to the master frame reset pulse generator 266 comprise the DF pulse and the U pulse which is output from inverter 267. The $\overline{U}$ pulse, which is generated by circuit 352, is normally used in standard T1 systems, as is well known by those of ordinary skill in the art, to compare the actually received framing bit with the desired framing bit in order continuously to check that the incoming signal is correctly framed. Therefore, rather than use the actual framing bit as a criterion for the beginning of the master frame, the U pulse, which is a 1 when the framing bit should be a 1, is used. Thus the beginning of a master frame is not dependent upon a line bit which may be in error.

After counters 263 and 264 have been initialized by the output signal from master frame reset pulse generator 266, as inverted by inverter 168, the output of NAND gate 260, which contains a series of serial strobe pulses excluding those corresponding to the "keep-alive" bit and the framing bit, is applied to the count input of three-bit counter 263. After the eighth one of these strobe pulses the output of three-bit counter 263 will fall. At this time the eighth bit of the first byte has been clocked from receive flip-flop 253 into shift register 251. Whenever output 252, the most significant bit of three-bit counter 263, falls, mode control flip-flop 271 in mode control circuit 269 is set. Flip-flop 271 had previously been cleared at the beginning of the master frame by the output from master frame reset pulse generator 266. Flip-flop 271 comprises a triggered flip-flop and hence any negative-going transition at the clock input will cause the flip-flop to change state.

After the falling edge of output 252 of three-bit counter 263 occurs, the mode control flip-flop 271 output changes to a 1. Therefore, shift register 251 is ready to clock data in on a parallel basis before the next serial strobe occurs if it is decided to do so. Note that mode control flip-flop 271 is set to the parallel mode after a complete eight-bit byte has been shifted into the shift register 251 irrespective of whether a parallel read-in will occur. If it is determined that transmission will occur, the parallel read-in to shift register 251 from select circuit 380 will occur prior to the falling edge of system clock 250. After the first byte of a packet has been completely read into shift register 251, a comparison identification byte of the packet must occur.

To accomplish this identification, incoming packet status decoder 27 is used along with incoming packet status detector 273. To detect any empty packet, the outputs of shift register 251, inverted by inverters 274–281, are applied to NAND gate 282 of incoming packet status decoder 272. If an empty packet is being passed through date multiplexer 58, the first eight-bit byte will necessarily be all 0's; therefore, since the inputs to NAND gate 282 are all the inverted outputs of shift register 251, all of the inputs will be 1, thereby causing the output of gate 282 to be a 0. NAND gate 283 decodes the identification number (ID) of the packet. The outputs of shift register 251, along with the inverted outputs of shift register 251 from inverters 274–281, are supplied to two patch blocks 356 and 357. These patch blocks comprise supporting structures containing terminals which are appropriately interconnected so that when the ID of the attached terminal interface unit is present in shift register 251, all of the inputs to gate 283 will be 1 thereby causing its output to be 0. The outputs of NAND gates 282 and 283 are supplied to NOR gates 284 and 285, respectively of incoming packet status detector 273.

Soon after the start of the first byte of a newly received packet, either OR gate 286 or NAND gate 287 of transmit packet type initialization pulse generator 363 will output a zero-going pulse to indicate the start of a new date packet or a new sigal packet, respectively. Note that these two pulses occur while the new packet is actually being read into shift register 251. This instant of time is after the parallel strobe corresponding to the last byte of the preceding packet and before the parallel strobe corresponding to the first byte of the next packet. The outputs of NAND gate 287 and OR gate 286 are applied to AND gate 288. Therefore the output of AND gate 288 will be a zero-going pulse during the first byte of a received packet, whether it is a signal packet or a data packet. The output of AND gate 288 is used to present flip-flop 289 and to clear flip-flops 290 and 291 of incoming packet status detector 273. By presetting flip-flop 289, a 0 output of either of NAND gates 282 or 283 is able to propagate through NOR gates 284 or 285, respectively, as a 1.

The clock pulse used to clock the J input of JK flip-flops 290 and 291 into the flip-flops is generated by the status read pulse generator 358 which comprises a NAND gate whose inputs are the output of mode control circuit 269 and the output from system clock 250.

Figure 6E:
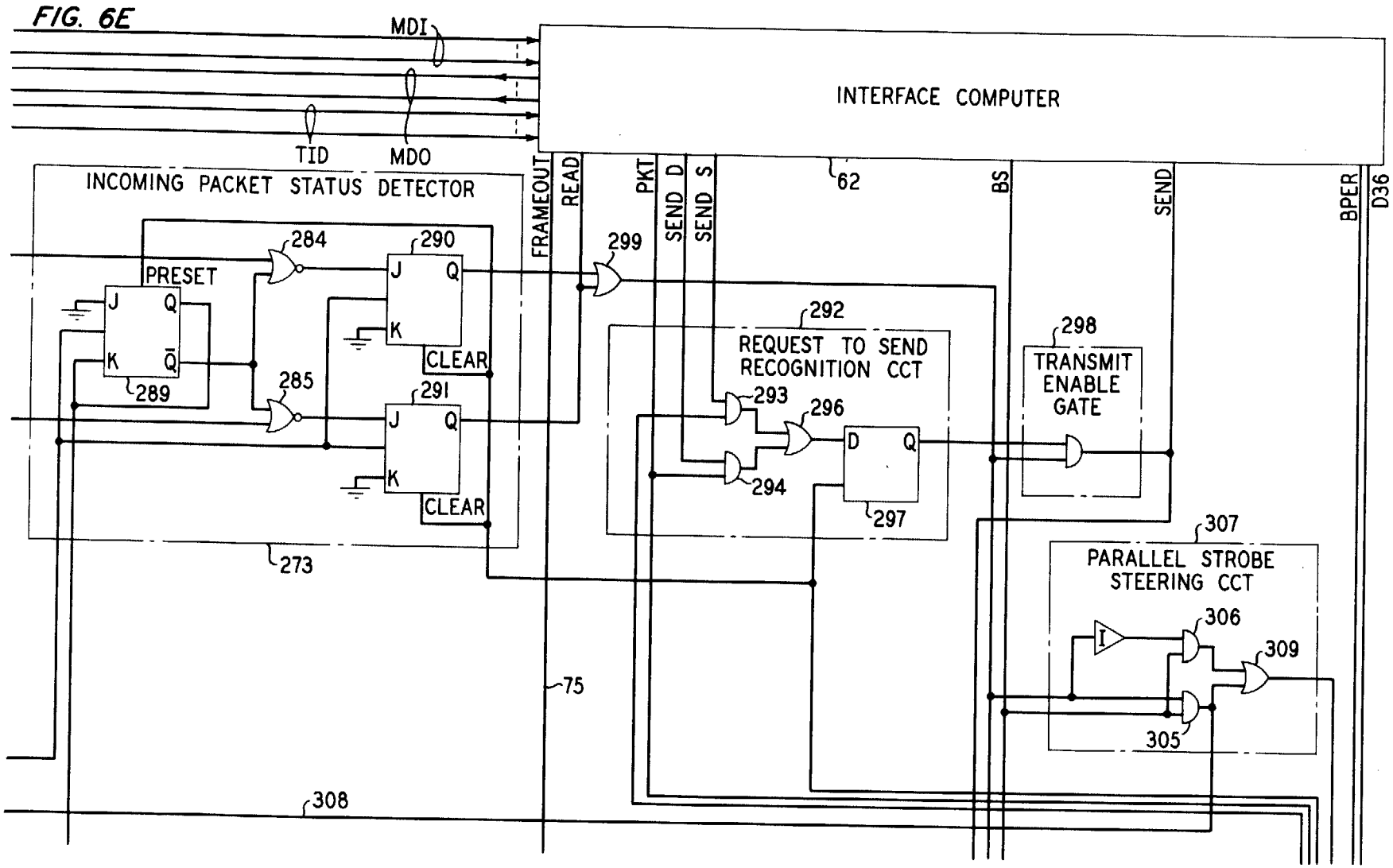
Figure 6F:
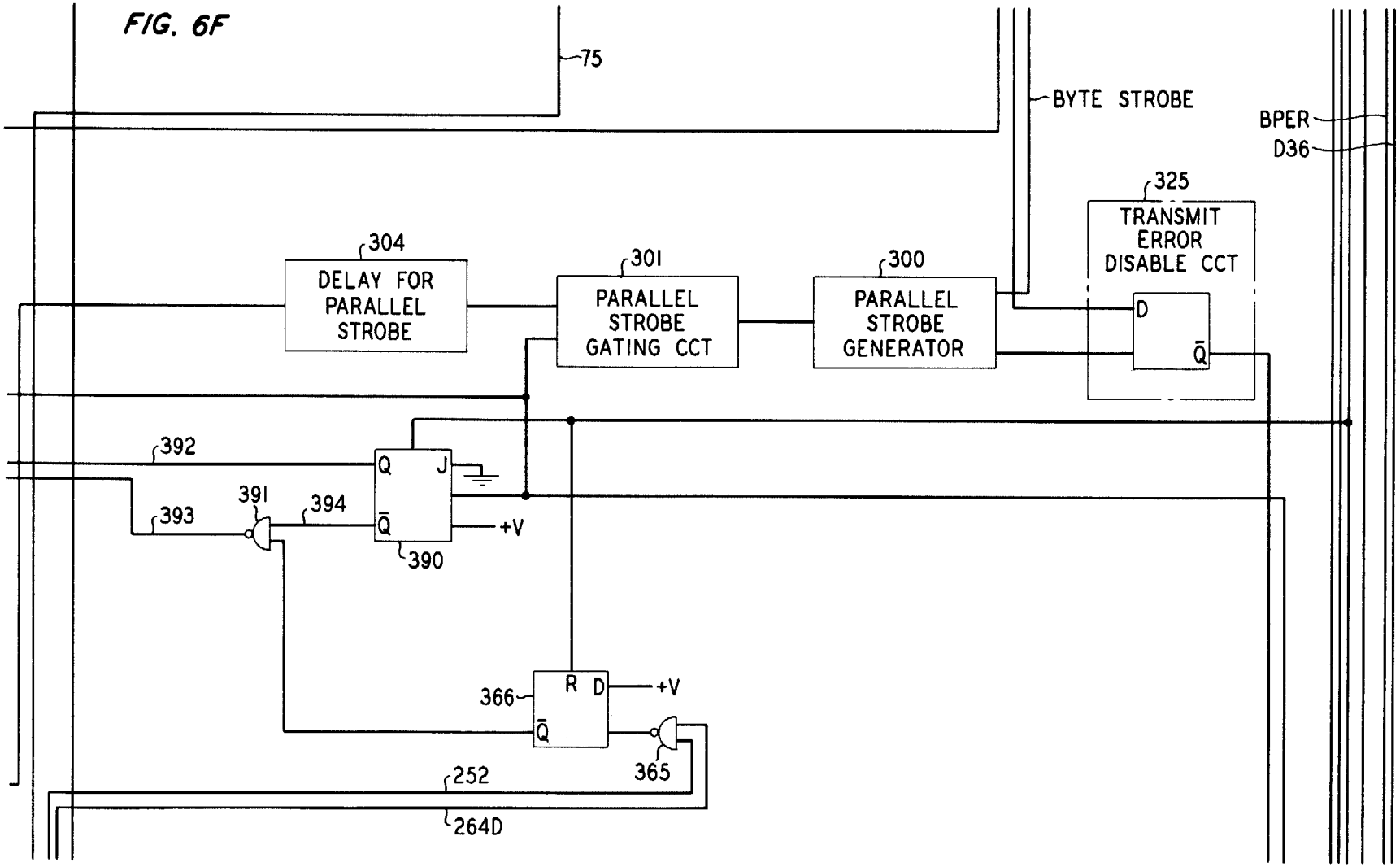

After the first byte of a new packet has been fully clocked into shift register 251, as after every complete byte, the mode control circuit 269 output rises to a 1. At that instant however, the output from system clock 250 is in its low state. When the output from system clock 250 rises to a 1, the output of the status read pulse generator 358 falls to a 0. This output is used to clock flip-flops 289, 290, and 291 of incoming packet status detector 273. At that time, whatever signal is on the J inputs of flip-flops 290 and 291 is transferred into those flip-flops and appear on their outputs. Also at this time flip-flop 289 returns to the state where its Q output is a 0 and its $\overline{Q}$ output is a 1. This is accomplished, as shown in FIG. 6E, by feeding the Q output back into the K input. Therefore, when the output of status read pulse generator 358 falls, the 1 input to the K input of flip-flop 289 will cause the Q output to go to 0 and the $\overline{Q}$ output to go to 1. With the $\overline{Q}$ output going to 1 the outputs of NOR gates 284 and 285 remain 0 until flip-flop 289 is again present.

The output of NOR gate 284 is applied to the J input of JK flip-flop 290 and the output of NOR gate 285 is applied to the J input of JK flip-flop 291. Thus if an empty packet is identified, flip-flop 290 is set so that its Q output goes to 1. If a terminal ID is decoded satisfactorily, flip-flop 291 is set so that its Q output goes to a 1. Either flip-flop will remain in the set state until cleared by the zero-going pulse generated by AND gate 288 during the start of the next packet.

When the associated terminal interface unit wishes to transmit data, the first thing that data multiplexer 58 must do is to find either an empty packet in the line bit stream or a packet that is addressed to the associated terminal interface unit. In the latter case, the terminal interface unit removes the information in the packet addressed to it thereby leaving the packet empty.

Next interface computer 62 must apply either or both of two distinct signals to data multiplexer 58. One signal, SENDD, indicates a request to transmit a data packet and the other, SENDS, indicates a request to transmit a signal packet. The data multiplexer identifies these two signals by means of request-to-send recognition circuit 292. Specifically, the SENDD signal is applied to AND gate 294 of request-to-send recognition circuit 292 and the SENDS signal is applied to AND gate 293. The other inputs to these two gates come from transmit packet type indicator circuit 295, which comprises a flip-flop. When a signal packet is being received by the data multiplexer, the Q output of flip-flop 295 will be a 1, thereby enabling AND gate 293. When a data packet is being received by the data multiplexer, the $\overline{Q}$ output of flip-flop 295 will be a 1, thereby enabling AND gate 294. It is the function of AND gates 293 and 294 to gate the SENDD and SENDS signals with the packet type that is being received at that time. Therefore, if signal packet transmission is requested and the date multiplexer is receiving a date packet, the outputs of AND gates 293 and 294 will both be 0 and hence the output of OR gate 296 will be 0. Therefore no outgoing date packet or signal packet transmission will take place. The same holds true in the reverse situation where date packet transmittion has been requested and a signal packet is being received. Thus, in order to transmit a signal packet, a signal packet must be used; and in order to transmit a date packet, a date

TRANSMISSION OF A SIGNAL PACKET BY THE DATE MULTIPLEXER

The manner in which a signal packet is transmitted by data multiplexer 58 can best be appreciated by a consideration of the following example. In this example it is assumed that the SENDS signal has been received, thereby causing one input to AND gate 293 to be a 1 and, further, that a signal packet has just begun to be received. Therefore, the Q output of flip-flop 295 will be a 1 thereby causing the output of AND gate 293 to be a 1. This 1 output, which is applied to the input of OR gate 296 will cause that gate's output to be a 1. This 1 output is applied to the D input of D-type flip-flop 297, which is also contained in a request-to-send recognition circuit 292 shown in FIG. 6E. When the output of AND gate 288 rises, the signal on the D input of flip-flop 297 will be transferred to its Q output. In this way it is insured that the SENDS signal is received and the match between received packet type and desired type of transmission is made before there is any parallel clocking into shift register 251. This insures that there can be no errors generated as a result of signals changing at critical times.

The Q output of flip-flop 297 of request to send recognition circuit 292 is applied to transmit-enable gate 298, which comprises an AND gate. The other input to transmit enable gate 298 comes from OR gate 299. The output signal from OR gate 299, when it is a 1, indicates, as described above, that either an empty packet has been detected or the ID of the associated terminal interface unit was successfully decoded. In this situation both imputs to AND gate 298 are 1 thereby causing its output to be a 1. The output of AND gate 298 is returned to interface computer 62 as the SEND line to indicate when data is being transmitted. The output of OR gate 299 is input to parallel strobe steering circuit 307. Thus when the output of OR gate 299 is a 1, a parallel strobe is applied to shift register 251 as described below.

The timing signals for the parallel insertion of data in shift register 251 are provided by parallel strobe generator 300 which comprises a one-shot multivibrator that is driven by the output of parallel strobe gating circuit 301 which comprises an AND gate. To insure that the parallel strobe occurs at the proper time, one-shot multivibrator 304 is used as a delay and is triggered at the time the system clock 250 output rises. The Q output of delay 304 is applied to one of the inputs of parallel strobe gating circuit 301. Delay 304 will output a pulse every time the system clock 250 output rises. However, the parallel strobe is required only after a complete eight-bit byte. Therefore, the Q output of delay 304 is gated with the mode control circuit 269 output by parallel strobe gating circuit 301. Hence only when the output from mode control 269 is a 1 does a pulse generated by delay 304 propagate to the output of parallel strobe gating circuit 301. At all other times the output of gating circuit 301 is clamped to a 0 level by the mode control 269 output being a 0. When the Q output of flip-flop 271 of mode control 269 is a 1, the pulse generated by delay 304 will appear at the output of gate 301. The falling edge of this pulse triggers the parallel strobe generator 300. Thus it is seen that this strobe, denoted the "byte strobe" signal, is generated after every complete eight-bit byte has been completely read into shift register 251 irrespective of whether transmission will be initiated by the terminal interface unit.

At the time that a complete byte of data has been assembled in shift register 251, the byte strobe from parallel strobe generator 300 clocks the data into register 251A. The eight output lines MDI from register 251A go to interface computer 62 and terminal buffer 60. At the same time that data is clocked into register 251A, a pulse appears on line 308 if the data belongs to an empty packet or if the data belongs to a packet whose ID was recognized. The pulse on line 308 strobes the output of select circuit 380 into register 251A.

Select circuit 380 comprises eight circuits, 380A through 380H, as shown in FIG. 6B. Each of these circuits contains the gates shown in detail in circuit 380A, that is, AND gates 382, 383, 384, 385 and 389, inverters 386 and 387, and OR gate 388. Each of circuits 380A through 380H provides one bit of the eight bits of the data supplied to shift register 251 as follows.

When interface computer 62 indicates that it wants to send, the output of transmit enable gate 298 will be a 1 if transmission is actually taking place. That output is a 0 when there is no request to send even if the opportunity exists. In these latter circumstances, AND gate 389 is inhibited and zero bytes are strobed into shift register 251. When a request to send has been received, and the output of gate 298 is a 1, AND gate 389 is enabled, and the source of data strobed into shift register 251 is determined by lines 392 and 393.

When the byte of data to be loaded into shift register 251 is the first of a packet, then both lines 392 and 393 are equal to 1, AND gate 382 is enabled, and the data input to shift register 251 is taken from patch block 381. Patch block 381 serves to generate the associated terminal's ID on eight lines 621.

When the byte of data to be loading into shift register 251 is one of the second through the fourth bytes of a packet, then lines 392 and 393 are zero, AND gate 385 is enabled, and the data on the eight lines MDO from interface computer 62 are strobed into shift register 251.

When the byte of data to be loaded into shift register 251 is the fifth through thirty-eighth of a data packet, then line 392 is a 1 and line 393 is a 0, AND gate 383 is enabled, and the data on lines SDO from terminal buffer 60 are strobed into shift register 251.

Line 392 is the Q output of JK flip-flop 390 which is preset at the start of each packet by the output and AND gate 288. Flip-flop 390 is cleared by the falling edge of the output from mode control 269 which is applied to the flip-flop's clock input. Thus flip-flop 390 remains set only during the first byte time of a packet. When flip-flop 390 is reset, NAND gate 391 is enabled and the signal on line 393 is the inverted form of the $\overline{Q}$ output of D-type flip-flop 366. That flip-flop is reset by the output of AND gate 288 at the start of a packet. The flip-flop 366 is set when the output of NAND gate 365 rises. This occurs when counter 264 contains the valve 8, and the most significant bit of counter 263 falls to zero.

The byte strobe signal output by parallel strobe generator 300 is applied to gates 305 and 306 of parallel strobe steering circuit 307, and is also applied to interface computer 62 by line BS where it is used as a timing reference for the interface computer 62 as described hereinbelow. If, as in the case previously descussed, the output of OR gate 299 is a 1, then AND gate 305 is enabled and the parallel strobe is allowed to propagate through it. The output of AND gate 305 is applied to the parallel load clock input 308 of shift register 251 where a parallel read-in to shift register 251 takes place. If, on the other hand, the output of OR gate 299 is a 0, then AND gate 305 will be disabled and AND gate 306 will be enabled. The strobe signal generated by parallel strobe generator 300 will then be allowed to propagate through AND gate 306 but not through AND gate 305 and the parallel load clock input 308 of shift register 251 will not be strobed. The outputs of AND gates 305 and 306 are applied to the input of OR gate 309. The output of OR gate 309 comprises the parallel strobe pulse irrespective of whether transmission has been enabled or not. The output of OR gate 309 is fed back to the input of OR gate 270 in mode control circuit 269 where it causes the Q output of mode control flip-flop 271 to return to its 0 state, thereby preparing shift register 251 for serial operation during the next incoming byte. During this time the byte present in shift register 251 is serially shifted out of the shift register through the injector circuit 302 to the transmit flip-flop 303 and out onto the line.

Figure 6G:
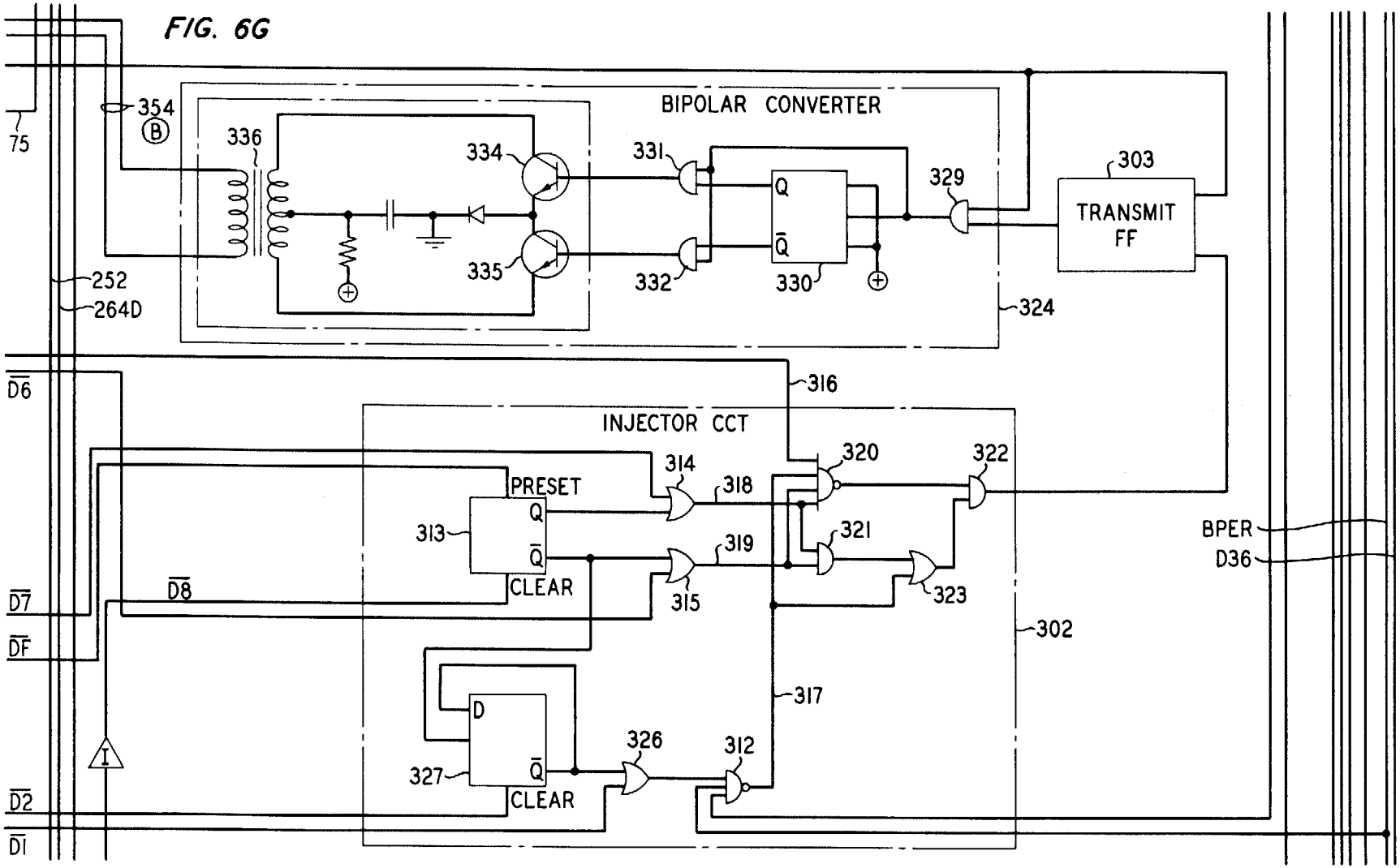
Figure 6H:
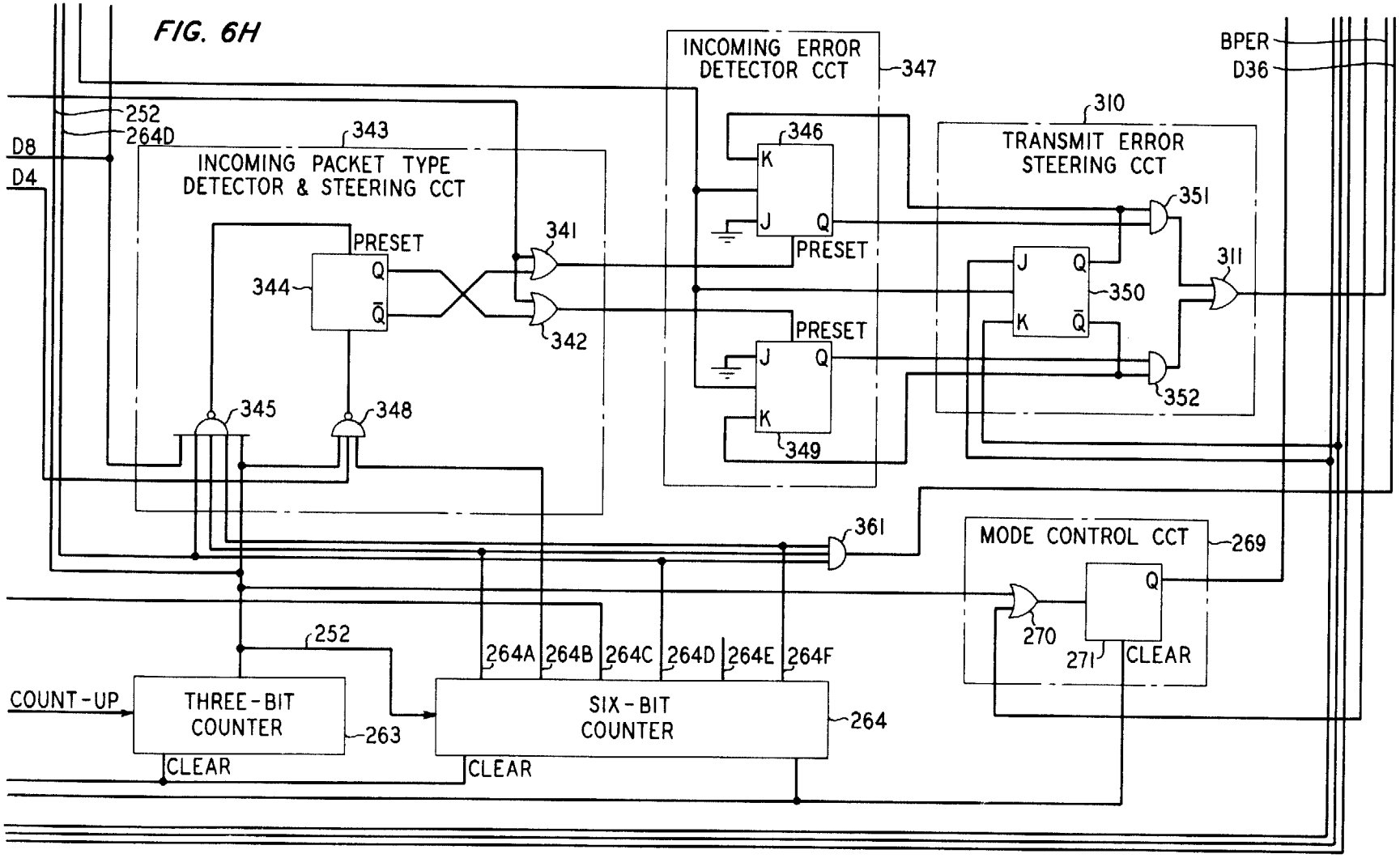

Turning then to injector circuit 302 shown in FIG. 6G, this circuit is seen to provide the means for inserting bits into the serial bit stream to comply with system constraints. It inserts the "keep-alive" bit into the sixth slot of a line subgroup, and it also inserts an error format into the bit stream whenever the transmit error steering circuit 310 indicates that it should do so. This error format comprises a 1bit in every line slot except for the "keep-alive" slot, which contains a 0 in this format. The framing bit, however, is allowed to pass through injector circuit 302 in its original state without being altered in any way.

Consider now a case of normal transmission where the error format is not transmitted. In this situation the output of OR gate 311 of transmit error steering circuit 310 will be a 0, thereby causing the output of NAND gate 312 of interior circuit 302 to be a 1. Flip-flop 313 and OR gates 314 and 315 are used to insert the "keep-alive" bit into the bit stream. During times other than those when the "keep-alive" bit is to be inserted, the outputs of both of OR gates 314 and 315 will be 1. In this situation inputs 317, 318, and 319 to NAND gate 320 are 1. Input 316 is from the output of inverter 281 which inverts the output of the last cell of shift register 251. Therefore, the output of NAND gate 320 is 1. Hence, the output of NAND gate 320 is seen to be in the same state as the last call of shift register 251. The output of NAND gate 320 is passed to the input of AND gate 322. The other input to AND gate 322 comes from OR gate 323. Since one of the inputs to OR gate 323 comes from the output of NAND gate 312, which is a 1 when the error format is transmitted, the output of OR gate 323 will be a 1 thereby enabling AND gate 322 and passing the output of NAND gate 320 through AND gate 322 to transmit flip-flop 303. On each falling edge of system clock 250 the output of AND gate 322 is clocked into transmit flip-flop 303 where it is sampled during the next 1 state of system clock 250. A further description of the operation of transmit flip-flop 303 in conjunction with bipolar converter 324 is contained hereinbelow.

Consider now the injection of the "keep-alive" bit into the bit stream. First considering the normal situation, that is, the situation that applies to every "keep-alive" time slot except the one immediately following the framing bit. In this normal situation the set output of flip-flop 313 of injector circuit 302 is a 0, which holds the output of OR gate 315 to a 1. When the set output of flip-flop 313 is 0, the output of OR gate 314 will be a 1 whenever its input from inverter 355, that is $\overline{D7}$, is 0. $\overline{D7}$ is a 1 at all times except for when it falls to 0 for one system clock time. Therefore when the $\overline{D7}$ pulse occurs, the output of OR gate 314 will go to a 0, causing the output of NAND gate 320 to go to a 1 and the output of AND gate 321 to go to a 0. Since, as stated above, the output of NAND gate 312 is at this time a 1, the output of AND gate 322 will also be a 1. Therefore a 1 will be clocked to transmit flip-flop 303 on the falling edge of system clock 250.

Next considering the situation of injection immediately after receiving a framing bit, it can be seen that the "keep-alive" bit injected by using the pulse $\overline{D7}$ would cause the "keep-alive" bit to be injected into the time slot immediately following the desired one. In this particular situation the D6 pulse is used. Note that the time slot referred to precedes the transmission of the framing bit by data multiplexer 58. The $\overline{DF}$ pulse is used to preset flip-flop 313 of injector circuit 302. With the Q output of flip-flop 313 a 1, the output of OR gate 314 will be a 1, and with the $\overline{Q}$ output a 0, the output of OR gate 315 will depend upon $\overline{D6}$. When the pulse $\overline{D6}$ goes to 0, the output of OR gate 315 will go to 0. With the output of OR gate 315 at 0, the output of NAND gate 320 is a 1, and the output of AND gate 322 is a 0. The output of OR gate 323 and NAND gate 320 each a 1 causes the output of AND gate 322 to be a 1. The output of AND gate 322 is clocked into transmit flip-flop 303. Using the pulse D6 in this situation causes the "keep-alive" bit to be inserted in the proper line time slot, the sixth slot. Two system clock pulse periods after pulse D6 occurs, pulse $\overline{D8}$ occurs, $\overline{D8}$ being used to clear flip-flop 313. The clearing of flip-flop 313 inhibits OR gate 315, therefore pulse $\overline{D7}$ will again be the pulse that inserts a 1 into the "keep-alive" slot until the next framing bit is received.

TRANSMISSION OF THE ERROR FORMAT BY THE DATA MULTIPLEXER

When the output of OR gate 311 of transmit error steering circuit 310 is a 1, the error format is transmitted. In this format all the bit slots except the "keep-alive" bit slot contain 1's and the "keep-alive" bit slot contains a 0. In order to preserve synchronization in the system, the framing bit is allowed to propagate through the injector circuit 302 without alteration.

Assume now that no transmission has been initiated and that therefore the transmit error disable circuit comprising flip-flop 325 has not been set to inhibit the error format. The $\overline{Q}$ output of flip-flop 325 is then a 1. The remaining input to NAND gate 312 comes from the output of OR gate 326. Assuming for the moment that flip-flop 327 is in its reset state, then the output of OR gate 326 is a 1. Therefore, since the three inputs to NAND gate 312 are all 1, the output of the gate is a 0. This causes the output of NAND gate 320 to be a 1. Except at those times when a signal is injected into the "keep-alive" slot through OR gates 314 or 315, the output of both of these gates is a 1. Since both of the inputs to AND gate 321 are 1, its output is a 1 thereby causing the output of OR gate 323 to be a 1. Since both inputs to AND gate 322 are also 1, its output is a 1. Hence a 1 level is applied to transmit flip-flop 303 to be clocked into it on the falling edge of the next pulse from system clock 250.

Now consider the "keep-alive" slot. As previously described, the $\overline{D7}$ pulse normally causes a 1 to be inserted into the "keep-alive" slot. In this situation, when the $\overline{D7}$ pulse goes to 0, thereby causing the output of OR gate 314 to go to 0, the corresponding input to AND gate 321 goes to 0, and therefore the output of AND gate 321 will be a 0 for the time that the $\overline{D7}$ pulse is present. With the output of NAND gate 312 a 0, and the output of OR gate 314 a 0, both inputs to OR gate 323 are 0 thereby causing its output to be 0. Thus one input to AND gate 322 is 0 which causes its output to be a 0. A 0 is thereby clocked into transmit flip-flop 303 at the time of the occurrence of the "keep-alive" slot. As previously described, immediately, following the receipt of a framing bit, the "keep-alive" bit must be generated one slot earlier than usual in order that it be in the correct line time slot. This is accomplished by presetting flip-flop 313 by using the $\overline{DF}$ pulse. This, therefore, enables OR gate 315 and disables OR gate 314. Note that in this context "enable" means applying a 0 input to OR gate 315. When the $\overline{D6}$ pulse appears from inverter 261, the output of OR gate 315 goes to 0, causing the output of AND gate 321 to go to a 0, thereby making one input to OR gate 323 a 0. Since the other input to OR gate 323 comes from NAND gate 312, whose output is also a 0, the output of OR gate 323 is a 0. Thus the output of AND gate 322 will also be a 0 and a 0 will be clocked into the "keep-alive" time slot. As soon as the $\overline{D8}$ pulse occurs, flip-flop 313 is cleared so that until the framing bit occurs again the $\overline{D7}$ pulse will be used to fill the "keep-alive" slot.

Another special situation occurs when the framing bit is clocked into shift register 251. In order to preserve line synchronization, it is necessary to transmit the framing bit exactly as it was received without regard to the action of injector circuit 302. Note that one of the inputs to NAND gate 312 comes from the output of gate 326, which is a 1.

In the normal situation, flip-flop 327 is in its reset state with its $\overline{Q}$ output equal to 1. The $\overline{Q}$ output of D-type flip-flop 327 is fed back to its D input so that when the clock lead is pulsed the $\overline{Q}$ output of the flip-flop will go to 0. The input to the clock lead of flip-flop 327 comes from the $\overline{Q}$ output of flip-flop 313. The $\overline{DF}$ pulse presets flip-flop 313 to allow the unaltered framing bit to pass through injector circuit 302 and the following $\overline{D8}$ pulse clears it. When the $\overline{D8}$ clear pulse occurs, the $\overline{Q}$ output goes from a 0 to a 1. This 0 to 1 transition causes the signal on the D input of flip-flop 327 to transfer to the Q output of flip-flop 327 and its complement to the Q output. Therefore on the $\overline{D8}$ pulse immediately following the $\overline{DF}$ pulse the $\overline{Q}$ output of flip-flop 327 is fed to one input of OR gate 326.

The other input to gate 326 is from the $\overline{D1}$ pulse which is output from inverter 328. This pulse is normally a 1 except during the time of the $\overline{D1}$ time slot at which time it is a 0. When the $\overline{D1}$ pulse does go to 0, and with the other input to OR gate 326 also a 0, the output of OR gate 326 also goes to 0. This 0 signal applied to the input of NAND gate 312 causes the output of NAND gate 312 to be forced to a 1. With the output of NAND gate 312 a 1 and the output of both gates 314 and 315 a 1, inputs 317, 318 and 319 of gate 320 are 1. With the output of NAND gate 312 a 1 the output of OR gate 323 is also a 1, therefore AND gate 322 is enabled and the inverted output of the end cell of shift register 251, which is the framing bit, is transferred on input line 316 to NAND gate 320 where it is inverted again and passes through AND gate 322 to transmit flip-flop 303. Hence at the next clock pulse from system clock 250, the unaltered framing bit is transmitted.

When flip-flop 313 is cleared by the $\overline{D8}$ pulse, the output of OR gate 314 returns to its normal 1 value, thereby removing the inhibit from NAND gate 312 and returning the injector circuit 302 to the previous condition whereby the 1 bit error signal from OR gate 311 causes the output of NAND gate 312 to be 0, thereby causing the error format to be properly injected into the bit stream.

TRANSMIT ERROR DISABLE

When transmission is initiated by a terminal interface unit it is desired that incoming errors do not cause injector circuit 302 to output a signal to transmit flip-flop 303 indicating that errors were received. When transmission is to be initiated, it is undesirable and unnecessary to send out only an error format. The transmit error disable circuit 325, which comprises a flip-flop, inhibits transmission of the error format in this case as follows.

Whenever the output of OR gate 299 is a 1, this 1 output is applied to the D input of D-type flip-flop 325. This 1 input causes the $\overline{Q}$ output of flip-flop 325 to fall to 0 upon being clocked by the rising edge of parallel strobe generator 300. This 0 input is applied to NAND gate 312 and causes the output of NAND gate 312 to remain a 1 as long as the $\overline{Q}$ output of flip-flop 325 is a 0. This inhibits the transmission of the error format by transmit flip-flop 303.

Once flip-flop 325 has been set, it remains in that state until the first parallel strobe associated with the next packet occurs. At that time, if no transmission is to be made, the output of OR gate 299 will be 0. This 0 is applied to the D input of D-type flip-flop 325 and causes its Q output to go to 0 and its $\overline{Q}$ output to go to 1 when the first parallel strobe associated with the next data packet occurs. Since the reset output of flip-flop 325 is one of the inputs to NAND gate 312, the output of NAND gate 312 will now be determined by its other two inputs.

TRANSMIT FLIP-FLOP AND BIPOLAR CONVERTER OF THE DATA MULTIPLEXER

As shown in FIG. 6G, the output of AND gate 322 of injector circuit 302 is applied to the input of flip-flop 303 the tansmit flip-flop. With each falling edge of system clock 250, the output of AND gate 322 is clocked into transmit flip-flop 303. Once a bit has been clocked into this flip-flop no further insertions or changes can be made. The output of flip-flop 303 is fed to AND gate 329 of biopolar converter 324.

Bipolar converter 324 converts the unipolar logic level of the data multiplexer to a line-compatible bipolar signal. The output of flip-flop 303 that was clocked in on the falling edge of system clock 250 is sampled by AND gate 329 during the next clock pulse interval. If a 1 bit was clocked into flip-flop 303 the output of AND gate 329 is a 1 during the next clock pulse interval. If a 0 was clocked into flip-flop 303 the output of AND gate 329 is a 0 during the next clock pulse interval. In the case where the output of AND gate 329 is a 0, both AND gates 331 and 332 will have 0 output thereby causing both of transistors 334 and 335 to be off. With these transistors both off, zero volts will appear across the secondary winding of transformer 336. In the situation where the output of AND gate 329 is a 1, the output of either AND gate 331 or 332 will be a 1 causing transistor 334 or 335, respectively, to turn on during the duration of the system clock pulse. This action causes either a positive or negative pulse to appear at the secondary winding of transformer 336.

Flip-flop 330 causes adjacent one-bit line pulses to be of opposite polarity. Assume, for example, that the Q output of flip-flop 330 is a 1, thereby enabling AND gate 331. When the system clock pulse falls, the output of AND gate 331 falls, thereby causing flip-flop 330 to change to a state where its Q output is a 1. AND gate 332 is now enabled for the next 1 bit that is to be transmitted. Since flip-flop 330 requires a falling edge to change state, it will only change state after a 1 bit has been transmitted. In this manner adjacent 1 bits on the line will be of opposite polarity.

ERROR DETECTION

Error detection occurs in two different circuits in data multiplexer 58. First, there is an error detector that detects the 1 bit inserted in the "keep-alive" slot. The output of receive flip-flop 253 is applied to the input of inverter 337 of six-slot error detector 262. The output of inverter 337 is fed to the D input of flip-flop 338. When the signal in the "keep-alive" slot is a 1, the output of inverter 337 will be a 0 thereby applying a 0 to the D input of flip-flop 338. When the signal in the "keep-alive" slot is a 0, the output of inverter 337 will be a 1, thereby applying a 1 to the D input of flip-flop 338.

The clock for flip-flop 338 comes from the strobe steering circuit 255, which supplies a clock pulse to the clock input of flip-flop 338 corresponding to the "keep-alive" slot only as has been previously explained. A 0 input clocked into the flip-flop will cause its $\overline{Q}$ output to apply a 1 to the input of AND gate 339, thereby indicating an error.

The other error detecting circuit is the PCM error detecting circuit in receive unit 352. This circuit outputs a PCM ERROR pulse whenever the bipolar nature of the incoming signal has been violated by two adjacent 1 bits being of the same polarity. The pulse is of the same width and in the same position as a line pulse that violates the bipolar code. The PCM ERROR pulse is aplied through inverter 340 to the other input of AND gate 339. Under normal conditions the output of inverter 340 is a 1. When an error is detected, its output will go to 0. When either of the two inputs to AND gate 339 go to 0, thereby corresponding to an error, the output of AND gate 339 goes to 0.

The output of AND gate 339 is applied to one input of OR gates 341 and 342 of incoming packet type detector and steering circuit 343. The other input to these two gates comes from flip-flop 344, which steers the error signal to the proper one of OR gates 341 and 342. It is important that the packet type, either signal or data, in which the error was detected be noted so that the correct packet will be made to contain the error format when it is transmitted. Flip-flop 344 indicates which type of packet is currently being received. It derives its preset signal from NAND gate 345. The inputs to NAND gate 345 are the pulse D8 and outputs 264A, 264D and 264F of six-bit counter 264 and output 252 of three bit counter 263. When the output of NAND gate 345 falls to 0, thereby presetting flip-flop 344, a 0 input to OR gate 341 corresponding to a detected error is allowed to propagate to its output. Note that flip-flop 344 is preset and set using the digit pulse corresponding to the last time slot in the packet.

In order to insure that a PCM error detected in the first bit of a new packet is directed to the flip-flop corresponding to that new packet, it is necessary to use the digit pulse corresponding to the last line bit of the previous packet. The appropriate steering is provided by flip-flop 344.

When flip-flop 344 is in the preset state, any errors detected and thereby output as a 0 by AND gate 339 will be directed through OR gate 341 to flip-flop 346 in incoming error detector 347. The 0 signal will serve to preset flip-flop 346 thereby indicating that there was an error in the incoming signal packet. Flip-flop 346 will remain in this state until the signal packet has been completely transmitted out of shift register 251. In the same manner, when flip-flop 344 is in the reset state as a result of NAND gate 348 applying a 0 pulse to its clear input, its $\overline{Q}$ output will be 1. Therefore any 0 output of AND gate 339 will propagate through OR gate 342 to preset flip-flop 349.

Since it is possible that an error may be detected in the first byte of a new incoming packet while the last byte of the previous packet is still being transmitted, the error format is not transmitted until the new packet is being transmitted. This is insured by the action of transmit error steering circuit 310. Flip-flop 350 forms the basis of this circuit. The JK inputs to this flip-flop come from the Q and $\overline{Q}$ outputs, respectively, of flip-flop 295. Flip-flop 295 indicates the type of packet that will be transmitted starting with the serial strobe following the next parallel load strobe. The clock pulse of flip-flops 350, 346, and 349 is derived from the Q output of flip-flop 289 in incoming packet status detector 273. Flip-flop 289 is normally in the reset state. The output of gate 288, which is a zero-going pulse to indicate the start of a new data packet or a new signal packet, is applied to the preset input of flip-flop 289. This action occurs after the last parallel load strobe of the previous packet and before the first parallel load strobe of a new packet..

The output of the status read pulse generator 358 is applied to the clock input of flip-flop 289. When the output of status read pulse generator 358 falls, which action precedes the parallel load strobe corresponding to the first byte of a new packet, the Q output of flip-flop 289 will go to 0. This is the result of tying the Q output back to the K input with the J input grounded. The falling edge of the Q output is the clock for flip-flops 346, 349, and 350. The time at which this happens is immediately preceding the parallel load strobe corresponding to the first byte of a new packet. The transmit error steering circuit 310 will therefore have time to settle and to apply the proper signal to injector circuit 302 in time for the next serial strobe to shift register 251. The output of transmit error steering circuit 310 is also applied to interface computer 62 on line BPER.

Flip-flop 350 has the secondary function of providing the means to clear flip-flops 346 and 349 at the appropriate time. For example, assume that an error is detected in the signal packet thereby causing flip-flop 346 to preset at the appropriate time. Also assume that signal packet transmission has been completed and data packet transmission is about to start. Therefore, sometime between this time and the time the next signal packet is received, flip-flop 346 must be cleared so that if no new signal packet errors are detected, the next signal packet can be transmitted without the error format. To accomplish this, the Q output of flip-flop 350 is applied to the K input of flip-flop 346. Likewise, the $\overline{Q}$ output of flip-flop 350 is applied to the K input of flip-flop 349 to accomplish this same clearing function for the data packet.

Assume further that the data multiplexer 58 has just completed transmitting the signal packet in which the Q output of flip-flop 350 is still high. When the clock for flip-flops 350, 346, and 349 occurs, which is prior to the parallel load strobe corresponding to the first byte of a packet, the 1 on the Q output of flip-flop 350 is fed back to the K input of flip-flop 346 causing flip-flop 346 to go to the state where its Q output is 0. Therefore flip-flop 346 is cleared ready to receive an error signal on its preset lead at the next time that a signal packet is being received. The same situation holds true when a data packet is being transmitted. The $\overline{Q}$ output of flip-flop 350 will be a 1 and the Q output of flip-flop 350 will be a 0. Therefore when the clock pulse generated by flip-flop 289 of incoming packet status detector 273 occurs, the 1 output of flip-flop 350 on its $\overline{Q}$ output that is fed back to the K input of flip-flop 349 will cause flip-flop 349 to clear itself and be ready to accept an error signal on its preset lead the next time that a data packet is being received.

As mentioned above, a subset of the apparatus comprising data multiplexer 58 can be used to implement byte disassembler 40 and byte assembler 64. The inputs to and outputs from data multiplexer 58 have been labeled A through E in FIG. 2B and in FIGS. 6A-6H to facilitate the following discussion.

BYTE DISASSEMBLER

Turning then to byte disassembler 40, this device can be made from the apparatus shown in FIGS. 6A-6H by connecting the eight lines 38 shown in FIG. 2B to the eight lines labeled "C" in FIG. 6B, and by connecting the pair of wires labeled "B" in FIG. 6G to terminal matching unit 42 shown in FIG. 2B. Lines A, D and E shown in FIGS. 6C, 6B, and 6A are not used by byte disassembler 40. Additionally, since byte disassembler 40 must transmit all packets it receives rather than merely those having a particular identification number, patch blocks 356 and 357 shown in FIG. 6A must be reconfigured so as to match any zero or non-zero identification number. Further, flip-flop 390 shown in FIG. 6F must be replaced by a patch block configured so that the signals appearing on lines 394 and 392 are each a 0.

BYTE ASSEMBLER

Byte assembler 64 can be made from the apparatus shown in FIGS. 6A-6H by connecting the eight lines labeled "E" in FIG. 6A to loop receive buffer 66 shown in FIG. 2B and by connecting the pair of wires labeled "A" in FIG. 6C to terminal matching unit 42 shown in FIG. 2B. Lines B, C, and D shown in FIGS. 6B and 6C are not used by byte assembler 64. Additionally, since byte assembler 64 must transmit all packets with non-zero identification numbers that it receives rather than merely those having a particular identification number, patch blocks 356 and 357 shown in FIG. 6A must be reconfigured to match any non-zero identification number. Further, the output of NAND gate 282 must be applied to patch block 356.

TERMINAL BUFFER

Terminal buffer 60 of terminal interface unit 17 shown in FIG. 2B is shown schematically in FIG. 7A. As shown in FIG. 7A, terminal buffer 60 comprises four major parts: data receive buffer 450, data transmit buffer 451, channel select circuit 452, and channel break circuit 453.

Data receive buffer 450 receives data from data multiplexer 58 on eight lines MDI and transfers it to digital device 18 by means of eight lines 455. Data receive buffer 450 assembles a complete packet of data before any of it is made avaiable to digital device 18.

Similarly, data transmit buffer 451 receives data from digital device 18 on eight lines 456 and transfers it to data multiplexer 58 on eight lines SDO. Again, a complete packet of data is assembled before it is transmitted.

Channel select circuit 452, in response to a command on eight lines 458 from digital device 18, selects a channel for the data transmission and passes this information to interface computer 62 on eight lines SBC.

Finally, channel break circuit 453 transfers a signal from interface computer 62 on eight lines RCH that notifies digital device 18 about a change in status of a non-selected channel. This information is transferred to digital device 18 by eight lines RCH.

Each of the four functional units 450, 451, 452, and 453 of terminal buffer 60 operates under the control of both digital device 18 and interface computer 62. The manner in which this control is exercised and the manner in which each of the major blocks shown in FIG. 7A accomplishes its function may best be appreciated by means of FIGS. 7B-7F which illustrate terminal buffer 60 in greater detail.

FIG. 7B illustrates the timing signals used in the operation of terminal buffer 60.

Timing signals for the entire terminal interface unit 17 are generated by data multiplexer 58 and transmitted to terminal buffer 60 and interface computer 62. The key timing signal is the byte strobe signal appearing on line BS in the data multiplexer logic diagram of FIG. 6E. This strobe occurs forty-two times during each master frame and coincides with the complete assembly of one eight-bit byte in register 251A of data multiplexer 58. At the time data multiplexer 58 issues a byte strobe it puts the eight-bit byte of data into register 251A and simultaneously reads data from one set of its data input lines, either MDO or SDO. When the first four byte strobes in a master frame occur, the four eight-bit bytes of the signal packet are put on the data output lines MDI, and when the subsequent thirty-eight byte strobes in one master frame occur the thirty-eight bytes of a data packet are put on the data multiplexer output lines MDI. The time interval following one byte strobe is identified by the name of the byte which for that time interval is available on the eight data multiplexer output lines MDI. The four time intervals during which the four bytes of a signal packet are available are known respectively as $S_0$, $S_1$, $S_2$, and $S_3$. The thirty-eight time intervals during which the thirty-eight bytes of a data packet are available are known respectively as $D_0$, $D_1$, et cetera, through $D_{37}$. Each of these time intervals starts when the byte strobe occurs and ends just before the occurrence of the next byte strobe.

DATA RECEIVE BUFFER

FIG. 7C is a logic diagram of data receive buffer 450 shown in FIG. 7A. This unit assembles and stores the thirty-two bytes of data from a data packet in response to a pulse being applied on line RCV to flip-flop 468. This pulse occurs during time period $D_3$ and causes data receive buffer 450 to read thirty-two bytes of data from the eight input lines MDI and to store them in memory unit 466 during time periods $D_4$ through $D_{35}$. Memory unit 466 comprises a thirty-two-word-by-eight-bit memory.

Concurrently with the store operation, the signals on lines MDI are applied to checksum circuit 467 which accumulates the logical sum of the incoming data and compares it with the sixteen-bit sum received on input lines MDI during time periods $D_{36}$ and $D_{37}$. If the checksum is found to be in error, then the error signal output from circuit 467 will be a 1, otherwise it will be a 0.

Checksum circuit 467 utilizes the apparatus of checksum circuit 239 shown in FIG. 5E. The input to checksum circuit 239 comprises sixteen bits while the input to checksum circuit 467 comprises eight bits. Thus in order for checksum circuit 467 to compute a sixteen bit checksum, the sixteen EXCLUSIVE OR gates 242 and flip-flops 241 of checksum circuit 239 are divided into two groups of eight and the eight lines MDI are alternatively gated to each of these two groups through the use of the least significant bit from counter 469 on line 454. The manner in which checksum circuit 239 shown in FIG. 5E can be adapted to serve as checksum circuit 467 will be apparent to those of ordinary skill in the art from the above discussion.

Incoming data bytes $D_4$ through $D_{35}$ are stored in successive locations within memory unit 466 as determined by the output of counter 469. This counter is initialized by the five lines which are the most significant bits of the eight lines RBL at the same time that command pulse RCV is issued to flip-flop 468 by interface computer 62. Once the data has been assembled in receive buffer memory 466, an RCLEAR pulse is given to JK flip-flop 468 which causes the assembled data to be made available to digital device 18 on the eight data lines 455. Counter 469 is again initialized when the RCLEAR pulse is applied to flip-flop 468, and the value then used is the same as the value used to initialize the counter when the RCV pulse is issued.

Digital device 18 obtains data eight bits at a time over the eight data lines 455 in response to commands which it issues to falling edge trigger circuit 470 on line RD CMD. Falling edge trigger circuit 470, which is identical to circuit 210 shown in FIG. 5D, acknowledges the commands issued on line RD CMD on line RD STS. The digital device is allowed to read eight-bit data bytes from memory 466 until counter 469 generates an overflow signal on line RSUM at which time the receive cycle is repeated. Digital device 18 receives an end-of-message signal from AND gate 472 on line EOMR when the last byte of information is read from memory 466. That signal will be set if, when the preceding RCV pulse was applied to flip-flop 468, the input line REOM was set. At that time the flip-flop 471 is set and its output is gated to digital device 18 on line EOMR by AND gate 472 when counter 469 overflows. Flip-flops 473 and 474 are used to turn off the normal operation of data receive buffer 450 and to put it into testing mode. The operation in that mode will be described below.

When JK flip-flop 468 is in the set state data receive buffer 450 is outputting data to digital device 18 on eight lines 455 and when that flip-flop is in the reset state data receive buffer 450 is reading data from data multiplexer 58 on eight lines MDI.

While flip-flop 468 is in the reset state, counter 469 is incremented as each byte strobe occurs. The byte strobe is input to one-shot multivibrator 477 which delays it until the byte has been read into memory 466 and then applies it through inverter 475A to NOR gate 475. The output of NOR gate 475, which is applied to NOR gate 476, will rise when flip-flop 468 is in the reset state and the output of multivibrator 477 is high. When the flip-flop 468 is in the set state and digital device 18 issues a command to falling edge trigger circuit 470, the strobe output from that trigger circuit is also applied to NOR gate 476. The strobe output and the output of NOR gate 475 are ORed together in NOR gate 476 and applied to the count input of six-bit counter 469. The counter is assembled so that, when a pulse occurs on the count input, the counter is incremented by 1 and when a pulse occurs on the load input from NOR gate 462 through AND gate 462A, the five most significant bits of the data currently on input lines RBL are copied into the five least significant bits of counter 469 and the most significant bit of the counter is cleared. The overflow (OVR) output of counter 469 corresponds to the most significant bit of the six bits and the carry output of the counter occurs when the least significant five bits are all 1 and therefore a carry is about to occur from the fifth bit position. The address input for memory unit 466 comprises the least significant five bits of counter 469.

The outputs of memory 466 on eight lines 455 are the contents of the cell currently being addressed by counter 469. The contents of the cell addressed by counter 469 are set equal to the data on the eight lines MDI when a pulse is received on the write input, provided that the Memory Write is not inhibited. The inhibit incurs when counter 469 OVR is set. As already indicated, the output of NOR gate 475 provides a pulse when a byte strobe occurs during the time that flip-flop 468 is reset. This pulse is gated by NAND gate 478 and the output of gate 478 is used to drive the write input to memory 466. Gate 478 inhibits the write pulse if flip-flop 473 is set, which occurs in the testing mode as described below.

DATA TRANSMIT BUFFER

FIG. 7D is a logic diagram of data transmit buffer 451 shown in FIG. 7A. The primary function of this unit is to collect thirty-two words of data from digital device 18 on eight lines 456 and transmit them to data multiplexer 58 on eight lines SDO. This function is performed under the control of JK flip-flop 481.

Flip-flop 481 is set by a pulse on the SCLEAR line from interface computer 62 and is reset by a pulse appearing on the XMT line. When flip-flop 481 is in the set state, commands issued by digital device 18 on the WT CMD line to rising edge trigger circuit 482 cause data to be written into memory 480. When flip-flop 481 is in the reset state, the thirty-two words stored in memory 480 are transferred to data multiplexer 58 on lines SDO.

An address must be supplied to memory 480 for each word that is either written into or read out of the memory. These addresses are generated as follows.

A pulse on line XMT is supplied by interface computer 62 when it wishes to initiate transmission of data out of memory 480 to data multiplexer 58. Interface computer 62 supplies a pulse on line SCLEAR when the data currently in memory 480 has been transmitted and memory 480 can be filled with other data from digital device 18. The pulses appearing on either of lines XMT or SCLEAR are applied through NOR gate 494 to the reset input of six-bit counter 483. This serves to initialize counter 483 so that a zero address is applied to memory 480 when digital device 18 begins to write a new set of thirty-two words and when the thirty-two words currently contained in memory 480 are about to be transmitted to data multiplexer 58. When a pulse is applied to the count input of counter 483, its current value is incremented; and when the current value is equal to or greater than thirty-two, it generates a signal on its OVR output.

A pulse is applied to the count input of counter 483 in two different ways. If data is currently being collected from digital device 18, flip-flop 481 is in the set state and a strobe is generated by rising edge trigger circuit 482, one for each write command issued by digital device 18 on the WT CMD line. Thus NOR gate 486 generates an output to the count input of counter 483 each time rising edge trigger circuit 482 generates a strobe output. If flip-flop 481 is in the reset state, indicating that data is being transmitted to data multiplexer 58, then each signal generated on line BS by data multiplexer 58 will cause one-shot multivibrator 484 to generate an output signal which is applied to NOR gate 485 through inverter 485A. Thus each byte strobe will cause NOR gate 485 to generate an output which will pass through NOR gate 486 to the count input of counter 483. Hence it can be seen that when digital device 18 is writing into memory 480 the address at which writing occurs is governed by counter 483 which is incremented each time digital device 18 issues a write command. When information is being read out of memory 480 to data multiplexer 58, counter 483 is incremented each time data multiplexer 58 sends out a byte strobe. The least significant five bits of the output from counter 483 are made available to interface computer 62 by means of the eight lines SBL, and the same five bits are used as the address input to memory 480. It should be noted that the least significant five bits of the output of counter 483 appear as the most significant five bits of eight lines SBL.

In addition to supplying the proper address on the address input of memory 480, it is necessary when writing into the memory to provide a strobe signal on the write input. The necessary signal it provided by the strobe output of rising edge trigger circuit 482 which passes through NOR gate 487 unless NOR gate 488 is generating an output. Gate 488 will generate an output and thus inhibit write signals from gate 487 when data transmit buffer 451 is in the test state. This will occur when flip-flop 489 is in its set state.

A signal on the write input of memory 480 will have no effect if a signal is present on the inhibit input of memory 480. This inhibit occurs when counter 483 generates an overflow signal. When digital device 18 has issued thirty-two consecutive write commands, the overflow output OVR of counter 483 will be set and thus inhibit memory 480 from being written into again. The overflow output signal from counter 483 is also applied to the inhibit input of rising edge trigger circuit 482 which prevents an acknowledgement signal from being sent to the digital device 18 on the WT STS line.

Interface computer 62 monitors counter 483 by means of line SSUM, in the manner to be described hereinbelow, and causes the assembled data in memory 480 to be transmitted to data multiplexer 58 when the memory is full. Alternatively, digital device 18 can cause transmission of less than thirty-two words of data by providing a signal on line SEOM. When a write command is issued on line WT CMD to rising edge trigger circuit 482 by digital device 18, the resulting strobe output serves to clock D-type flip-flop 490 which then samples the line SEOM from digital device 18. If a signal is present on this line, the output from flip-flop 490 will inhibit rising edge trigger circuit 482 and also be available on line EOMS to interface computer 62, thus allowing interface computer 62 to begin the transmission of the data in memory 480 to data multiplexer 58.

Considering then the manner in which data from memory 480 is transferred to data multiplexer 58, this process is seen from FIG. 7D to be initiated by a pulse on the XMT line from interface computer 62 to flip-flop 481. If this signal is issued during time period $D_3$, data bytes will be transmitted to data multiplexer 58 in the subsequent time periods $D_4$ through $D_{35}$. At the same time a sixteen-bit checksum will be computed by checksum circuit 491 and this sum will be transmitted over lines 457 during time periods $D_{36}$ and $D_{37}$. Checksum circuit 491 is the same as checksum circuit 467 shown in FIG. 7C. This result is accomplished using select circuit 492 which is the same circuit as circuit 179 shown in FIG. 5B. The clock input to checksum circuit 491 is pulsed once for every incoming byte strobe by the output of multivibrator 484. The output of checksum circuit 491, which appears on line 495, is set to 0 whenever an XMT pulse is applied to flip-flop 481. During time periods $D_3$ through $D_{35}$, the OVR output of counter 483 is reset and select circuit 492 will transfer the output from memory 480 on to the output lines SDO. In time periods $D_{36}$ and $D_{37}$ the OVR output of counter 483 is set and select circuit 492 will transfer the output of checksum circuit 491 on to the data output lines SDO.

It is advantageous for control computer 30 to be able to test the operation of data receive buffer 450 shown in FIG. 7C and a data transmit buffer 451 shown in FIG. 7D. This is accomplished by the provision of special circuitry which assembles an incoming data packet from data multiplexer 58 in data receive buffer 450, transfers the assembled data to data transmit buffer 451, and subsequently transfers it back to data multiplexer 58. This entire operation takes place without requiring any interaction with digital device 18.

Referring then to FIG. 7C, it is understood that the application of a pulse on the RCV line to flip-flop 468 causes an incoming data packet to be stored in memory 466 in the manner described above. When thirty-two bytes of data have thus been stored, a pulse on line RTEST will set flip-flop 473 and thereby cause NAND gate 478 to inhibit further write pulses to memory unit 466. The data will remain in memory 466 until such time as it can be transferred to memory 480 in data transmit buffer 451 shown in FIG. 7D.

The transfer of the data from memory 466 to memory 480 is effected by the simultaneous application of pulses on line XMT to flip-flop 481 and on line STEST to flip-flop 489 of data transmit buffer 451, shown in FIG. 7D. The effect of the STEST pulse is to set flip-flop 489 and through inverter 489A and AND gate 462A load counter 469 in data receive buffer 450. When flip-flop 489 is set incoming byte strobes from multivibrator 484 are steered into the write input of memory 480 by means of NOR gates 488 and 487 and inverter 485A. Since an XMT pulse is issued simultaneously with the STEST pulse, counter 483 is reset and as each of the next thirty-two byte strobes occur, the write input to memory 480 is strobed and counter 483 incremented. While flip-flop 489 is set, data select circuit 493 will steer data on line RDO from the output of memory unit 466 in data receive buffer 450 into memory 480. When thirty-two bytes of data have been transferred from memory 466 to memory 480 test mode flip-flops 473 and 489 will be returned to their normal reset state. Flip-flop 489 is reset by the OVR output of counter 483 when it overflows. Flip-flop 473 is reset by the next pulse on line RCV.

CHANNEL SELECT CIRCUIT

Channel select circuit 452 shown in FIG. 7A is shown in more detail in FIG. 7E. This circuit allows digital device 18 to transfer an eight-bit channel number on eight lines 458 through to interface computer 62 on eight lines SBC. The circuit operates as follows.

The channel number on line 458 is stored in eight-bit register 500. The eight outputs from register 500 are clocked onto lines SBC by the strobe output of rising edge trigger circuit 501. The strobe output is generated when the digital device 18 sends a select command on line SL CMD to rising edge trigger circuit 501. Thus the eight-bit channel number on lines 458 is stored in register 500 when the select command is generated. Since the strobe output of rising edge trigger circuit 501 is applied to the J input of JK flip-flop 502, and since the Q output of JK flip-flop 502 is connected to the inhibit input of rising edge trigger circuit 501, trigger 501 is inhibited immediately following the SL CMD signal.

The Q output of flip-flop 502 is made available on line SELEC to interface computer 62. When interface computer 62 detects that flip-flop 502 is set, it reads the eight-bit channel number from register 500 on lines SBC and generates a signal on line SLCT to the K input of flip-flop 502. This resets flip-flop 502, thereby removing the inhibit from rising edge trigger circuit 501. This allows trigger circuit 501 to return an acknowledgement over line SL STS to digital device 18 which is then free to issue another select command on line SL CMD.

There is a logical interlock between the channel select circuit 452, the data receive buffer 450, and data transmit buffer 451 which insures that no data is transmitted or received while the channel number is being changed by interface computer 62. This operates as follows.

When a channel select command has been issued and flip-flop 502 set, operation of data receive buffer 450 and data transmit buffer 451 by digital device 18 is disabled. This is brought about by feeding the Q output of flip-flop 502 into the inhibit inputs of trigger circuits 470 and 482 on the line labeled "SELECTED." Digital device 18 is also prevented from issuing the SL CMD signal to channel select circuit 452 when memory 466 in data receive buffer 450 has been partially emptied. This effect is obtained by means of JK flip-flop 474 in data receive buffer 450. That flip-flop is reset whenever an RCLEAR or RCV pulse is issued to flip-flop 468 or when the OVR output of counter 469 is set. Flip-flop 474 is set whenever digital device 18 issues an RD CMD signal to falling edge trigger circuit 470 which in turn issues a strobe to the J input of JK flip-flop 474. By connecting the Q output of flip-flop 474 to the inhibit input of rising edge trigger circuit 501 in channel select unit 452 on the line labeled "BLOCK," select commands issued by digital device 18 to rising edge trigger circuit 501 are disabled.

CHANNEL BREAK CIRCUIT

The channel break circuit 453 shown in FIG. 7A appears in greater detail in FIG. 7F. This unit transfers an eight-bit channel number over lines RCH from interface computer 62 to digital device 18.

Interface computer 62 issues a channel break command (BREAK) in order to provide digital device 18 with an eight-bit channel number when information transmission is to begin on a different channel than the one currently in use. This is accomplished by setting D-type flip-flop 510 by means of a pulse on the BREAK input line. The $\overline{Q}$ output of flip-flop 510 is connected to the inhibit input of falling edge trigger circuit 511 so that when flip-flop 510 is set the trigger circuit is enabled allowing digital device 18 to issue a command on line BK CMD to falling edge trigger circuit 11. An indication that such a command can be issued is provided by status line BK STS which is set when falling edge trigger circuit 511 is enabled and is reset after a command has been issued. The strobe output of falling edge trigger circuit 511 is connected to the clear input of flip-flop 510 so that when a command has been issued that flip-flop is reset and falling edge trigger circuit 511 is inhibited. Interface computer 62 detects that digital device 18 has issued a command on line BK CMD by examining line BK EKO which is connected to the Q output of flip-flop 510.

INTERFACE COMPUTER

Interface computer 62, which is shown in FIG. 2B to be part of terminal interface unit 17, is shown in block diagram form in FIG. 9A. Interface computer 62 is a small digital computer which has a single eight-bit accumulator 602, sixteen eight-bit words of working storage 604, and 256 sixteen-bit words of read-only program store 600. This computer supervises and controls transmission activity by means of control lines that connect at the various parts of the transmission equipment as has been shown in the preceding FIGS. These control lines are organized so that they appear to interface computer 62 to be seven storage words, each containing eight bits. These control lines are known collectively as the "peripheral store" and are shown as peripheral store 611 in FIG. 9A.

The instruction repertoire for interface computer 62 is given below in Table I. As shown in FIG. 8, each instruction word of interface computer 62 contains sixteen bits which are organized into an operation code field of two bits, a T field of one bit, an R field of five bits, and an X field of eight bits.

TABLE I

Instruction Repertoire for the Terminal Interface Computer

CONTROL INSTRUCTIONS

| Mnemonic Form | Operation Code Field | T Field | R Field | Instruction Definition |
|---|---|---|---|---|
| GOTOa | 00 | 0 | 00000 | Unconditional jump to the program store location specified by a |
| BTa | 01 | 0 | 00000 | Jump to the program store location specified by a if a = 0 |
| BFa | 10 | 0 | 00000 | Jump to the program store location specified by a if a ≠ 0 |
| WAIT | 11 | 0 | 00000 | Wait for Byte strobe |
| GOTOx | 00 | 1 | 00000 | Unconditional jump to the program store location specified by x |
| BTx | 01 | 1 | 00000 | Jump to the program store location specified by x if a = 0 |
| BFx | 10 | 1 | 00000 | Jump to the program store location specified by x if a ≠ 0 |
| WAIT | 11 | 1 | 00000 | Wait for Byte strobe |

ARITHMETIC AND LOGICAL INSTRUCTIONS

| | Operation Code Field | T Field | Instruction Definition |
|---|---|---|---|
| A=a!r | 00 | 0 | Form the logical EXCLUSIVE OR of a and the contents of the specified by r and store the result in A |
| A=a | 01 | 0 | Form the logical AND of a and the contents of the specified by r and store the result in A |
| A=a+r | 10 | 0 | Add a to the contents of the location specified by r and store the result in A |
| A=a→r | 11 | 0 | Store a in the location specified by r and also in A |
| A=x!r | 00 | 1 | Form the logical EXCLUSIVE OR of x and the contents of the location specified by r and store the result in A |
| A=x & r | 01 | 1 | Form the logical AND of x and the contents of the location specified by r and store the result in A |
| A=x+r | 10 | 1 | Add x to the contents of the location specified by r and store the result in A |
| A=x→r | 11 | 1 | Store x in the location specified by r and in A |

Referring to Table I, the instruction repertoire is seen to comprise control instructions and arithmetic and logical instructions. Control instructions are characterized in that the R field is 0. If the T field is a 0 then, as shown in Table I, the accumulator, A, contains the operand for the instruction. If the T field is a 1 then the operand for the instruction is the contents of the X field. Note that in Table I the various instruction word fields are denoted by upper case letters while the contents of the fields are denoted by lower case letters.

The arithmetic and logical instructions are seen in Table I to include addition, the logical AND, and the logical EXCLUSIVE OR functions. In the arithmetic and logical instructions, as in the control instructions, a 1 value in the T field indicates that one of the operands, x, is contained in the X field while a 0 1 in the T field indicates that one of the operands is contained in the accumulator, A. The other operand in each case is found at the location specified by r, the contents of the R field.

The locations which can be specified by the R field are shown in Table II to include the sixteen working storage locations denoted by $W_i$, where $0 \leqq i \leqq 15$, the seven peripheral store locations $V_k$, where $0 \leqq k \leqq 6$, and the accumulator.

TABLE II

| R Field Formats | |
|---|---|
| R Field (Binary Value) | Location Specified |
| 10000 + i | Working storage location $W_i$, where $0 \leqq i \leqq 15$. |
| 01000 + k | Peripheral interface word $V_k$, where $0 \leqq k \leqq 6$. |
| 01111 | Accumulator. |
| 00000 | No location, this specifies that the instruction is a control instruction. |

Referring again to FIG. 9A, it can be seen that program store 600, outputs sixteen bit instruction words to instruction register 601. The output from instruction register 601 and the output from accumulator 602 are gated by means of selection circuit 608 onto eight lines 609. From lines 609 the information may be transferred into program counter 605, which controls the addressing of program store 600, into eight-bit function generator 603, into peripheral store 611, or into working store 604. Gating into the peripheral store is controlled by write select circuit 607.

Function generator 603 provides the means for performing the functions of addition, logical AND, EXCLUSIVE OR, and an additional function in which, upon command, the data on lines 609 are merely transferred to the function generator 603 output which comprises accumulator 602. Function generator 603 also supplies a special status signal whenever its output is 0. This status signal is gated into flip-flop 606. Function generator 603 obtains one of its inputs from the eight lines 609 and the other is obtained from eight lines 610. Data on lines 609 is obtained either from instruction register 601 or from accumulator 602 depending upon the operation of select circuit 608. The data on lines 610 may be from working store 604 or from either accumulator 602 or peripheral store 611 as determined by gating circuit 619. The function of the interface computer may best be appreciated by a consideration of the manner in which the instructions in Table I above are executed.

Each cycle of interface computer 62 may be conveniently divied into four sections which are shown as $t_1$, $t_2$, $t_3$, and $t_4$ in the timing diagram of FIG. 9B. During time interval $t_1$, a sixteen-bit instruction is read out of program store 600 into instruction register 601. The outputs from the most significant eight bits of the instruction register then determine the behavior of the machine during the remaining three time periods in the machine's cycle. This behavior is different for each of the eight different instructions described in Table I. For all instruction types, the machine increments the program counter 605 at time $t_2$. The output of this counter, at the subsequent time $t_1$ selects the instruction to be used for the following machine cycle.

First consider the eight control instructions. The instructions are seen to comprise two groups, the first having a T-field of 0, as indicated in Table I, and the second having a T-field equal to 1. The value of T determines the behavior of selection circuit 608. If T equals 0, selection circuit 608 allows the output of accumulator 602 to pass onto bus 609. If the T-field is a 1, selection circuit 608 allows the least significant eight bits of the current instruction contained in the I register 601 to pass onto bus 609.

The operation code field in the instruction determines what use is made of the value that is gated onto bus 609. In a "GOTO" instruction the contents of bus 609 are loaded unconditionally into the program counter 605 during the time period starting at $t_2$. This action overrides the previously mentioned operation of adding 1 to the program counter. The result of this action is, of course, that the next instruction is taken from the address specified by the value on bus 609.

The instruction whose operation code field has the value 01 is a jump instruction that is conditional on the value in accumulator 602. The effect of that instruction is to transfer the contents of bus 609 into the program counter 605 if the accumulator contains 0. The instruction with operation code 10 has the effect of transferring the contents of bus 609 into the program counter 605 if the contents of the accumulator 602 is non-zero. It is possible to determine whether the contents of the accumulator is 0 by examining flip-flop 606. If the set output of flip-flop 606 is 0, then the contents of accumulator 602 are zero.

In either of the two conditional jump instructions, if the jump is actually to take place and information is to be transferred from bus 609 into program counter 605, this operation takes place starting in the time period beginning at $t_2$ and overrides the previously mentioned act of incrementing the program counter.

The remaining control instruction has operation code 11 and is a WAIT instruction which stops the operation of the interface computer. The interface computer will resume operation when it receives a byte stobe signal from the data multiplexer 58.

The eight arithmetic and logical instruction listed in Table I can also be grouped into two sets of four instructions. In one set the T-field is a 1, in the other it is a 0. As with the previously described control instructions, the T-field governs the action of selection circuit 608.

The operation code of the instruction in register 601 determines what value is to be computed in the function generator and subsequently stored in the accumulator 602. The computed value is stored in the accumulator at time $t_1$, that is, at the beginning of the next instruction cycle. At the same time, flip-flop 606 is set either to 0 or to 1 as the result put into the accumulator is 0 or non-zero. For operation code 11 the value stored in the accumulator is equal to the value on bus 609. For operation code 10 the value stored in the accumulator is equal to the sum of the value on bus 609 and the value on the bus 610. For operation code 01 the value stored in the accumulator is the logical AND of the value on bus 609 and the value on bus 610. For operation code 00 the value stored in the accumulator is the EXCLUSIVE OR of the value on bus 609 and the value on bus 610.

Operation code 11 has the additional effect of storing the value from bus 609 into one eight-bit register, either in the working store 604 or in the peripheral store 611. The particular register concerned is determined by the R field of the instruction currently in the instruction register 601. That field also determines the contents of bus 610 which is equal to the contents of one of the words either from the working store 604 or the peripheral interface 605, or possibly from the accumulator 602. If a store instruction takes place, that is, if the operation code is 11, then it takes place at time $t_3$.

Interface computer 62 shown in block diagram form in FIG. 9A is shown in greater detail in FIGS. 9C through 9G. Referring then to FIG. 9C, program store 600 shown therein comprises a 256-word-by-sixteen-bit read-only memory unit. This memory may be formed, for example, from four integrated circuits of type SN74187 manufactured by Texas Instruments, Inc.

The output of program store 600 comprises sixteen-bit words which are clocked into instruction register 601 when clock signal C1 is applied to instruction register 601. The outputs of instruction register 601, which have been labeled in FIG. 9C in accordance with the instruction word format shown in FIG. 8, are applied to the remainder of the interface computer circuitry as shown to provide the requisite control signals.

The clock signals used by the interface computer are supplied by the clock circuit shown in FIG. 9G. Astable multivibrator 650 shown in FIG. 9G supplies a train of pulses to the clock input of D-type flip-flop 651. Flip-flop 651 transfers these pulses on to flip-flop 652 if the D input to flip-flop 651 is not inhibited by NOR gate 666. The Q output of flip-flop 652 is applied to AND gate 653, the output of which comprises the C1 clock signal used in FIGS. 9C, 9D and 9E. The $\overline{Q}$ output of flip-flop 652 forms the C2 clock signal and is also applied to AND gate 654, the output of which is the C4 clock signal. The clock signals thus supplied by the output of flip-flop 652 are phased as shown in FIG. 9B.

NOR gate 666 and flip-flops 655 provide the means for stopping the generation of clock signals when a WAIT signal occurs. This signal is supplied by AND gate 669 shown in FIG. 9C. The inputs to AND gate 669 are supplied by AND gate 668 and NOR gate 612. As can be seen from FIG. 9C, AND gate 668 generates an output when both bits in the operation code field of the word currently in instruction register 601 are 1. NOR gate 612 generates an output when the first two bits in the R field of the word currently in instruction register 601 are 0. Referring back to Table 1, it thus can be seen that the WAIT signal is generated whenever a WAIT instruction is present in instruction register 601.

Returning then to FIG. 9G, it is seen that when the WAIT signal is applied to flip-flop 655 it causes the Q output to rise at the next C4 pulse. This inhibits NOR gate 666 which causes the $\overline{Q}$ output of flip-flop 651 to remain a 1, thereby enabling AND gates 653 and 654. Since the Q output of flip-flop 651 remains a 0, no further pulses are supplied to the clock input of flip-flop 652, causing this flip-flop to remain in the state where its Q output is a 1 and its $\overline{Q}$ output is a 0. The clock circuit thus halts with the C1 output a 1 and the C2 and C4 outputs a 0. The point of the clock signal waveforms at which the clock circuit halts is graphically shown in FIG. 9B by the line labelled "HALT." The clock circuit resumes normal operation when flip-flop 655 is reset by the byte strobe from data multiplexer 58 on line BS. Since a 0 is required to reset a D-type flip-flop, the byte strobesignal must be inverted by inverter 667.

Returning then to FIG. 9D, it is seen that the outputs of instruction register 601 corresponding to the X field of an instruction word are applied to select circuit 608 which operates in the same manner as select circuit 179 shown in FIG. 5B. The select input to select circuit 608 is the one-bit T field output from instruction register 601 which servs to gate onto eight lines 609 the X field from instruction register 601 if T=1, and the contents of eight-bit accumulator 602 if T=0.

The clocking of accumulator 602 shown in FIG. 9E is performed by the CA signal from AND gate 645 which is generated by each C1 clock signal unless inhibited by the $\overline{Q}$ output of flip-flop 613 being a 0. The $\overline{Q}$ output of flip-flop 613 is a 0 only when the value gated into its D input by the C4 pulse is a 1. This only occurs during a control instruction at which time both inputs to NOR gate 612 are 0 thereby causing its output to be a 1.

The input to eight-bit accumulator 602 is supplied by eight-bit function generator 603 which computes the aforementioned four functions from the two eight-bit operands on lines 609 and 610. Function generator 603 can be made from two four-bit function circuits of type 74181 manufactured by Texas Instruments, Inc. The two-bit operation code available from instruction register 601 must be suitably gated to provide the proper signals to the $S_0$, $S_1$, $S_2$, $S_3$ and M inputs of the type 74181 function circuits. The gating that is required is shown in Table III.

TABLE III

| $0_1$ | $0_2$ | $S_0$ | $S_1$ | $S_2$ | $S_3$ | M |
|---|---|---|---|---|---|---|
| 0 | o | 1 | 0 | 0 | 1 | 1 |
| 0 | 1 | 0 | 1 | 1 | 1 | 1 |
| 1 | 0 | 1 | 0 | 0 | 1 | 0 |
| 1 | 1 | 1 | 1 | 1 | 1 | 0 |

This gating is accomplished by the voltage -V, NAND gate 614, and inverter 615 as shown in FIG. 9E.

If the four bit result from each of the two function circuits is zero, then their "C" outputs are each 1. These outputs are combined by NAND gate 616 to yield a signal that is 0 if the result stored in accumulator 602 is non-zero and are applied to zero detector 606 shown in FIG. 9C which is seen to comprise a D-type flip-flop that is clocked by the CA signal from AND gate 645.

The outputs of flip-flop 606 and NOR gate 612 are combined by AND-NOR gate 617 with the two operation code bits as inverted by inverters 670 and 671 to determine whether a control instruction is currently resident in instruction register 601. The AND-NOR gate 617 may be obtained, for example, as part number 74H55 manufactured by Texas Instruments, Inc. The output of AND-NOR gate 617 is a 0 if a control transfer is present and it causes eight-bit program counter 605 to be loaded by the data currently on bus 609. The count input of program counter 605 is provided by the C2 pulse and its output drives the address leads of program store 600.

The other storage unit used by interface computer 62 is working store 604 shown in FIG. 9E. This storage unit contains sixteen eight-bit storage locations. These locations have been previously referred to in Table II as locations $W_i$, where $0 \leqq i \leqq 15$. The $W_i$ are used to store the information required by that part of the communication process that is executed by the interface computer. In the detailed explanation of this process which is to follow hereinafter, the $W_i$ are, for convenience referred to by mnemonic designations. These are given in Table IV below along with an explanation of the contents of each location.

TABLE IV

| Working Store Location | Mnemonic | Explanation |
|---|---|---|
| W0 | SOUT | Status of the signal output routine |
| W1 | DOUT | Status of the data output routine |
| W2 | DIN | Status of the data input routine |
| W3 | DERR | List of errors detected by the data input routine |
| W4 | SSEQ | Sequence number of the last packet transmitted by the data output routine |
| W5 | LIMIT | Sequence number of the last packet that the data output routine is allowed to transmit |
| W6 | RSEQ | Sequence number of the packet which the data input routine next expects to receive |
| W7 | SELCH | Channel number that is currently selected for data output from the digital device |
| W8 | FOUT | The information which is to be inserted in byte $S_1$ of the next signal packet to be transmitted by the signal output routine |
| W9 | NOUT | The information which is to be inserted in byte $S_2$ of the next signal packet to be transmitted by the signal output routine |
| W10 | FIN | The information that was in byte $S_1$ of the last signal packet that was received by the signal input routine |
| W11 | NIN | The information that was in byte $S_2$ of the last signal packet that was received by the signal input routine |
| W12 | COUT | The information which is to be inserted in byte $D_1$ of the next data packet to be transmitted by the data output routine |
| W13 | LOUT | The information which is to be inserted in byte $D_2$ of the next data packet to be transmitted by the data output routine |
| W14 | CIN | The information that was in byte $D_1$ of the last data packet that was received by the data input routine |
| W15 | LIN | The information that was in byte $D_2$ of the last data packet that was received by the data input routine |

Working store 604 may be constructed from a pair of sixteen-word-by-four-bit integrated circuit memories such as bipolar LSI memory 3101 manufactured by Intel, Inc. The four-bit address required to access working store 604 is obtained from the least significant four bits, $R_1$, $R_2$, $R_3$ and $R_4$, of the R field of the instruction currently in instruction register 601. Working store 604 is selected if the most significant bit, $R_0$, of the R field is 1. Input in working store 604 occurs during time $t_2$ shown in FIG. 9B from eight lines 609 when a signal is supplied by AND gate 618 to the write input of the store. Output from working store 604 is available on eight lines 610 when a 1 is present on the select input of the store.

The major remaining portion of the interface computer is peripheral store 611 shown in FIG. 9D. As previously mentioned, peripheral store 611 actually comprises a plurality of sets of input and output lines which are treated by interface computer 62 like a series of memory locations. These input and output lines provide the means for the flow of commands and data between interface computer 62 and the rest of the terminal interface unit 17. Table V below provides a list of these input and output lines and an explanation of their functions.

TABLE V

| Peri-pheral Store Location | Line Name in FIGS. 9C, 9D, and 9E | Function Performed |
|---|---|---|
| | | Pheripheral Store Output Lines |
| $V_6$ | MDO | These eight lines transfer a byte of control information to shift register 251 of data multiplexer 58 shown in FIG. 6A |
| $V_5$ | RCH | These eight lines transfer to digital device 18 the channel number on which data is currently available |
| $V_4$ | RBL | These five lines transfer to counter 469 shown in FIG. 7C the length of the data in the data packet currently being input to data receive buffer 450. These five lines correspond to the five most significant bits of eight-bit register 630 |
| $V_2$ | CMDB | This comprises the seven lines: |
| | XMT | This line transmits the pulse that causes data transmit buffer 451 shown in FIG. 7D to transfer data to data multiplexer 58. |
| | SCLEAR | This line transmits the pulse that causes data transmit buffer 451 shown in FIG. 7D to allow the digital device 18 to write into data transmit buffer memory 480 |
| | RCV | This line transmits the pulse that causes data receive buffer 450 shown in FIG. 7C to receive data from data multiplexer 58 |
| | RCLEAR | This line transmits the pulse that causes data receive buffer 450 shown in FIG. 7C to allow the digital device to read from data receive buffer memory 466 |
| | BREAK | This line transmits the pulse that causes the channel break circuit 453 shown in FIG. 7F to send the BK STS signal to digital device 18 thereby informing it that there is a channel number waiting |
| | REOM | This line transmits the pulse that causes data receiver buffer 450 shown in FIG. 7C to send an end of message, EOMR, signal to digital device 18 |
| | SLCT | This line transmits the pulse that causes channel select circuit 452 shown in FIG. 7E to read a channel number from digital device 18 |
| $V_0$ | CMDA | This comprises the five lines: |
| | RTEST | This line transmits the pulse that puts data receive buffer 450 shown in FIG. 7C into the test mode |

TABLE V-continued

| Peri-pheral Store Location | Line Name in FIGS. 9C, 9D, and 9E | Function Performed |
|---|---|---|
| | STEST | This line transmits the pulse that puts data transmit buffer 451 shown in FIG. 7D into the test mode |
| | SENDS | This line transmits a pulse that informs data multiplexer 58 that the terminal interface unit 17 wants to send a signal packet |
| | SENDD | This line transmits a pulse that informs data multiplexer 58 that the terminal interface unit 17 wants to send a data packet |
| | ALIVE | This line transmits a pulse to AND gate 73 shown in FIG. 2B that enables power monitor 76 to keep protection relay 54 closed |
| | | Peripheral Store Input Lines |
| $V_6$ | MDI | The eight lines transfer a byte of information from data multiplexer 58 to receive buffer memory 466 of data receive buffer 450 shown in FIG. 7C and also to the interface computer 62 shown in FIG. 9D |
| $V_4$ | SBC | These eight lines transfer the channel number selected by digital device 18 from register 500 of channel select circuit 452 shown in FIG. 7E |
| $V_3$ | SBL | These five lines are the most significant of the eight lines 623 shown in FIG. 9D. They transfer from counter 483 shown in FIG. 7D the length of the data in the data packet currently stored in the data transmit buffer 451. These five lines correspond to the five least significant bits of six-bit counter 483 |
| $V_2$ | STSB | This comprises five lines: |
| | SSUM | This line transmits a pulse from counter 483 of data transmit buffer 451 shown in FIG. 7D when the counter overflows |
| | RSUM | This line transmits a pulse from counter 469 of data receive buffer 450 shown in FIG. 7C when the counter overflows |
| | SELEC | This line transmits a pulse from channel select circuit 452 shown in FIG. 7E that indicates that the digital device 18 has provided another channel number |
| | BKEKO | This line transmits a pulse from channel break circuit 453 shown in FIG. 7F. The pulse ends when the digital device 18 has acknowledged the channel number previously sent by the interface computer 62 |
| | EOMS | This line transmits a pulse from data transmit buffer 451 shown in FIG. 7D that indicates that digital device 18 has sent an end-of-message signal to data transmit buffer 451 |
| $V_1$ | TID | These eight lines transfer the terminals identification number from patch block 381 of data multiplexer 58 shown in FIG. 6B |
| $V_0$ | STSA | This comprises seven lines: |
| | BPER | This line transmits a pulse from data multiplexer 58 shown in FIG. 6E when a bipolar error is detected in the packet just received by the data multiplexer |
| | ERROR | This line transmits a pulse from data receive buffer 450 shown in FIG. 7C when an error is detected in a data packet |
| | $D_{36}$ | This line transmits a pulse from data multiplexer 58 when it transmits the 36th byte of a data packet |
| | FRAMEOUT | This line transmits a pulse from data multiplexer 58 when it detects a T1 framing error |
| | SEND | This line transmits a pulse from data multiplexer 58 when it is transmitting a new packet |
| | READ | This line transmits a pulse from data multiplexer 58 when it is reading a signal or data packet having the terminals' identification number |
| | PKT | This line transmits a timing signal pulse from data multiplexer 58 |

Considering first the input lines 620 through 626 of peripheral store 611 (FIG. 9D). These and lines 627 from a register 602 are seen to be gated onto eight lines 610 by gating circuit 619 shown in FIG. 9D. Gating circuit 619 comprises eight gates 619A–619H. Each of these eight gates has eight input bit positions. Each of the eight incoming cables 620 through 627 comprises eight wires. One wire from each of these eight cables is connected to a particular input bit position on each of eight gates 619A–619H. Gates 619A–619H each output that input bit position selected by the three-bit address $R_2$, $R_3$, $R_4$. Since the same three-bit address is always supplied to each of eight gates 619A–619H, each of the eight gates always outputs the same input bit position. Thus, each three-bit address supplied to gating circuit 619 results in the gating of each of the eight wires of one of cables 620 through 627 onto the eight output lines 610. Gates 619A–619H supply an output whenever the $R_0$ bit connected to their inhibit inputs is a zero. These gates may each comprise integrated circuits of the type 8231 manufactured by Signetics, Inc.

Considering next the output lines 640 through 644 of peripheral store 611, these are seen to be supplied from the eight-bit registers 628 through 632 shown in FIG. 9D. These registers are set by the signals on eight lines 609 under the control of write select circuit 607. Write select circuit 607, which may comprise part number 74874 manufactured by Texas Instruments, selects which of five registers 628 through 632 is to receive an input from lines 609 at any given time. This selection is made in accordance with the three least significant bits of the R field if it is not inhibited by a signal from NAND gate 634 (FIG. 9C). NAND gate 634 uses the $O_0$, $O_1$, $R_1$ and $R_0$ as inverted by inverter 634A to generate an inhibit at all times except when a transfer is to be made to peripheral store 611. Registers 628 through 630 each comprise eight D-type flip-flops. The clock inputs for each of these registers are provided by NOR gates 635 through 637, respectively, each of which serves to combine the C4 clock signal and the appropriate output from write select circuit 607. Registers 631 and 632 also each comprise eight D-type flip-flops, 631A–631H and 632A–632H, respectively. The eight reset inputs to each flip-flop in each of these two registers is the inverted byte strobe signal on line BS as inverted by inverter 674. The eight flip-flops 631A–631H of register 631 each take their preset input from one of the eight NAND gates 638A through 638H which make up gate 638. Each of NAND gates 638A–638H has three inputs: the C4 signal, one of eight lines 609, and the output of inverter 672. Similarly, the eight flip-flops 632A–632H of register 632 each take their preset input from one of the eight NAND gates 639A through 639H which make up gate 639. Each of NAND gates 639A–639H has three inputs: the C4 signal, one of eight lines 609, and the output of inverter 673.

THE COMMUNICATION PROCESS

The apparatus described above provides the transmission paths by which the digital data transmission system of this invention actually transmits and receives data. As briefly discussed in conjunction with FIG. 1B, this apparatus is controlled by stored programs in interface computer 62 and control computer 30. The method by which this control is achieved will now be discussed in greater detail.

FIG. 10A is a functional diagram of the data and signals that are transmitted on a full-duplex basis between a switching unit 10 and a digital device 18 through a terminal interface unit 17.

As shown in FIG. 10A a digital device 18 issues a channel select command to its associated terminal interface unit (TIU) 17 each time it wishes to begin a new transmission of data. TIU 17 then sends an SEL signal to the switching unit 10 which replies with an ACK signal. Data transmission then proceeds. As bytes of data are sent from digital device 18 to TIU 17, they are accumulated into data packets and then sent to switching unit 10, which periodically acknowledges them with an ACK signal.

In the other direction, switching unit 10 sends an SEL signal to the TIU 17 when it has accumulated a quantity of data for the digital device 18. TIU 17 then sets the channel break status line thereby informing digital device 18 that there is data ready for it. When digital device 18 has selected the appropriate channel, switching unit 10 delivers the data packets to TIU 17 which transfers the data in bytes to digital device 18 and periodically sends an ACK signal to switching unit 10 in acknowledgment.

FIG. 10B is a functional diagram of the data and signals that are transmitted on a full-duplex basis between two switching units 10. This transmission is exactly the same on both halves of the full-duplex path.

As shown in FIG. 10B, when data is about to be transmitted from switching unit 10a, that unit sends an STRT signal to switching unit 10b, which acknowledges it with an ACK signal. Data transmission then proceeds. As data becomes available in switching unit 10a it is sent in packets to switching unit 10b, which periodically acknowledges this by sending an ACK signal. Certain errors may be detected by switching unit 10b in which case NACK signals are sent to switching unit 10a. Finally, when switching unit 10a ceases to transmit data it sends an IDL signal to switching unit 10b.

The data and signal transfers shown functionally in FIGS. 10A and 10B can best be appreciated through an understanding of the data formats shown in FIGS. 11A, 11B and 11C.

FIG. 11A shows a signal packet and a data packet. As shown, a signal packet comprises four eight-bit bytes.

Considering first the signal packet, it is seen that its first byte, byte 1100, contains an identification number (ID). Since the most significant bit of ID is used to specify the direction of data transfer, the ID provides the capability of multiplexing up to 128 TIU's on each of the transmission loops 14 shown in FIG. 1A. In this case the ID serves to uniquely identify each TIU. Since the same data format is used on transmission lines 12 that serve to interconnect pairs of switching units 10, each such transmission line 12 is effectively multiplexed into 128 full-duplex transmission paths. These are termed "trunks" and comprise a system resource which is allocated and assigned in the manner to be explained hereinbelow. Of course, an ID of different size, thereby allow the capability of multiplexing a different number of TIU's and trunks, may be used without departing from the spirit and scope of the invention.

Byte 1101, shown in greater detail in FIG. 11B, comprises a six-bit sequence number 1112 and a two-bit F field 1113. Sequence numbers are consecutively applied to both SEL signal packets and data packets during transmission on loop 14 and are consecutively applied to date packets during transmission on line 12. The significance of the SEQ field 1112 as well as the CH byte 1102 depends upon the value of the F field 1113.

The F field 1113, if zero, indicates that the packet is an acknowledge (ACK) packet. The SEQ field 1112 is used to acknowledge the receipt of data of SEL signals and contains the sequence number applied to the last data packet or SEL signal correctly received. The significant of the CH field 1102 in an acknowledge packet depends upon the circumstances in which the packet is being used. When the ACK signal is issued by a switching unit to either a TIU or other switching unit, the CH field 1102 serves to authorize further transmissions. In that case, the CH field 1102 contains the last sequence number that can be used for subsequent transmission. When the ACK signal is issued by a TIU the CH field 1102 contains zero if no transmission errors have been detected, and contains the appropriate error codes as listed below in Table VI if errors have been detected.

TABLE VI

| Value | Error |
|---|---|
| 1 | Framing trouble |
| 2 | Control checksum error |
| 4 | Wrong channel |
| 8 | Wrong sequence number |
| 16 | Bipolar format error |
| 32 | Data checksum error |

The F field 1113, if a one, indicates an SEL signal when used on a loop 14 and indicates an STRT signal when used on a line 12. In an SEL signal, the SEQ field 1112 is a sequence number, as described above, and the CH byte 1102 contains the number of the selected channel. In an STRT signal, the two fields 1112 and 1102 are combined to form a 14 bit number identifying the channel on which communication is about to start.

The Field 1113, if a two, indicates an IDL signal and the SEQ field 1112 is the last sequence number used in the immediately prior transmission.

The Field 1113, if a three, indicates an NACK signal and the SEQ and CH fields 1112 and 1102, respectively, are used in the same manner as in an ACK signal from the TIU.

Finally, byte 1103, the last byte in the signal packet, contains an 8 bit checksum which is generated by program means and which comprises the EXCLUSIVE OR of the value contained in fields 1100, 1101, and 1102.

The data packet shown in FIG. 11A also includes an eight-bit byte 1104 which contains the ID number of the packet. Byte 1105, shown in greater detail in FIG. 11C, comprises a six-bit sequence number 1110 and a two-bit type field 1111. If field 1111 contains the value two, then the data packet is an end-of-message packet. If field 1111 contains the value one, then the data packet is an end-of-bundle packet. If field 1111 contains zero, then the data packet merely contains data and is neither an end-of-message nor and end-of-bundle packet.

Byte 1106 of the data packet contains the length L, of the data in the packet. A length of zero, by convention, indicates a full packet of 32 bytes. If the packet is less than full, the information must be in the leading part of the 32-byte field and the remaining positions can contain any value.

Byte 1107 of the data packet contains an eight-bit program-generated checksum.

Field 1108 contains the actual data and may be up to 32 eight-bit bytes in length. Finally, field 1109 contains a sixteen-bit hardware-generated checksum.

The method by which the aforementioned $\alpha$ and $\beta$ processes use the signalling capability illustrated by FIGS. 10A and 10B can best be appreciated by referring again to FIG. 1B. Each channel such as the one illustrated in FIG. 1B comprises two subchannels, each subchannel being concerned with data transmission in one direction. The description which follows shall be directed to the algorithm that handles data transmission on one subchannel, subchannel 15 shown in FIG. 1B, and it is understood that data transmission on a full channel is achieved through the application of the algorithm twice.

It will be remembered that there are two sets of parameters and two processes involved in the transmission on one subchannel. The $\alpha$ process or algorithm controls outgoing data and updates the $\alpha$ parameters of the subchannel. The $\beta$ process or algorithm controls incoming data and updates the $\beta$ parameters of the sub-channel.

The detailed process of this invention is based upon certain important techniques which will now be discussed before proceeding to a detailed description of the algorithms.

Digital data is transmitted in accordance with this invention in bursts, where a "burst" is defined as that data which is transmitted by a digital device during one continuous period of activity on one channel. A burst starts with an SEL signal and ends with either the next SEL signal or a data packet with an end-of-message code in it. System resources are assigned for the purpose of transmitting one burst and reassigned for subsequent bursts. "System resources" are here understood to mean data packet storage space in a switching unit and trunks on a transmission line that interconnects two switching units.

Each link of a channel in the data transmission from one switching unit to another can use at most one trunk, and therefore no one channel can absorb all available trunks. However, there is a danger that one channel might use all the storage in one or more switching units. Therefore, the following constraints are used.

Storage space in a switching data is assigned in units data M packets, where "M" is a parameter that is a constant for each channel. The particular value given to M for a specific channel is determined when the channel data virtually allocated. When burst transmission begins, the $\beta$ process obtains the assignment of M storage locations, data all transmission there have been loaded by the $\beta$ process with data it has received, it requests another assignment of M storage locations. data data packet must be used.

DATA

The storage locations by the $\beta$ process are then made available to the associated $\alpha$ process for retransmission. When the retransmission is satisfactorily completed, the $\alpha$ process releases the storage locations. They are then available for assignment to the next $\beta$ process that makes a request for storage allocation. Hence the amount of storage, denoted by "V," in a switching unit which is actually assigned to an active subchannel is the sum of all those assignments of M made to the subchannels $\beta$ process less the amount of storage released by the subchannel's $\alpha$ process.

The V assigned to a particular subchannel is constrained not to be greater than a particular value "A," where "A" is another constant that is specified for the subchannel. Hence so long as $A-V<M$ for a particular subchannel, the requests for further allocation of storage by that subchannel's $\beta$ process will not be honored. This use of the ACK signals provides the means whereby the data transmission system of this invention automatically matches the transmitting speed of each sending digital device to the receiving speed of each digital device to which it transmits.

The manner in which the data transmission system of this invention controls the transfer of data is dependent upon all data being assigned sequence numbers which are used by the ACK signals both to acknowledge correct receipt of the data which has been thus far transmitted and to authorize further transmission. The use of a six-bit sequence number, as has been done in this exemplary embodiment, allows a single ACK signal to authorize transmission of at most 63 data packets. Alternative embodiments could, of course, use a sequence number of different size to allow the authorizatin of transmission of a greater or lesser number of packets without departing from the spirit and scope of this invention.

The packets transmitted between successive authorization signals are collectively referred to as a "bundle." Since this embodiment uses a six-bit sequence number it will be appreciated that the size of a bundle may not be greater than 63 packets. In fact, it may comprise less than this number, the length being determined by the $\alpha$ process which transmits it. The maximum authorization that a $\beta$ process will send is determined by the parameter N, which is a constant for the subchannel. Thus N is a second constrain on the maximum size of a bundle. In all cases, the last packet in a bundle is uniquely identified by type field 1111 shown in FIG. 11C. By convention, an SEL signal is always the end of a bundle. A digital device may arbitrarily divide the data it sends to another digital device into units termed "messages." When a sending digital device transfers the last byte of a message to its associated TIU, it must set the SEOM line as previously discussed in conjunction with FIG. 7D. By convention, the last packet of a message defines the end of a bundle and the end of a burst.

The operation of the $\alpha$ and $\beta$ algorithms can be understood with reference to FIG. 1B by considering the transfer of data from TIU 19 to switching unit 21 through switching unit 20.

As shown in FIG. 1B, the $\alpha_{T1}$ process of terminal interface unit 19 is connected to the $\beta_{T1}$ process of switching unit 20. The other half of the switching unit 20 portion of subchannel 15 is the $\alpha_{T2}$ process which connects to the $\beta_{T2}$ process of switching unit 21.

Consider first a transmission from $\alpha_{T1}$ to $\beta_{T1}$. Data and SEL signal packets passing from $\alpha_{T1}$ to $\beta_{T1}$ are sequence numbered as described above and these sequence numbers are checked by $\beta_{T1}$. Only data and SEL signal packets which have consecutive numbers are accepted for processing by $\beta_{T1}$, all others are treated as errors. When the digital device associated with TIU 19 desires to start transmission on subchannel 15, it must issue a select for that channel which will then result in an SEL signal being sent by $\alpha_{T1}$ to $\beta_{T1}$. Upon arrival at $\beta_{T1}$ that SEL signal will constitute a request for resources for the transmission of one burst of data from $\alpha_{T1}$ through switching unit 20 onto link 25. In particular, $\beta_{T1}$ makes a request for a subtrunk to implement link 25 and for storage space in switching unit 20 sufficiently large to accommodate M packets of data. If either of these two resources cannot currently be assigned to $\beta_{T1}$, then transmssion to switching unit 20 on subchannel 15 is suspended until sufficient resources become available.

One the requested resources have been assigned to $\beta_{T1}$, the SEL signal from $\alpha_{T1}$ is acknowledged by sending an ACK signal from $\beta_{T1}$ to $\alpha_{T1}$ authorized the start of data transmission. The $\alpha_{T1}$ process will, if the digital device provides enough data, send the authorized number of packets of data to $\beta_{T1}$, marking the last of these packets as the last of a bundle. As each packet is received, $\beta_{T2}$ checks its sequence number and stores it in switching unit 20. When the last packet of the bundle is received, $\beta_{T1}$ wil construct a new ACK signal and send it to $\alpha_{T1}$. That new ACK signal confirms the successul reception of the transmitted data and authorizing transmission of more data until the total amount transmitted is equal to M. When this occurs, $\beta_{T1}$ will request storage space for another M packet of data. When this request is honored, $\beta_{T1}$ again sends an ACK signal to $\alpha_{T1}$.

When $\beta_{T1}$ receives either an SEL signal or the last packet of a message, thus signifying the end of a burst, any unused storage resources assigned during burst transmission but currently unused for storage of data are returned to the common storage pool in switching unit 20.

Considering next the transmission from $\alpha_{T2}$ to $\beta_{T2}$, it is apparent that this depends upon $\beta_{T1}$ supplying to $\alpha_{T2}$ the data received from $\alpha_{T1}$. $\beta_{T1}$ makes this data available to $\alpha T_2$ by placing it in a first-in-first-out queue which can also be accessed by $\alpha_{T2}$. $\alpha_{T2}$ constantly tries to empty the queue by retransmitting the data to $\beta_{T2}$. The transmission process comprising sequence numbering of the data packets and use of the ACK signal to authorize further transmission that was described above is also used to effect this retransmission.

Although the process for transmission of data on link 25 shown in FIG. 1B is the same as that previously described for link 24, the signalling associated with the start and end of a burst is different.

A burst on link 25 starts when the $\beta_{T1}$ process obtains an assignment of a subtrunk linking switching units 20 and 21. At that time an STRT signal is sent over the assigned subtrunk to switching unit 21. As previously mentioned, the SEQ and CH fields are combined to uniquely specify that portion of subchannel 15 passing through switching unit 21 shown in FIG. 1B. When switching unit 21 receives the STRT signal it associates the assigned subtrunk number with the proper subchannel so that subsequent transmissions on that subtrunk will be correctly handled by the $\beta_{T2}$ process. The signal also causes $\beta_{T2}$ to request resources for burst transmission in the same way as was described above for $\beta_{T1}$.

The end of a burst occurs when $\alpha_{T2}$ runs out of data to transmit and at the same time no burst is in progress on link 24. At that time $\alpha_{T2}$ releases the subtrunk which it has been using to implement link 25. The subtrunk then becomes available for reassignment. When the subtrunk is released, and periodically thereafter, switching unit 20 sends an IDL signal over that subtrunk for as long as it remains unassigned. If switching unit 21 receives an IDL signal on the subtrunk while it is associated with $\beta_{T2}$, then it disassociates that subtrunk from $\beta_{T2}$ and informs $\beta_{T2}$ that the burst is finished. At this time, the action of $\beta_{T2}$ is the same as that previously described for $\beta_{T1}$ at the completion of a burst.

The communication process utilized by this invention in the manner set forth above is implemented by stored programs that reside in each interface computer 62 and each control computer 30 shown in FIG. 2B. Each interace computer executes the same program as every other interface computer in the system and each control computer executes the same program as every other control computer in the system. The details of these two programs will now be discussed, considering first the interface computer program and then the control computer program.

THE INTERFACE COMPUTER PROGRAM

Figure 14A:
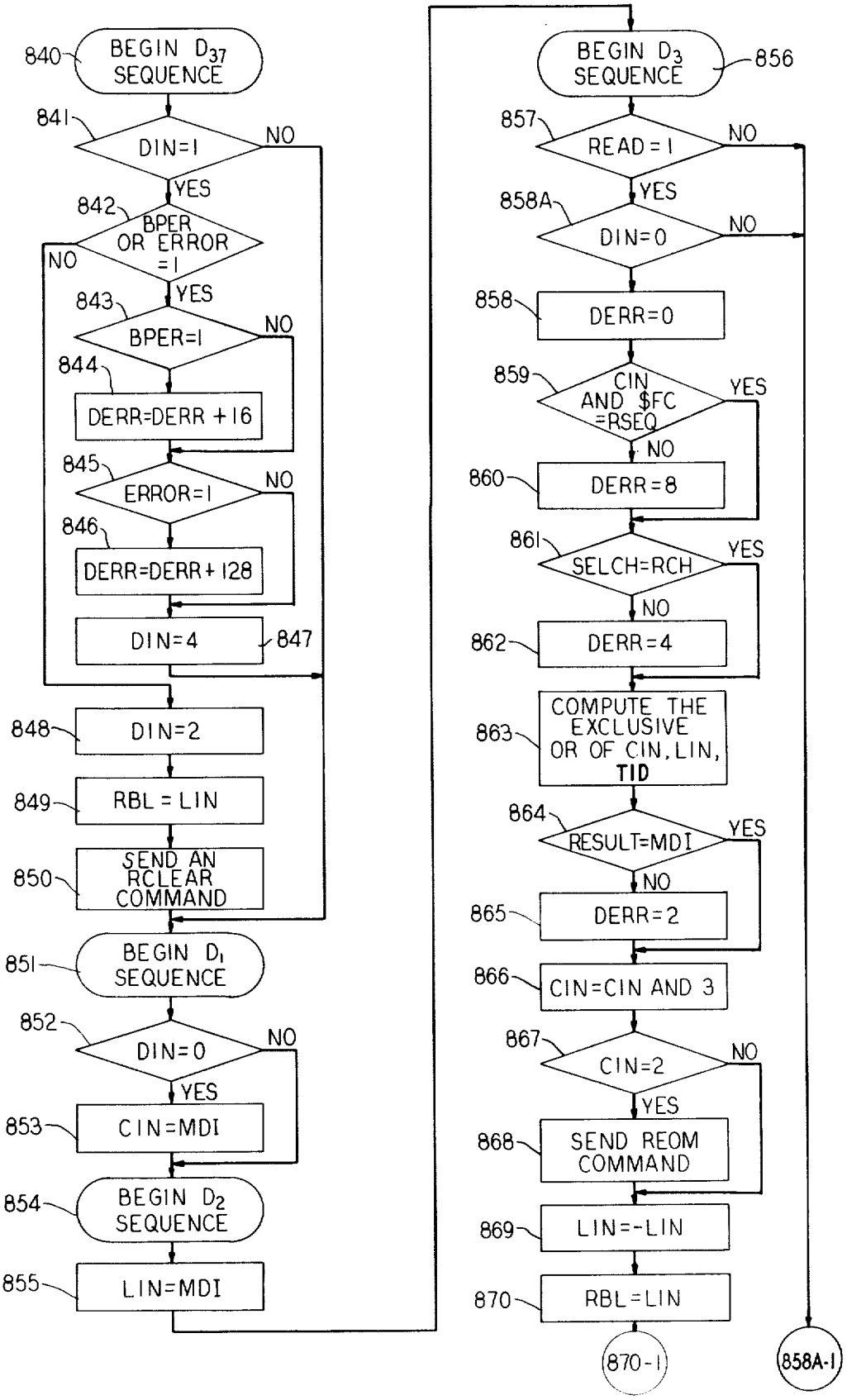
Figure 14B:
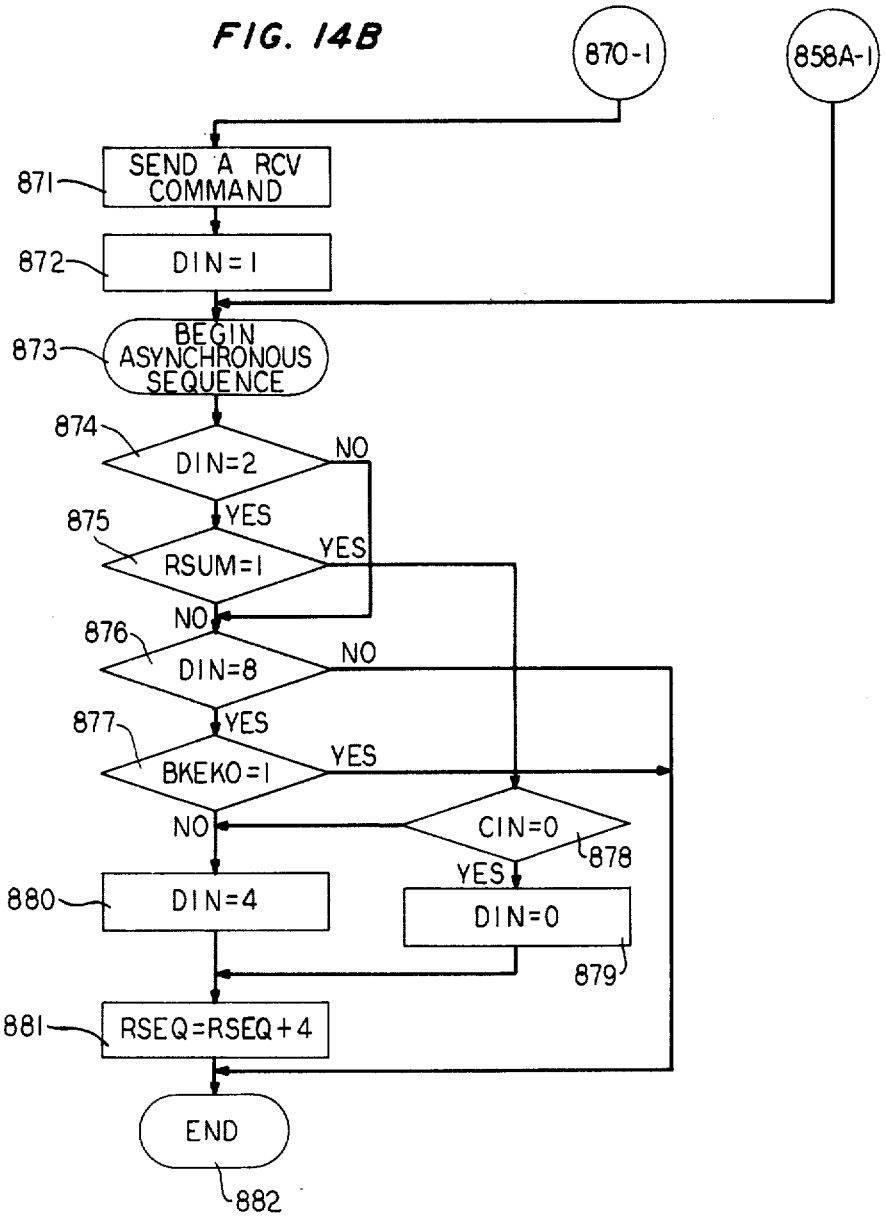

FIGS. 12–16B are seen to comprise flow charts of the initialization instructions and the four routines that correspond to the $\alpha$ and $\beta$ processes as performed by the interface computer: the initialization instructions shown in FIG. 12, the data output routine shown in FIGS. 13A and 13B, the data input routine shown in FIGS. 14A and 14B, the signal output routine shown in FIG. 15, and the signal input routine shown in FIGS. 16A and 16B. The data output routine implements the data handling portion of the $\alpha$ process, while the data input routine implements the data handling portion of the $\beta$ process. The signal input and output routines are used by both the $\alpha$ and $\beta$ processes to perform the signaling that each requires.

Each of the four interface computer routines is functionally independent of the others. However, each contains sequences of instructions that must be performed in particular ones of the time periods which have been set forth graphically in FIG. 7B, during which terminal buffer 60 can transmit control information. The four routines contain instructions that must be executed during the $D_{37}$, $S_0$, $S_1$, $S_2$, $S_3$, $D_0$, $D_1$, $D_2$, and $D_3$, periods as well as some instructions, termed asynchronous instructions, that may be executed between the $D_3$ and $D_{37}$ time periods. The execution of the instructions in the proper time sequence is achieved by interleaving the functionally independent portions of each of the four routines according to the time periods in which they must be executed. For ease of description, each routine will be explained individually. The exact manner in which the instruction interleaving may be performed is, however, set forth in the program listing of Appendix A, which is a list of the contents of program memory 600 of interface computer 62 shown in FIG. 9A.

The flow charts of FIGS. 12–16B are seen to include several different symbols. A rectangle, termed up "operation block" is used to indicate an arithmetical or logical step in the process. A diamond, termed a "conditional branch point" indicate a decision step of the process. An ellipse, termed a "terminal indicator" delineates the various sequence times during which the instructions must be performed. A circle is used merely as a drafting aid to indicate the proper flow from one sheet of the drawing to another.

INITIALIZATION INSTRUCTIONS OF THE INTERFACE COMPUTER PROGRAM

Turning then to the flow charts, FIG. 12 illustrates the several initialization instructions which must precede the four interleaved routines to insure that each cycle of execution begins at the start of the $D_{37}$ time period.

The flow chart of FIG. 12 has two entry points, 750 and 754. The START entry 750 is used to initialize the interface computer program. Operation block 751 begins this process by setting working store locations SOUT, DOUT, DIN, SSEQ, RSEQ, and LIMIT to zero. Block 752 then sends an XMT command to the data transmit buffer 451 causing it to prevent the digital device 18 from writing data into the buffer. Next block 753 issues an RCV command to the data receive buffer 450 causing it to prevent any data from being read out of that buffer by the digital device. Control then passes to operation block 755.

The RESTART entry 754 is used when it is required to disconnect the TIU 17 from the transmission loop 14. To obtain this effect control is passed to block 755, which sets SOUT equal to three and then passes control to the main loop of the interface computer program at conditional branch point 756.

Conditional branch point 756 tests whether data multiplexer 58 has obtained frame synchronization with the transmission loop 14. That fact is indicated by a 0 on line FRAMEOUT. If that line is a 1, indicating that frame synchronization has not been achieved, conditonal branch point 756 continues to loop back to block 755. If data multiplexer 58 is in synchronization with the transmission loop control passes from conditional branch point 756 to conditional branch point 757.

The sequence comprising conditional branch point 757 and block 758 maintains the connection of the TIU to the transmission loop 14 by appropriate pulsing of power monitor 76 shown in FIG. 2B which keeps the protection relay 54 in the loop access module 16 closed for as long as the value in working store location SOUT is not equal to three. If the value in working store location SOUT is equal to three, control transfers from conditional branch point 757 around block 758 to conditional branch point 759. Otherwise, control passes to block 758. In block 758 an ALIVE command is issued to power monitor 76 which causes the protection relay 54 to remain closed for the next time period of about 250 microseconds. The sequence comprising conditional branch point 759 and operation block 760 causes interface computer 62 to wait for time period $D_{36}$. During that time period the D36 input line is equal to 1. If that line is not equal to 1, then conditional branch point 759 transfers control to block 760 and block 760 causes interface computer 62 to wait for another byte strobe. Following the arrival of the next byte strobe, control passes back to conditional branch point 759. If conditional branch point 759 determines that input line D36 is equal to one, synchronization is now obtained with the time period $D_{36}$ and control passes to block 761. Block 761 waits for the byte strobe to arrive signaling the start of time period $D_{37}$. This time period is the time at which the first sequence of execution of the four main routines is to begin and hence control passes from block 761 to these routines. This action is shown schematically in FIG. 12 as block 762. After the execution of the asnychronous sequence of the last of these routines, control passes back to block 756 and the cyclic operation of the interface computer program is repeated.

DATA OUTPUT ROUTINE OF THE INTERFACE COMPUTER PROGRAM

Turning then to FIGS. 13A and 13B, these are seen to comprise a flow chart of the data output routine. The function of the data output routine is to handle the output of a data packet and to supervise the operation of data transmit buffer 451. This routine maintains the sequence number SSEQ discussed hereinbefore in Table IV. It stores the data packet control data in COUT, the data packet length in LOUT, and the process status in DOUT. The sequence number for the end of the current bundle is held in LIMIT and SELCH contains the number of the currently selected output channel.

As shown in FIG. 13A, the first function performed by the data output routine takes place during the $D_{37}$ interval and comprises blocks 800 through 805. The purpose of these blocks is to complete if necessary, the outputting of a data packet from data transmit buffer 451 to data multiplexer 58. This operation may have been begun during the last cycle of the interface computer program and may not as yet have been completed. Conditional branch point 801 tests whether DOUT is equal to four. As previously mentioned. Dout stores the status of the routine. If indeed the data output routine is in the process of outputting a data byte, then DOUT will equal four. If this is not the case, then conditional branch point 801 will transfer control to the next sequence, the $S_3$ sequence which begins at block 806.

If DOUT does equal four, the conditional branch point 801 transfers control to conditional branch point 802 which tests the value of COUT. COUT corresponds to the TYPE field in the CNTRL byte of a data packet. Thus COUT takes the value two if the data packet is the end of a message and therefore the end of a bundle, takes the value one if it is merely the last packet in a bundle without being the last packet in a message, and takes the value zero if it is neither the last packet in a bundle nor in a message. If COUT is not equal to zero, thus indicating that the current packet is either an end-of-bundle or end-of-message, then status word DOUT is set equal to eight by block 803, which serves to indicate that the data output routine is now waiting for an ACK signal. Control is then transferred by block 803 to the the beginning of the $S_3$ sequence at block 806.

If COUT is zero, then the current data packet is neither an end-of-bundle nor an end-of-message, and block 804 sends an SCLEAR command to data transmit buffer 451. This will cause data transmit buffer 451 to allow digital device 18 to write in another packet of data. Status word DOUT is then set equal to 1 by block 805 indicating that digital device 218 is now currently reading a new data packet into data transmit buffer 451.

At this point, control is transferred to terminal indicator 806 at which time the $S_3$ sequence is begun.

During time period $S_2$ the sequence starting at block 806 is obeyed. That sequence starts with conditional branch point 806 where a test is made on DOUT. If DOUT is equal to two, it indicates that the data output routine is waiting to transmit a packet of data. If the data output routine is not so waiting, conditional branch point 807 transfers control to the $D_0$ sequence starting at operation block 809. If the data output routine is waiting to transmit a data packet, then block 808 issues a SENDD command to data multiplexer 58. This command causes the multiplexer to look for an opportunity to transmit a data packet.

The sequence starting at terminal indicator 809 is executed in time period $D_0$. That sequence comprises only block 810 in which the contents of working storage location COUT are transferred to data output lines MDO. The effect of this is to cause data multiplexer 58 to transmit as byte $D_1$ of a data packet the value which is currently contained in COUT.

The sequence beginning at terminal indicator 811 is executed in time period $D_1$. That sequence comprises block 812 in which the contents of working store location LOUT are transferred to data output lines MDO, causing data multiplexer 58 to write the value from LOUT into byte $D_2$ of the outgoing data packet. If the multiplexer is not currently transmitting, then blocks 810 and 812 will have no useful effect.

The sequence which begins at terminal indicator 812A is executed in time period $D_2$. This sequence is in fact redundant and has no useful effect if data multiplexer 58 is not actually transmitting data; and if the multiplexer is transmitting, the effect of this sequence is to output in byte $D_3$ of the outgoing data packet the checksum which is computed as the EXCLUSIVE OR of the values in bytes $D_0$, $D_1$, and $D_2$ of a data packet. Block 813 computes this value using the fact that peripheral store lines TID carry the terminal ID which is written into byte $D_0$ of the data packet and the fact that working store locations LOUT and COUT contain the values inserted in byte positions $D_1$ and $D_2$, respectively, of that packet. The result computed by block 813 is transferred to data output lines MDO by block 814.

The sequence which starts at terminal indicator 815 is obeyed in time period $D_3$. First, conditional branch point 816 tests the SEND line from data multiplexer 58. That line is equal to 1 if data multiplexer 58 is in fact transmitting a data packet. Conditional branch point 816 transfers control to terminal indicator 820 if data multiplexer 58 is not transmitting data. When the data multiplexer is transmitting data, SEND is 1 and conditional branch point 816 transfers control to block 818 where an XMT command is issued to data transmit buffer 451. The effect of this command is to cause the buffer to transmit during time periods $D_3$ through $D_{36}$ the thirty-two bytes of data held in the buffer, followed by the sixteen-bit checksum which that buffer computes .Operation block 819 then sets DOUT equal to four, indicating that transmission of data is in progress.

The asynchronous sequence which begins at terminal indicator 820 is obeyed sometime between time period $D_3$ and time period $D_{37}$. First in that sequence, as shown in FIG. 13B, conditional branch point 821 tests DOUT. If DOUT is not equal to 1, control is transferred to the end of the data output routine at terminal indicator 835. When DOUT equals 1, this indicates that the digital device is able to transfer data into data transmit buffer 451.

When digital device 18 has finished transferring data into data transmit buffer 451 either SSUM or EOMS will be set equal to 1. Alternatively, digital device 18 may select a new channel, in which case SELEC will be equal to 1. If any of these conditions exists, then the sequence beginning at block 823 is obeyed, otherwise conditional branch point 822 transfers control to the end of the data output routine at terminal indicator 835.

The sequence beginning at block 823 first works on the assumption that digital device 18 has inserted data into data transmit buffer 451 and that that data should then be transmitted as a data packet. This assumption is good unless digital device 18 selected a new channel when data transmit buffer 451 was empty. This condition is tested by conditional branch points 832 and 833.

Block 823 computes the sequence number to be used in the data packet which will next be transmitted. Next, conditional branch points 824 and 827 and operation blocks 825, 826, and 828 compute the type of the data packet to be transmitted. If the sequence number of the packet held in SSEQ is equal to the limiting sequence number held in LIMIT, then conditional branch point 824 transfers control to block 826 where the type of the packet is provisionally set in COUT to be equal to 1. If SSEQ is not equal to LIMIT, then conditional branch point 824 transfers control to block 825 wherein the type of the packet is provisionally set to 0 in working storage location COUT.

Conditional branch point 827 is then executed and tests input line EOMS. This line is 1 if digital device 18 has indicated that the data stored in data transmit buffer 451 is the last of a message. If EOMS is equal to 1, then conditional branch point 827 transfers control to block 828 wherein the packet type two is stored in working storage location COUT. If EOMS is not equal to 1, then conditional branch point 827 transfers control around block 828 to block 829.

The information which will go into byte position $D_1$ of the data packet contains the sequence number in its most significant six bits and the packet type in its least significant two bits. This value is computed in block 829 and stored in COUT. Since the sequence number is already in the most significant six bits of SSEQ, and since the type is already in the least significant two bits of COUT, block 829 merely adds the contents of working store locations COUT and SSEQ and stores the value in COUT.

The information which is transmitted in byte $D_2$ of the data packet is equal to the length of the data in that packet. That length is currently available on input lines SBL which come from data transmit buffer 451. Operation block 830 stores this length in working store location LOUT. DOUT is then set equal to two by block 831. This indicates that the data output routine is now waiting for an opportunity to transmit.

Conditional branch points 832 and 833 then proceed to test whether digital device 18 in fact wrote any data into data transmit buffer 451. If it did, then either the data length on lines SBL will be nonzero or line SSUM will be set equal to 1. If either of these conditions exist, then conditional branch points 832 and 833 will transfer control to the end of the data output routine at terminal indicator 835. If neither of these conditions exists, then digital device 18 must have selected a new channel without writing any data into data transmit buffer 451, and in this case block 834 is used to set DOUT equal to zero, indicating that the data output routine is calling upon the signal output routine to transmit an SEL signal. After obeying block 834, control is transferred to the end of the data output routine at terminal indicator 835.

DATA INPUT ROUTINE OF THE INTERFACE COMPUTER PROGRAM

This routine handles the input of a data packet and supervises operation of the data receive buffer 450. The process maintains a sequence number in RSEQ, stores the data packet control and length information in CIN and LIN, respectively, and stores the process status in DIN. If any errors are detected during input the type of error is noted in DERR.

As shown in FIG. 14A, the routine starts at terminal indicator 840 with a sequence which is obeyed in time period $D_{37}$. First in that sequence is conditional branch point 841 where a test is made on DIN to see if it is equal to 1, indicating that data is currently being received from data multiplexer 58 by data receive buffer 450. If DIN is not equal to one, conditional branch point 841 transfers control to the $D_1$ sequence beginning at terminal indicator 851. Otherwise, control is passed to conditional branch point 842.

Conditional branch point 842 checks whether there was a bipolar error or a checksum error in the data received by data receive buffer 450. It does this by checking to see if either of the input lines BPER or ERROR is equal to 1. If neither is equal to 1, then conditional branch point 842 transfers control to block 848, otherwise it transfers control to conditional branch point 843. If line BPER is equal to 1 then a bipolar error was detected by multiplexer 58 and conditional branch point 843 transfers control to block 844, where the value sixteen is added to working store location DERR. If no such error was detected, then conditional branch point 843 transfers control to conditional branch point 845.

If data receive buffer 450 detects a checksum error in the incoming data packet, then line ERROR will be set to 1 and conditional branch point 845 will transfer control to block 846 where the value 128 is added to working store location DERR. if no such error was detected then conditional branch point 845 transfers control to block 847. In block 847 DIN is set equal to four, which serves to indicate that the data input routine is now waiting for the signal output routine to send an ACK signal. Operation block 847 then passes control to the $D_1$ sequence beginning at terminal indicator 851.

As mentioned above, conditional branch point 842 transfers control to block 848 if no error is detected in the incoming data packet. Block 848 then sets DIN equal to two, indicating the data input routine is now waiting for digital device 18 to read data from data receive buffer 450, and control is transferred to operation block 849. Operation block 849 sets the lines RBL equal to the value currently stored in working store location LIN which value is currently minus one times the length of the data in the data packet. Then block 850 issues an RCLEAR command to data receive buffer 450 causing that buffer to make the data it holds availabe to digital device 18. Control is then transferred to the $D_1$ sequence beginning at terminal indicator 851.

The $D_1$ sequence starts with conditional branch point 852 where a test is made on DIN. If DIN is equal to 0, then the data input routine is waiting to read a data packet and conditional branch point 852 transfers control to block 853, which transfers the data available on input lines MDI from data multiplexer 58 to working store location CIN. Otherwise, control passes around block 853 to terminal indicator 854.

The next sequence, starting at terminal indicator 854, is executed in time period $D_2$ and comprises operation block 855 which transfers the data on data input lines MDI to working store location LIN.

The next sequence is the $D_3$ sequence which begins at terminal indicator 856. The first action taken by this sequence is to test whether a data packet destined for TIU 17, in which the data input routine is running, is in fact being read by data multiplexer 58. That test is made in conditional branch point 857 by checking to see whether line READ is equal to 1. If READ is not equal to 1, then control is transferred to the beginning of the asynchronous sequence at terminal indicator 873 shown in FIG. 14B. If a packet is being read by data multiplexer 58, then line READ will equal 1 and control is transferred to conditional branch point 858A where a test is made on DIN to see if the data input routine is in fact waiting for more data input as is the case when DIN equals 0. If no input is expected, the control is transferred from conditional branch point 858A to the end of the $D_3$ sequence, that is, to terminal indicator 873 shown in FIG. 14B. Otherwise, control passes to block 858.

Working store location DERR is used by the data input routine to accumulate values indicating errors that have been detected during the input process. In block 858 DERR is initialized to zero. Following block 858, conditional branch point 859 and block 860 together check the sequence number of the incoming packet against that expected by the data input routine as stored in RSEQ. If that check fails and the sequence number of the incoming packet is a number different from that expected, then a error code of eight is set in DERR. Conditional branch point 859 extracts the sequence number from the most significant six bits of CIN where it is deposited by block 853 during the input process. This extraction uses "$FC" as a mask, where the symbol "$" indicates the hexadecimal number system and F and C are hexadecimal digits. Thus "$FC" is the hexadecimal representation of the decimal number 252.

Conditional branch point 859 compares the extracted sequence number with the sequence number in the most significant six bits of working store location RSEQ. If the sequence numbers are equal, control passes from conditional branch point 859 to conditional branch point 861. Otherwise, block 860 sets an error code in DERR.

Conditional branch point 861 and operation block 862 then check whether the data input packet just received relates to a channel different from the one selected for data output. Working store location RCH contains the number of the channel that was selected for data input and working store location SELCH contains the channel number chosen by digital device 18 for data output. At conditional branch point 861 these two values are compared, and if they are equal, control is transferred to operation block 863. Otherwise control passes to operation block 862 where the error code four is inserted in working store location DERR.

Byte $D_3$ of each data packet is a checksum whose value should be the EXCLUSIVE OR of bytes $D_0$, $D_1$, and $D_2$, which byte values are currently available to the data input routine on input lines TID, in working location CIN, and in working location LIN, respectively Block 863 thus computes the EXCLUSIVE OR of these three values. Conditional branch point 864 compares the result with the value currently on data input lines MDI. If equality is found, then control passes from conditional branch point 864 around operation block 865 to operation block 866. Otherwise block 865 is used to set the error code two in working store location DERR.

Next, block 866 shown in FIG. 14A extracts the type of the incoming data packet from the value currently held in CIN. That type is in the least significant two bits of CIN and the effect of block 866 is to mask out and return to CIN just the two-bit quantity which is the type of the incoming packet. Conditional branch point 867 then checks whether the incoming packet is of type two. If it is not, control is passed around block 868 to block 869. Otherwise, block 868 is used to set the command line REOM. Command line REOM is an input to data receive buffer 450 which signals if that the incoming data packet is the last of a message. At this point in the data input routine working store location LIN contains the length of data actually contained in the packet. This value is shown as being negated by block 869. Since interface computer 62 does not have a subtract instruction, the two's-complement negative of the value in LIN is obtained in two steps. First the EXCLUSIVE OR of that value with the hexadecimal value $FF (255 decimal) is formed. Then one is added to the result.

Operation block 870 transfers the contents of working store location LIN to the lines RBL where it is made available to data receive buffer 450. Operation block 871 shown in FIG. 14B then issues an RCV command to data receive buffer 450 which causes it to start reading data from data multiplexer 58. This is a process which continues from time period $D_4$ through to time period $D_{37}$. To indicate that this input process is taking place, operation block 872 sets working store location DIN equal to 1.

The asynchronous sequence starting at terminal indicator 873 is obeyed during the interval from time period $D_3$ through time period $D_{37}$. In the asynchronous sequence, the data input routine first checks to see whether data in data receive buffer 450 is currently available to digital device 18 and whether digital device 18 has in fact just finished taking the last byte of data from data receive buffer 450. If that is the case, then working store location DIN is equal to two and input lines RSUM are equal to 1. If the first of these conditions is not true, then conditional branch point 874 transfers control to conditional branch point 876. If the second of these conditions is not true, then conditional branch point 875 transfers control to conditional branch point 876. If both conditions are true, then conditional branch point 875 transfers control to conditional branch point 878. Conditional branch point 876 determines whether a channel break has been sent to digital device 18. If a channel break has been sent to digital device 18 then working store location DIN will contain the value eight and conditional branch point 876 transfers control to conditional branch point 877. Otherwise, control passes to the end of the data input routine at terminal indicator 882.

Conditional branch point 877 determines whether the channel break has been accepted and acknowledged by digital device 18. If it has, input line BKEKO will contain the value 0 and conditional branch point 877 will transfer control to operation block 880. Otherwise control will pass to the end of the data input routine at terminal indicator 882. In block 880 the working store location DIN is set to four, indicating that the data input routine is waiting for the signal output routine to send an ACK signal. Operation block 880 passes control to block 881.

It can be seen from the above that when digital device 18 has completed collecting data from data receive buffer 450 control passes to conditional branch point 878. At that point, the data intput routine checks to see whether the type of packet just given to digital device 18 is equal to 0. Working store location CIN stores the packet type. If the type is nonzero, it must either be the last packet of a bundle or the last packet of a message, and in either of these cases control passes from conditional branch point 878 to operation block 880 where, as seen above, working store location DIN is set equal to four to indicate that the data input routine is waiting for the signal output routine to send an ACK signal. If the type of the packet is zero, then control passes from conditional branch point 878 to operation block 879 where working store location DIN is set equal to 0 indicating that the data input routine is waiting for another input packet. Operation block 879 then passes control to operation block 881.

The sequence number of the next packet to be accepted by the data input routine is contained in the most significant six bits of working store location RSEQ. Operation block 881 increases RSEQ by four and then transfers control to the end of the data input routine at terminal indicator 882.

SIGNAL OUTPUT ROUTINE OF THE INTERFACE COMPUTER PROGRAM

The signal output routine is illustrated in FIG. 15. This routine handles the output of a signal packet contained in working storage locations FOUT and NOUT. The state of the signal output routine is indicated by the current value of SOUT.

As shown in FIG. 15, the signal output routine begins at terminal indicator 890 in time period $D_{37}$. The signal output routine first checks whether SOUT is 1 to see if it is waiting to send a signal. Conditional branch point 891 transfers control around operation block 892 to terminal indicator 893 if SOUT is not equal to 1, and transfers control to block 892 where an SENDS command is issued to data multiplexer 58 if SOUT is equal to one. The SENDS command requests transmission of a signal packet at the next opportunity.

The $S_0$ sequence starting at terminal indicator 893 comprises block 894 in which the information in storage location SOUT is transferred onto data output lines MDO and made available to data multiplexer 58 which will insert it as the second byte of an outgoing signal packet.

The $S_1$ sequence beginning at terminal indicator 895 comprises operation block 896 where information in storage location NOUT is transferred onto data output lines MDO which take it to the multiplexer 58 where it is inserted into byte $S_2$ of an outgoing signal packet.

The $S_2$ sequence begins at terminal indicator 896A. First, operation block 897 computes the checksum to be transmitted as byte $S_3$ of the outgoing signal packet. That checksum is the EXCLUSIVE OR of the three preceding bytes of the signal packet and these values are available, respectively, on input lines TIC, in working store location FOUT, and in working store location NOUT. This checksum is output onto data output lines MDO by block 898.

It may happen that operation block 892 requested the opportunity to transmit a signal packet and data multiplexer 58 did not find an opportunity to do so in the current master frame time. This condition is tested in conditional branch point 899. If so, input line SEND is equal to zero 0 and the operation performed by blocks 894, 896, 897, and 898 will have been in vain. If input line SEND is equal to 1 it indicates that data multiplexer 58 was able to transmit a signal packet and in this case conditional branch point 899 transfers control to operation block 900. If this is not the case, conditional branch point 899 transfers control to terminal indicator 901. In operation block 900 SOUT is set equal to two, indicating that the signal output routine has disposed of any current requests to send a signal packet and is available to process a subsequent request.

The asynchronous sequence beginning at terminal indicator 901 is obeyed during time period $S_3$ and $D_{37}$. If at this point SOUT contains the value two, then the signal output routine is available to service a request to transmit signals and the signal output routine thus goes on to determine whether such a request exists. Conditional brance point 902 transfers control to the end of the signal output routine at terminal indicator 906 if the signal output routine is not available to send a signal, that is, if SOUT is not equal to two. Otherwise, control is transferred to conditional branch point 903.

If it is able to service this request to send a signal, conditional branch point 903 tests to see if the data input process is requesting that an ACK signal be sent. That fact is indicated by the value four stored in DIN. If an ACK signal is requested, conditional branch point 903 transfers control to block 907. Otherwise, control passs to conditional branch point 904.

In conditional branch point 904 the signal output routine checks to see if the data output routine is requesting the transmission of an SEL signal, that is, if working store location DOUT is equal to 0. If such a signal is requested, control is transferred from conditional branch point 904 to operation block 910. Otherwise control passes to the end of the signal output routine at terminal indicator 906.

Blocks 907, 908, and 909 handle the output of an ACK signal on behalf of the data input routine. Byte $S_1$ of the ACK signal contains the sequence number of the last packet received by the data input routine, which number is one less than the six-bit number held in the most significant six bits of working store location RSEQ. The purpose of block 907 is to compute the sequence number of the last received packet and store the value in FOUT for subsequent transmission by the signal output routine. Byte $S_2$ of the ACK signal contains the error indication currently stored in working store location DERR. In block 908 this value is transferred to working store location COUT for subsequent output by the signal output routine. Block 909 sets DIN equal to 0, indicating to the data input routine that it should now be waiting for further data packet input and then transfers control to operation block 920.

The sequence starting at block 910 handles the output of the SEL signal on behalf of the data output routine. The number of the selected channel is provided by digital device 18, and is stored in channel select circuit 452 from which it is available to interface computer 62 on lines SBC. Block 910 stores the number of this channel in working store location SELCH. That number is to appear in byte $S_2$ of an SEL signal and thus operation block 912 transfers the channel number from SELCH to working store location COUT from which it is subsequently transmitted by the signal output routine.

Byte $S_1$ of an SEL signal contains in its most significant six bits the sequence number which is one greater than the last sequence number transmitted. That number is available in the most significant six bits of working store location SSEQ. A 1 is stored in the least significant two bits of byte $S_1$ of the SEL signal packet. Block 913 computes the value of byte $S_1$ for the SEL signal packet using the sequence number held in SSEQ and stores the result in working store location FOUT for subsequent transmission by the signal output routine. In block 914 the signal output routine sets DOUT equal to sixteen indicating to the data output routine that it should now be waiting for the ACK signal to be received. Operation block 915 then issues an XMT command which insures that digital device 18 cannot write more data into data transmit buffer 450. Conditional branch point 916 checks to see if DIN is equal to two, that is, to see if there is data currently available in data receive buffer 450. If this is not the case, control passes to block 920, otherwise control passes to block 917.

Operation block 917 issues an RCV command to data receive buffer 450. This insures that data currently resident in data receive buffer 450 is no longer made available to digital device 18. Then in block 918 DIN is set to four to indicate to the data input routine that it must now send an ACK signal. In block 919 working store location DERR is set to four to indicate that the most recently received data packet was treated as being an error for the reason that it applies to a channel that is no longer the one selected for data output. From block 919 control passes to block 920 where SOUT is set equal to 1 indicating that the signal output routine is now waiting to transmit another signal. From block 920, control passes to the end of the signal output routine at terminal indicator 906.

SIGNAL INPUT ROUTINE OF THE INTERFACE COMPUTER PROGRAM

The signal input routine is illustrated in FIGS. 16A and 16B. This routine stores the second and third bytes of each signal packet in working store locations FIN and NIN, respectively.

The signal input routine starts with the $S_1$ sequence beginning at terminal indicator 930. During time period $S_1$, block 931 copies the data available on data input lines MDIN into woking store location FIN.

The $S_2$ sequence beginning at terminal indicator 932 is executed next. During time period $S_2$, block 933 transfers the data on data input lines MDIN into working store location NIN.

The next sequence executed by the signal input routine is the $S_3$ sequence beginning at terminal indicator 934. Conditional branch point 935 tests to see if a signal is in fact being read. This is indicated by the READ input line. If that line is equal to 0, then no signal packet is in fact being read and conditional branch point 935 causes a transfer to the end of the signal input routine at terminal indicator 943 shown in FIG. 16B. Otherwise control passes to conditional branch point 936. At this time the input line BPER is equal to one if a bipolar error was detected by data multiplexer 58 during the reading of the signal packet. Conditional branch point 936 transfers control to the end of the signal input routine at terminal indicator 943 shown in FIG. 16B if an error is so detected, and if no error is detected, control passes to block 937.

Byte $S_3$ of a signal packet contains a checksum which is the EXCLUSIVE OR of the preceding three bytes, $S_0$, $S_1$, and $S_2$. At this point the values of these bytes are available on lines TID, in working store location FIN, and in working store location NIN, respectively. Block 937 computes the EXCLUSIVE OR of these three values, and conditional branch point 938 compares that with the value available on data input lines MDIN. If the two values are found to be unequal, conditional branch point 938 transfers control to the end of the signal input routine at terminal indicator 943 shown in FIG. 16B. Otherwise, control passes to block 939. The significance of the signal packet is determined by the function code in the least significant two bits of byte $S_1$ of the signal packet. That function code is extracted from the value stored in FIN by operation block 939. Conditional branch points 940, 941, and 942 then transfer control to the sequence appropriate to the function value obtained.

Conditional branch point 940 transfers control to conditional branch point 944 if the function code of the incoming signal packet is 0 indicating that it is an ACK signal. Otherwise, control is transferred to conditional branch point 941 shown in FIG. 16B. Conditional branch point 941 transfers control to conditional branch point 956 if the function code of the incoming signal packet is one, indicating that it is an SEL signal. Conditional branch point 942 shown in FIG. 16B transfers control to conditional branch point 966 if the function code of the incoming signal is two, indicating that it is an RST signal. If the function code is not one of these values, then control passes t the end of the signal input routine at terminal indicator 943.

The sequence starting at conditional branch 944 shown in FIG. 16A handles the case when the incoming signal is an ACK signal. If the data output routine is waiting for an ACK signal after transmitting the last data packet of a bundle, the value of DOUT is eight. A test of this value is made by conditional branch point 944 and if that value is found, control is transferred to block 948. Otherwise, it passes to conditional branch point 945.

If the data output routine has previously received an ACK signal which indicated that it should not transmit any more data packets, the value of DOUT is thirty-two. Conditional branch point 945 tests for this value and, if it finds it, passes control to block 948. If not, control passes onto conditional branch point 946.

If the data output routine is waiting for an ACK signal after sending an SEL signal, then DOUT equals sixteen. Conditional branch point 946 checks for this value. If the value sixteen is not found, control passes from conditional branch point 946 to the end of the signal input routine at terminal indicator 943 shown in FIG. 16B. If the value sixteen is found, control passes to block 947. Block 947 sets DOUT equal to 0 as a provisional measure indicating that if the incoming ACK signal has an incorrect sequence number, then the data output routine should request the signal output routine to send another SEL signal. Control then passes from block 947 to terminal indicator 949.

As mentioned above, block 948 is obeyed if either of the tests made by conditional branch points 944 and 945 are true. In this case, DOUT is set equal to two indicating to the data output routine that if the incoming ACK signal has an erroneous sequence number the data output routine should repeat the transmission of the most recently transmitted data packet. Control then passes from block 948 to terminal indicator 949.

In the $D_0$ sequence beginning at terminal indicator 949, the first operation is performed by conditional branch point 950 which compares the sequence number in the most significant six bits of working store location SSEQ with the sequence number from byte $S_1$ of the incoming signal packet which is currently stored in working store location FIN. If these values are not equal, control passes through conditional branch point 950 to the end of the signal input routine at terminal indicator 943 shown in FIG. 16B. Otherwise control passes to block 951. In block 951 working store location LIMIT is set equal to the value stored in working store location NIN.

The NIN value was obtained from the byte $S_1$ of the incoming signal packet and is the sequence number of the last data packet which the data output routine is authorized to transmit. If this value is equal to the value stored in SSEQ then the data output routine has transmitted all that it is permitted to transmit and conditional branch point 952 passes control to block 955 where the working store location DOUT is set equal to thirty-two, indicating to the data output routine that it must wait for another ACK signal. If working store location LIMIT is not equal to working store location SSEQ, control passes from conditional branch point 952 to block 953 where an SCLEAR command is issued to data transmit buffer 451 with the effect that digital device 18 is permitted to write more data into that buffer. Block 954 sets DOUT equal to one, indicating to the data output routine that digital device 18 is now able to write into data transmit buffer 451. Control passes through blocks 954 and 955 to the end of the signal input routine at terminal indicator 943 shown in FIG. 16B.

The sequence starting at conditional branch point 956 shown in FIG. 16B handles the input of the SEL signal on behalf of the data input routine. Only if that routine is waiting for input will the SEL signal be accepted. Thus conditional branch point 956 checks to see if working store location DIN is equal to 0, and, if it is not, passes control to the end of the signal input routine at terminal indicator 943. If working store location DIN is 0, block 957 is obeyed. In that block the six-bit sequence number contained in the most significant six bits of byte $S_1$ of the incoming signal packet is extracted from working store location FIN. Conditional branch point 958 compares this sequence number with working store location RSEQ. If the two values are found to be equal, control passes to block 961. Otherwise control passes to block 959.

Block 959 sets an error code of eight in working store location DERR and then block 960 instructs the data input routine to request that the signal output routine send an ACK signal. This it does by setting DIN to four. After block 960, control passes to the end of the signal input routine, that is, to terminal indicator 943. In the case that control passes from conditional branch point 958 to block 961, the incoming SEL signal has been accepted and the channel number obtained from byte $S_2$ of the signal packet and currently stored in working store location NIN is copied onto the lines RCH which are input lines to channel break circuit 453.

Conditional branch point 962 compares the channel number now selected for data input and contained in working store location NIN with the channel number selected for data output and currently contained in working store location SELCH. If these values are equal, control passes to block 965. Otherwise, control passes to block 963. When these numbers are not equal, error code four is set in working store location DERR by block 963 and a BREAK command is sent to channel break circuit 453 by block 964. The effect of these actions is to make the number of the channel selected for data input available to digital device 18.

After block 964 control passes to block 965 in which the signal input routine sets DIN equal to eight, indicating to the data input routine that a new channel has been selected for data input. After this action has been taken, control passes to the end of the signal input routine at terminal indicator 943.

The sequence starting a conditional branch point 966 is obeyed if an RST signal is received. In that case, the value contained in byte $S_2$ of the incoming signal packet determines what further action should be taken. That value is currently stored in working store location NIN. Conditional branch point 966 transfers control to the RESTART entry point 754 of the signal input routine shown in FIG. 12 if the value in NIN is 0. Conditional branch point 967 transfers control to the START entry point 750 of the signal input routine shown in FIG. 12 if the value in working store location NIN equals 1. In the case that working store location NIN contains a value which is greater than 1, block 968 is obeyed. In block 968 working store location SOUT is set equal to two. This action is significant if the previous value of SOUT was three, indicating that the terminal interface unit is disconnected from the loop access module by protection relay 54 shown in FIG. 2B. By setting SOUT to two, terminal interface unit 17 will attach itself to the transmission line, an effect which is brought about by the initialization instructions shown in FIG. 12. After block 968, control passes to the end of the signal input routine at terminal indicator 943.

THE CONTROL COMPUTER PROGRAM

The program that resides in the control computer 30 of each switching unit 10 is a great deal more complex than the program that resides in the interface computer 62 of each terminal interface unit 17. Each switching unit 10 may have a plurality of transmission lines 12 attached to it as shown in FIG. 1A. Additionally, each switching unit 10 may have a plurality of transmission loops 14 attached to it as shown and each of these loops may interconnect through loop access module 16 up to 128 to terminal interface units 17. At any particular instant of time, the control computer 30 of each switching unit 10 will therefore be handling a large number of virtually allocated as well as actually assigned transmission paths. This function is performed in accordance with the illustrative embodiment of this invention by a plurality of functionally distinct routines and subroutines which are multiprogrammed by the Tempo I computer which serves as control computer 30. In order to facilitate the understanding of these routines and subroutines, the data structures that they use, which are illustrated in FIGS. 17–17L will first be discussed.

The major components in the data structures are blocks of thirty-two sixteen-bit words. Each of these blocks is termed a "descriptor." The manner in which the individual words of a descriptor are used depends upon what it is that the particular descriptor describes. Each TIU 17 shown in FIG. 1A has one descriptor which is stored in its associated switching unit 10. Each transmission loop 14 has one descriptor which is stored in its associated switching unit 10. Each transmission loop 14 has one descriptor which is stored in its associated switching unit 10. Each transmission line 12 has two descriptors, one stored in each of the two switching units 10 which it serves to interconnect. Similarly, each trunk has two descriptors, one in each of the switching units 10 which use it. Each channel has one descriptor stored in each switching unit 10 through which it passes. Finally, there is a single control unit descriptor in each control computer that describes the switching unit which it contains.

Figure 17A:
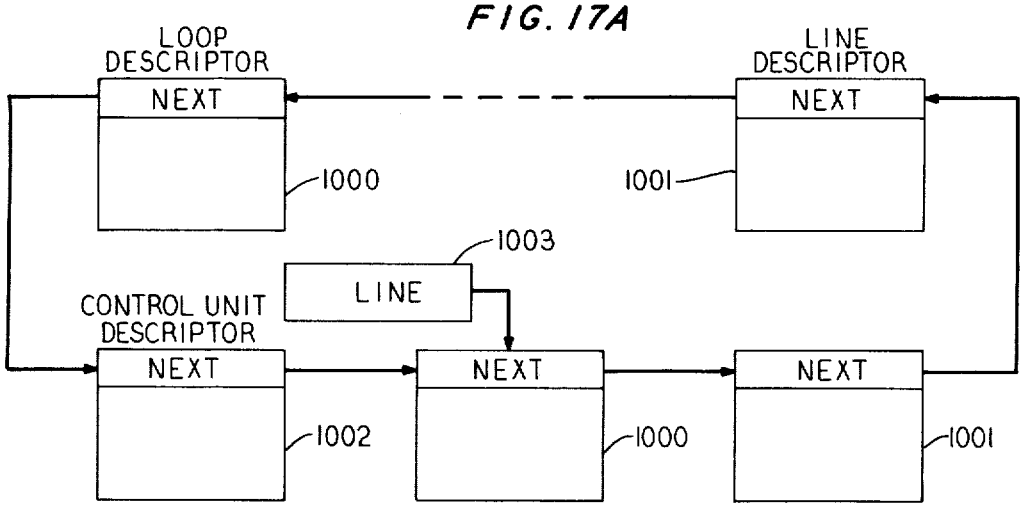

Referring then to FIG. 17A, it is seen that all of the transmission loop descriptors 1000, transmission line descriptors 1001 and control unit descriptor 1002 contained in a single control computer 30 memory are linked together by a circular pointer chain. Each pointer in this chain is contained in the NEXT field of each of these descriptors. For ease of discussion hereinbelow loop descriptors 1000, line descriptors 1001, and control unit descriptor 1002 are collectively referred to as "type 1" descriptors. A single storage location, LINE 1003, contains a pointer to that descriptor currently being processed by control computer 30.

Figure 17B:
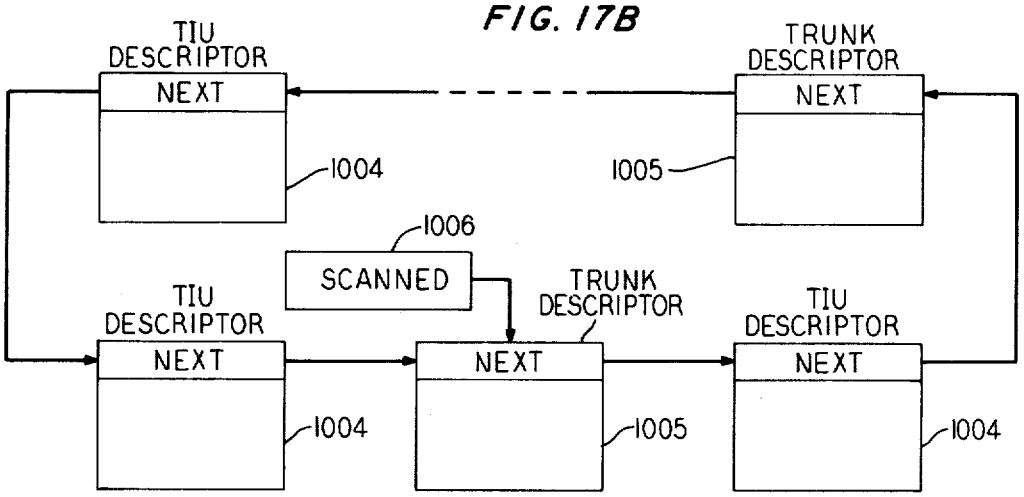

FIG. 17B shows a circular pointer chain of the TIU descriptors 1004 and trunk descriptors 1005 that are contained in a single control computer 30 memory. These descriptors are collectively referred to hereinbelow as "type 2" descriptors. The circular chain shown in FIG. 17B interconnects all type 2 descriptors contained in control computer 30 by means of a pointer in the NEXT field of each descriptor which points to the next descriptor in the chain. The single storage location SCANNED 1006 contains a pointer to that one of the type 2 descriptors that was last accessed by the timeout routine in the manner to be described hereinbelow.

Figure 17C:
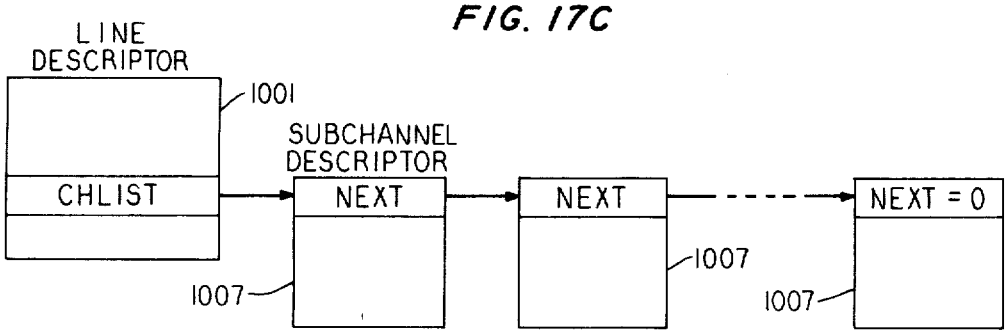

FIG. 17C shows another pointer which is contained in line descriptor 1001. This pointer, CHLIST, points to a chain of subchannel descriptors 1007. There are two subchannel descriptors for each virtual channel that is currently allocated in control computer 30. The pointer CHLIST shown in FIG. 17C points to a chain of the descriptors of those subchannels that are allocated to transmit data out of control computer 30 on a particular transmission line 12. In that chain the NEXT field of each subchannel descriptor 1007 contains a pointer to the next subchannel descriptor in the chain. The NEXT field of the last subchannel on the chain contains the value zero. The word CHLIST is zero if the chain is empty.

Figure 17D:
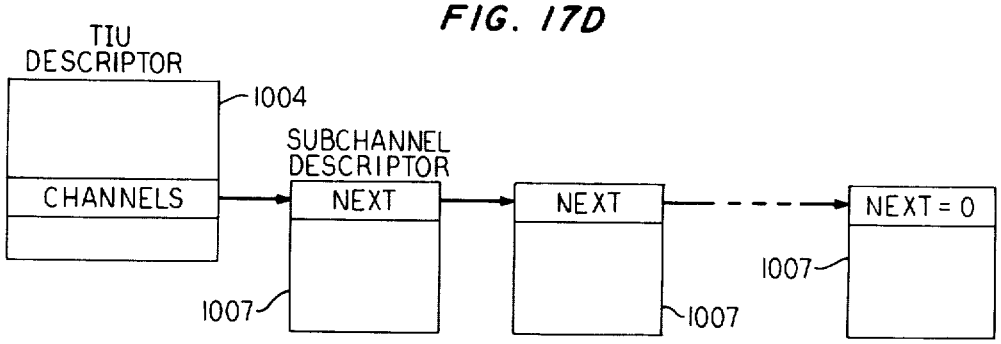

FIG. 17D shows another pointer which is contained in TIU descriptor 1004. This pointer, CHANNELS, also points to a chain of subchannel descriptors 1007. This chain comprises those subchannels which are allocated to transmit data to a TIU which is on a loop directly connected to the control computer 30. It can be seen in FIG. 17D that this chain is linked by the NEXT fields of subchannel descriptors 1007 in the same way as those of FIG. 17C. Also, the word CHANNELS is zero if the chain is empty.

Figure 17E:
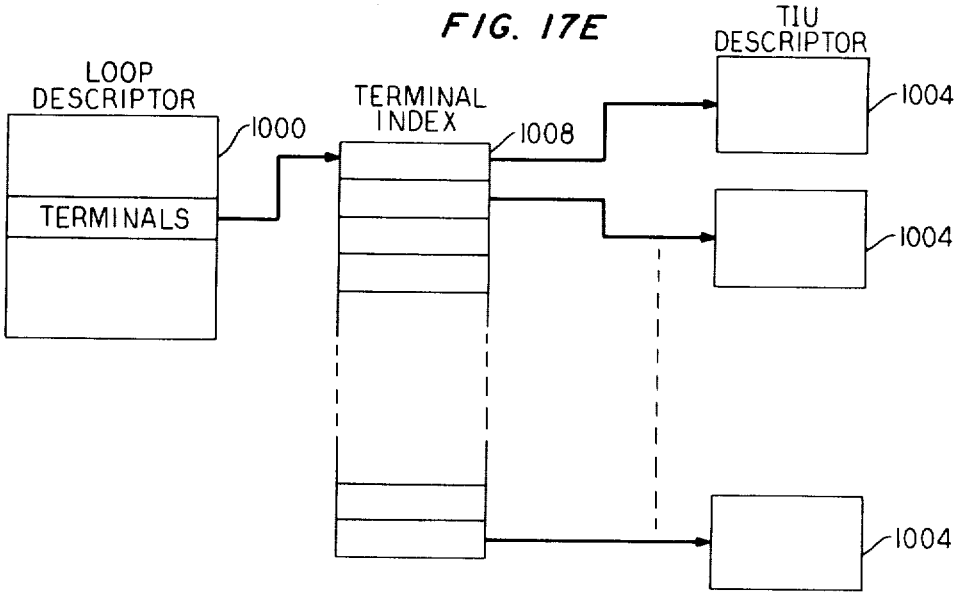

FIG. 17E shows another pointer which is contained in loop descriptor 1000. This pointer TERMINALS, points to terminal index 1008 which contains pointers to TIU descriptors 1004. Although not shown in FIG. 17E, each line descriptor 1001 also contains a pointer TERMINALS to a terminal index 1008. Each terminal index 1008 contains 128 entries, one for each TIU ID if the terminal index 1008 is associated with a loop descriptor 1000 and one for each trunk ID if the terminal index 1008 is associated with a line descriptor 1001. The position of an entry in the terminal index 1008 corresponds to the ID of the type 2 descriptor to which that entry points. For loop descriptors 1000, as shown in FIG. 17E, the entries in the terminal index 1008 correspond to TIU ID numbers.

Figure 17F:
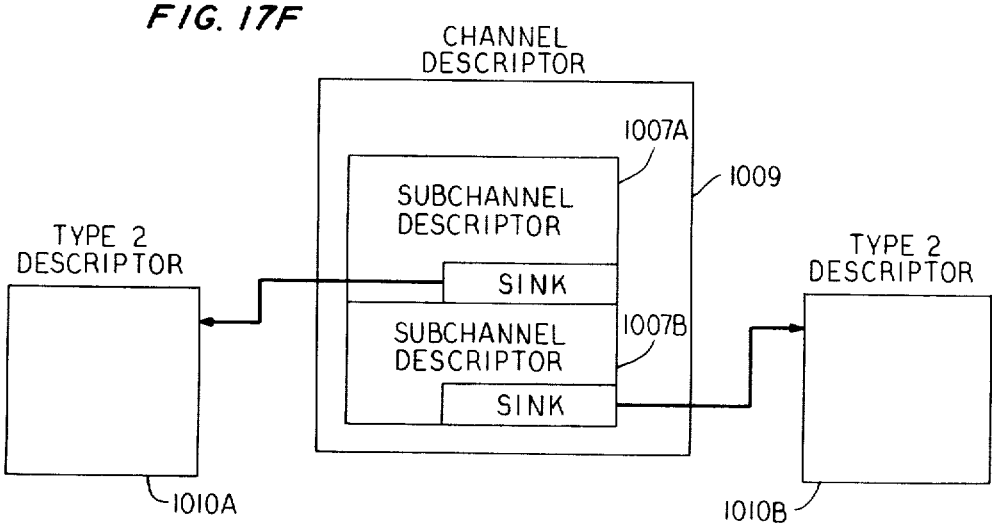

As previously mentioned, a full-duplex channel is described as a pair of subchannels. FIG. 17F shows that the pair of subchannel descriptors 1007A and 1007B for one channel comprise the channel descriptor 1009 for the channel. The thirty-two word channel descriptor 1009 contains a sixteen-word subchannel descriptor 1007A in its first sixteen words and a second sixteen-word subchannel descriptor 1007B in its second group of sixteen words. The SINK fields in each subchannel descriptor 1007A and 1007B contains pointers to the type 2 descriptors 1010A and 1010B, respectively, that correspond to the terminal interface units or trunks to which the subchannel is allocated for the transmission of data. In the case where a subchannel is allocated to transmit data to a trunk, the field SINK contains a pointer to a trunk descriptor 1005 only while a trunk is actually assigned to that subchannel. When assignment of a trunk has not been made the field SINK of a subchannel descriptor contains zero.

FIG. 17F can be correlated to the illustrative channel shown in FIG. 1B in the following manner. If channel descriptor 1009 shown in FIG. 17F is assumed to be associated with switching unit 20 shown in FIG. 20, then subchannel descriptors 1007A and 1007B of FIG. 17F correspond to the $\beta_{\tau 1}/\alpha_{\tau 2}$ and $\alpha_{Rn}/\beta_{R(n-1)}$ parameter pairs, respectively, and type 2 descriptors 1010A and 1010B correspond to the $\beta_{\tau 2}/\alpha_{\tau 3}$ pair and $\beta_{Rn}$ parameters, respectively.

Figure 17G:
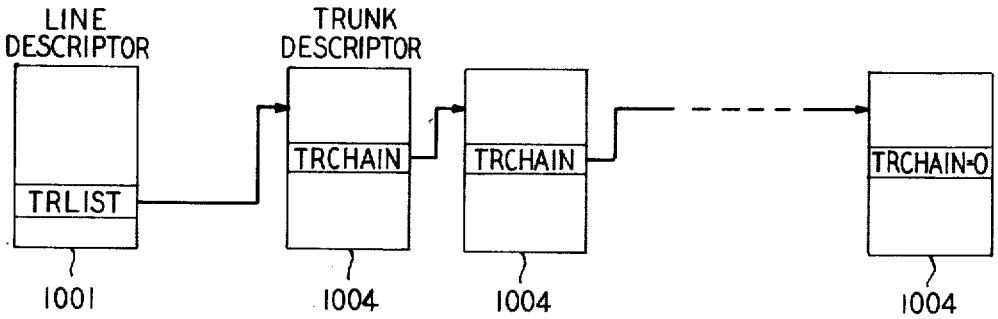

Referring then to FIG. 17G, there can be seen another pointer of line descriptor 1001. This pointer TRLIST, points to a chain of currently unassigned trunk descriptors 1005. TRLIST is zero if no trunk remains unassigned and otherwise contains a pointer to the trunk descriptor 1005 for the first unassigned trunk. Each trunk descriptor 1005 contains a pointer, TRCHAIN, to the next trunk descriptor, 1005 in the chain, and the TRCHAIN field of the last trunk descriptor on the chain contains zero.

Figure 17H:
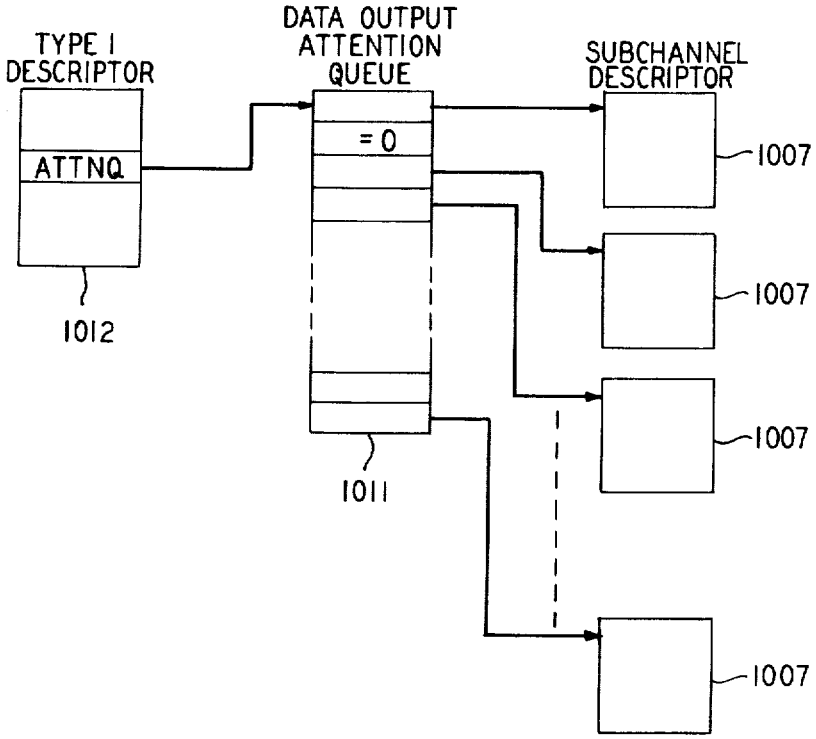

FIG. 17H shows a pointer, ATTNQ, which is contained in each type 1 descriptor. ATTNQ points to data output attention queue 1011.

When a subchannel has data ready for output an entry is made in the data output attention queue 1011 for the type 1 descriptor 1012 associated with the line onto which the data is to be transmitted. There is one queue 1011 for each type 1 descriptor. In each 250 microsecond interval one queue entry is processed. The position of the entry processed in the most recent interval is contained in the field DXLAST of the type 1 dscriptor. An entry in the attention queue 1011 is either zero or a pointer to a subchannel descriptor 1007 that has data ready for output.

Figure 17I:
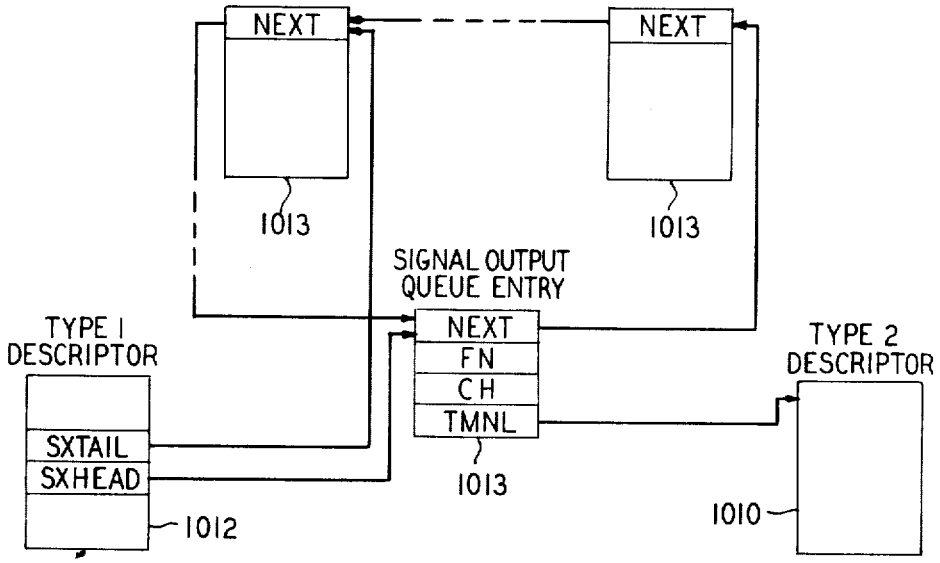
Figure 17J:
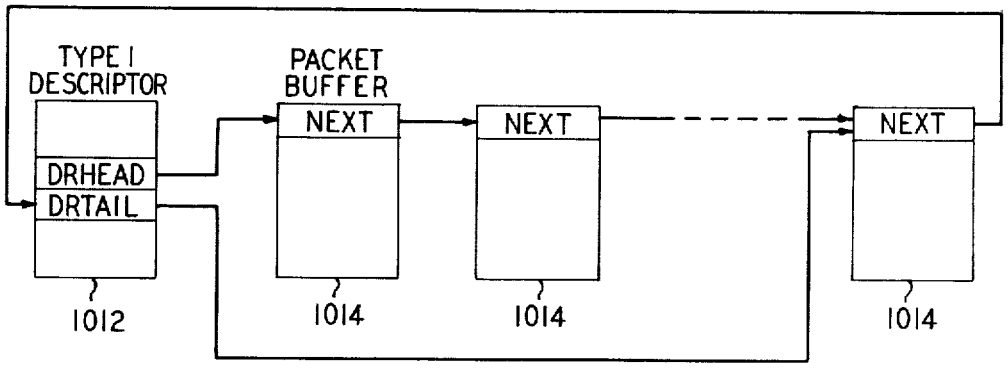

FIG. 17I illustrated a signal output queue. Each signal output queue entry 1013 comprises four words. The entries 1013 are chained to form a circular chain by for of the NEXT fields. There is one signal output queue for each type 1 descriptor 1012. The fields SXTAIL and SXHEAD in the type 1 descriptor 1012 contain pointers to queue entries 1013. All those queue entries 1013 in the circular chain starting at the entry pointed to by SXHEAD and terminating with the entry prior to the one pointed to by SXTAIL are the "active" queue entries. Each active queue entry specifies a signal that is to be sent out of the control computer. The field TMNL in each queue entry 1013 contains a pointer to the type 2 descriptor 1010 for the terminal or trunk to which the signal is to be directed. The fields FN and CH contain data to be used in constructing the second and third bytes, respectively, of the signal packet.

As each data packet is received at control computer 30 it stored is in a twenty-one word storage area which is known as a "packet buffer" 1014. After certain checks have been completed, the packet buffer is placed on a queue of packet buffers where it waits for service. This queue is shown graphically in FIG. 17J. There is one such queue for each transmission line and each transmission loop. The type 1 descriptors 1012 for each such transmission facility have fields DRHEAD and DRTAIL that contain pointers to the associated queue of packet buffers 1014. Field DRHEAD contains a pointer to the first packet buffer 1014 in the queue and DRTAIL points to the last packet buffer 1014 in the queue. Each packet buffer 1014 contains a pointer, NEXT, to the next packet buffer 1014 in the queue. The NEXT field of the last packet buffer 1014 in the queue contains a pointer to the storage location that contains DRTAIL for the type 1 descriptor 1012. When the queue is empty, DRHEAD contains a pointer to the location DRTAIL.

Figure 17K:
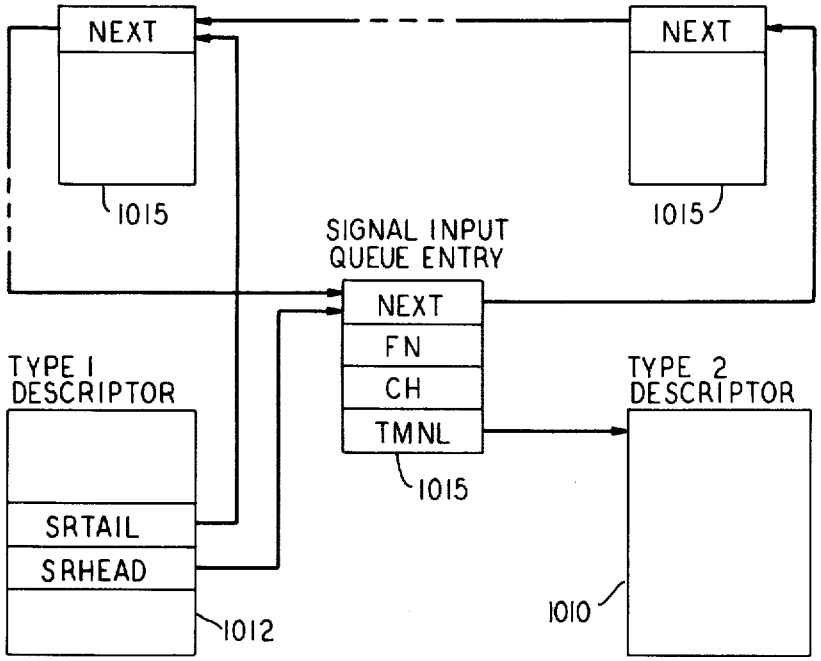
Figure 17L:
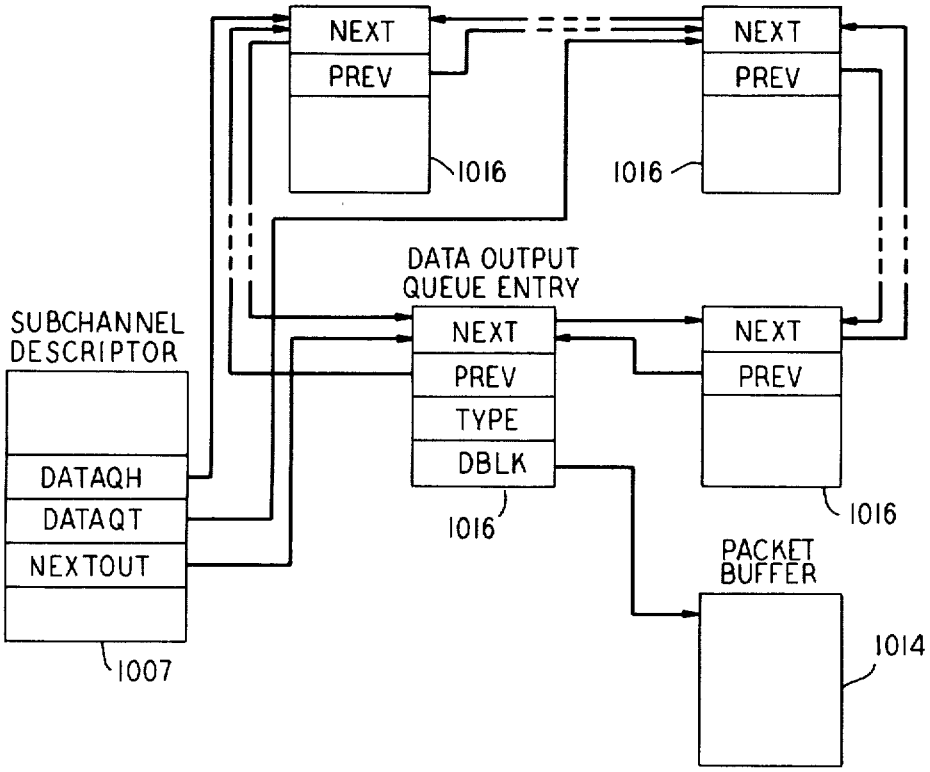

FIG. 17K shows a typical signal input queue that is associated with one type 1 descriptor 1012. Entries 1015 in that queue comprise four-word units which are formed into a circular chain by means of the NEXT fields in them. Each entry does not contain useful information at every instant of time. A pointer to the first that any particular time does contain useful information is stored in field SRHEAD of type 1 descriptor 1012. The queue entry 1015 pointed to by SRHEAD and successive entries on the circular chain up to but not including the one pointed to from the field SRTAIL, all contain useful information that is waiting to be processed. That information is derived from signal packets received at control computer 30. The field FN of a queuee entry 1015 contains a copy of the first two bytes from a signal packet, and the field CH contains a copy of the last two bytes from a signal packet. The TMNL field of queue entry 1015 contains a pointer to the type 2 descriptor 1010 to which the signal packet relates.

After processing, data packets are stored in a data output queue associated with the subchannel on which that data is being sent. FIG. 17L shows a data output queue. There is one such queeue for each subchannel descriptor 1007. The queue comprises entries 1016 of four words each that are chained together in a circular chain by means of the NEXT field in each entry 1016. As seen in FIG. 17L the chain formed by pointers in the NEXT fields of the data output queue entries 1016 is matched by a circular chain comprising pointers in the PREV fields of each entry 1016. The circular chain made from the PREV fields traverse the circle of queue entries in the reverse direction to that of the NEXT fields.

Three other pointers of interest appear in each subchannel descriptor 1007 to which a data output queue relates. These pointers are in fields DATAQH, DATAQT and NEXTOUT. The queue entries 1016 that currently contain information to be processed occupy successive positions around the circular chain starting with the particular entry 1016 that is pointed to by the field DATAQH and ending with the entry prior to the one pointed to by the field DATAQT. Data will have been transmitted from some of these queue entries 1016 but the entries remain in the data output queue until acknowledgement of the transmission is received at the control computer. A pointer to the first queue entry 1016 for which data has not been transmitted is contained in the field NEXTOUT. The field TYPE of each queue entry 1016 contains the value 2 if the associated data packet is the last of a message, otherwise the value is zero. The field DBLK in each queue entry 1016 contains a pointer to the packet buffer 1014 holding data to be transmitted.

In addition to these pointers, the data structures discussed in conjunction with FIGS. 17A–17L contain other pointers and data which are used by the program of control computer 30. In order to aid the detailed description of the various parts of this program, all of the data structure entries are listed below in Table VII.

TABLE VII

Type I Descriptor Fields

NEXT Pointer to next type 1 descriptor in a circular chain. Position in the data output attention queue 1011 of the last entry processed.

SXHEAD Pointer to the first active signal output queue entry 1013.

SXTAIL Pointer to the signal output queue entry 1013 following the last active entry.

DRHEAD Pointer to the first packet buffer 1014 in the queue of buffers waiting for input processing.

DRTAIL Pointer to the last packet buffer 1014 in the queue of buffers waiting for input processing.

SRHEAD Pointer to the first active signal output queue entry 1015.

SRTAIL Pointer to the signal output queue entry 1015 following the last active entry.

TERMINALS Pointer to the terminal index 1008.

ATTNQ Pointer to the data output attention queue 1011.

DXMASK Contains one less than the length of the data output attention queue 1011. That length must be a power of two.

TRLIST Pointer to the first trunk descriptor 1005 for an unassigned trunk.

CHLIST Pointer to the first sub-channel descriptor 1007 that has been allocated to output data on line described by the type 1 descriptor containing this field.

TRUNKDEBT This contains minus one times the maximum number of channels which can be virtually allocated to output data on the transmission line.

SIGCH Pointer to the sub-channel descriptor 1007 to be used for control messages on this transmission line.

CHLOW The lower bound on channel numbers that can be chosen by the control computer for use on this transmission line.

CHHIGH The upper bound on the channel numbers that can be chosen by the control computer for use on this transmission line.

Type 2 Descriptor Fields

NEXT Points to the next type 2 descriptor on a circular chain.

CHANNELS Points to the first subchannel descriptor 1007 with data output allocated to the terminal which this type 2 descriptor relates.

RSTAT Contains a status indicator for the input process.

RTIME Contains the time, in units of 250 microseconds at which the last input was received.

RSELCH Points to the subchannel descriptor 1007 selected for data input.

RSEQ Contains the sequence number expected in the next data packet received.

SSTAT Contains a status indication for the data output process.

STIME Contains the time, in units of 250 microseconds at which the last transmission was made.

SSELCH Pointer to the sub-channel descriptor 1007 selected for data output.

SELNO Contains the number of the channel currently selected for data output.

SSEQ Contains the sequence number used in the last data transmission.

ID Contains, in its most significant 8 bits the ID to be used for packets transmitted.

LOOP Points to the type 1 descriptor for the line with which this type 2 descriptor is associated.

V.IN Contains minus one times the number of packets not yet received but whose receipt has been authorized.

A.IN Contains the number of packets whose receipt can be authorized after receipt of the bundle currently being received.

V.OUT Contains minus one times the number of packets not yet transmitted but whose transmission has been authorized.

A.OUT Contains the number of packets that can be sent after completion of the current bundle.

N.OUT Contains the maximum bundle size for data output.

N.IN Contains the maximum bundle size for data input.

TRCHAIN Pointer to the next trunk descriptor 1005 of the same transmission line.

Subchannel Descriptor Fields

NEXT Points to the next subchannel descriptor 1007 of the same terminal interface unit or of the same transmission line.

SINK Pointer to the type 2 descriptor to which data output is to be directed.

DATAQH Pointer to the data output queue entry 1016 currently at the head of the queue.

DATAQT Pointer to the data output quenue entry 1016 following the last active queue entry.

NEXTOUT Pointer to the data output queue entry 1016 from which data is next to be taken for output.

VOL This 16 bit value contains, in the last significant eight bits a count of the active entries in the data output queue. In the most significant eight bits is a count of the packets which are the ends of a messages.

RATE This contains the minimum number of packet times that must elapse for each packet of data transmitted.

COSTAT A status indicator for the subchannel. It indicates the status for data output processing.

CRSTAT A status indicator for data output processing of the subchannel.

M.IN The number of packet buffers assigned to the subchannel at the start of burst transmission.

M.OUT The number of packets that should be collected before starting transmission of data.

ALLOC The maximum number of packet buffers that can concurrently be assigned to the subchannel.
MAXN.IN The maximum bundle size for data input.
MAXN.OUT The maximum bundle size for data output.
CHANNO The number used to identify the channel to the receiving terminal or trunk.
SLOOP Pointer to the type 1 descriptor to which this subchannel relates.

Packet Buffer Fields

NEXT Pointer to the next packet buffer in one chain.
TERM Pointer to the type 2 descriptor to which the packet in this packet buffer relates.
IDW A copy of the first two bytes of the data packet.
DLENGTH A copy of the third and fourth bytes from the data packet.
BODY An area of 17 words used to hold the data and checksum from a data packet.

Miscellaneous Fields Used by the Control Computer

TIME This location is increased by one for each 250 microsecond interval that passes.
SCANTIME This contains minus one times the time that must elapse before the next activation of the timeout routine.
SCANNED Points to the type 2 descriptor last processed by the timeout routine.
FREESPACE All those packet buffers not actually in use are chained, by their NEXT fields, and the first is pointed to form FREESPACE.
UNASSIGNEDSPACE Contains a count of the number of packet buffers that have not been assigned to any subchannel.
FREE32 A pointer to the first of a chain of 32 word storage areas that are all currently not in use.
FREE4 A pointer to the first of a chain of unused four word storage areas.
COUNT4 A count of the number of four word areas in the chain FREE4.
LOOPLIST The address of a 256 location index containing pointers to type 1 descriptors. Each such descriptor has an identity which is also the position of the pointer to it contained in this index.
SWLIST The address of a 256 location index relating to the 256 possible switching unit identities. An entry in this list is a pointer to the subchannel to be used to send messages to the switch in question.
SPACEDEBT This contains minus one times the maximum space allocation that can be made to new virtual channels.

MESSAGE FORMATS USED FOR COMMUNICATION WITH THE CONTROL COMPUTER PROGRAM

The control computer program that uses the above described data structures begins its operation with respect to a particular communication by responding to a request for the virtual allocation of a transmission path, and ends that operation by deallocating the path. This process requires communication between the control computer program and the remainder of the system. This communication uses messages having standard formats which are passed to the control computer 30 of the switching unit 10. These messages are sent by both the digital device 18, termed the "calling device," which is initiating the data transfer and the digital device 18, termed the "called device" which is to receive the data. Each messages comprises thirty-two bytes with the thirty-second byte being appropriately identified as an end-of-message as was discussed hereinbefore in conjunction with FIG. 11C.

Four different messages are used. A "connect" message is sent by the calling device to its associated switching unit to initiate channel allocation. An "accept" message is sent by the called device to its associated switching unit in response to the connect message if the called device is willing to accept data from the calling device. Otherwise, the called device sends a "reject" message. An "end-of-call" message is used by either the calling device or the called device to deallocate a channel.

When a calling device wishes to obtain allocation of a new channel it sends a connect message to the associated control computer. That message carries identification information which uniquely specifies the called device. The control computer transmits the connect message, to the called device. A function code in the first byte of the message allows the called device to identify the message as a connection request. If the called device wishes to accept the connection request, it adds certain information to the connection request, changes the function code to indicate acceptance, and returns the updated message to the control computer associated with the called device. If the called device wishes to reject the connection request, the function code in the request is changed to indicate rejection and the message is returned to the control computer.

An acceptance message contains all the information required by all of the switching units in the communication path to allocate one virtual channel. When acceptance is obtained, the acceptance message is returned in the calling device and at the same time the virtual channel is allocated. This is done on a link-by-link basis. Communication can start at any time after the calling device receives the acceptance message. In the case of a rejection, the rejection message passes from the called device to the calling device without further action on the part of any switching unit in the communication path.

Either the called or the calling device may cause a virtual channel to be deallocated by sending an end-of-call message to its associated control computer. That message is transmitted to the other device. As that transmission takes place, the virtual channel is deallocated on a link-by-link basis. Any data currently in transit on the virtual channel is lost.

As previously mentioned, by convention, all communication with the control computer must be made on channel zero and all messages transmitted from the control computer to a digital device are sent on that devices' channel zero.

A message of thirty-two bytes comprises two sixteen-byte parts. The first sixteen bytes contain a specification of the virtual channel for the calling device; the second sixteen bytes contain a specification of the virtual channel for the called device. The first byte, termed FUNCTION, of the specification for the calling device contains a function code indicating which type of message is being sent. If FUNCTION is one it indicates a connect request, if two it indicates an acceptance, if three it indicates a rejection, and if four it indicates an end-of-call. The remaining bytes of the two sixteen byte specifications are used in the same manner. The values will, of course, depend on whether the device being specified is the calling or the called device. These remaining bytes are as follows.

The second byte of a specification, termed AOUT, contains the amount of packet buffer storage space that is to be used in each switching unit through which the virtual channel passes. This number specifies a particular multiple of thirty-two bytes. The packet storage space is used to buffer all data passing away from the device in whose specification the number appears.

The third byte, termed "MIN," specifies, as a multiple of thirty-two, the number of bytes of packet storage space to be assigned at the start of each burst transmission. It applies to bursts of transmission away from the device in whose specification the number is contained.

The fourth byte, termed "NOUT," specifies, as a multiple of thirty-two, the number of bytes that should be collected in the switching unit before the start of delivery to the device in whose specification this fourth byte appears. In the case that a complete message contains fewer bytes than are indicated in this specification, delivery of the message will start when all of it has been assembled in the switching unit.

The fifth byte, termed "RIN," specifies the maximum rate at which the digital device to which the specification applies will accept data packets on the particular channel being specified. That rate is given as a multiple of six miscroseconds and is the time allowed for the delivery of one byte of data.

The sixth byte, termed "ROUT", specifies the expected maximum rate of data output during burst transmission. This rate also is expressed as a multiple of six microseconds and is the anticipated delivery time per byte transmitted.

The seventh, eighth and ninth bytes, termed "SWITCHNO," "LINENO," and "TERMINALNO," respectively, uniguely identify the digital device to which the specification relates. The SWITCHNO byte contains the identity of the switching unit to which the digital device is attached, the LINENO byte specifies the transmission loop on that switch, and the TERMINALNO byte contains the terminal interface unit ID.

The tenth byte, termed "CHANNELNO," specifies the channel number to be used by the digital device when communicating on the new virtual channel.

The eleventh through sixteenth bytes of a message are reserved for switching unit use. The eleventh and twelfth bytes together form a sixteen-bit value, termed "LOOPD," which is a pointer to a type 1 descriptor. The thirteenth and fourteenth bytes together form a sixteen-bit value, termed "TERMINALD" which is a pointer to a type 2 descriptor. The fifteenth and sixteenth bytes together form a sixteen-bit value, terminal "TRUNKN," which uniquely identifies the channel on a per-switching-unit basis.

The above-described data structures and message formats are used by the control computer program in the manner shown in the flow charts of FIGS. 18A–25N. These flow-charts describe the various routines and subroutines that make up the control computer program. The data output routine shown in FIGS. 21A and 21B is primarily responsible for implementing the data handling portion of the $\alpha$ process as performed by the control computer, while the data input routine shown in FIGS. 20A and 20B is primarily responsible for implementing the data handling portion of the $\beta$ process. The remaining routines and subroutines implement the remainder of these two processes.

As previously mentioned, the Tempo 1 compouter utilized in the illustrative embodiment of this invention is multiprogramed. The aforementioned routines and subroutines are thus actually divided into two subprograms, the level 1 subprogram and the level 2 subprogram. These subprograms are interrupt-driven with the level 1 subprogram having priority over the level 2 subprogram and serving to set the interrupt that drives the level 2 subprogram.

The routines and subroutines of the control computer program are shown in FIGS. 18A–25N on a functional basis. Various of the routines contain both level 1 and level 2 instructions. The level 1 instructions deal with the synchronous transmission lines 12 and transmission loops 14 shown in FIG. 2A. In fact, there is a complete set of level 1 instructions for each transmission line 12 and transmission loop 14 connected to control computer 30. The appropriate set is executed in response to the interrupt that is generated by a signal from one of the line terminating units 31 shown in FIG. 2A. That is, each line terminating unit 31 attached to control computer 30 controls its own individual interrupt line which activates the copy of the level 1 instructions associated with that particular line terminating unit 31. Since time is of the essence in dealing with the synchronous loops 14 and lines 12, the level 1 subprogram instructions are given higher priority than the level 2 subprogram instructions.

The routines and subroutines of the control computer program may be implemented in accordance with this illustrative embodiment by using the instruction set of the Tempo 1 computer. As will be obvious to those of oridinary skill in the art, the flow charts of FIGS. 18A–25N could be programmed in many differently detailed ways to execute the indicated processes. Indeed, the detailed steps in the flow charts could be accomplished in a plurality of different ways. These will be obvious from the discussion below of FIGS. 18A–25N taken in conjunction with the descriptions of the Tempo 1 computer that are provided in the Tempo 1 Interface Reference Manual, TA-1000-969, and in the Tempo Programmer's Reference Manual, E0002. Although the many ways of accomplishing the detailed steps that must be performed by control computer 30 will be obvious to those of ordinary skill, one particular sequence of suitable Tempo program instructions that may be used is shown in the familiar hexadecimal form in the listing of Appendix B. It can be seen that this listing contains two copies of the level 1 instructions and thus is capable of handling a single transmission loop 14 and a single transmission line 12. The listing of Appendix B was limited to two such copies of the level 1 instructions for brevity. The necessary additional coding for other loops 14 and lines 12 will be obvious to those of ordinary skill.

Turning then to the flow charts of FIGS. 18A–25N, it can be seen that these flow charts use the same symbols as were used in the flow charts of FIGS. 12–16B. Additionally, the rectangular operation block symbol is also used in FIGS. 18A–25N for the operation of calling a subroutine. Further, a hexagon is used to indicate a computed branch point which uses a computed value to determine its branch point.

CALL MANAGEMENT ROUTINE OF THE CONTROL COMPUTER PROGRAM

Figure 18A:
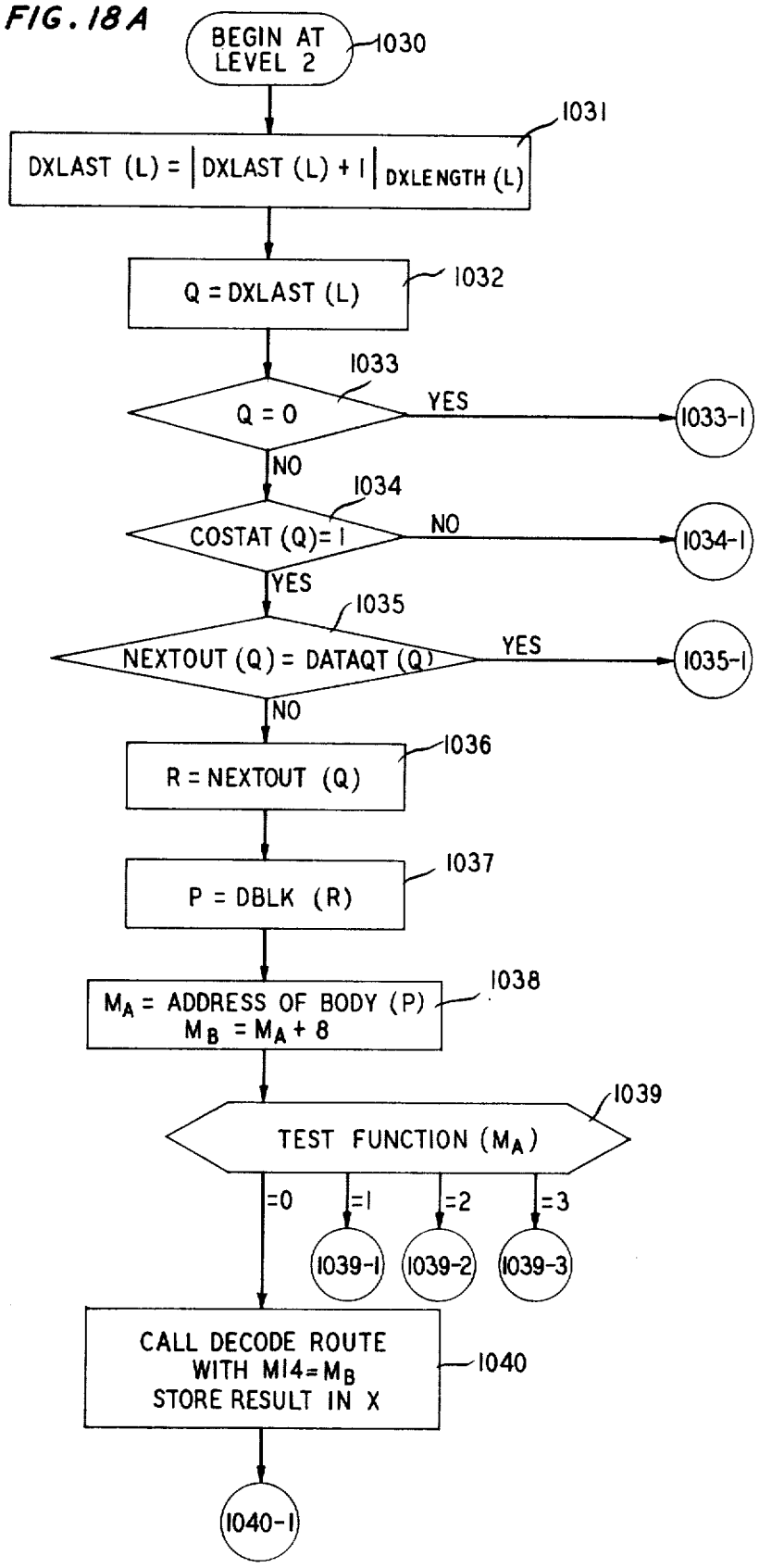
Figure 18B:
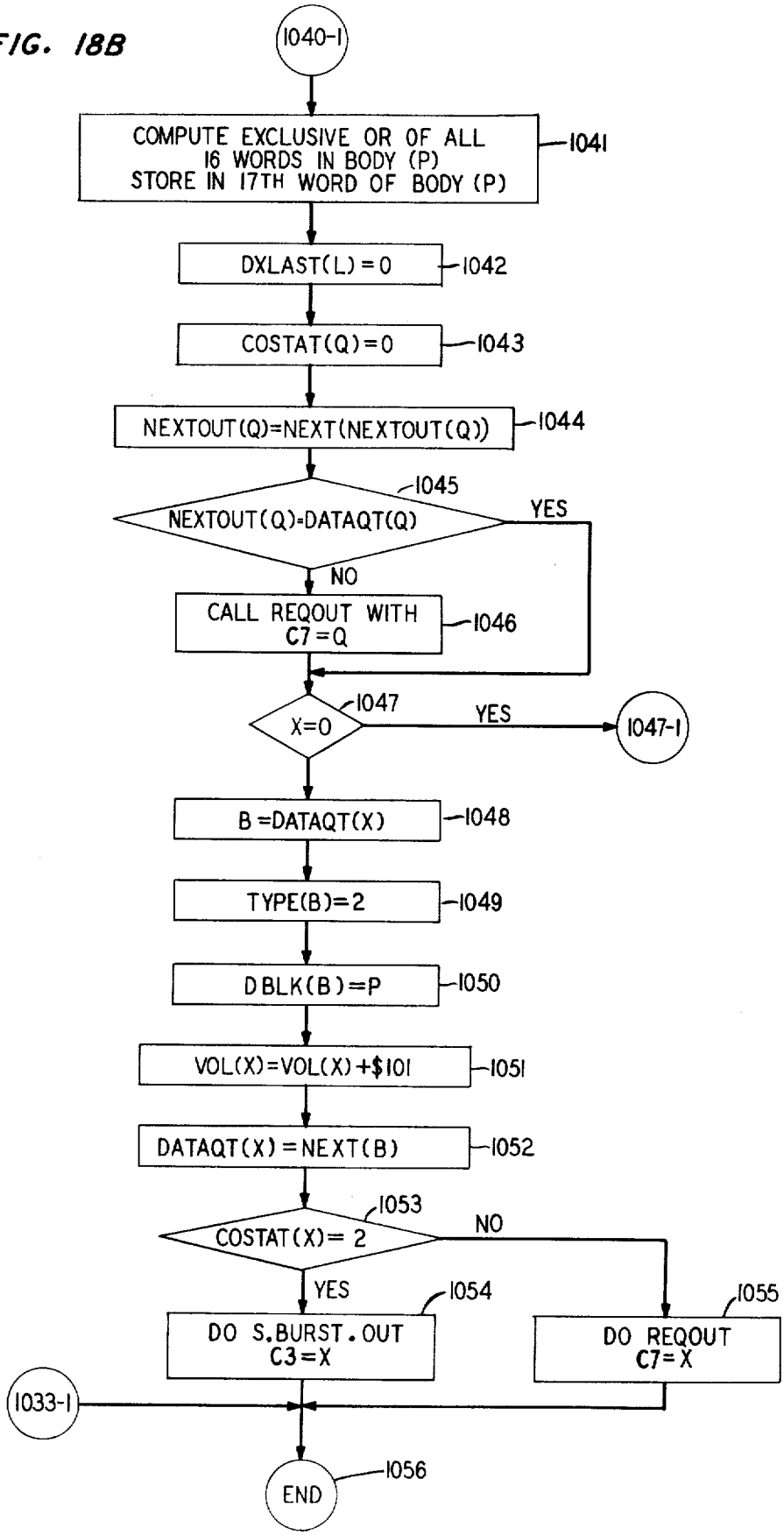
Figure 18C:
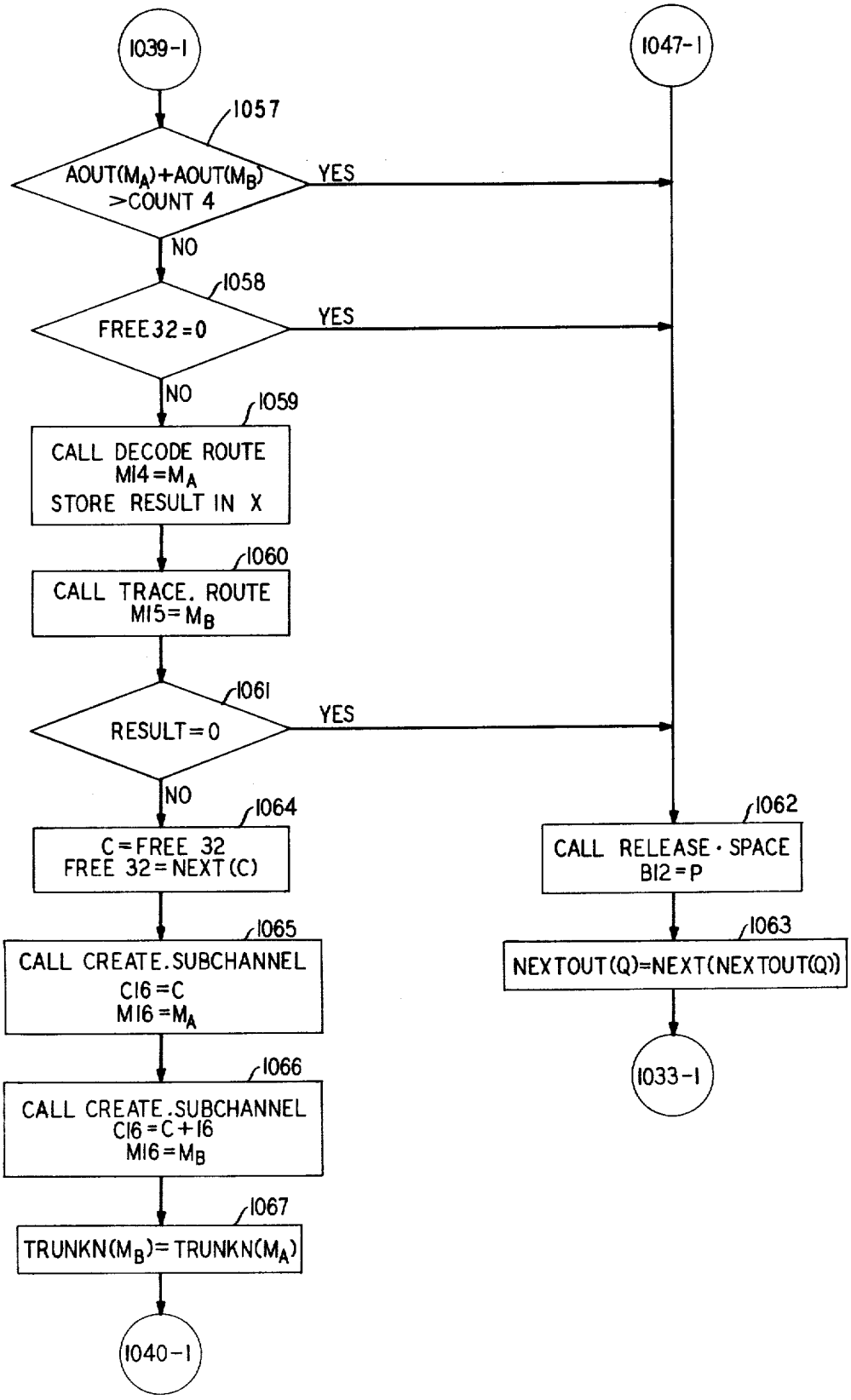
Figure 18D:
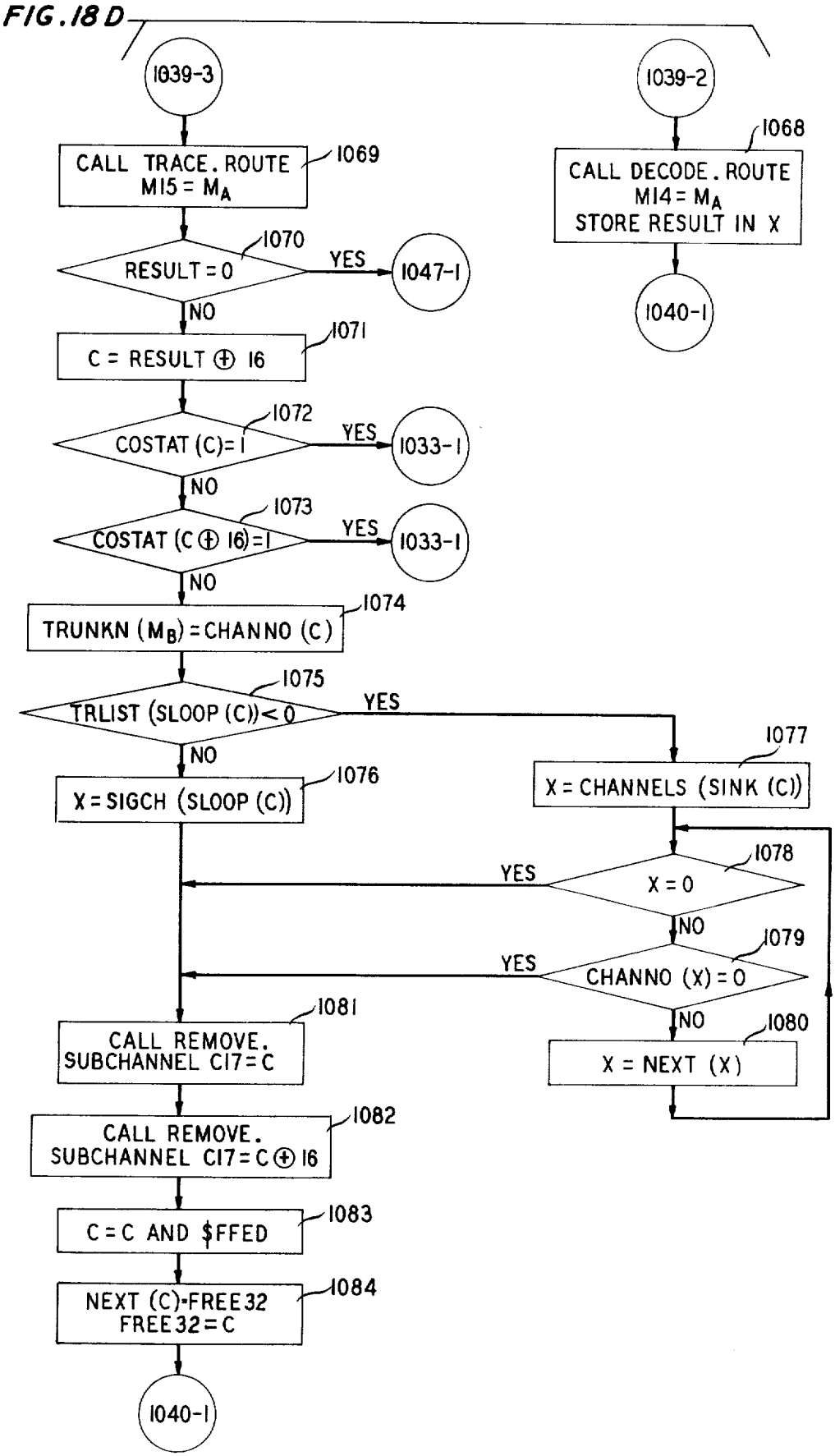

FIGS. 181–18D are a flow chart of the call managemnt routine.

All bytes contain numeric values expressed in the binary notation. As will be obvious to those of ordinary skill in the art, other message formats and other notations can be used without departing from the spirit and scope of this invention.

This routine handles all control messages, allocates virtual channels, and subsequently de-allocates them. The routine, which begins at block 1030, is a level 2 routine. This routine, like the others in the control computer program, uses the parameter "L." This parameter is a pointer to the type 1 descriptor 1012 as shown in FIG. 171 which corresponds to the loop or line with which the current execution of the routine is associated. In the case of the call management routine, it processes the data output attention queue 1011 shown in FIG. 17H associated with the control unit descriptor 1002. The pointer of that descriptor is stored in location L.

Block 1031 updates the field DXLAST of the control unit descriptor so that it then contains the position of the next entry to be processed. Since the queue is in consecutive locations and the number of these locations is DXLENGTH, the position of the next entry is obtained by adding one to DXLAST modulo DXLENGTH. This function is indicated in block 1031 in FIG. 18A by the term "|DXLAST(L)+1|$_{DX\text{-}LENGTH}$." It is to be noted that DXLAST(L) means "the DXLAST field of the descriptor pointed to by the pointer stored in location L.

Block 1032 then copies the next queue entry into temporary storage location Q. If this entry contains zero, then no action has been requested. Conditional branch point 1033 tests for this condition and transfers control to the end of the routine at terminal indicator 1056 shown in FIG. 18B if no action is required. If the attention request has been properly made the status field COSTAT in the subchannel descriptor whose pointer is in Q will be equal to 1. Conditional branch point 1034 transfers control to the end of the routine at terminal indicator 1056 shown in FIG. 18B if the status value is not 1. Conditional branch point 1035 then checks to see that there is in fact a data packet waiting to be processed. The field NEXTOUT in the subchannel descriptor pointed to by Q points to the next data output queue entry 1016 shown in FIG. 17L to be processed. The queue of data waiting to be output will be empty if that entry is the same as the one pointed to by DATAQT of the subchannel descriptor. When there is no data to process, conditional branch point 1035 transfers control to the end of the routine at terminal indicator 1056 shown in FIG. 18B. Otherwise block 1036 sets temporary location R equal to the pointer of the queue entry to be processed.

The field DBLK of the data output queue entry points to the packet buffer to be processed. The pointer to that buffer is put in temporary location P by block 1037. The data in that packet buffer is a control message. In block 1038 temporary location $M_A$ is set equal to the pointer to the first specification in that message, and temporary location $M_B$ is set equal to the pointer to the second specification in the message. Block 1038 then transfers control to computed branch point 1039.

The point to which computed branch point 1039 switches control depends upon the value of the FUNCTION code contained in the first byte of the message. If the FUNCTION code is 0, control passes to block 1040, if FUNCTION code is 1 control passes to conditional branch point 1057, shown in FIG. 18C, if the FUNCTION code is 2 control passes to block 1068, shown in FIG. 18D, and if the FUNCTION code is 3 control passes to block 1069, also shown in FIG. 18D.

Consider first the sequence starting at block 1040. This is obeyed when a connect message is received. Block 1040 calls subroutine DECODE.ROUTE, with M14 set equal to the pointer in $M_b$, which is used to set up the loop descriptor pointer LOOPD, the terminal descriptor pointer, TERMINALD, and the trunk identification number TRUNKN in the specification pointed to by $M_B$. This subroutine returns the pointer to the subchannel description to be used for control messages destined for the called device of the received connect message. This is stored in the temporary location X and control then passes to block 1041 shown in FIG. 18B.

Block 1041 computes the checksum for the data packet pointed to by P and stores it in the word following the sixteen words of data in the packet. The data output attention queue entry is then set to 0 by block 1042 and the status field COSTAT in the subchannel descriptor pointed to by Q is set to 0 by block 1043 indicating that there is now no attention request outstanding for the subchannel. Control is then transferred to block 1044.

The operation performed by block 1044 is seen in flow chart 18B to be defined as NEXTOUT(Q)=NEXT(NEXTOUT(Q)). The meaning of this notation is as follows:

First consider the expression NEXTOUT(Q). NEXTOUT(Q) denotes the field NEXTOUT in the subchannel pointed to by the pointer in location Q. NEXTOUT(NEXTOUT(Q)) thus denotes the field NEXT which is pointed to by the pointer in location NEXTOUT.

Considering now the entire expression shown in block 1044, it will be remembered that the expression "A=B" is understood by those of ordinary skill in he programming art to mean "store the contents of location B in location A." Thus a symbol to the left of the "=" symbol denotes a location while a symbol to the right denotes the contents of a location.

Thus block 1044 is seen to transfer the contents of NEXT to location NEXTOUT. Control is then transferred to conditional branch point 1045.

Conditional branch point 1045 transfers control to conditional branch point 1047 if the data output queue of the subchannel pointed to by Q is empty. That condition exists if the fields NEXTOUT and DATAQT are equal. If they are not equal control passes to block 1046 where a call is made on the subroutine REQOUT, with C7 set equal to the pointer in Q, to replace subchannel Q in the data output attention queue.

After block 1046, conditional branch point 1047 tests whether a destinatin for the control message was obtained. If location X contains 0 control passes to block 1062 shown in FIG. 18C. Otherwise, block 1048 copies the contents of field DATAQT in subchannel descriptor pointer to by X into temporary location B. Location B now contains the pointer of the next usable entry in the data output queue for subchannel X. The TYPE field in that entry is set equal to 2 by block 1049, and block 1050 sets the DBLK field to point to the packet buffer pointed to by P. Having thus constructed a new queue entry, the field VOL of the subchannel description pointed to by X is increased in value by the hexadecimal value $101 by block 1051, and the field DATAQT of the subchannel X is set to point to the next queue entry. The pointer of that entry is to be found in the field NEXT(B). Conditional branch point 1053 is then obeyed to check whether the subchannel field COSTAT is equal to 2. If so, control passes to block 1054, otherwise it passes to block 1055. Block 1054 calls subroutine S.BURST.OUT, with C(3)=X, which performs the housekeeping associated with the start of a new burst of data on subchannel X.

Block 1055 calls subroutine REQOUT to place subchannel X in the appropriate data output attention queue.

After either block 1054 or block 1055 has been obeyed, control passes to the end of the call management routine at terminal indicator 1056.

It was mentioned above that, upon recognizing a FUNCTION code of 1, computed branch point 1039 transfers control to conditional branch point 1057 shown in FIG. 18C. The sequence starting at that point handles the allocation of a virtual channel as it transmits the acceptance message back to the calling device. Conditional branch point 1057 tests whether there is sufficient storage space available for the data output queue entries that will be needed by the virtual channel. The number of entries required equals the sum of the message fields AOUT for each of the two devices. Since the queue entries are four word items, the sum is compared with COUNT4, the number of free four word units on the free store chain FREE4. If insufficient space is available, conditional branch point 1057 transfers control to block 1062. Conditional branch point 1058 next checks that there is a thirty-two word block of store available to hold the channel descriptor for the new virtual channel. If no such block exists, control passes to block 1062. Otherwise block 1059 is obeyed.

Block 1059 calls the DECODE.ROUTE subroutine which is given a pointer to the specification for the calling device to the requested channel. The subroutine sets up loop descriptor pointers, the terminal descriptor pointer, and the trunk number in the specification pointed to by $M_A$. It returns as its result the subchannel pointer of the subchannel to be used to send control messages to that device. This result is stored in temporary storage location X.

Block 1060 calls upon the subroutine TRACE.ROUTE which determines the loop descriptor pointer and terminal pointer of the calling device to the connection and places these data in the specification pointed to by $M_B$. The subroutine returns a result that in the pointer of another subchannel descriptor if one already exists for the same channel number as is used by the called device. Next conditional branch point 1061 transfers control to block 1062 if such a subchannel already exists. Block 1064 next obtains one block of 32 words from the free store list FREE32. To do this it copies the pointer currently in FREE32 into temporary storage location C and copies the pointer in the field NEXT of the block pointed to by C into location FREE32. Block 1065 uses the subroutine CREATE.SUBCHANNEL to construct the subchannel descriptor for the subchannel which transfers data from the called device to the calling device. The subchannel descriptor is constructed in the sixteen words starting at that word pointed to by temporary location C. Block 1066 then uses the subroutine CREATE.SUBCHANNEL to construct the subchannel descriptor for the subchannel that transfers data from the calling device to the called device. That descriptor is made up of the sixteen locations which are the last sixteen in the thirty-two locations pointed to by C.

Having thus constructed the channel descriptors, the call management routine transfers the trunk number from the field TRUNKN from the calling device's specification to the same field of the called device's specification, as shown in block 1067. The sequence then ends with a transfer of control to block 1041 shown in FIG. 18B which is the first of the sequence which sends the control message out on the subchannel pointed to by X.

Consider now the sequence that starts with block 1062. That sequence is obeyed whenever the control message has to be abandoned. First in the sequence, a call is made on the subroutine RELEASE.SPACE as shown in block 1062. That subroutine is given the pointer P of the packet buffer containing the message to be discarded. The routine returns the packet buffer to the free storage list FREESPACE. Block 1063 next updates the data output queue pointers NEXTOUT in the subchannel Q that held the message. To do this, it copies the pointer in the field NEXT of the queue entry pointed to by NEXTOUT into the field NEXTOUT. Control then is transferred to the end of the call management routine at terminal indicator 1056.

It was seen from the above that control is transferred to block 1068 shown in FIG. 18D if a reject message is received. The reject message is passed directly back to the calling device without any further action on the part of the call management routine. To effect this, block 1068 uses subroutine DECODE.ROUTE to obtain the pointer, in X, of the subchannel on which control messages to the calling device should be sent. That pointer is the computed result of the subroutine DECODE.ROUTE. After doing this, the call management routine transfers control to the sequence beginning at block 1041.

Control messages with a FUNCTION code of 3 are used to terminate a connection and to deallocate a virtual channel. Upon detecting one of these messages computed branch point 1039 transfers control to block 1069. Block 1069 shown in FIG. 18D calls subroutine TRACE.ROUTE to compute the loop descriptor pointer and terminal descriptor pointer for the calling device. This data is stored in the specification for the calling device as pointed to by $M_A$. The result of the subroutine TRACE.ROUTE is the pointer of the subchannel to be deleted. If no such subchannel is found, conditional branch point 1070 transfers control to block 1062. Otherwise, control passes to block 1071. The pointers of the two subchannels in the pair making one full-duplex channel differ by sixteen and, given the pointer of one, the other can be found by an EXCLUSIVE OR operation. In block 1071 the pointer of the subchannel which sends data to the called device is stored in temporary location C. Conditional branch points 1072 and 1073 transfer control to the end of the call management routine at terminal indicator 1056 if either of the status fields COSTAT in the two subchannels is equal to 1. Block 1074 transfers the value in field CHANNO of the subchannel pointed to by C to the TRUNKN field in the specification pointed to by $M_B$. If TRLIST in the type 1 descriptor pointed to by SLOOP in the subchannel descriptor pointed to by C is negative, then the type 1 descriptor is a loop descriptor and conditional branch point 1075 transfers control to block 1077. Otherwise it is a line descriptor and control passes to block 1076. Block 1076 sets in X the pointer to the subchannel descriptor which is pointed to by field SIGCH of the above-mentioned line descriptor. Control then passes to block 1081 which calls subroutine REMOVE.SUBCHANNEL to deallocate the subchannel pointed to by C. Block 1082 then uses the same subroutine to deallocate the other subchannel of the same channel. In blocks 1083 and 1084 the thirty-two word block containing the two subchannel descriptors is added to the free store chain FREE32. The pointer of the block is obtained by removing the least significant five bits of the pointer in C. The current head of the free store chain is copied from FREE32 to NEXT of the block and the pointer of the block is set in FREE32. Control then passes to block 1041.

When the subchannel descriptor pointed to by C is associated with a loop descriptor, conditional branch point 1075 passes control to block 1077. In that block temporary location X is set equal to the pointer of the first channel in the chain from the field CHANNELS of the terminal descriptor whose pointer is in SINK of subchannel descriptor pointed to by C. The loop consisting of conditional branch points 1078 and 1079 and block 1080 then searches for the subchannel descriptor with CHANNO equal to 0. In each cycle around the loop, block 1080 sets equal to the pointer in NEXT of the subchannel previously inspected. Conditional branch point 1078 transfers control out of the loop if the end of the chain of subchannels is reached. Conditional branch point 1079 transfers control out of the loop if a subchannel descriptor with CHANNO equal to 0 is found. The pointer of the descriptor so found is left in X. When control is transferred out of the loop it goes to block 1081 previously described.

SUBROUTINE DECODE.ROUTE OF THE CONTROL COMPUTER PROGRAM

The subroutine DECODE.ROUTE is shown in FIG. 19A. This subroutine is used to examine the specification for one device to a channel allocation request, that device's specification being pointed to by M14. The subroutine also computes a result which is the pointer to the subchannel descriptor which should be used to send control messages to the device specified.

The subroutine begins at terminal indicator 1090. Conditional branch point 1091 tests whether the field SWITCHNO specified for the device is equal to the unique identifying number for the switching unit in which the subroutine is being executed. If so, control passes to block 1097. If the call is being made to a device attached to another switching unit, block 1092 is used to obtain from the index of switching units the channel number of the channel to be used for messages to that switching unit. That index is SWLIST. Block 1092 sets C14 equal to the contents of the entry in SWLIST whose position in that list is equal to the switching unit number specified in the device specification. If C14 is set equal to 0, conditional branch point 1093 transfers control to block 1095. Block 1094 sets the loop descriptor pointer in the specification pointed to by M14 equal to the pointer in SLOOP of the subchannel descriptor pointed to by C14. The value in C14 is returned as the result of the subroutine as indicated in block 1095, and control is transferred to the end of the subroutine at terminal indicator 1096.

When the switching unit specified in the specification M14 is that of the switching unit in which this subroutine is being obeyed, control passes to block 1097. The line number specified in the specification M14 is then inspected and used to determine the position of an entry in the index LOOPLIST. In block 1097 the content of that entry is transferred location L14. L14 now contains either the pointer of the specified loop descriptor, or 0 if no such loop exists. Conditional branch point 1098 transfers control to block 1634 if the index entry is 0. The loop descriptor pointer for the specification pointed to by M14 is set equal to the value in L14. Next, the terminal number contained in the specification pointed to by M14 is transferred to location N14. That value is then used in block 1631 as the position of an index entry in the terminal index pointed to by TERMINALS of the loop descriptor pointed to by L14. In block 1631 the contents of that entry is copied to location T14. If T14 is 0, control is transferred to block 1634 by conditional branch point 1632.

Block 1634 then sets C14 equal to 0 and transfers control to block 1639A. If T14 is non-zero block 1633 is obeyed. That block sets the field TERMINALD in the specification pointed by M14 equal to T14. Next, C14 is set equal to the first subchannel pointer in the list CHANNELS for the terminal descriptor pointed to by T14. The loop consisting of conditional branch points 1636 and 1637, and block 1638 serves to search out the subchannel with CHANNO equal to 0. Each time round the loop block 1638 sets the pointer of the next subchannel to be inspected in C14. That pointer is obtained from the field NEXT of the preceding subchannel currently pointed to by C14.

Conditional branch point 1636 transfers control out of the loop if C14 is 0. Conditional branch point 1637 transfers control out of the loop if the subchannel with a 0 in the CHANNO field is found. After this search has terminated, block 1639A is obeyed. From that block it is seen that the result of the subroutine is the value in C14. Terminal indicator 1639 is the end of the DECODE.ROUTE subroutine.

TRACE.ROUT SUBROUTINE OF THE CONTROL COMPUTER PROGRAM

The subroutine shown in FIG. 19B is the TRACE.ROUT subroutine. It computes the loop descriptor and terminal descriptor pointers for the device that is the source of the control message now being processed and places these in the specification point to by M15. The subroutine returns a subchannel pointer as its result, that pointer being of the subchannel specified by the specification M15.

The subroutine starts at block 1640. In block 1641 it is seen that the type 1 descriptor pointer SLOOP in the subchannel descriptor pointed to by Q is copied into LOOPD for the specification M15. Conditional branch point 1642 tests whether the type 1 descriptor is a loop or line. If it is a loop the field TRLIST in the descriptor is negative and control passes to block 1645. If the type 1 descriptor is a line, control passes to block 1643. In block 1643 temporary storage location N15 is set equal to the trunk number in the specification pointed to by M15. Then in block 1644 temporary storage location C15 is set equal to the pointer CHLIST in the loop descriptor pointed to by SLOOP in subchannel descriptor Q. Control then passes to conditional branch point 1648. That branch point together with block 1650 form a loop in which a search is made for the subchannel descriptor with CHANNO equal to the value in N15. Each time round the loop block 1650 sets C15 equal to the pointer of the next subchannel and that pointer from the field NEXT of the subchannel currently pointed to by C15. Conditional branch point 1648 transfers control to block 1649A if the field CHANNO in the subchannel descriptor pointed to by C15 is equal to the value in N15. In block 1649A it is shown that the result of the subroutine is the value in C15. After block 1649A, control passes to the end of the subroutine at terminal indicator 1649.

REMOVE.SUBCHANNEL SUBROUTINE OF THE CONTROL COMPUTER PROGRAM

Subroutine REMOVE.SUBCHANNEL is shown in FIG. 19C. This subroutine is used to deallocate a single subchannel. The subroutine requires a single input parameter C17 which is a pointer to the descriptor for the subchannel to be deallocated. The subroutine begins at terminal indicator 1125. Conditional branch point 1126 transfers control to block 1134 if subchannel C17 is allocated to transmit data to a TIU. That fact can be determined by inspecting the field TRLIST of the type 1 descriptor pointed to from the field SLOOP in the channel descriptor. If TRLIST is negative the type 1 descriptor is a loop descriptor, otherwise it is a line descriptor. If the type 1 descriptor is a line descriptor control is transferred to block 1127 where a pointer to that type 1 descriptor is copied into the temporary storage location L17. In block 1128 the temporary storage location A17 is set equal to the pointer contained in the field CHLIST of the type 1 descriptor pointed to by L17. Conditional branch point 1129 then transfers control to conditional branch point 1132 if the pointers in locations A17 and C17 are not equal. If they are equal then the subchannel pointed to by C17 is removed from the chain starting at field CHLIST by copying the pointer from NEXT in the subchannel C17 to the field CHLIST in the line descriptor pointed to by L17. Control then passes to block 1138.

The sequence that begins with block 1134 removes the subchannel from the chain of subchannels for the TIU descriptor with which it is associated. Block 1134 sets in T17 a pointer to the TIU descriptor which is pointed to from field SINK of the subchannel descriptor pointed to by C17. Block 1135 copies into A17 the pointer from field CHANNELS of the TIU descriptor addressed by T17. Conditional branch point 1136 transfers control to block 1137 if the pointer now in C17 equals that in A17. If they are unequal control passes to conditional branch point 1132. Block 1137 copies the pointer from NEXT of the subchannel descriptor addressed by C17 into CHANNELS of the TIU descriptor pointed to by T17. Control then passes to block 1138.

The loop comprising block 1131 and conditional branch point 1132 searches for the chain position occupied by subchannel descriptor C17. In each cycle of the loop, block 1131 sets a pointer to the subchannel descriptor previously inspected in A17 taking that pointer from the NEXT field of the subchannel descriptor previously pointed to by A17. Conditional branch point 1132 transfers control out of the loop to block 1133 when NEXT of the subchannel descriptor A17 is that addressed by C17. Block 1133 copies the pointer from NEXT in subchannel descriptor C17 into NEXT of subchannel descriptor A17. Control then passes to block 1138.

The number of queue entries in the data output queue for subchannel C17 is to be found in the field ALLOC. That number is added, by block 1138, to the storage location COUNT4. In block 1139 a pointer from field NEXTOUT of he subchannel descriptor pointed to by C17 is copied into B17. Block 1140 places on the free store chain starting at location FREE4 all queue entries attached to the subchannel descriptor pointed to by C17. To do this, it sets NEXT in the queue entry pointed to by PREV in the queue entry pointed to by B17, then copies the pointer from B17 to FREE4. Control then passes to the end of the subroutine at terminal indicator 1141.

CREATE.SUBCHANNELL SUBROUTINE OF THE CONTROL COMPUTER PROGRAM

Subroutine CREATE.SUBCHANNEL, shown in FIG. 19D, is used to allocate one virtual subchannel by completing the subchannel descriptor pointed to by C16. The specification for the destination of data on that subchannel is pointed to by M16. The subroutine starts at terminal indicator 1145. Conditional branch point 1146 transfers control to block 1148 if the pointer in M16 equals that in $M_A$, otherwise it transfers control to block 1147. In block 1148 N16 is set equal to the pointer in $M_B$, and in block 1147 N16 is set equal to the pointer in $M_A$. Block 1149 sets the ALLOC field of the subchannel pointed to by C16 equal to the specification field AOUT in the specification pointed to by N16. Block 1150 sets the M.IN field of the subchannel pointed to by C16 equal to the value in the MOUT field of the specification pointed to by N16. Conditional branch point 1151 transfers control to block 1155 if the field ROUT of the specification pointed to by N16 is greater than a pre-specified constant RLIMIT, and block 1155 sets field MAXN.IN of the subchannel pointed to by C16 equal to 1. Conditional branch point 1152 transfers control to block 1153 if the field MOUT of the specification pointed to by N16 contains a value greater than thirty-two, and block 1153 sets thirty-two in the field MAXN.IN of the subchannel pointed to by C16. Block 1154 copies the value from the field MOUT of the specification pointed to by N16 into MAXN.IN of the subchannel pointed to by C16.

Block 1156 makes a call on subroutine FIND.QUEUE to obtain in Q16 a pointer to the chain of queue entries. The length of that chain is set in L18 and is one more than the value in the AOUT field of the specification pointed to by N16. Block 1157 then copies the value from Q16 into the fields NEXTOUT, DATAQH and DATAQT, respectively, of the subchannel pointed to by C17. In block 1158 0 is set in field VOL of the subchannel pointed to by C16. Then the values 2 and 1 are set in the fields COSTAT and CRSTAT respectively of the subchannel descriptor pointed to by C16. Block 1161 copies the pointer from LOOPD of the specification pointed to by M16 into the field SLOOP of the subchannel pointed to by C16. If the field TRLIST of that type 1 descriptor is negative, conditional branch point 1162 transfers control to block 1175. Otherwise, conditional branch point 1163 checks to see if the field RIN of specification M16 is greater than the prespecified constant RLIMIT. If it is greater, control is transferred to block 1168, otherwise block 1164 is obeyed. Block 1164 copies from the field RIN of the specification pointed to by M16 into the field RATE of subchannel C16. Conditional branch point 1165 then tests the field MIN of the specification pointed to by M16 and if that field is greater than thirty-two, control passes to block 1166. Block 1167 copies from field MIN of the specification pointed to M16 into MAXN.OUT of the subchannel pointed to by C16. Block 1166 copies thirty-two into MAXN.OUT of the subchannel pointed to by C16. After either of these two blocks, control passes to block 1170. It was seen that control could be transferred to block 1168 from conditional branch point 1163. In block 1168 the field RATE of the subchannel pointed to by C16 is set equal to the prespecified constant RLIMIT. In block 1169 the value 1 is copied into field MAXN.OUT of the subchannel pointed to by C16, then control is transferred to block 1170 shown in FIG. 19E.

In blocks 1170, 1171 and 1172 the three fields M.OUT, SINK and CHANNO of the subchannel pointed to by C16 are set equal to the values in fields MIN, TERMINALD and CHANNELNO, respectively, of the specification pointed to by M16. The field NEXT in the subchannel pointed to by C16 is then set by block 1173 to be equal to the pointer in CHANNELS of the type 2 descriptor pointed to from field SINK of the subchannel pointed to by C16. The field CHANNELS of the type 2 descriptor is then set equal to the pointer in C16. Control then passes to the end of the subroutine at terminal indicator 1174.

Block 1175 is obeyed, as was indicated above, when conditional branch point 1162 determines that the field SLOOP of the subchannel pointed to by C16 points to a line descriptor. Blocks 1175, 1176 and 1177 respectively copy values 1, and 0 into the fields M.OUT, RATE and SINK of the subchannel pointed to by C16. Conditional branch point 1178 transfers control to block 1182 if the pointer in M16 is the same as that in $M_A$. Otherwise control passes to block 1179. Block 1179 copies from the field TRUNKN in the specification pointed to by M16 into the channel number field CHANNO of the subchannel pointed to by C16. Block 1180 sets temporary location L16 equal to the pointer in SLOOP of the subchannel pointed to by C16, Block 1181 copies the pointer from CHLIST in the line descriptor pointed to by L16 into the field NEXT of the subchannel pointed to by C16 before copying the pointer from C16 into the field CHLIST. After block 1181, control is transferred to the end of the subroutine at terminal indicator 1174.

When the pointers in $M_A$ and M16 are equal, the sequence beginning at block 1182 is obeyed. In block 1182 L16 is set equal to the pointer from field SLOOP of the subchannel pointed to by C16. A 1 is then added to the field TRUNKDEBT for the line descriptor pointed to by L16. In block 1184 temporary storage locations A16 and B16 are set equal to the value in fields CHHIGH and CHLOW of the line descriptor L16. Block 1185 then sets temporary storage locations K16 equal to the value in field CHLIST of the line descriptor pointed to by L16. A pointer to the field CHLIST of the line descriptor is set in J16. The loop comprising conditional branch point 1186 through 1189 and blocks 1193 through 1195 searches for an unused channel identification number in the chain of subchannel descriptors starting with that pointed to by K16. Conditional branch point 1186 transfers control to block 1190 if K16 contains 0. Conditional branch points 1187 then transfer control to block 1194 if the channel number in CHANNO of the subchannel descriptor addressed by K16 is either less than the value in B16 or not less than the value in A16. If the field CHANNO contains a value equal to that in A16, conditional branch point 1189 transfers control to block 1193. Otherwise, it transfers control out of the loop to block 1190. In block 1193 the content of location A16 is increased by one. Next, block 1194 copies the pointer from K16 to location J16. In block 1195 the pointer from field NEXT of the subchannel descriptor pointed to by K16 is copied into K16. Control then passes to block 1186.

As indicated above, the search for a spare channel identification number ends with a control transfer to block 1190. In block 1190 the field CHANNO of the channel descriptor pointed to by C16 is set equal to the value in A16. That value is then copied into the field TRUNKN of the specification pointed to by M16. The subchannel pointed to by C16 is then added to the chain of subchannels. This is done in block 1192 by copying the pointer from C16 into the field NEXT of the subchannel descriptor pointed to by J16, and by copying the pointer left in K16 into the field NEXT of the subchannel pointed to by C16. Control then is transferred to the end of the subroutine at terminal indicator 1174.

FIND.QUEUE SUBROUTINE OF THE CONTROL COMPUTER PROGRAM

The subroutine FIND.QUEUE shown in FIG. 19F is used to obtain a new queue comprising four word queue entries assembled into a circular chain by the fields NEXT and PREV, as was described hereinbefore. The subroutine takes one parameter from L18 and that is the length of the queue required. The subroutine begins at terminal indicator 1660 shown in FIG. 19F. Block 1661 sets a pointer to the first free four word block in T18, and block 1662 sets B18 equal to the same value. The loop comprising blocks 1663 through 1666 takes the required number of four word blocks from the chain starting at T18. Block 1663 copies the pointer from B18 to location E18. Block 1664 copies into B18 the pointer NEXT from the block currently pointed to by B18. Block 1665 then reduces the content of L18 by 1. Conditional branch point 1666 then transfers control back to block 1663 if the value in L18 is still greater than 0. The pointer now in B18 is placed in the location FREE4. Block 1668 makes the chain circular by setting the pointer in T18 into the field NEXT of the queue entry pointed to by E18. Block 1669 copies the queue entry pointer from T18 to B18. The loop comprising blocks 1760 to 1673 build up the chain of reverse pointers in fields PREV of the queue. Block 1670 sets the pointer from E18 into the field PREV of the queue entry pointed to by B18. Block 1671 copies the pointer from B18 to E18. Block 1672 copies into B18 the pointer in the field NEXT of the queue entry currently pointed to by B18. Conditional branch point 1673 returns control to block 1670 if the pointer in B18 does not equal that in T18. The pointer in T18 is returned as the result of the subroutine as shown in block 1674, and then control passes to the end of the subroutine at terminal indicator 1675.

DATA INPUT ROUTINE OF THE CONTROL COMPUTER PROGRAM

Figure 20A:
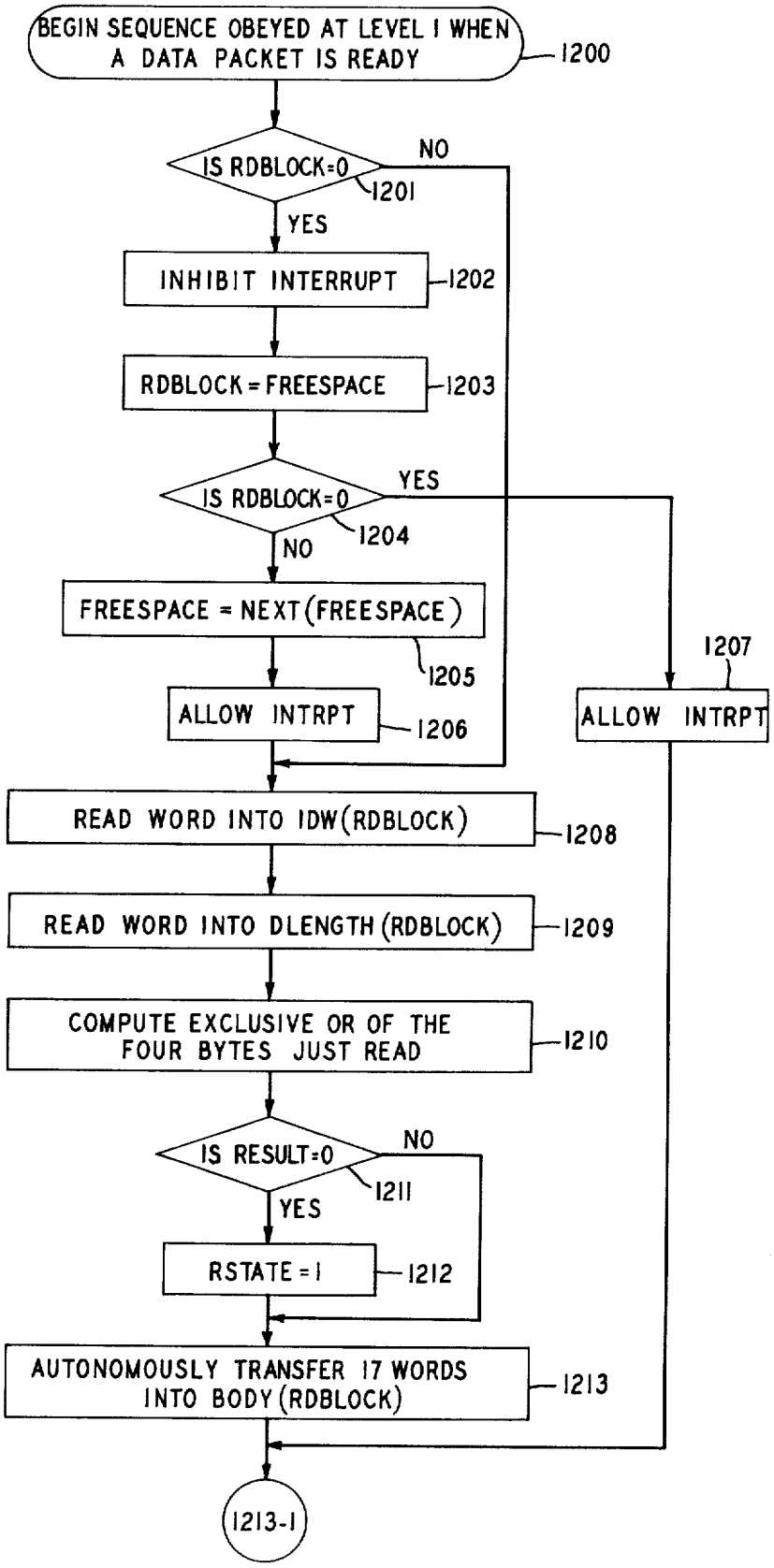
Figure 20B:
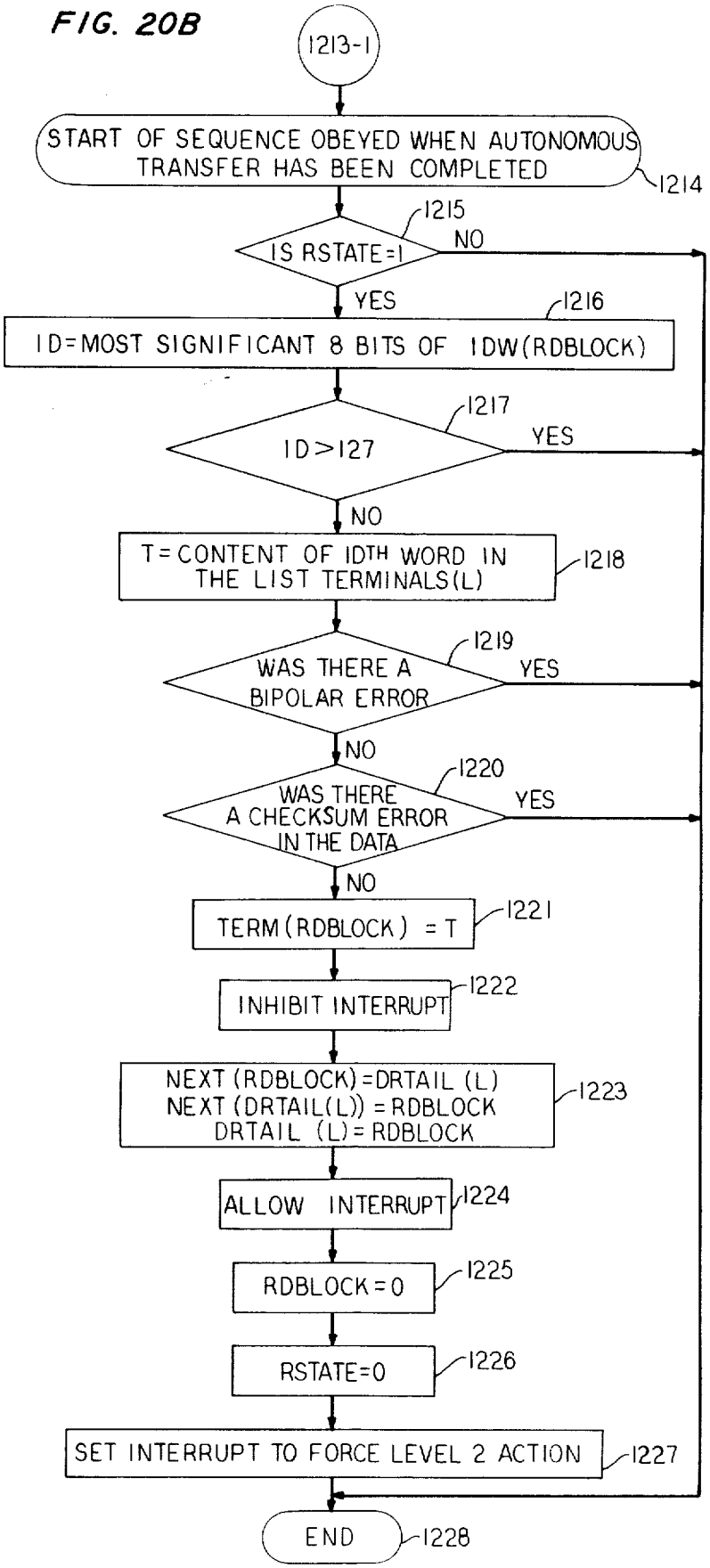
Figure 20C:
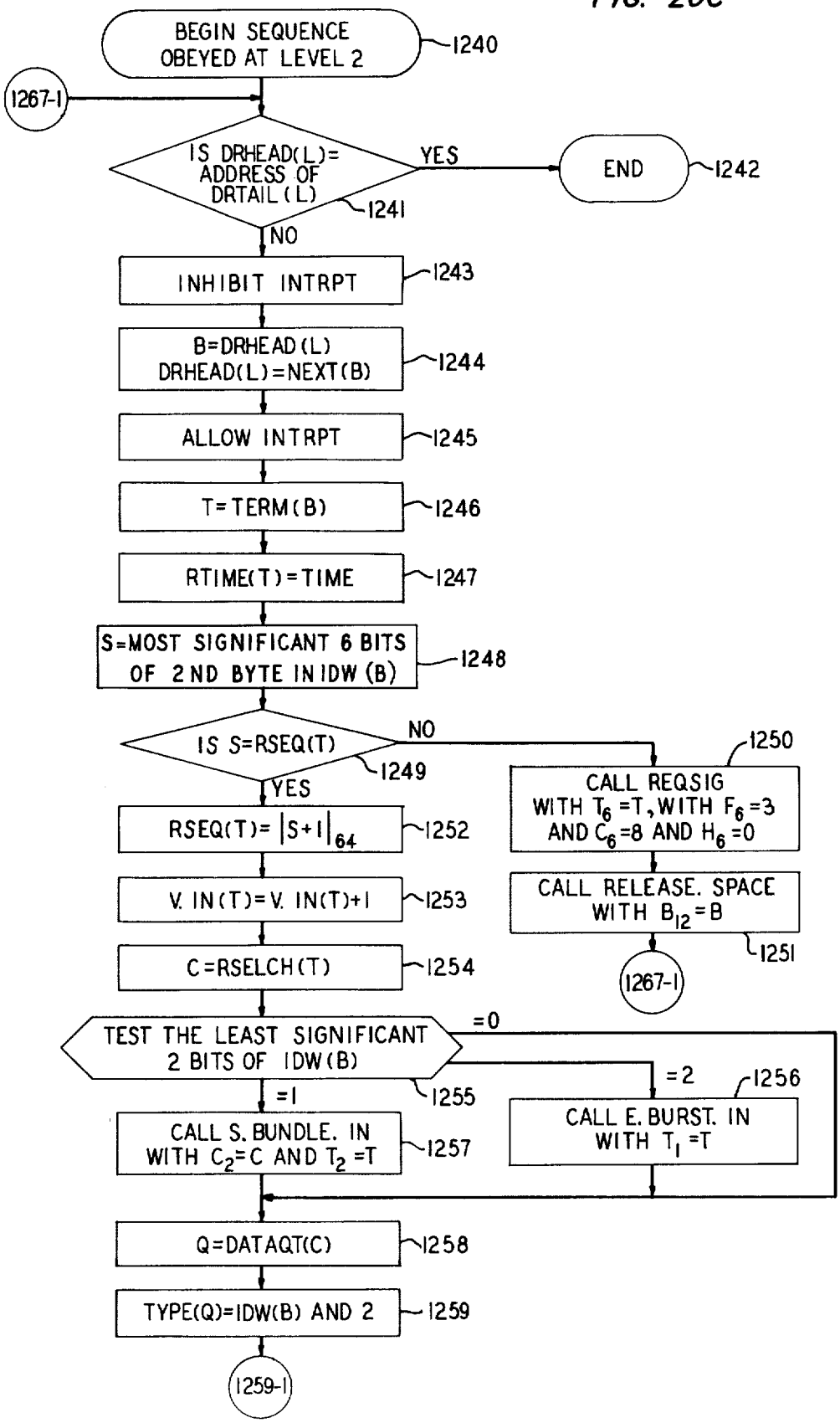
Figure 20D:
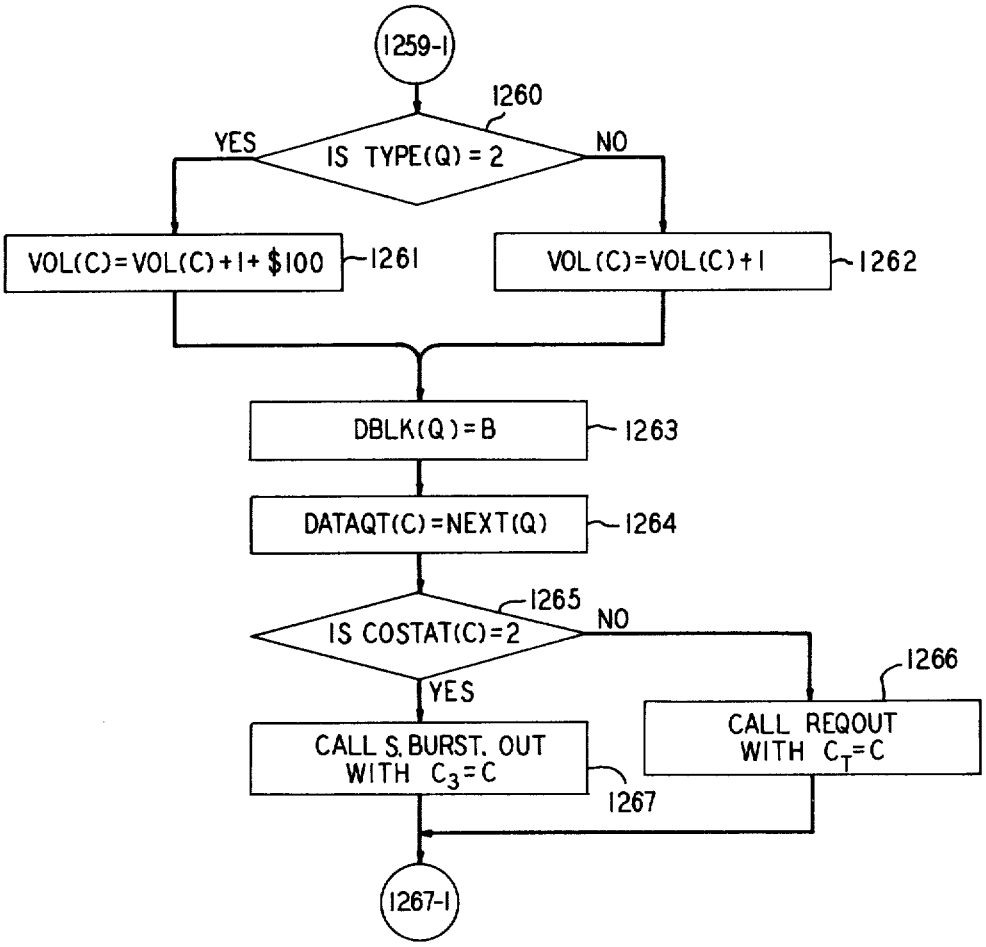

The data input routine is shown in detail in FIGS. 20A–20D. Referring to FIGS. 20A and 20C, it is seen that there are two program sequences in this routine. The first one, starting with block 1200, is obeyed at level 1. The other one, starting at block 1240, is obeyed at level 2.

Considering first the program sequence obeyed at level 1, shown in FIG. 20A, it is seen that this sequence is obeyed when the line terminating unit 31 has a data packet ready for collection by control computer 30. First in that program sequence is conditional branch point 1201 where a test is made on the working store location RDBLOCK. If that location is non-zero, then it will contain the address of a packet buffer which can be used to store a new incoming data packet. If RDBLOCK is zero, then the data input routine must obtain a packet buffer from the communal supply. Conditional branch point 1201 therefore transfers control to block 1208 if RDBLOCK already contains the address of a packet buffer. Otherwise, control passes to block 1202.

In order to avoid timing problems, the sequence beginning at block 1201 is obeyed with interrupts inhibited. The communical storage supply comprises a chain of packet buffers with the address of the first packet buffer stored in working store location FREESPACE.

In block 1203 it is seen that that address is copied into RDBLOCK, then conditional branch point 1204 checks whether the address so obtained was non-zero. If it was, the address of the next packet buffer on the chain of free storage locations is copied by block 1205 into the storage location FREESPACE and in block 1206 interrupts are allowed. If the free storage supply is empty, then conditional branch point 1204 transfers control to block 1207 where interrupts are allowed.

After block 1207, control passes to block 1214. Returning now to the usual course of events, after block 1206 is executed, control passes to block 1208 where the first sixteen-bit work is read from line terminating unit 31 into control computer 30 and stored in field IDW of the packet buffer addressed by RDBLOCK. Next, in block 1209, another sixteen-bit word is read from the line terminating unit 31 into control computer 30 and stored in field DLENGTH of the packet buffer addressed by RDBLOCK. The two sixteen-bit words read by blocks 1208 and 1209 comprise the first four bytes of the incoming data packet. The last of these bytes is a checksum which is the EXCLUSIVE OR of the first three bytes. Therefore, if no errors have occurred during data transmission, the EXCLUSIVE OR of all four bytes as computed by block 1210 should yield a result of 0. A test of that case is made by conditional branch point 1211 where control is transferred around block 1212 to block 1213 if the result is non-zeroand therefore indicates an error. When no error is detected control passes from conditional branch point 1211 to block 1212 where working store location RSTATE is set equal to 1 to indicate that the input of the data is in progress.

The interconnection of the line terminating unit 31 and the Tempo I computer makes use of the high rate I/O feature described in the aforementioned Tempo programmers reference manual. Using the mechanism described therein, the seventeen remaining words comprising the thirty-four remaining bytes of the incoming data packet are transferred autonomously into field BODY of the packet buffer pointed to by RDBLOCK as indicated in block 1213. When the autonomous transfer is complete, execution of the data input routine continues at terminal indicator 1214 shown in FIG. 20B.

Conditional branch point 1215 tests the value of RSTATE which is equal to 1 if, in fact, a data packet was being read. If that was not the case, conditional branch point 1215 transfers control to the end of the data input routine at terminal indicator 1228. Otherwise, control passes to block 1216. The first byte of the data packet is contained in the most significant eight bits of the field IDW in the packet buffer pointed to by RDBLOCK. That byte, as shown in block 1216 is extracted and transferred to temporary storage location ID. The value so obtained is the identity of a TIU, or trunk, and should not be greater than one hundred twenty-seven. If the contents of storage location ID exceed one hundred twenty-seven, then conditional branch point 1217 transfers control to the end of the data input routine at terminal indicator 1228. Otherwise control passes to block 1218.

Associated with the transmission line or loop on which the data packet arrived is a type 1 descriptor having the structure described above. The address of that descriptor is contained in storage location L. In that descriptor the field TERMINALS contains the address of a list of the type 2 descriptors relating to the terminals, or trunks, connected to that transmission line. The address of the type 2 descriptor contained in the list entry whose position in the list is equal to the value stored in temporary location ID relates to the TIU or trunk from which the data packet came. That descriptor address is transferred in block 1218 to temporary storage location T.

As was seen above, the line terminating unit 31 computes a sixteen-bit checksum of the data contained in the data packet and compares it with the final sixteen bits in the data packet. Status line 245 shown in FIG. 5E is used to test whether the comparison indicates that the data transmission error occurred. Another test for the data transmission error can be made by examining the status derived from line 224 shown in FIG. 5D. That line will be non-zero if the byte assembler 64 shown in FIG. 5E detected in a bipolar format error during the receipt of the data packet. Conditional branch points 1219 and 1220 test these error conditions and transfer control to the end of the data input routine at terminal indicator 1228 if either type of error was detected. Otherwise control passes to block 1221 where the field TERM in the packet buffer location addressed by RDBLOCK is set equal to the terminal descriptor address contained in temporary location T.

Having thus successfully read the data packet from the transmission line, the level 1 sequence of the data input routine adds the packet to a queue associated with the type 1 descriptor relating to the line or loop on which the packet arrives. In order to avoid timing troubles, this action is taken with interrupt inhibited as indicated by locks 1222 and 1224. The first-in-first-out queue is updated as shown in block 1223. The last entry currently existing on that queue is addressed by field DRTAIL in the type 1 descriptor addressed by L. To update the queue, the field NEXT in the packet buffer pointed to by RDBLOCK is set equal to the address of the end of the queue. Then field NEXT in the packet buffer currently at the end of the queue is set equal to the address contained in RDBLOCK. Finally, field DRTAIL in the type 1 descriptor addressed by location L is set equal to the address of the new end of the queue, namely, the address in RDBLOCK. Having thus disposed of the incoming data packet, and having used the packet buffer pointed to by RDBLOCK, the data input routine now writes 0 in RDBLOCK as illustrated in block 1225 and clears working store location RSTATE as illustrated in block 1226. Finally, in block 1227, the level 1 sequence of the data input routine sets an interrupt that will call the level 2 subprogram to be obeyed. A simple device controller connected to the Tempo I peripheral bus may be constructed in the manner which will be obvious to those of ordinary skill in the art so that when issued a Tempo I EDF instruction it sets the appropriate interrupt line.

That part of the data input routine which is obeyed at level 2 is shown in FIG. 20C, starting at terminal indicator 1240. That sequence tests the queue of data input packets stored in association with the type 1 descriptor with address L and for each packet contained on that queue performs the process starting at block 1240. Conditional branch point 1241 checks whether the queue is empty by inspecting the field DRHEAD contained in the type 1 descriptor with the address contained in storage location L. If the queue is empty, the address contained in DRHEAD is equal to the address of the field DRTAIL in the same type 1 descriptor. If that is the case, control passes to the end of the data input routine at terminal indicator 1242. Otherwise control passes to block 1243.

The next action taken at level 2 is to remove one data packet from the queue, pointed to by DRHEAD. That removal must be obeyed with interrupts inhibited if timing errors are to be avoided. Interrupts are therefore inhibited at block 1243 and the data packet is removed from the queue in block 1244. Finally, interrupts are allowed in block 1245. The specific action taken in block 1244 is first to store in temporary location D the address of the packet buffer containing the data packet being removed from the queue. The address of that packet buffer is obtained from field DRHEAD in the type 1 descriptor whose address is in L. A new value is then inserted in field DRHEAD of the type 1 descriptor, that address being the contents of the field NEXT in the packet buffer now addressed by temporary location B.

Field TERM of the packet buffer addressed by B contains the address of a type 2 descriptor and in block 1246 this address is transferred to temporary location T. Next, in block 1247 the current time measured in units of 250 microseconds is transferred in storage location TIME into field RTIME in the type 2 descriptor whose address is now contained in temporary location T. The sequence number of the data packet can be found in the most significant six bits of the least significant byte in field IDW of the packet buffer addressed by B. That sequence number is extracted in block 1248 and stored in temporary location S.

Next, conditional branch point 1249 compares S with field RSEQ in the type 2 descriptor whose address is contained in T. If these two six-bit numbers are unequal, then some transmitted data has probably been lost and a suitable error indication must be sent to the TIU or switching unit which originated the data. For this purpose, conditional branch point 1249 passes control to block 1250. Block 1250 calls subroutine REQSIG which places the request for transmission of the signal with function code three and CH field eight to the TIU or switching unit with the type 2 descriptor whose address is in T. After that call has been completed the packet buffer used to hold the incoming data packet must be returned to the common pool and for this purpose a call is made to subroutine RELEASE SPACE as shown in block 1251. The address of the packet buffer to be released is currently contained in temporary storage location B. After that, control passes back to the beginning of the level 2 sequence at conditional branch point 1241.

Returning now to conditional branch point 1249, it is seen that, if the sequence number contained in temporary location S is equal to the six-bit number stored in RSEQ of the type 2 descriptor whose address is contained in T, then control passes to block 1252. In block 1252 temporary storage location S is increased by 1, modulo 64, and the result is stored in field RSEQ of the type 2 descriptor addressed by T. In block 1253 the contents of field V.IN of the type 2 descriptor addressed by T is increased by 1. In block 1254, the address of the subchannel descriptor selected for data input is obtained from the field RSELCH in the type 2 descriptor addressed by T, and this subchannel descriptor address is stored in temporary location C.

The type of data packet received is to be found in the least significant two bits of the field IDW in the packet buffer addressed by B. Block 1255 is a computed branch point in which control is transferred to block 1258 if the type of the data packet is zero, to block 1257 if the type is equal to one, and to block 1256 if the type is equal to two. Thus, block 1256 is obeyed when the type of the incoming data packet equals two, indicating that it is the last packet in the message. The action taken in block 1256 is to call subroutine E.BURST.IN. This subroutine performs the housekeeping associated with the end of an input burst. After that subroutine returns, control passes to block 1258. Block 1257 is obeyed when the type of the incoming data packet is one, indicating that it is the last packet of a bundle. The action specified in block 1257 is to call subroutine S.BUNDLE.IN which performs the start-of-input-bundle housekeeping sequence on the subchannel addressed by C of the type 2 descriptor addressed by T. When that subroutine returns, control transfers to block 1258.

The next action to be taken is to place the input data packet on the first-in-first-out queue of packets belonging to the subchannel addressed by C and waiting for transmission on the next link of the subchannel. The end of that queue is to be found in field DATAQT of the subchannel descriptor addressed by C. The address of the queue entry is copied in block 1258 to temporary location Q. The field TYPE in queue entry addressed by Q is then set equal to two if the type of the incoming data packet is also equal to two. That action is shown in block 1259.

Conditional branch point 1260 then checks the type of the incoming data packet and transfers control to block 1261 if it is the last packet of a message. Otherwise it transfers to block 1262. The actions taken in these two blocks are required to maintain in the field VOL of the subchannel descriptor addressed by C a record of the volume of data held in the first-in-first-out queue. For each packet added to the queue, a 1 is added to the field VOL. In addition, for each end-of-message packet the hexadecimal value $100 is added to field VOL. Whichever action takes place, control then passes to block 1263, where the field DBLK in the queue entry addressed by Q is set equal to the address contained in location B, which is the address of the incoming packet. In block 1264 the field DATAQT in the subchannel descriptor addressed by C is updated so that it points to the next unused entry in the queue. Specifically, it is set equal to the contents of the field NEXT in the queue entry pointed to by Q.

Conditional branch point 1265 then tests the field COSTAT in the subchannel descriptor addressed by C. If that field is equal to two, the subchannel is waiting fro sufficient data to be collected to justify the start of a new output burst. Therefore, if COSTAT is equal to two, conditional branch point 1265 transfers control to block 1267 where a call is made to subroutine S.BURST.OUT which attempts to start a new output burst on the channel currently addressed by location C.

If the field COSTAT is not equal to two, then conditional branch point 1265 transfers control to block 1266 where a call is made to subroutine REQOUT which places a request for attention in the data output attention queue associated with the type 1 descriptor associated with line or loop which the subchannel specified by C sends data. After obeying either block 1267 or block 1266, control passes back to the beginning of the level 2 sequence of the data input, namely, to conditional branch point 1241.

DATA OUTPUT ROUTINE OF THE CONTROL COMPUTER PROGRAM

Consider now the data output routine shown in FIGS. 21A and 21B. That routine is obeyed entirely at level 1 and starts when line terminating unit 31 is ready to take data packet from control computer 30. It is assumed that the data output routine is activated once every 250 microseconds, that is, for every master frame time on the T1 line. On each occasion this routine is executed, it processes one entry on the data output attention queue pointed to by field ATTNQ in the type 1 descriptor pointed to by L. At the start of execution of the data output routine the field DXLAST in the type 1 descriptor pointed to by L contains the position of the entry processed during the last activation of the data output routine, so the first action taken by this routine is to update the field DXLAST so that it now points to the next queue entry. This is shown in block 1271. Since the queue is cyclic, occupying consecutive storage locations, it is necessary to increase the value contained in field DXLAST by 1, modulo the length of the queue.

Block 1272 uses the new value stored in field DXLAST as an index into the data output attention queue whose address is contained in ATTNQ of line descriptor addressed by L. The entry which this index gives is extracted from the list and copied into temporary location C. That entry will either be 0 or the address of a subchannel descriptor requiring attention by the data output routine. Conditional branch point 1273 tests to see which is the case and if it finds 0 transfers control to the end of the data output routine at terminal indicator 1300. Otherwise, control passes to block 1274. As shown in block 1274, the entry in the list ATTNQ, from which the value now contained in temporary storage location C was obtained, is set equal to 0.

When attention is requested on a subchannel, the field COSTAT in the subchannel descriptor is set equal to 1. Conditional branch point 1275 checks that this is true for the subchannel addressed by C, and, if it is not true, transfers control to the end of the data output routine at terminal indicator 1300. Otherwise, control passes to block 1276 where the field COSTAT in the subchannel descriptor pointed to by C is provisionally set equal to 0, thereby indicating that the attention request has been processed. The field SINK of the subchannel descriptor contains the address of the type 2 descriptor relating to the TIU or trunk to which data on that subchannel should be sent. The address of the type 2 descriptor is set in temporary location T as indicated in block 1277. In fact, the field SINK in the subchannel descriptor is 0, if the subchannel requires the use of a trunk but has not yet been assigned one.

Conditional branch point 1278 checks for this condition and transfers control to the end of the data output routtine at terminal indicator 1300 if no trunk has been assigned. If T in fact contains the address of the type 2 descriptor, then control passes from conditional branch point 1278 to conditional branch point 1279. At conditional branch point 1279 a test is made on the field SSTAT, which is the output status for the type 2 descriptor addressed by T. If that is non-zero then the terminal is not ready to output more data and conditional branch point 1279 transfers control to the end of the data output routine at terminal indicator 1300. Otherwise, control passes to conditional branch point 1280.

The first-in-first-out queue used to contain data packets waiting for transmission on a subchannel is pointed to by the field NEXTOUT contained in the subchannel descriptor. The last entry on that queue is pointed to by the field DATAQT of the subchannel descriptor. If the contents of these two fields are the same then there is no data to be output. Conditional branch point 1280 checks for this condition and if there is no data, then control is transferred to the end of the data output routine at terminal indicator 1300. Otherwise, control passes to block 1281.

The address of the queue entry for the packet next to be output is pointed to by the field NEXTOUT in the channel descriptor addressed by C. That pointer is copied into temporary location B by block 1281 and in block 1282 the field NEXTOUT is updated to point to the next queue entry, namely, the one pointed to by the field NEXT of the queue entry now pointed to by the temporary location D. Having now decided to output one more data packet, the data output routine adds one to the contents of the field V.OUT in the type 2 descriptor addressed by T. That action is taken in block 1283 shown in FIG. 21B.

If the new value of the field V.OUT is 0 then the packet must be the last of a bundle. If that is the case, conditional branch point 1284 transfers control to conditional branch point 1285, otherwise, control is passed to block 1288. Even if V.OUT is equal to 0, the data packet may be the last of a message. To test for this condition, the data output routine examines the field TYPE in the queue entry addressed by B. If that field contains the value two then the data packet is indeed the last of a message, and control is transferred from conditional branch point 1285 to block 1287. Otherwise, control passes to block 1286.

Block 1286 sets the value 1 in temporary location F and block 1287 sets the value two in temporary location F, and each then transfers control to block 1292.

Turning attention now to block 1288, it is seen that this sets the value two in temporary location F if the data packet is the last of a message since the field TYPE in the queue entry addressed by B will in these circumstances be equal to two. In all other circumstances it is 0. Conditional branch point 1289 now compares the field NEXTOUT and DATAQT in the subchannel descriptor addressed by C. If these fields are equal, then no more data is immediately available for output and control passes to conditional branch point 1291. Otherwise, control passes to block 1290. The action specified in block 1290 is to place the subchannel addressed by C into the data output attention queue belonging to the type 1 descriptor addressed by L. The actions taken here are precisely the same as those taken in subroutine REQOUT but in order to avoid timing troubles block 1290 is a copy of the body of that subroutine rather than being a call to that subroutine.

In conditional branch point 1291 a check is made on the type of the data packet being transmitted as stored in temporary location F. If that is zero, then it is not the last packet of a bundle or message and further transmissions are possible without the need to wait for an acknowledgment. When this is the case, control passes from conditional branch point 1291 to block 1293 where the field SSTAT in the type 2 descriptor addressed by T is set equal to zero. After block 1293, control passes to block 1294. In the case where the type of the data packet to be transmitted is non-zero, block 1292 is obeyed and there the field SSTAT in the type 2 descriptor addressed by T is set equal to 1. That value indicates that further transmission cannot take place until an ACK signal has been received. Control then passes to bloc, 1294.

As indicated in block 1294, the time at which data is transmitted is stored in the field STIME of the type 2 descriptor addressed by T. That time is obtained from storage location TIME where it is increased by 1 once every 250 microseconds. Block 1295 computes the sequence number of the data packet to be transmitted. It does this by adding 1 to the field SSEQ contained in the type 2 descriptor addressed by T and this addition is done modulo 64 since the sequence number is a six-bit quantity.

The first word to be transmitted as part of the data packet contains the ID of the TIU or trunk to which the packet is destined. The ID is obtained from the field ID in he type 2 descriptor addressed by T. The second byte of the data packet contains the sequence number of the packet in the most significant six bits and the type of the packet in the least significant two bits. In this case the sequence number is obtained from the field SSEQ in the type 2 descriptor addressed by T and the type of the packet is that value currently contained in temporary location F. As shown in block 1296, the first and second bytes of the data packet are assembled to form a complete sixteen-bit word and stored in temporary location D.

Block 1297 shows that the sixteen-bit value is transferred from control computer 30 to the line terminating unit 31 associated with the type 1 descriptor whose address is L. The third byte from the data packet is the length of data contained in the remaining part of the packet. In this case that length can be obtained from field DLENGTH in the packet buffer addressed by the field DBLK of the queue entry addressed by B. The third byte of the data packet is an eight-bit checksum which is the EXCLUSIVE OR of the preceding three bytes.

In block 1298 it is shown that the third and fourth bytes, respectively, of the data packet are assembled into a sixteen-bit word and written out to the line terminating unit associated with the type 1 descriptor pointed to by L. Transmission of the remaining seventeen words of the data packet is carried out autonomously using the aforementioned high-rate data transfer mechanism which is an integral part of the Tempo 1 computer. In this case, the seventeen words are obtained from the field BODY in the packet buffer addressed by the field DBLK which itself is contained in the queue entry addressed by B. This autonomous transfer is shown in block 1299, and once this transfer has been started, control passes immediately to the end of the data output routine at terminal indicator 1300.

SIGNAL INPUT ROUTINE OF THE CONTROL COMPUTER PROGRAM

The signal input routine is shown in FIGS. 22A–22F. That routine has sequences obeyed both at level 1 and at level 2. The sequence obeyed at level 1 starts at block 1310 in FIG. 22A and is obeyed when the line terminating unit 31 has a signal packet available for collection by control computer 30.

The level 1 sequence is used to transfer the contents of an incoming signal packet into a queue of signal packets awaiting the attention of the level 2 sequence for signal input. The next available position in that queue is pointed to by the field SRTAIL in the type 1 descriptor whose address is L. Block 1311 shows that the address of this queue entry is copied into the temporary working location B. Next, block 1312 shows that a sixteen-bit word is read from the line terminating unit 31 associated with the type 1 descriptor addressed by L into the field FN of the queue entry addressed by B. In block 1313, the second word of the incoming signal packet is read from the same line terminating unit 31 and placed in field CH of the queue entry addressed by temporary location B.

The fourth byte of a signal packet is always a checksum which is the EXCLUSIVE OR of the preceding three bytes. Therefore, by computing the EXCLUSIVE OR of all four bytes in the signal packet a result of 0 should be obtained. That computation is shown in block 1314 and a test for the 0 result is made in conditional branch point 1315. When a zero result is not obtained, a transmission error has probably occurred and control passes from conditional branch point 1315 to the end of the signal input routine at terminal indicator 1324. Otherwise, control passes from conditional branch point 1315 to block 1316. The first byte of the signal packet contains the identification of the terminal interface unit or trunk to which that signal packet relates. For the signal packet just read, the identification byte can be found in the most significant eight bits of the field FN in the queue entry addressed by B. Block 1316 shows that this identification field is transferred to the temporary storage location ID. When transmission is between a terminal interface unit and a switching unit, two different IDs are used, the difference between their values being 128. The smaller value is used for transmissions out of the terminal interface unit into the switching unit and the larger value is used for transmission out of the switching unit into the therminal interface unit. There is no such convention for packets transmitted between two switching units. Conditional branch points 1317 and 1318 therefore provide a test for packets transmitted by a switch around the transmission loop that is not being picked up by a terminal interface unit and therefore have arrived at the switching unit. Conditional branch point 1317 transfers control around conditional branch point 1318 to block 1319 if the type 1 descriptor pointed to by L is not a loop descriptor. That fact can be determined by looking for a negative value in the field TRLIST contained in the type 1 descriptor addressed by L.

In the case where L is a loop, control passes to conditional branch point 1318 where a test is made on the identification currently contained in location ID. If that value is greater than 127 then the signal packet is one that originated at the switch and has passed entirely around the loop and in that case control passes from conditional branch point 1318 to the end of the signal input routine at 1324. Otherwise, control passes to block 1319. The identification value contained in field ID is now used as an index into the list whose address is contained in the field TERMINALS in the type 1 descriptor addressed by L. Each entry in that list is the address of the type 2 descriptor, and block 1319 shows that the address of the type 2 descriptor which relates to the signal packet just read is transferred to temporary location T. If the entry in the list is 0 then the identification code does not correspond to any existing TIU or trunk and conditional branch point 1320 will transfer control to the end of the signal input routine at terminal indicator 1324. Otherwise, control will pass to block 1321.

The field TMNL in the queue entry addressed by B is now set by block 1321 equal to the address of the type 2 descriptor currently stored in location T. The queue pointer contained in SRTAIL of the type 1 descriptor L is now updated by block 1322 to contain the address of the next available queue entry and that address can be obtained from the field NEXT in the queue entry addressed by B. Having now stored details of the incoming signal packet in the signal input queue, an interrupt is set which will force level 2 action and subsequent processing by the level 2 sequence of the signal input routine. That interrupt is set by obeying an EDF instruction in the Tempo 1 computer. After block 1323, control passes to the end of the signal input routine level 1 at terminal indicator 1324.

Figure 22A:
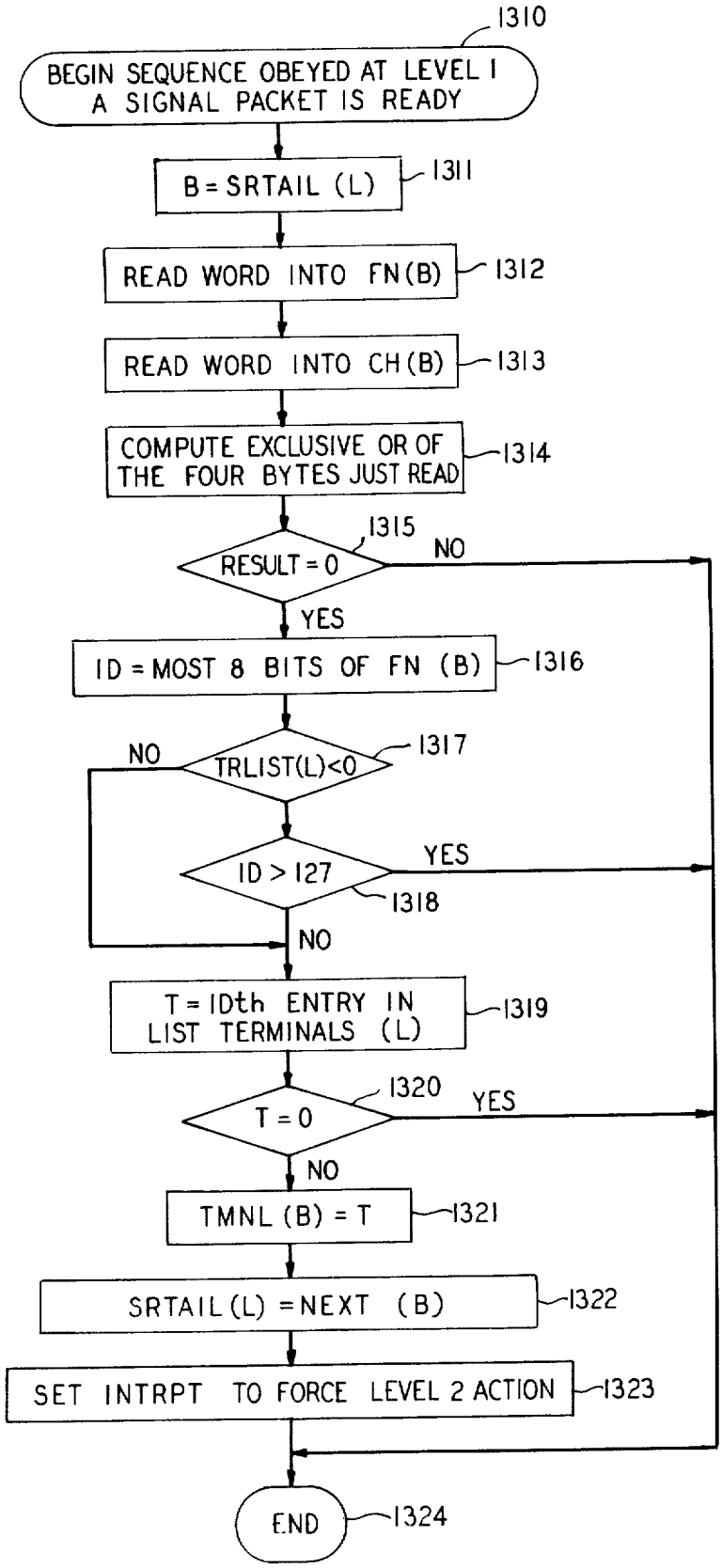
Figure 22B:
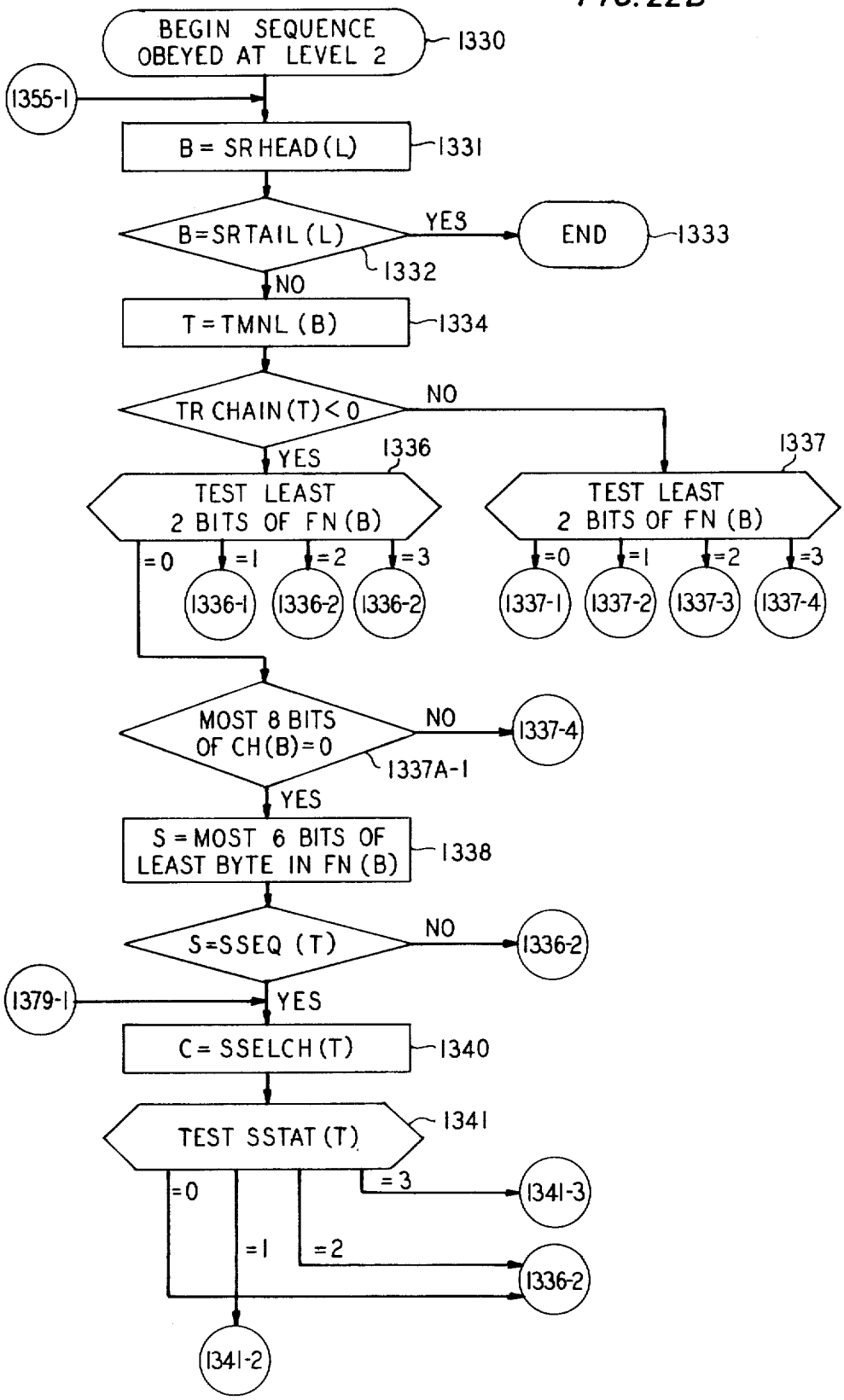

The level 2 sequence for the signal input routine starts at terminal indicator 1330 as shown in FIG. 22B. At level 2, the signal input routine takes entries off the signal input queue which was loaded by the level 1 sequence of the signal input routine. The next entry to be processed on that queue is pointed out by the field SRHEAD contained in the type 1 descriptor addressed by L. In block 1331 the address of that queue entry is transferred to temporary location B. If the address contained in SRHEAD is equal to the address contained in SRTAIL, the signal input queue is in fact empty and conditional branch point 1332 transfers control to the end of the signal input routine at terminal indicator 1333. Otherwise, control passes to block 1334.

The field TMNL in the queue entry addressed by B contains the address of the type 2 descriptor to which the input signal relates. That address is transferred in block 1334 to temporary location T. The action to be taken with respect to the incoming signal packet now depends upon the function code in that signal packet and whether a switching unit or TIU generated it. The field TRCHAIN in the type 2 descriptor addressed by T will be less than 0 if the signal packet came from a terminal interface unit and will be positive if the signal packet came from another switching unit. Conditional branch point 1335 tests to see which of these conditions exists and transfers control to computed branch point 1336 if the source of the signal packet was a terminal interface unit and to computed branch point 1337 if the source was another switching unit. Computed branch points 1336 and 1337 transfer control to various different places depending upon the function code in the signal packet just read. That function code is in the least significant two bits of the field FN in the Q entry addressed by B.

The signal packet functions in the control transfers are as follows. First consider signal packets received from a terminal interface unit. Function code 0 identifies an ACK signal and results in control being transferred to conditional branch point 1337. Function code 1 identifies an SEL signal and results in control being transferred to block 1361. Function codes two and three should not arise from the terminal interface unit and are ignored by transferring control to the end of the level 2 processing sequence at terminal indicator block 1355. Next consider signal packets arriving from another switching unit. Function code 0 identifies an ACK signal and results in control being transferred to block 1375. Function code 1 identifies an STRT signal results in control being transferred to conditional branch point 1380. Function code two identifies an IDL signal and results in control being passed to block 1390. Function code three identifies an NACK signal and results in control being passed to block 1393.

Considering now the process used to handle an ACK signal arriving from terminal interface unit, the appropriate sequence begins at conditional branch point 1337. The third byte of that signal packet specifies whether the terminal interface unit detected an error. That byte is to be found in the CH field in the queue entry addressed by B. Conditional branch point 1337 checks its value. If non-zero, control is transferred to block 1393, otherwise control passes to block 1338. The most significant six bits of the second byte in the signal packet contain the sequence number of the last packet correctly received by the terminal interface unit. Since the second byte of the signal packet can currently be found in field FN of the queue entry addressed by B, block 1338 transfers the sequence number from the most significant six bits of that byte into storage location S. For the acknowledgment to be meaningful, that sequence number should be equal to the sequence number of the last transmission by the switching unit as indicated in the field SSEQ of the type 2 descriptor addressed by T.

Conditional branch point 1339 compares these two values and transfers control to the end of the level 2 signal input sequence at block 1335 if the sequence numbers are found to be unequal. Otherwise, control passes on to block 1340. The ACK signal acknowledges successful transmission from the switching unit to the terminal interface unit and that transmission relates to the subchannel addressed by field SSELCH in the type 2 descriptor addressed by T. Block 1340 shows that the address of this subchannel descriptor is transferred into temporary storage location C. Computed branch point 1341 shows that the action now to be taken in response to the received ACK signal depends upon the status in field SSTAT of the type 2 descriptor addressed by T.

Status codes 0 and two require no further action on the part of the signal input routine and control is transferred from computed branch point 1341 to the end of the level 2 sequence of block 1355. If the status is equal to 1, the ACK signal acknowledges the receipt of a complete bundle of data and in this case control is passed to block 1342. Status three indicates that the ACK signal acknowledges the receipt of an SEL signal, and in that case control is transferred to block 1360.

Figure 22C:
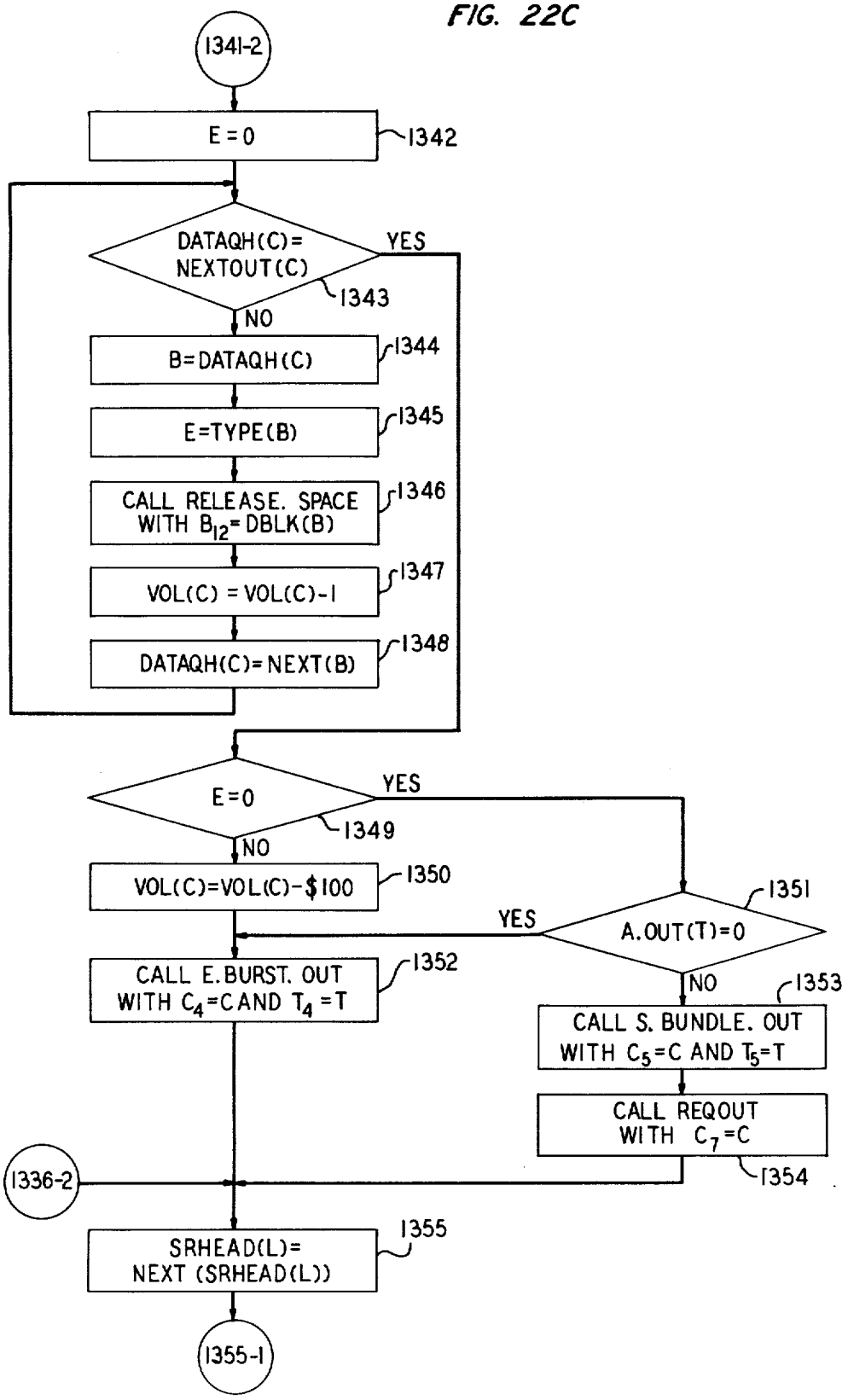

Returning now to the case where the ACK signal acknowledges receipt of a bundle of data, it is seen that the signal input routine obeys the program sequence starting at block 1342 shown in FIG. 22C. The first task performed here is to examine the queue of the data blocks stored with the subchannel addressed by C and to release the space of any data blocks whose transmission has now been acknowledged. During this process a marker is kept in temporary storage location E indicating whether or not the acknowledged bundle of data contains the end of the message. That marker is initialized in block 1342 to zero.

Next, conditional branch point 1343 compares the address of the head of the queue contained in queue DATAQH with the value contained in field NEXTOUT of the same subchannel descriptor. If these two values are equal, then there is no data in the queue which was already being transmitted and in this case control passes from conditional branch point 1343 to conditional branch point 1349. If such data does exist control passes to block 1344.

The queue entry for the next block of data is extracted from field DATAQH in subchannel descriptor addressed by C and placed in temporary location B. In block 1345 it is seen that the field TYPE of the queue entry now addressed by location B contains the value two if the data packet is the last of a message, and this value is transferred to temporary location E. The queue pointer DATAQH in the subchannel descriptor addressed by C is updated to point to the next entry and the address of this next entry is to be found in field NEXT of the queue entry addressed by B. Block 1347 indicates that the RELEASE.SPACE subroutine is called with the intnetion of returning to the common supply of storage space the packet buffer containing the data associated with the queue entry addressed by B. The address of that packet buffer is contained in field DBLK of the queue entry addressed by B. Block 1348 then shows that the field VOL contained in the subchannel descriptor addressed by C is reduced by 1. That field contains a count of the number of data blocks resident in the queue. Control is then transferred back to conditional branch point 1443 to test whether further queue entries must be processed. If no such entries remain, control is transferred from conditional branch point 1343 to conditional branch point 1349.

If the bundle of data now acknowledged was the last of a message, then temporary location E will be nonzero and conditional branch point 1349 will transfer control to block 1350. Otherwise, it will transfer control to conditional branch point 1351. The field VOL in the subchannel descriptor addressed by C has the hexidecimal value $100 added to it for each message stored in the queue.

In block 1350 it is seen that the value contained in this field is reduced by hexidecimal $100. the end-of-message signals the end of a burst so control passes from block 1350 to block 1352 where a call is made on the subroutine E.BURST.OUT which performs the necessary housekeeping associated with a burst of output on the subchannel addressed by C of the type 2 descriptor addressed by T. After this action has been taken, control passes to block 1355. As was seen above, if the bundle acknowledged by the received ACK signal was not the last bundle of a message then control passes to conditional branch point 1351, at which point the field AOUT in the type 2 descriptor addressed by T is tested. When the terminal descriptor relates to a trunk, that field is 0. When the terminal descriptor relates to the terminal interface unit, the field is 0 if the last bundle of an output burst has been transmitted. In either case, the 0 value of this field will cause a transfer from conditional branch point 1351 to block 1352 and a non-zero value will cause a control transfer to block 1353.

It is seen in block 1353 that a call is made to subroutine S.BUNDLE.OUT which performs the necessary housekeeping associated with the start of a new output bundle on the subchannel descriptor addressed by C belonging to the type 2 descriptor addressed by T. Control is next transferred to block 1354 where a call is made on the subroutine REQOUT for the purpose of requesting attention by the data output routine. An entry giving the address of the subchannel descriptor pointed to by C is made in the data output attention queue for the data output routine and control is transferred to block 1355.

Block 1355 is obeyed when one signal obtained from the signal input queue has been processed. That signal will still be the topmost entry in the queue and will be addressed by the field SRHEAD in the type 1 descriptor addressed by L. To remove that entry from the queue, the field SRHEAD is updated by placing in it the contents of field NEXT in the queue entry being removed. After doing this, control passes to block 1331 where an attempt is made to process other entries in the signal input queue.

Figure 22D:
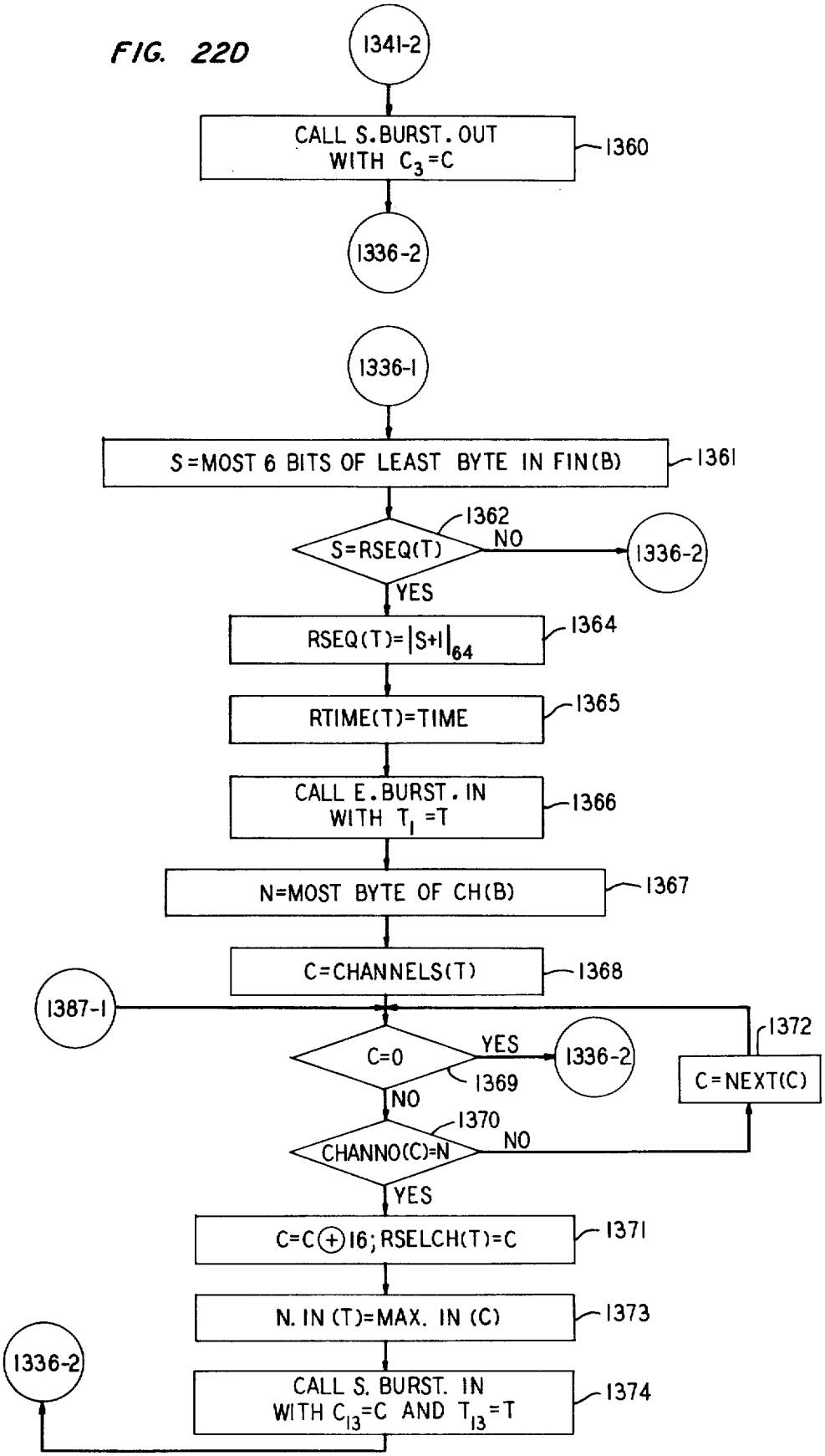
Figure 22E:
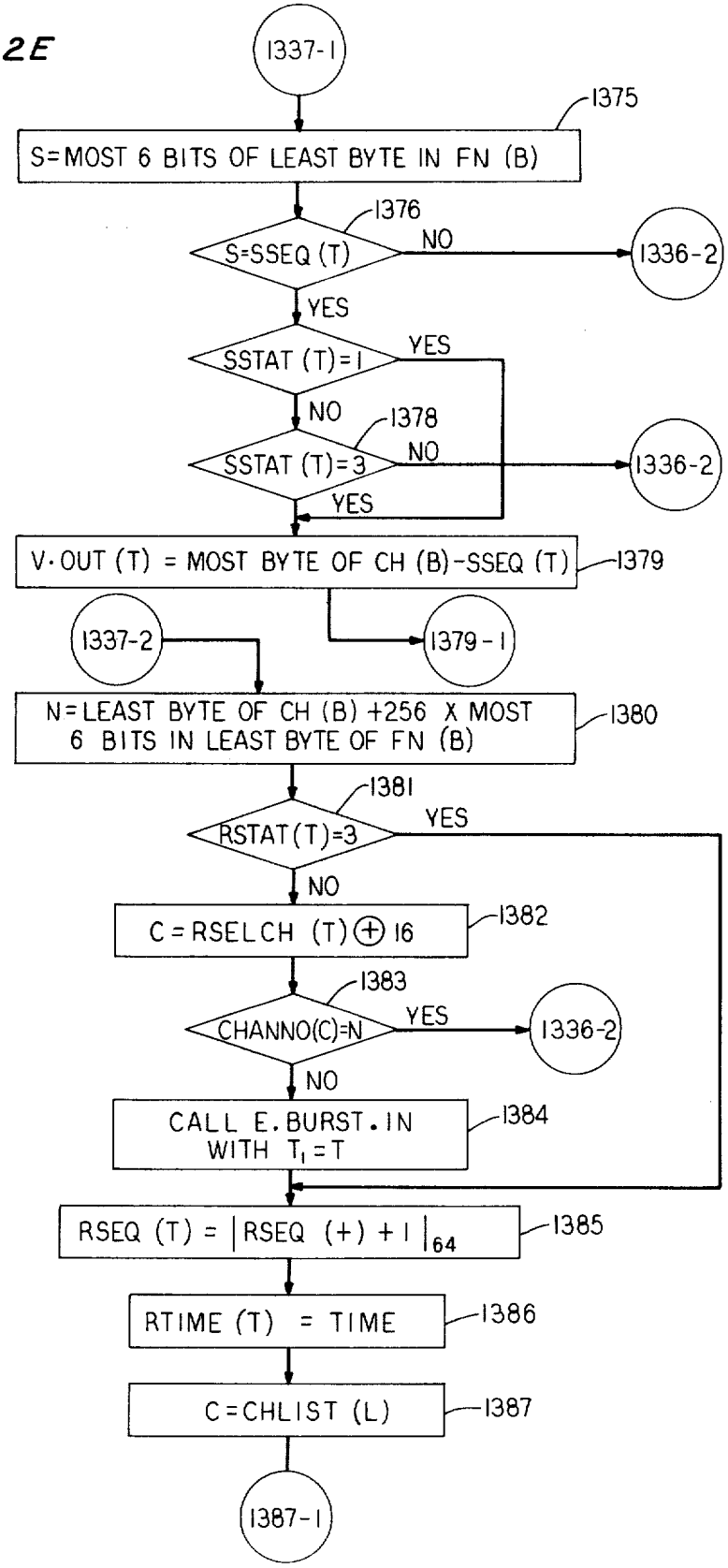

Considering now the case when the received ACK signal acknowledges the receipt of and SEL signal, it was seen that computed branch point 1341 transferred control to block 1360. The action described in block 1360 shown in FIG. 22D is to call subroutine S.BURST.OUT which performs the housekeeping associated with the start of the new burst of data output on the subchannel descriptor addressed by C. After that subroutine returns, control passes to block 1355.

Consider now the processing of an SEL signal received from the terminal interface unit. As described above, computed branch point 1336 will in this case transfer control to block 1361. SEL signals, like data packets, are sequentially numbered and the sequence number is in the most significant six bits of the second byte of the packet of the signal packet just received. The second byte is contained in the most significant eight bits of the field FN in the queue entry addressed by B.

Block 1361 indicates that the sequence number from this byte is transferred to temporary location S. That sequence number should match the number contained in the field RSEQ held in the type 2 descriptor addressed by T. If that is not the case, then some data transmission has probably been lost.

Conditional branch point 1362 makes a comparison and arranges to ignore the signal if an error is detected by transferring control to block 1355. If the sequence numbers are equal, control is passed to block 1364 where the sequence number of the next packet expected is computed. That sequence number is one greater than the number of the current packet, but since the sequence number is a six-bit quantity the addition is done modulo 64. In block 1364 the new sequence number is stored in field RSEQ of the type 2 descriptor addressed by T. In block 1365 the time at which the signal was processed is stored in the field RTIME in the type 2 descriptor addressed by T. Next, block 1366 calls subroutine E.BURST.IN which performs the housekeeping associated with the end of a burst of data input from the trunk or TIU whose descriptor is addressed by T.

The third byte of an SEL signal packet contains the number of a channel which is about to be selected. That number can be obtained from the most significant byte in the field CH of the queue entry addressed by B. As shown in block 1367, the new channel number is transferred to temporary location N. The next action to be taken is to search the list of channels associated with the type 2 descriptor addressed by T to find the channel which has the appropriate number. As will be seen later, this sequence is used also by the STRT signal. The sequence starts with block 1368 which obtains from the field channels in the type 2 descriptor addressed by T the address of the first subchannel descriptor associated with that channel. Conditional branch point 1369 checks to see if the address contained in temporary location C is 0. If it is, then no channel exists and the SEL signal is ignored by transferring control to block 1355. If temporary location C indeed contains the address of the subchannel, then conditional branch point 1370 shows that the channel number stored in temporary location N is compared with the channel number stored in the subchannel descriptor field CHANNO. If these two numbers are equal, then the requiredchannel has been found and control is passed to block 1371. Otherwise, the search must continue and control is passed to block 1372.

From block 1372 it is seen that the field NEXT in the subchannel descriptor addressed by C is used to obtain the address of the next subchannel descriptor to be inspected. That address is copied into location C and control is transferred back to conditional branch point 1369. The subchannel descriptors which are chained from a type 2 descriptor T are all those subchannels whose data output is destined for that TIU or trunk. The descriptors of the subchannels which handle the data input from that TIU or trunk are adjacent in the store to the subchannel descriptors listed. The address of the descriptor for the subchannel handling data input from TIU or trunk T can be computed by an EXCLUSIVE OR operation on the address currently contained in location C. In block 1371 it is seen that this computation is made and the resulting value of C is stored in the field RSELCH of the type 2 descriptor associated with T. By taking this action, subsequent data input from that TIU or trunk will be directed to the subchannel addressed by C. In block 1373 it is seen that the field N.IN in the type 2 descriptor addressed by T is set equal to the field NAX.N in the subchannel descriptor addressed by C. Then in block 1374 it is seen that a call is made to subroutine S.BURST.IN which performs the housekeeping associated with the start of a burst of input data on the subchannel addressed by C from the TIU or trunk whose descriptor is addressed by T. After the call has been completed control is transferred to block 1355.

Next to be considered in an ACK signal arriving from another switching unit. It will be seen in the discussion of block 1337 that when such a signal arrives control is transferred to block 1375 shown in FIG. 22E. The most significant six bits of the second byte in that signal packet contain the sequence number which is the number of the last packet successfully received by the other switching unit. The second byte of the signal packet is in the most significant eight bits of the field FN in the queue entry addressed by B.

Block 1375 shows that the sequence number from that byte is transferred to temporary location S. In conditional branch point 1376 a comparison is made between the receive sequence number and the value stored in SSEQ of the type 2 descriptor addressed by T. If these two values are not equal, then the incoming ACK signal is ignored by transferring control to block 1355.

The incoming ACK signal is also ignored if the status SSTAT stored with the type 2 descriptor addressed by T is equal to neither one nor three. A test of this effect is made by conditional branch points 1377 and 1378. If neither of these values is to be found in field SSTAT then control is transferred by conditinal branch point 1378 to block 1355. Otherwise, control passes on to block 1379.

The incoming ACK signal from another switching unit contains in its third byte a sequence number which determines the length of the next burst that can be transmitted to that switching unit. The length of that burst is computed in block 1379. Since the third byte of the signal packet can be found in the most significant byte of field CH in the queue entry addressed B, the length of the next burst is the difference between this value and the sequence number stored in SSEQ of the type 2 descriptor addressed by T. As seen in block 1379, the length of that burst is stored in location V.OUT of the type 2 descriptor associated with T, and control is then transferred to block 1340. It will be recalled that the sequence containing block 1340 is used to handle an ACK signal coming from the terminal interface unit and is in fact equally applicable to an ACK signal coming in from another switching unit.

Turning again to computed branch point 1337, it is seen that an STRT signal with a function code of one results in a control transfer to conditional branch point 1380. The purpose of that signal is to indicate that a trunk has been assigned for the purpose of sending data into the switching unit receiving the STRT signal. The subchannel to which the trunk has been assigned is identified by a fourteen-bit number constructed from the most significant six bits in the second byte of the signal packet and the eight bits in the third byte of the signal packet. The action taken in block 1380 is to compute that number and store it in temporary location N.

Conditional branch point 1381 then checks the status of the type 2 descriptor addressed by T as stored in the field RSTAT. A status value of three here indicates that the trunk was marked as "idle" and in this case control transfers from conditional branch point 1381 to block 1385. In the case where the trunk is not idle, it is necessary to check to see whether the STRT is a duplicate of one received earlier or whether the type 2 descriptor was not updated when the trunk was released. For this purpose, block 1382 computes the address of the subchannel descriptor containing the number of the subchanels to which input data from the trunk is currently assigned. The address of the descriptor for that subchannel is contained in field RSELCH in the type 2 descriptor addressed by T. Conditional branch point 1383 then compares the number specified in the STRT signal with the channel number of the subchannel currently being used for data input from the trunk. If these are equal, the STRT signal is a duplicate of one received earlier and no processing is necessary. Control is therefore transferred to block 1355. If the values are unequal, the trunk was not properly released and that action is now taken in block 1384. To release the trunk a call is made to subroutine E.BURST.IN which performs all housekeeping associated with the end of an input burst from the trunk whose type 2 descriptor is addressed by T. After that action has been taken control is transferred to block 1385.

The sequence number of the first packet expected on the newly assigned trunk will be one greater than the sequence number currently contained in field RSEQ of the type 2 descriptor addressed by T. Block 1385 computes the new sequence number modulo 64 and stores it in the field RSEQ. Block 1386 copies the current time from the location TIME into the field RTIME in the type 2 descriptor addressed by T. the remaining action taken with respect to the STRT signal parallels that taken for the SEL signal. In particular, it is necessary to search through the list of channels for one with the appropriate number.

However, in the case of the STRT signal, the list of channels is pointed to by the field CHLIST in the type 1 descriptor addressed by L. Thus, block 1387 obtains the address of this list and stores it in temporary location C before transferring control into the middle of the sequence previously described to handle SEL signals. Control is then transferred to conditional branch point 1369.

Figure 22F:
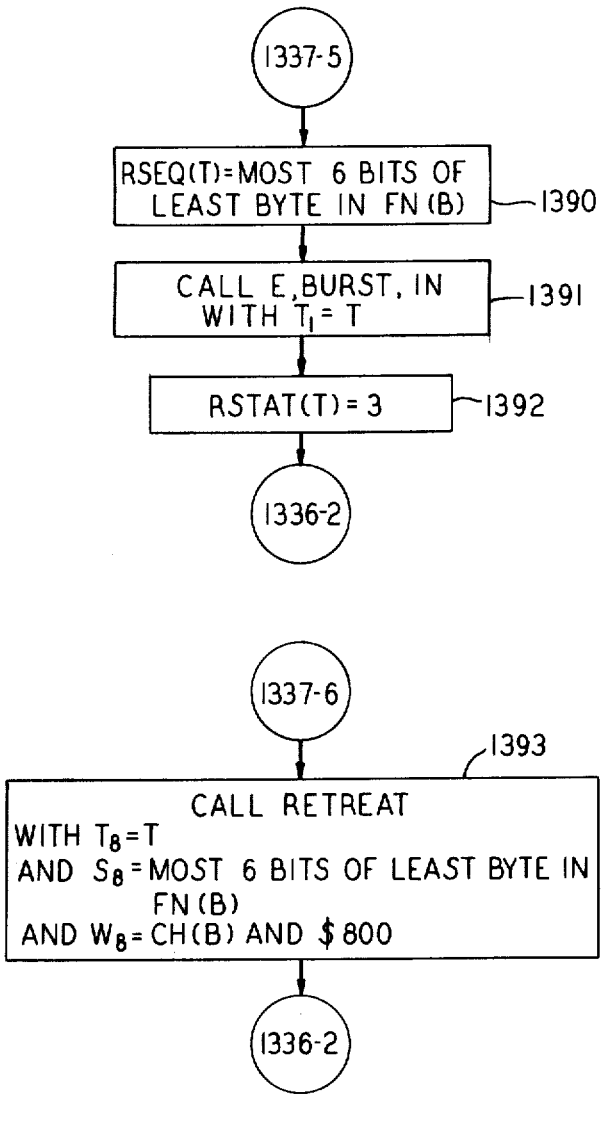

An IDL signal received from the switching unit has function code two and causes a control transfer from computed branch point 1337 to block 1390 shown in FIG. 22F. The IDL signifies the release of a trunk and the sequence number in the most significant six bits of the second byte of the signal packet specify the number to be used when the trunk is next used. In block 1390 the sequence number is obtained from the most significant bits of the byte in the least significant position of the field FN in queue entry B, and that sequence number is stored in the field RSEQ of the type 2 descriptor addressed by T. To disassociate the trunk with the subchannel to which it is linked, the signal input routine calls upon the subroutine E.BURST.IN as shown in block 1391. This subroutine performs the necessary housekeeping associated with the end of an input burst from the TIU or trunk whose descriptor is addressed by T. Finally, the trunk is marked as "idle" by setting the field RSTAT in the type 2 descriptor addressed by T equal to three, and then control is transferred to block 1355.

Block 1393 is obeyed on two accounts. In the first instance it is obeyed when an NACK signal is received from another switching unit, and in this case computed branch point 1337 transfers control directly to block 1393. Alternatively, block 1393 computes when an ACK signal is received from a terminal interface unit and when that ACK signal indicates that errors were detected by the terminal interface unit. As was described earlier, this situation prompts the transfer of control from conditional branch point 1337 directly to block 1393. The action taken in block 1393 is to call the subroutine RETREAT which steps back the queue pointers and associated controls for the subchannel currently transmitting data to the TIU or trunk whose descriptor is addressed by T. The distance of backtrack is determined by a sequence number known internally to the routine as $S_8$. That sequence number must be the number of the last packet successfully transmitted and received. That number is to be found in the most significant six bits of the second byte of the signal packet currently located in the least significant byte point of the field FN in the queue entry whose address is B. Subroutine RETREAT takes special action in respect of error code eight which is used by the terminal interface unit to indicate that data or select signals are being sent on a channel which is not the same as the one being used for data transmission. The temporary working location $W_8$, used by subroutine RETREAT is set non-zero if that particular error condition exists. After completion of the call shown in block 1393, control is transferred to the end of the signal processing sequence of block 1355.

SIGNAL OUTPUT ROUTINE OF THE CONTROL COMPUTER PROGRAM

The signal output routine is illustrated in FIGS. 23A and 23B. It is seen that that routine is obeyed entirely at level 1 and starts at block 1400 shown in FIG. 23A when the line terminating unit with type 1 descriptor addressed by L is ready to take another signal packet. The routine services a queue built up by subroutine REQSIG. The head of that queue is contained in the field SXHEAD in the type 1 descriptor addressed by L. The action described in block 1401 is to transfer the address of the head of that queue into temporary location B. If the value in SXHEAD is equal to the value in SXTAIL, then the queue is empty and conditional branch point 1402 transfers control to the end of the signal output routine at terminal indicator 1407A. Otherwise, it proceeds to process that queue entry by passing control to block 1403. The address of the type 2 descriptor to which the signal output request relates is contained in the field TMNL in the queue entry addressed by B. As shown in block 1403, the address of that type 2 descriptor is transferred to temporary location T.

The action to be taken with respect to the signal being transmitted depends on the function code of that signal. The function code is contained in the least significant two bits of the field FN in the queue entry addressed by B. Computed branch point 1404 transfers control to block 1408 in the case where an ACK signal with function code zero is requested; it transfers control to block 1412 in the case where an SEL or STRT signal with function code one is requested; and otherwise transfers control to block 1405.

Considering now the transmission of packets with function codes two and three, these are handled by the sequence starting at block 1405. The first byte in each packet is the identity of the thermal interface unit or trunk to which that signal relates and can be obtained from the field ID in the type 2 descriptor addressed by T. The second byte in the signal packet has in its most significant six bits the sequence number currently contained in the field SSEQ of the type 2 descriptor addressed by T, and has in its least significant two bits the function code currently contained in the least significant two bits of the field FN in the queue entry addressed by B. Block 1405 shows that these values are assembled into a complete word stored in temporary location D. This word is written by the control computer 30 into the line terminating unit 31 associated with the type 1 descriptor addressed by L as shown in block 1406. The third byte of the signal packet is equal to that value currently contained in the field CH of the queue entry addressed by B, and the fourth byte is a checksum being the EXCLUSIVE OR of the values in the first three bytes. Block 1407 shows that the second and third bytes are assembled into a word which is then written out to the same line terminating unit. Control then is transferred to the end of the signal output routine at terminal indicator 1407A.

Consider now the case when an ACK signal is transmitted. As was seen above, control in this case will be transferred from computed branch point 1404 to block 1408. The first byte to be transmitted in the signal packet is equal to the identity of the terminal interface unit or trunk with which the signal is associated and that value is obtained from field ID in the type 2 descriptor addressed by T. The second byte of the signal packet has in its most significant six bits the value contained in field RSEQ of the type 2 descriptor addressed by T, and in the least significant two bits it has zero.

Block 1408 explains what these two bytes are assembled together into a word and stored in temporary location D. That value is written into the line terminating unit 31 associated with type 1 descriptor addressed by line L as shown in block 1409. The third byte of an ACK signal must specify the sequence number to be used at the end of the next burst of transmission. The sequence number currently held in RSEQ of the type 2 descriptor addressed by T is that for the last transmission received. Furthermore, the values stored in field V.IN of the type 2 decriptor addressed by T is minus one times the number of packets which are authorized for transmission in the next burst. Therefore, by subracting V.IN from RSEQ, the sequence number to be used at the end of the next burst of transmission is obtained. Block 1410 shows that this number is stored in temporary location V. The third byte of the signal packet is a checksum being the EXCLUSIVE OR of the preceding three bytes. Block 1411 shows that the second word of the signal packet is assembled from the values stored in temporary location V on the computed checksum. This value is written to the line terminating unit associated with L. Control then transfers to the end of the signal output routine at terminal indicator 1407A.

Computed branch point 1404 transfers control to block 1412 shown in FIGS. 23B when the request is made to transmit either an SEL signal or an STRT signal, both of which have the function code of one. In each case the sequence number held in SSEQ of the type 2 descriptor addressed by T is increased by one before the transmission takes place. That computation is made modulo 64 since the sequence number is a six-bit quantity. The value contained in the most significant six bits of the second byte of the signal packet depends upon whether that packet is an SEL signal or an STRT signal. If the signal is being sent on a trunk then it is an STRT signal, otherwise it is an SEL signal. A determination to this effect can be made by testing the field SRCHAIN in the type 2 descriptor addressed by T. That field is negative if what it relates to is a terminal interface unit, and positive if it relates to a trunk.

Control passes from control point 1413 to block 1415 when an SEL signal is being transmitted, and block 1415 then obtained the sequence number from the field SSEQ of the type 2 descriptor which is addressed by T, storing that number in temporary location S. When the signal is an STRT signal, the most significant six bits of the fourteen-bit channel number contained in the field SELNO of type 2 descriptor addressed by T, are extracted and stored in temporary location S, as shown in block 1414.

After execution of either block 1414 or block 1415, contro passes to block 1416 where the first word of the signal packet is assembled. The first byte of that packet is the terminal identity obtained from the field ID of the type 2 descriptor addressed by T. The second byte of that packet has in its most significant six bits the value currently contained in temporary location S and has 1 as the function code in its least significant two bits. As shown in block 1417, the assembled word which was stored in temporary location D is now output to the line terminating unit. The third byte of a signal packet is obtained from the least significant eight bits of the channel number held in the field SELNO of the type 2 descriptor addressed by T. As shown in block 1418, that value is transferred into temporary location S. The fourth byte of the signal packet is a checksum being the EXCLUSIVE OR of the preceding three bytes. It is shown in block 1419 that the second and third bytes are assembled and written to the line transmit unit associated with the type 1 descriptor addressed by L. Finally, control is transferred to the end of the signal output routine at terminal indicator 1407A.

TIME-OUT ROUTINE OF THE CONTROL COMPUTER PROGRAM

FIGS. 24A and 24B show the time-out routine which is obeyed entirely at level 2 and is called once every two milliseconds. The function of this routine is primarily to detect when transmission has come to a halt due to the loss of the signal or failure to queue an output request when appropriate. Once every two milliseconds the routine inspects one type 2 descriptor of the many type 2 descriptors held in the system. All these terminal descriptors are linked together by the field NEXT and from a circular chain. The storage location SCANNED contains the address of the terminal descriptor processed in the last activation of the time-out routine. In block 1421 it is seen that the first act is to put into the location SCANNED the address of the next type 2 descriptor in the cyclic chain. The address of the type 2 descriptor now to be inspected is copied into temporary location T as shown in block 1422. The address of the descriptor of the subchannel currently associated with that terminal for data input is copied into temporary location C from field RSELCH in the type 2 descriptor addressed by T. The action now taken depends upon the status of the TIU or trunk as stored in the field RSTAT in the type 2 descriptor addressed by T. A status value of three calls for no particular action and control is transferred to computed branch point 1428. If the status value is two, control is transferred to block 1430, and if the status is 1, control is transferred to block 1431. In the case when the status is 0, normal data transmission is in progress and the routine proceeds to obey the conditional branch point 1425. At that branch a test is made on the field RTIME in the type 2 descriptor addressed by T. That field contains the time when the last transmission from the terminal was received, which is compared with the time stored in the location TIME. If the absolute value of the difference between these two values is greater than 2000, indicating that about half a second has elapsed since any transmission from the TIU or trunk was received, then control passes to block 1426. Otherwise, no action is taken and control passes to computed branch point 1428. It is seen in block 1426 that field RTIME is set equal to the current value of time and that in block 1427 a request for a signal output is made by calling subroutine REQSIG. That subroutine asks for the output of an ACK signal to be sent to the TIU or trunk whose descriptor is addressed by T. When the call is completed, control passes to computed branch point 1428.

In the case where the status value held in RSTAT is equal to 1, computed branch point 1424 transfers control to block 1431. That status value indicates that the TIU or trunk is waiting for space in order to be able to start the new bundle of input data transmission. A second attempt to start the bundle is made as shown in block 1431 by calling subroutines S.BUNDLE.IN. This performs the necessary housekeeping associated with the start of an input bundle from the TIU or trunk whose descriptor is addressed by T on the subchannel whose descriptor is addressed by C. Once this call has been completed, control is transferred to computed branch point 1428. In the case where the status value held in field RSTAT is a two, control passes from computed branch point 1424 to block 1430. That status value indicates that the TIU or trunk is waiting for a trunk in order to start an input burst. A second attempt to start the burst is made by calling on the subroutine S.BURST.IN as shown in block 1430. That subroutine performs all the necessary housekeeping associated with the start of an input burst from the TIU or trunk whose descriptor address is in T on the subchannel whose address is in C. After the call has been completed, control is transferred to computed branch point 1428.

Considering now the sequence starting at computed branch point 1428, the time-out routine extending the status of the TIV or trunk with respect to data transmission out of the switching unit. That status is stored in location SSTAT in the type 2 descriptor addressed by T. Computed branch point 1428 transfers control to various points depending upon the value of the status. The status value 0 results in a transfer to block 1429; status value one results in a transfer to conditional branch point 1432; status value two results in a transfer to block 1435; status value three results in a transfer to conditional branch point 1432; and status value four results in a transfer to block 1443.

Considering now the sequence beginning at block 1429 which is obeyed when status value 0 indicates that normal transmission activity is in progress. In this case the time-out routine calls subroutine S.BURST.OUT which is designed to have no effect unless the terminal is unnecessarily idle and to attempt to start a burst if that is the case. The subroutine performs its housekeeping with respect to the channel descriptor whose address can be obtained from the field SSELCH whose type 2 descriptor is addressed by T. After completing the call, control transfers to the end of the time-out routine at terminal indicator 1444. Returning to computed branch point 1428, when the status field SSTAT contains either value 1 or value three, it indicates that the switching unit is waiting for an ACK signal to arrive from a TIU or other switching unit. In these circumstances, control is transferred to conditional branch point 1432 shown in FIG. 24B.

First in the sequence a check is made on the field STIME in the type 2 descriptor addressed by T. That field is compared with the current value of time and if the absolute value of the difference between these two values is not greater than fifty no action is taken and control passes to the end of the time-out routine at terminal indicator 1444. In the case when the time difference is greater than fifty, action is taken by passing control to block 1433.

First, the field STIME is set equal to the current time as shown in block 1433, then a call is made to subroutine RETREAT. This subroutine backs up the output queue and associated controls, thereby enabling re-transmission to the TIV or trunk of the most recently transmitted information. The sequence number which the RETREAT subroutine requires is a specification for the distance of backup and is computed to be one less modulo 64 than the current value in field SSEQ of the type 2 descriptor addressed by T. After completion of the call control is transferred to the end of the time-out routine at terminal indicator 1444.

Returning again to computed branch point 1428, control is transferred to block 1435 if the status value in SSTAT is two. That status indicates that insufficient data has been collected on any channel which can be selected so, in fact, no channel at all has been selected for data output. The sequence beginning at block 1435 attempts to verify this situation and to find the channel which can be selected if that situation is in fact not the case.

First in that sequence, the address of the subchannel selected for data input from the TIU whose descriptor address is T is obtained from field RSELCH. That subchannel is one of a pair, the other subchannel carrying data in the opposite direction, that is, towards the TIU whose descriptor address is T. The address of the descriptor for the other subchannel is obtained by an EXCLUSIVE OR with value sixteen. It is shown in block 1435 that the address of the descriptor for that other channel is stored in temporary location N.

Next the time-out routine scans the list of channels for the TIU whose descriptor address is T. As shown in block 1436, the head of this list is copied into temporary location C. Conditional branch point 1437 checks to see of C is zero, and if it is, transfers control to the end of the time-out routine at terminal indicator 1444. Otherwise, control passes to conditional branch point 1438. If the field COSTAT of the channel descriptor whose address is C is less than two, then it has sufficient data to warrant the start of a new burst of transmission and conditional branch point 1438 transfers control to clock 1442. If the field COSTAT of the subchannel whose address is C contains the value two then sufficient data is not available and control is transferred to block 1441. Otherwise, COSTAT is equal to three, indicating that sufficient data exists but the channel was rejected as a suitable channel for selection by the TIU. In this case control passes to conditional branch point 1440.

If the address of the channel descriptor equals the address contained in temporary location N, then it is probable that the TIU will be prepared to select this channel so an attempt is made to start a new burst on that channel by transferring control to block 1442. If this is not the case control passes to block 1441 where the time-out routine moves down the chain of channel descriptors for TIU T. The field next in each subchannel descriptor contains the address of the next subchannel descriptor as shown in block 1441. Block 1441 passes control back to the beginning of the scanning loop branch point 1437. Block 1442 is obeyed when it is determined that a burst of transmission might be started to output the data currently stored in the subchannel whoseaddress is stored in C. As shown in block 1442 a call is made to subroutine S.BURST.OUT. This subroutine performs the necessary housekeeping associated with the start of a new burst of output on the channel whose descriptor address is contained in C. On completion of the call control is transferred to the end of the time-out routine at terminal indicator 1444.

Control is transferred to block 1443 when the field SSTAT of a trunk description contains the value four, indicating that the trunk is idle. Block 1443 calls subroutine SIGOUT which requests that an IDLE be sent to the switching unit at the other end of the trunk. When the subroutine returns, the time-out routine ends at terminal indicator 1444.

S.BURST.IN SUBROUTINE OF THE CONTROL COMPUTER PROGRAM

FIG. 15A shows the subroutine S.BURST.IN whose function is to perform the housekeeping associated with the start of a new input burst. On entry it requires two parameters. Parameter C13 contains the address of a subchannel descriptor, and parameter T13 contains the address of the associated type 2 descriptor. The subroutine begins at terminal indicator 1450. Under normal operating conditions, field SINK in the subchannel descriptor contains the address of the type 2 descriptor associated with that subchannel. In the case when the subchannel would normally use a trunk but at the current time is inactive, the field SINK contains zero. Conditional branch point 1451 tests this field or the subchannel descriptor whose address is in C13 and transfers control to block 1453 if the field is non-zero. Otherwise, it transfers control to block 1452 for the purpose of finding a trunk to that subchannel. As shown in block 1452 the assignment is done by calling the subroutine ASSIGN.TRUNK which uses as parameters the address of the subchannel descriptor contained in C13 and the address of the type 2 descriptor contained in T13. That subroutine has two exits. A success exit us used if the trunk was successfully assigned and a fail exit if no trunk was obtained at that time. Control passes from the success exit to block 1453 and from the fail exit to block 1456.

Assuming then that the assignment to the trunk was successful, block 1453 sets field CRSTAT in the subchannel descriptor addressed by C13 equal to 0. Then block 1454 calls upon the subroutine S.BUNDLE.IN to perform the housekeeping necessary to initiate the input of a new bundle. Parameters for that subroutine are the subchannel address currently contained in C13 and the type 2 descriptor address currently contained in T13. After completion of the cell, control passes to the end of the subroutine at terminal indicator 1455.

Returning now to consider the fail exit from block 1452, control passes from this to block 1456 where the field RSTAT in the type 2 descriptor whose address is contained in T13 is set equal to two. That number indicates that the terminal wishing to start a new input burst must wait until the trunk becomes available. Block 1457 is a call to subroutine REQSIG which in this case is requester to output an ACK signal to the TIU or trunk that would have started a new input burst. Since no transmission has yet been authorized, the ACK signal would instruct the TIU or trunk not to transmit any further data. Following from block 1457, block 1458 sets the field CRSTAT in the type 2 descriptor whose address is in T13 equal to one, indicating thereby that burst input is not in progress. Control then passes to the end of the subroutine in terminal indicator 1455.

E.BURST.IN SUBROUTINE OF THE CONTROL COMPUTER PROGRAM

FIG. 25B shows the subroutine E.BURST.IN which is used to perform the housekeeping function associated with the termination of an input burst. The single parameter required by the subroutine is the address of a type 2 descriptor. This address must be in working location T1. The routine begins in terminal indicator 1460. When an input burst terminates, any unused space assignment must be returned to the common pool. The volume of space involved here is obtained by subtracting V.IN from A.IN in the type 2 descriptor addressed by T1. That computation is shown in block 1461 and the result is stored in temporary location N1. In block 1462 the value contained in N1 is added to the value contained in the storage location UNASSIGNED SPACE and the result is put back in the storage location UNASSIGNED SPACE. In block 1463 it is seen that the field A.IN and the field V.IN in the type 2 descriptor addressed by T1 are both set equal to 0.

Block 1464 shows a call to subroutine REQSIG whose function is to request that the signal output routine send an ACK signal to a TIU or trunk whose decriptor address is contained in T1. Control then passes to block 1465 where the field CRSTAT in the type 2 descriptor whose address is T1 is set equal to 1 indicating that burst transmission is no longer in progress, and control passes to the end of the subroutine at terminal indicator 1466.

S.BUNDLE.IN SUBROUTINE OF THE CONTROL COMPUTER PROGRAM

FIG. 25C shows the subroutine S.BUNDLE.IN whose function is to perform the housekeeping associated with the start of a new input bundle. The input parameters required by this routine are C2, the address of a subchannel descriptor and T2, the address of its associated type 2 descriptor.

The routine begins at terminal indicator 1470. Cince no data can be read from the input line or loop until storage space is available to hold it, bundle transmission cannot start unless sufficient storage space has been assigned. Field A.IN in the type 2 descriptor addressed by T2 contains the number of blocks of storage which have currently been assigned to TIU or trunk T2 but have so far been unused. If A.IN is 0, then more space must be requested. Conditional branch point 1471 tests for this situation and, if space does remain, turns over control to block 1473. Otherwise, control passes to block 1472 where a call to ASSIGN.SPACE subroutine is made. Parameters for the space assignment subroutine are the subchannel address C2 and the address of the associated type 2 descriptor T2. The assigned space subroutine can exit in two ways. A success exit is used if space was successfully required, and a fail exit if not. Upon a success exit from block 1472, control passes to block 1473, and upon a fail exit control passes to block 1476.

Assuming now that the assignment of space was successful, block 1473 computes the maximum allowable size for the next bundle. That size is the smaller of the two values contained in N.IN and A.IN of the type 2 descriptor whose address is in T2. The computed result is deposited in temporary location N2. Field V.IN of the TIU or trunk descriptor contains munus one times the number of packets authorized for transmission in the next bundle. Therefore, in block 1474 it is seen that the field V.IN of a type 2 descriptor whose address is in T2 is set equal to minus the value currently found in N2. Then in block 1475 the value currently held in field A.IN of the type 2 descriptor addressed by T2 is reduced by the amount contained in N2. Control then passes to block 1476 where a request is made to send an ACK signal to the TIU or trunk associated with the descriptor with the address T2. For this purpose the subroutine REQSIG is used. Upon completion of the call to that subroutine, control passes to the end of the S.BUNDLE.IN subroutine at terminal indicator 1477.

S.BURST.OUT SUBROUTINE OF THE CONTROL COMPUTER PROGRAM

FIG. 25D shows the subroutine S.BURST.OUT which handles the housekeeping associated with the start of a new burst of output transmission. The single parameter required by this routine is C3, the address of a subchannel descriptor.

The subroutine begins in terminal indicator 1480. The field SINK of a subchannel contains the address of the descriptor which relates to the TIU or trunk to which data is being sent. It is seen in block 1481 that the address of the type 2 descriptor is stored in temporary location T3. Conditional branch point 1482 then tests the field TRCHAIN which is found in the type 2 descriptor addressed by T3. It does this in order to determine whether the descriptor is that of a trunk or a terminal interface unit. The field TRCHAIN will be negative if the descriptor relates to a terminal interface unit and in that case control will pass through conditional branch point 1482 to conditional branch point 1491. In the case where T3 relates to a trunk, control passes to conditional branch point 1483. The test on field COSTAT in the channel descriptor address by C3 and shown in conditional branch point 1483 is made in order to determine whether an output request is already outstanding for this subchannel. In that case control passes from conditional branch point 1483 to the end of the subroutine at terminal indicator 1487, otherwise control passes to conditional branch point 1484.

The next test which is made is in conditional branch point 1484 and seeks to determine whether there is any data at all in the subchannel C3. The field VOL in the descriptor for that subchannel will be 0 if the data output queue is empty and in that case conditional branch point 1484 will transfer control to conditional branch point 1485. When data does exist in the output queue of C3, control passes to block 1488. Assuming now that the output queue is empty, a test is made on the field CRSTAT in the subchannel descriptor addressed by C3. That field will be 0 if there is an active burst transmission of data into the subchannel C3, otherwise it will be non-zero. If indeed there is active burst transmission, control passes to the end of the routine at terminal indicator 1487. Otherwise, control passes to block 1486 for the purpose of releasing the trunk which subchannel C3 has assigned to it. As is shown in block 1486, the trunk is released by using the subroutine RELEASE-TRUNK and by providing it with the subchannel descriptor address C3 and the type 2 descriptor address T3. After releasing the trunk control passes to the end of the routine at terminal indicator 1487.

Turning now to block 1488 where control passes if there is data collected in the subchannel C3, it is seen that the first two actions taken are to clear the fields COSTAT in the channel descriptor and SSTAT in the type 2 descriptor. Control then passes on to block 1490 where a request is made for the purpose of sending an ACK signal to the TIU or trunk associated with T3. To effect this request, the subroutine REQOUT is used. Following completion of the request, control passes to the end of the subroutine at terminal indicator 1487.

As was seen above, control passes from conditional branch point 1482 to conditional branch point 1491, if the type 2 descriptor whose address is contained in T3 described a terminal interface unit. The sequence which begings in block 1491 seeks to determine whether subchannel C3 should be selected for the purpose of sending a new burst of data to TIU T3. That question only arises when subchannel C3 is not currently selected for burst transmission to TIU T3 and the status is indicated by the contents of field SSTAT in the TIU descriptor. If that field contains value two, then conditional branch point 1491 will transfer control to block 1492. Otherwise, it will skip around the channel selection sequence to block 1497.

A status value of two indicates that no channel is currently selected as being suitable for burst transmission, presumably because no channel contains a sufficient volume of data to justify the start of transmission.

On the assumption that subchannel C3 does in fact justify the start of burst transmission, block 1492 sets the field SSELCH in the TIU descriptor T3 equal to the address of the subchannel descriptor contained in C3. Then block 1493 extracts the channel number for that subchannel from field CHANNO in the subchannel descriptor and puts the number in field SELNO, the TIU descriptor addressed by T3. Control then passes on to conditional branch point 1494. AT that pont a test is made on the field COSTAT in the subchannel descriptor addressed by C3. If that field contains the value three then in attempt has previously been made to transmit data on the subchannel C3 and that attempt was rejected by the terminal interface unit because the channel did not correspond to the channel then being used for data transmission.

If COSTAT is equal to three, control passes to conditional branch point 1495, otherwise it passes to conditional branch point 1497. If COSTAT was equal to three then it is presumed that there is no point in repeating the attempt to send data to the terminal interface unit unless the subchannel selected for data output from the terminal interface unit is part of the same channel that contains C3. Since the address of the descriptor for the subchannel selected for data output from the terminal interface unit is contained in the field RSELCH of the TIU descriptor addressed by T3, and since the subchannel descriptor for the two subchannels is one channel are sixteen words apart, the test shown in conditional branch point 1495 will transfer control to conditional branch point 1497 if the appropriate channel is not selected for data output from the TIU and will otherwise pass control to block 1496. Block 1496 enables a retry at burst transmission on subchannel C3 to TIU T3 by setting the value two in field COSTAT of the subchannel descriptor addressed by C3. Having done that control passes to conditional branch point 1497 shown in FIG. 25E.

The sequence starting at conditional branch point 1497 makes certain tests to see whether a start of burst output transmission is justified on subchannel C3. First, conditional branch point 1497 checks whether the subchannel specified as being selected is in fact subchannel C3. It does this by comparing the fields SSELCH in the TIU descriptor whose address is T3 with the value of C3. If they are unequal control passes to the end of the routine at terminal indicator 1508.

Next, a test is made in block 1498 to insure that the housekeeping operations are not performed while a data output transmission request remains extant. That is indicated by the value 1 in the field COSTAT belonging to the channel descriptor addressed by C3. If the value 1 is found, control is transferred to the end of the subroutine at terminal indicator 1508. Conditional branch point 1499 then checks to see whether the field COSTAT contains the value three, and, if so, transfers control to the end of the subroutine at terminal indicator 1508.

The test shown in block 1500 is made in order to insure that burst transmission to a terminal interface unit does not start until a certain specified number of packets has been collected. That number is contained in the field MOUT to the subchannel descriptor. By comparing this field with the field VOL, conditional branch point 1500 arranges to transfer control to block 1501 if either the requisite number of the packets have been collected or if among those packets that have been collected there is one which signifies that it is the end-of-message. In any other circumstance, control is transferred from conditional branch point 1500 to the end of the subroutine at terminal indicator 1508.

The sequence starting in block 1501 initializes burst output. First, the value contained in the field MOUT in the subchannel descriptor pointed to by C3 is copied into the field AOUT of the type 2 descriptor pointed to by T3. Block 1502 then indicates that normal transmission is to take place by setting the value 0 in the field COSTAT belonging to the subchannel descriptor addressed by C3.

Block 1503 is obeyed next. Its function is to send an SEL signal to the terminal interface unit indicating the channel on which subsequent data is to be transmitted. Block 1503 produces this effect by calling subroutine REQSIG where the function code of one is in parameter F6. Block 1504 then sets the field SSTAT in the type 2 descriptor addressed by T3 equal to the value three, thereby indicating that the switching unit must wait for an ACK signal from the terminal interface unit. Following that, in block 1505 the current time is stored in the field STIME belonging to the type 2 descriptor whose address is in T3. Block 1506 then calls the subroutine S.BUNDLE.OUT to perform the housekeeping associated with bundle transmission on the subchannel addressed by C3 to the TIU whose descriptor is addressed by T3. Block 1507 shows a call to subroutine REQOUT whose effect is to place a request for attention by the data output routine. That request will specify subchannel C3. Control then passes to the end of the subroutine at terminal indicator 1508.

E.BURST.OUT SUBROUTINE OF THE CONTROL COMPUTER PROGRAM

FIG. 25F shows the subroutine E.BURST.OUT whose purpose is to perform the housekeeping associated with the end of an output burst. The subroutine requires two input parameters. Parameter C4 is the address of the subchannel descriptor, and parameter T4 is the address of its associated type 2 descriptor.

The subroutine begins at terminal indicator 1510. The first action taken is shown in conditional branch point 1511 where a test is made on the field COSTAT in the subchannel descriptor addressed by C4. If that field contains the value 1 then the subchannel has been queued for attention by the data otuput routine and cannot at this time be processed for the end of burst transmission. In that case control passes from conditional branch point 1511 to the end of the subroutine at terminal indicator 1516. Otherwise, control passes to block 1512. Block 1512 provisionally sets the field COSTAT in the subchannel descriptor addressed by C4 equal to the value two. That value indicates that future transmission is conditional upon the requisite amount of data being collected in the subchannel addressed by C4. Conditional branch point 1513 then tests the field TRCHAIN in the type 2 descriptor pointed to by T4 to determine if it relates to a terminal interface unit or to a trunk. In the case that it is a trunk, control passes from the control point 1513 to block 1515, otherwise control passes to block 1514. The field SSTAT in the descriptor for a terminal interface unit contains the value two when the terminal interface unit has no burst transmission scheduled for it. It is that status which is set by block 1514. Block 1515 is a call to subrouine S.BURST.-OUT which will make an attempt to start transmission of another burst of data to a TIU. Finally, control passes to the end of the subroutine at terminal indicator 1516.

S.BUNDLE.OUT SUBROUTINE OF THE CONTROL COMPUTER PROGRAM

FIG. 25G shows the subroutine S.BUNDLE.OUT which handles the housekeeping associated with the start of a new bundle for output transmission. The subroutine required one parameter, T5, which is the address of a type 2 descriptor.

The subroutine begins at terminal indicator 1520. The first action taken in this subroutine is to compute the maximum size that will be allowed for the bundle to be sent to the TIU or trunk whose descriptor is addressed by T5. That maximum is the smaller of the two values contained, respectively, in the fields A.OUT and N.OUT of the type 2 descriptor. Block 1521 shows that this value is computed and stored in the temporary location N5. Next to be obeyed is block 1522 wherein minus one times the value stored in temporary location N5 is inserted into the field V.OUT contained in the type 2 descriptor pointed to by T5. Next, in block 1523, the value currently contained in the field A.OUT of the type 2 descriptor addressed by T5 is reduced by the amount contained in the storage location N5; after that, control passes to the end of the subroutine at terminal indicator 1524.

REQSIG SUBROUTINE OF THE CONTROL COMPUTER PROGRAM

FIG. 25H shows the subroutine REQSIG whose function is to place a request to the signal output routine for the transmission of a signal. That routine requires three parameters. T6 is the address of the type 2 descriptor relating to the TIU or trunk to which the signal is to be sent; F6 contains the function code for the signal to be sent; and H6 contains, where appropriate, the value to be used in the CH field of the signal.

The routine begins at terminal indicator 1530. The signal output routine operates by taking entry from the circular queue pointed to by the field SXTAIL and SXHEAD in the type 1 descriptor. If these two fields are equal, then the queue is full and no further entry should be made. Conditional branch point 1531 compares the values in these two fields and if they are equal passes control to the end of the subroutine at terminal indictor 1537. Otherwise, control passes on to block 1532. Field SXTAIL in the type 1 descriptor whose address is contained in L is the field which contains the address of the next queue entry to be used for the purpose of making requests for signal output. In block 1532 it is shown that this address is transferred to the temporary storage location B6. The ield FN in the queue entry addressed by B6 is set equal to the value contained in F6, then the CH field in the queue entry addressed by B6 is set equal to the value contained in H6. Next, the field TNML contained in the queue entry addressed by B6 is set equal to the value contained in T6. These actions are carried out respectively by blocks 1533, 1534, and 1535. Finally, the queue pointers are updated by copying into field SXTAIL in the type 1 descriptor whose address is in L the value of the next queue entry following the 1 addressed by B6. The addressed of that entry is contained in the field NEXT of the queue entry addressed by B6. After that action is taken, control passes to the end of the routine at terminal indicator 1537.

REQOUT SUBROUTINE OF THE CONTROL COMPUTER PROGRAM

FIG. 251 shows the subroutine REQOUT whose function is to request attention by the data output routine. The single parameter of this subroutine is C7, the address of a subchannel descriptor, being the subchannel for which attention is required.

The subroutine begins at terminal indicator 1540. Conditional branch point 1541 tests the field COSTAT in the subchannel descriptor addressed by C7. Only if that field is 0 will an attempt be made to make an entry in the attention queue for the data output routine. In all other cases, conditional branch point 1541 transfers control to the end of the routine at terminal indicator 1550. To signify that a queue entry has been made field COSTAT is set equal to 1, as shown in block 1542. The queue entries themselves form a circular list in consecutive locations the first of which is pointed to by the field ATTNQ contained in the type 1 descriptor. One entry in this list is processed each master frame time, that is once each 250 microseconds. It is therefore possible to estimate the delay before a particular service request will be honored by computing the relative position of the queue entry in question and the last queue entry processed by the data output routine. The position of the latter is contained in the field DXLAST of the type 1 descriptor.

Since it is required to restrain the speed with which the switching unit sends data packets to a terminal interface unit, the subroutine REQOUT attempts to make a data output attention queue entry a specific distance ahead of the position indicated by the field DXLAST. The distance in question is stored as field RATE in the channel descriptor.

Resuming then the step-by-step description of the queuing action, block 1543 initializes a counter in temporary location X7. Block 1544 then puts in temporary location L7 the address of the type 1 descriptor associated with channel C7. In block 1545 the position in the data output attention queue of which it is required to make an entry is computed. That position is the sum of the values in the field RATE of the subchannel descriptor and the value in the field DXLAST in the type 1 descriptor. This computation is performed modulo the length of the queue which is contained in field DXLENGTH of the type 1 descriptor pointed to by L7. As shown in block 1545, the position of the queue entry is stored in temporary location B7. Conditional branch point 1546 then shows that the current content of the specified queue entry is examined and if it is 0 control passes to block 1551 where the subchannel address contained in C7 is copied into the queue entry. If the queue entry is non-zero, then control passes to block 1547 for the purpose of computing an alternative position into which to make the queue entry. As is seen in block 1547, the alternative position is computed by adding one to the current position and doing this addition modulo the length of the queue. The new position is stored in location B7. Block 1548 shows that the contents of the temporary location X7 are then increased by one and conditional branch point 1549 transfers control back to conditional branch point 1546 for another attempt at making a queue entry if the resulting value in X7 is less than 0. The effect of this action is to insure that only a limited number of queuing attempts are made. When X7 no longer contains a negative number, control passes from conditional branch point 1549 to the end of the routine at terminal indicator 1550.

ASSIGN.SPACE SUBROUTINE OF THE CONTROL COMPUTER PROGRAM

FIG. 25J shows subroutine ASSIGN.SPACE whose purpose is to obtain a space assignment for the purposes of data input and storage. The parameters required by that routine are C11, which is the address of a subchannel descriptor, and T11 which is the address of a type 2 descriptor relating to that subchannel.

The routine begins at terminal indicator 15513. In block 1552 it is seen that the temporary storage location V11 is set equal to the number which is in the least significant eight bits of the field VOL in the subchannel descriptor addressed by C11. The value so obtained is equal to the total number of data blocks currently queued for data transmission with subchannel C11. The ASSIGN.SPACE subroutine will attempt to assign the number of storage locations equal to the number stored in the field NIN of the subchannel descriptor addressed by T11. However, if, in making that assignment, the total number of blocks assigned to channel C11 will exceed the number stored in the field ALLOC of the subchannel C11, then the assignment will not take place and the demand will be considered excessive at this time. Conditional branch point 1553 makes the necessary tests and transfers control to block 1559 if the demand is excessive. Otherwise, control passes to conditional branch point 1554.

The storage location UNASSIGNED SPACE contains a value equal to the number of storage locations in the common pool available for assignment. Clearly if the space assignment is to be successful, that number of free storage locations must not be less than the number which the ASSIGN.SPACE subroutine wishes to assign to channel C11. Conditional branch point 1554 makes the necessary determination by comparing the value in the storage location UNASSIGNED SPACE with the value in the field M.IN of the subchannel descriptor associated with C11. If the storage assignment cannot be made, control is transferred to block 1559, otherwise control proceeds to block 1555. In order to record that the assignment has been made, the value stored in field M.IN of subchannel descriptor C11 is transferred to field A.IN in the type 2 descriptor whose address is contained in T11. That action is shown in block 1555.

In block 1556 it is seen that the value stored in the location UNASSIGNED SPACE is reduced by the amount of the value contained in the field M.IN of the subchannel descriptor addressed by C11. To indicate that data transfer can now take place, a 0 is written into the field RSTAT of the type 2 descriptor addressed by T11 as is shown in block 1557. Immediately thereafter, control passes to the end of the subroutine at terminal indicator 1558. This subroutine is written to return to the calling routine in two different ways, one signifying success and the other signifying failure. When control reaches terminal indicator 1558 a success exit occurs Referring now to block 1559, it was seen that control reached this point if the space assignment could not in fact be made. To indicate this fact the value 1 is stored in the field RSTAT of the type 2 descriptor addressed by T11. Control then passes to terminal indicator 1560 which is the end of the subroutine and its fail exit to the calling routine.

RELEASE.SPACE SUBROUTINE OF THE CONTROL COMPUTER PROGRAM

FIG. 25K shows the subroutine RELEASE.SPACE whose function is to return to the common pool a packet buffer which once was assigned and used for storing data. The single input parameter to this subroutine is B12, the address of the packet buffer to be released.

The subroutine begins at terminal indicator 1565. In order to avoid timing problems, the greater part of this routine is obeyed with interrupts inhibited, as shown in blocks 1566 and 1569. After inhibiting interrupts, control passes to block 1567 where the first step in placing the packet buffer on the free space list is taken. The list of free packet buffer starts in working store location FREESPACE. Block 1567 shows that the address of the current head of the free storage list is transferred to the field NEXT of the packet buffer addressed by B12. Then block 1568 shows that the address contained in B12 is transferred to the storage location FREESPACE, thus placing the packet buffer addressed by B12 on the free storage list. After allowing interrupts in block 1569 the contents of the storage location UNASSIGNEDSPACE is increased by 1 to indicate that there is now one more packet buffer in the free list. That is shown in block 1570 which is the last before the end of the subroutine at terminal indicator 1571.

ASSIGN.TRUNK SUBROUTINE OF THE CONTROL COMPUTER PROGRAM

FIG. 25L shows at subroutine ASSIGN.TRUNK whose function is to obtain an idle trunk and assign it to a specified subchannel. The address of the descriptor for the subchannel in question is the single parameter for the subroutine and is denoted by C9.

The subroutine starts at terminal indicator 1575. When the subchannel C9 is intended to transfer data on a trunk to another switching unit then the field SLOOP in the descriptor for that subchannel will contain the address of a descriptor for a transmission line and associated with that transmission line will be a number of trunks each described by a single type 2 descriptor. In block 1576 the address of the type 1 descriptor is transferred to temporary storage location L9. All those trunks, which are not currently active and assigned to work for specific channels, are chained together and hang from the field TRLIST of the line descriptor L9. If that field in the line descriptor is 0, then no free trunk is available. Conditional branch point 1577 determines whether this is in fact the case and, if there is no trunk available, transfers control to the end of the subroutine at terminal indicator 1578. The subroutine has in fact two ends and two styles of returning to the calling routine. In one case the return signifies successful assignment of a trunk, in the other case the return signifies a failure to assign a trunk. Terminal indicator 1578 is the fail exit from subroutine ASSIGN.TRUNK.

Returning now to conditional branch point 1577, control will be transferred to block 1579 if the list of free trunks is not empty. In 1579 it is shown that the address of the descriptor for the first of these trunks is copied into temporary storage location D9. The list which starts in field TRLIST passes through the fields TRCHAIN in the trunk descriptors through all trunks that are free. Therefore, the assignment shown in block 1580 has the effect of removing one trunk from the list. In block 1580 the value contained in the field TRCHAIN of the trunk addressed by D9 is copied into the field TRLIST of the line descriptor addressed by L9. At this point D9 contains the address of the trunk descriptor for the trunk that is to be assigned to the channel C9. To complete the assignment the following actions are taken. The value three is stored in the field SSTAT of the trunk description addressed by D9, and in block 1582 0 is written into the field A.OUT and V.OUT of that trunk descriptor.

In block 1581 it is seen that the address of the subchannel, namely, that value which is contained in C9, is transferred into the field SSELCH of the trunk descriptor whose address is contained in D9. Next, in block 1582, the value two is stored in the field COSTAT found in the subchannel descriptor whose address is contained in C9. The field SINK in the subchannel descriptor normally contains the address of the trunk assigned to serve that subchannel. So, in block 1583, the value contained in D9 is stored in the field SINK of the subchannel descriptor addressed by C9. The channel number used in STRT signal is contained in the field CHANNO of the subchannel descriptor and block 1584 it is seen that this value is transferred to the field SELNO of the trunk descriptor addressed by D9.

Having thus completed the assignment of a trunk to the subchannel C9, an STRT signal is sent along the trunk to the switching unit of the receiving end. To cause this to happen, a call is made to subroutine REQSIG with input parameter F6 equal to 1. The action taken by that subroutine has already been specified. After completion of the call, control passes to the successful exit of the subroutine at terminal indicator 1586.

RELEASE.TRUNK SUBROUTINE OF THE CONTROL COMPUTER PROGRAM

FIG. 25M shows the subroutine RELEASE TRUNK whose purpose is to disassociate a trunk from a particular channel and make that trunk available to all channels sharing the same transmission line. The input parameters to this subroutine are T10, the address of the trunk descriptor for the trunk to be released, and C10, the address of the channel descriptor currently associated with the trunk.

The routine starts at terminal indicator 1590. When the subchannel C10 is not being served by a trunk, the field SINK in the descriptor for that subchannel must be set to 0. That action is taken in block 1591. Block 1592 sets in temporary storage location L10 the address of the descriptor for the line over which transmissions from subchannel C10 are sent. The address of that line descriptor is found in field SLOOP of the subchannel descriptor addressed by C10.

In order to make the trunk available for reassignment, it must be added to the chain of free trunks which starts at the field TRLIST in the line descriptor whose address is now contained in temporary location L10. All these trunks in that list are connected by the fields TRCHAIN in the trunk descriptor. Thus block 1593 is seen to add the trunk whose descriptor address is T10 to the list starting in TRLIST of the line descriptor whose address is contained in L10.

Having thus released the trunk, block 1594 is obeyed wherein the value four is stored in the status field SSTAT of the trunk T10. This indicates that the trunk is now idle. Finally, an IDL signal must be sent over that trunk to the switching unit of the receiving end. That action is shown in block 1595 where a call is made to subroutine REQSIG with the input parameter F6 set equal to two. After completion of that call, control passes to the end of the subroutine at terminal indicator 1596.

RETREAT SUBROUTINE OF THE CONTROL COMPUTER PROGRAM

FIG. 25N shows the subroutine RETREAT whose function is to backtrack over the queue of data waiting to be transmitted in association with a particular subchannel. Input parameters to the subroutine are T8, the address of the type 2 descriptor for the TIU or trunk affected by the backtrack operation, and S8, a sequence number which determines how far the backtrack operation should go. In fact S8 is the sequence number of the last packet successfully transmitted and therefore the sequence number of the most recently transmitted packet that need not be involved in the backtrack operation.

The subroutine starts in terminal indicator 1600. It is seen that in block 1601 the temporary storage location C8 is set equal to the address of the descriptor for the subchannel which the TIU or trunk T8 is currently serving. The field SSELCH of the type 2 descriptor addressed by T8 contains the address of the subchannel descriptor in question. If that subchannel is currently queued for attention by the data output routine then the backtrack operation cannot be made. That determination is made by conditional branch point 1602 which, if the backtrack cannot take place, transfers control to the end of the subroutine at terminal indicator 1621. Otherwise, control passes on to conditional branch point 1603. The action required on backtrack depends on the type of packet most recently transmitted to the TIU or trunk described by T8.

If the state as stored in the field SSTAT of the type 2 descriptor contains value three then an SEL or STRT signal was transmitted and the switching unit is waiting for an ACK signal from the TIU or trunk. If that is the case, conditional branch point 1603 transfers control to block 1616. Otherwise, control passes to conditional branch point 1604. If the field SSTAT contains the value two or the value four then the TIU or trunk T8 is no longer involved in data transfer and no backtrack is possible. In this case, conditional branch point 1604 transfers control to the end of the subroutine at terminal indicator 1621. Otherwise, control passes to block 1605.

The distance of backtrack is determined by the calculation shown in block 1605. That distance is the difference between the value contained in field SSEQ of the type 2 descriptor addressed by T8 and the sequence number S8 supplied an input parameter to the RETREAT subroutine. The difference between these two numbers is computed modulo 64 since the sequence number is a six-bit quantity and that difference is stored in the temporary location D8. If D8 is 0, then no backtrack is required and conditional branch point 1606 will transfer control to conditional branch point 1613. Otherwise, control passes to block 1607.

In block 1607 it is seen that the value stored in D8 is subtracted from the value contained in the field V.OUT of the type 2 descriptor addressed by T8. Then, in block 1608 the sequence number S8 is stored in the field SSEQ of the type 2 descriptor addressed by T8. The status field SSTAT of the type 2 descriptor addressed by T8 is set equal to 0 in block 1609 and the field COSTAT of the channel descriptor addressed by C8 is set equal to 0 in block 1610. The program loop involving blocks 1611, 1612, and 1615 provides the backtrack operation across untransmitted data blocks. Control passes once around this loop for each data block across which backtrack must pass. Block 1611 subtracts one from D8 each time around the loop and conditional branch point 1612 checks to see when D8 goes negative transferring control out of the loop to conditional branch point 1613 when that happens.

Thus it is seen that control passes around the loop exactly the number of times that is contained in the temporary storage location D8 before the loop execution begins. Each time around the loop block 1615 is obeyed. That block shows how the pointer NEXTOUT contained in the channel descriptor addressed by C8 is updated. That pointer points to a block in the queue of data associated with the subchannel and the field PREV in each queue entry contains the address of the queue entry for the data which would previously have been transmitted. Thus, to backtrack across one block of data it is necessary to copy the contents of the field PREV from the queue entry addressed by NEXTOUT into the field NEXTOUT.

Turning now to the action which takes place when control has passed out of the loop to conditional branch point 1613, it is seen that that branch point tests the input parameter W8. That parameter will be non-zero if the reason for obeying the RETREAT routine is that the terminal interface unit corresponding to T8 rejected transmissions on the ground that they were on a channel not the same as the one on which the terminal interface unit was currently transmitting. If that were the case, then control passes to block 1620, otherwise it moves on to block 1614. In block 1614 is a call on the subroutine REQOUT whose purpose is to make an entry in the list requesting the attention of the data output routine. After completion of that call control passes to the end of the subroutine at terminal indicator 1621.

Returning to conditional branch point 1603, it is recalled that control passes through there to block 1616 if the backtrack operation was requested when the switching unit was waiting for an acknowledgment from the SEL or STRT signal. The action taken here is, first, to transfer the sequence number contained in S8 to the field SSEQ of the type 2 descriptor addressed by T8, then conditional branch point 1617 tests the input parameter W8 to see if it is zero. If non-zero, it indicates that a channel-select was sent to a terminal interface unit and the terminal interface unit rejected the channel-select on the ground that the channel number did not correspond to the number of the channel on which data transmission was currently taking place. If that is the case, control will pass through conditional branch point 1617 to block 1619. Otherwise, it will pass to block 1618.

It is seen that block 1618 calls for a retransmission of the SEL or STRT signal. That block shows a call to subroutine REQSIG whose purpose is to make a queue entry for the signal output routine. After requesting transmission of this signal control passes to the end of the subroutine at terminal indicator 1621. When block 1619 is obeyed, the field CSTAT in the channel descriptor addressed by C8 is set equal to three. The effect that this has is to prevent that channel from being automatically selected again until the same channel is selected for data transmission out of the terminal interface unit.

From block 1619 to block 1620 it is seen that the field SSTAT in the type 2 descriptor addressed by T8 is set equal to two. The purpose here is to indicate that there is no known subchannel which is in a position to transmit data to the TIU or trunk described by T8. After setting this status field control passes to the end of the subroutine at terminal indicator 1621.

Appendix A

```
0 A=$0->W0
1 A=$0->W1
2 A=$0->W2
3 A=$0->W4
4 A=$0->W6
5 A=$0->W5
6 A=$80->V2
7 A=$20->V2
8 A=$3->W0
9 A=$6&V0
10 BF 6
11 A=$3!W0
12 BT 14
13 A=$2->V0
14 A=$20&V0
15 WAIT 0
16 BT 14
17 A=$1!W2
18 BF 26
19 A=$4->W2
20 A=$90&V0
21 A=A+W3
22 A->W3
23 BF 26
24 A=$2->W2
25 A=W15
26 A->V4
27 A=$10->V2
28 A=$4!W1
```

Initialization Instructions

Data Input Routine $D_{37}$ Sequence

| | | |
|---|---|---|
| 29 | BF 35 | |
| 30 | A=S8->W1 | Data Output Routine |
| 31 | A=W12 | $D_{37}$ Sequence |
| 32 | BF 35 | |
| 33 | A=S40->V2 | |
| 34 | A=S1->W1 | |
| 35 | A=S11W0 | Signal Output Routine |
| 36 | BF 38 | $D_{37}$ Sequence |
| 37 | A=S8->V0 | |
| 38 | WAIT 0 | |
| 39 | A=W8 | Signal Output Routine |
| 40 | A->V6 | $S_0$ Sequence |
| 41 | WAIT 0 | |
| 42 | A=V6 | Signal Input Routine |
| 43 | A->W10 | $S_1$ Sequence |
| 44 | A=W9 | Signal Output Routine |
| 45 | A->V6 | $S_1$ Sequence |
| 46 | WAIT 0 | |
| 47 | A=V6 | Signal Input Routine |
| 48 | A->W11 | $S_2$ Sequence |
| 49 | A=W9 | |
| 50 | A=A\|W8 | |
| 51 | A=A\|V1 | Signal Output Routine |
| 52 | A->V6 | $S_2$ Sequence |
| 53 | A=S4&V0 | |
| 54 | BT 56 | |
| 55 | A=S2->W0 | |
| 56 | WAIT 0 | |
| 57 | A=S21W1 | Data Output Routine |
| 58 | BF 60 | $S_3$ Sequence |
| 59 | A=S4->V0 | |

```
60 A=S12&V8
61 A=S21A
62 BF 75
63 A=V6
64 A=A|W10
65 A=A|W11
66 A=A|V1                    Signal Input Routine
67 BF 75                     S3 Sequence
68 A=S3&W10
69 A=S47+A
70 GOTO A
71 GOTO 192
72 GOTO 211
73 GOTO 228
74 GOTO 75
75 WAIT 0
76 A=W12                     Data Output Routine
77 A->V6                     D0 Sequence
78 WAIT 0
79 A=W2
80 BF 83                     Data Input Routine
81 A=V6                      D1 Sequence
82 A->W14
83 A=W13                     Data Output Routine
84 A->V6                     D1 Sequence
85 WAIT 0
86 A=V6                      Data Input Routine
87 A->W15                    D2 Sequence
88 A=W13
89 A=A|W12                   Data Output Routine
90 A=A|V1                    D2 Sequence
91 A->V6
```

```
92 WAIT 0
93 A=$4&V0
94 BT 97
95 A=$80->V2
96 A=$4->W1
97 A=$24V0
98 BT 127
99 A=W2
100 BF 127
101 A=$0->W3
102 A=$FC&W14
103 A=A!W6
104 BT 106
105 A=$8->W3
106 A=W7
107 A=A!V5
108 BT 110
109 A=$4->W3
110 A=V6
111 A=A!W14
112 A=A!W15
113 A=A!V1
114 BT 116
115 A=$2->W3
116 A=$3&W14
117 A->W14
118 A=$21A
119 BF 121
120 A=$4->V2
121 A=$FF!W15
122 A=$1+A
123 A->W15
```

Data Output Routine $D_3$ Sequence

Data Input Routine $D_3$ Sequence

```
124 A->V4
125 A=$20->V2
126 A=$1->W2
127 A=$21W0
128 BF 152
129 A=$41W2
130 BF 137
131 A=$FC+W6
132 A->W8
133 A=W3
134 A->W12
135 A=$0->W2
136 GOTO 151
137 A=W1
138 BF 152
139 A=V4
140 A->W7
141 A->W12
142 A=$1+W4
143 A->W8
144 A=$10->W1
145 A=$80->V2
146 A=$21W2
147 BF 151
148 A=$20->V2
149 A=$4->W2
150 A=$4->W3
151 A=$1->W0
152 A=$41&W1
153 BT 176
154 A=$94&V2
155 BT 176
```

Signal Output Routine

Asynchronous Sequence

```
156 A=$0->W12
157 A=$4+W4
158 A->W4
159 A=A!W5
160 BF 162
161 A=$1->W12
162 A=$4&V2
163 BT 165                    Data Output Routine
164 A=$2->W12                 Asynchronous Sequence
165 A=W12
166 A=A+W4
167 A->W12
168 A=V3
169 A->W13
170 A=$2->W1
171 A=V3
172 BF 176
173 A=$94&V2
174 BF 176
175 A=$0->W1
176 A=$2!W2
177 BF 180
178 A=$48&V2
179 BF 185
180 A=$8!W2
181 BF 191
182 A=$8&V2                   Data Input Routine
183 BT 188                    Asynchronous Sequence
184 GOTO 191
185 A=$0->W2
186 A=W14
187 BT 189
```

```
188 A=$4->W2
189 A=$4+W6
190 A->W6
191 GOTO 9
192 A=$28&W1
193 BF 196
194 A=$10|W1                    Signal Input Routine
195 BT 75                       S3 Sequence
196 A=$0->W1
197 GOTO 199
198 A=$2->W1
199 WAIT 0
200 A=W10
201 A=A|W4
202 BF 210
203 A=$20->W1
204 A=W11                       Signal Input Routine
205 A->W5                       D0 Sequence
206 A=A|W4
207 BT 210
208 A=$40->V2
209 A=$41->W1
210 GOTO 76
211 A=W2
212 BF 227
213 A=$FC&W10
214 A=A|W6
215 BT 219
216 A=$8->W3
217 A=$4->W2
218 GOTO 227                    Signal Input Routine
```

```
219 A=$0->W3
220 A=W11
221 A->V5
222 A=A|W7
223 BT 226
224 A=$4->W3
225 A=$8->V2
226 A=$8->W2
227 GOTO 75
```

$S_3$ Sequence

```
228 A=W11
229 BT 8
230 A=$1!W11
231 BF 233
232 GOTO 0
233 A=$2->W0
234 GOTO 75
```

Signal Input Routine $S_3$ Sequence

Appendix B

| | Memory Address | Memory Contents | | | | |
|---|---|---|---|---|---|---|
| 1 | $1200 | $0000 | $0000 | $0000 | $0000 | Level 2 |
| 2 | $1204 | $0000 | $0000 | $0000 | $0000 | |
| 3 | $1208 | $0000 | $0000 | $0000 | $0000 | |
| 4 | $120C | $0000 | $0000 | $0000 | $0000 | |
| 5 | $1210 | $0000 | $0000 | $0000 | $0000 | |
| 6 | $1214 | $0000 | $0000 | $61F4 | $69F4 | Level 2 Interrupt Routine |
| 7 | $1218 | $4100 | $120C | $BE40 | $120D | |
| 8 | $121C | $69F1 | $5650 | $000B | $121A | |
| 9 | $1220 | $B70D | $120D | $BE2D | $0006 | Signal Input Level 2 |
| 10 | $1224 | $DE2D | $0007 | $12B9 | $69E7 | |
| 11 | $1228 | $B71D | $0003 | $B202 | $0368 | |
| 12 | $122C | $61E6 | $B62D | $0014 | $4503 | |
| 13 | $1230 | $123A | $BA01 | $69E1 | $9C03 | |

| | | | | | |
|---|---|---|---|---|---|
| 14 | $1234 | $4557 | $1236 | $1298 | $1243 |
| 15 | $1238 | $12DA | $12DA | $BA01 | $69D8 |
| 16 | $123C | $9C03 | $4557 | $123F | $1263 |
| 17 | $1240 | $1271 | $128E | $12AD | $B1D0 |
| 18 | $1244 | $94FC | $0B1D | $D206 | $4706 |
| 19 | $1248 | $12DA | $F404 | $94FC | $6206 |
| 20 | $124C | $B1B4 | $6204 | $5600 | $13AB |
| 21 | $1250 | $BE2D | $0001 | $4401 | $1261 |
| 22 | $1254 | $B20D | $D1BD | $1203 | $BA00 |
| 23 | $1258 | $3FFA | $AC10 | $6E2D | $0005 |
| 24 | $125C | $B20A | $662D | $0010 | $5600 |
| 25 | $1260 | $13BC | $4507 | $12DA | $B1B0 |
| 26 | $1264 | $94FC | $0B1D | $D20B | $4706 |
| 27 | $1268 | $12DA | $B207 | $9401 | $4501 |
| 28 | $126C | $12DA | $B1A5 | $C20B | $6211 |
| 29 | $1270 | $3E31 | $B1A2 | $94FC | $0166 |
| 30 | $1274 | $F19E | $619D | $B62D | $0003 |
| 31 | $1278 | $D403 | $120A | $BE2D | $0005 |
| 32 | $127C | $AC10 | $B20D | $D194 | $4701 |
| 33 | $1280 | $12DA | $5600 | $13AB | $0B1D |
| 34 | $1284 | $B206 | $F404 | $94FC | $6206 |
| 35 | $1288 | $B178 | $6204 | $B188 | $BA0D |
| 36 | $128C | $BA0D | $3FC5 | $B185 | $94FC |
| 37 | $1290 | $6406 | $5600 | $13AB | $B403 |
| 38 | $1294 | $662D | $0003 | $4507 | $12DA |
| 39 | $1298 | $B17A | $4506 | $12AD | $B178 |
| 40 | $129C | $94FC | $0B1D | $D20B | $4706 |
| 41 | $12A0 | $12DA | $B207 | $BA09 | $D401 |
| 42 | $12A4 | $4701 | $12B5 | $D403 | $4706 |
| 43 | $12A8 | $12DA | $5600 | $1409 | $4507 |
| 44 | $12AC | $12DA | $B166 | $94FC | $BC04 |
| 45 | $12B0 | $9962 | $5600 | $14A4 | $4507 |

| | | | | | | |
|---|---|---|---|---|---|---|
| 46 | $12B4 | $12DA | $695A | $09CC | $B202 | |
| 47 | $12B8 | $D203 | $4701 | $12CB | $0B10 | |
| 48 | $12BC | $B71C | $0002 | $BA03 | $B650 | |
| 49 | $12C0 | $0002 | $6203 | $5600 | $139D | |
| 50 | $12C4 | $B94B | $B5FF | $7205 | $B650 | |
| 51 | $12C8 | $0002 | $D203 | $1DF1 | $461C | |
| 52 | $12CC | $12D3 | $B500 | $7205 | $5600 | |
| 53 | $12D0 | $1451 | $4507 | $12DA | $B62D | |
| 54 | $12D4 | $0012 | $33FA | $5600 | $1460 | |
| 55 | $12D8 | $5600 | $1486 | $B933 | $B640 | |
| 56 | $12DC | $120E | $6206 | $3F42 | $B92E | Data Input Level 2 |
| 57 | $12E0 | $BA04 | $C92C | $DC05 | $124D | |
| 58 | $12E4 | $42F0 | $0000 | $BE2D | $0000 | |
| 59 | $12E8 | $B200 | $662D | $0000 | $4200 | |
| 60 | $12EC | $1205 | $6924 | $B71D | $0001 | |
| 61 | $12F0 | $B110 | $662D | $0004 | $B202 | |
| 62 | $12F4 | $611C | $94FC | $0B1D | $D206 | |
| 63 | $12F8 | $1C11 | $F404 | $94FC | $6206 | |
| 64 | $12FC | $7A0E | $BA05 | $B112 | $9403 | |
| 65 | $1300 | $4501 | $1313 | $D402 | $4701 | |
| 66 | $1304 | $1311 | $5600 | $13D4 | $4507 | |
| 67 | $1308 | $1313 | $B403 | $BC08 | $5600 | |
| 68 | $130C | $146E | $B904 | $5600 | $139D | |
| 69 | $1310 | $3E1F | $5600 | $13AB | $B71D | |
| 70 | $1314 | $0004 | $B600 | $1210 | $9402 | |
| 71 | $1318 | $662D | $0002 | $3203 | $B6F0 | |
| 72 | $131C | $0100 | $0400 | $7205 | $B600 | |
| 73 | $1320 | $1211 | $662D | $0003 | $B62D | |
| 74 | $1324 | $0000 | $6204 | $B207 | $D402 | |
| 75 | $1328 | $4706 | $132D | $5600 | $1409 | |
| 76 | $132C | $3E03 | $5600 | $1486 | $3FB0 | |
| 77 | $1330 | $B600 | $1201 | $3861 | $B5F8 | Timeout Routine Level 2 |

| | | | | | | |
|---|---|---|---|---|---|---|
| 78 | $1334 | $6600 | $1201 | $BE40 | $1202 | |
| 79 | $1338 | $6E00 | $1202 | $B203 | $0BD1 | |
| 80 | $133C | $BA05 | $D401 | $4701 | $1355 | |
| 81 | $1340 | $D402 | $4701 | $1358 | $D403 | |
| 82 | $1344 | $1216 | $B600 | $1200 | $C204 | |
| 83 | $1348 | $3603 | $F6F0 | $8000 | $D6F0 | |
| 84 | $134C | $07D0 | $1A0D | $B600 | $1200 | |
| 85 | $1350 | $6204 | $0900 | $5600 | $146E | |
| 86 | $1354 | $3E06 | $5600 | $13D4 | $3E03 | |
| 87 | $1358 | $5600 | $13BC | $BE2D | $0007 | |
| 88 | $135C | $4557 | $135E | $1363 | $1368 | |
| 89 | $1360 | $137C | $1368 | $1390 | $BE2D | |
| 90 | $1364 | $0009 | $5600 | $1409 | $3E2C | |
| 91 | $1368 | $B600 | $1200 | $0B1D | $C208 | |
| 92 | $136C | $3603 | $F6F0 | $8000 | $D432 | |
| 93 | $1370 | $1A23 | $B600 | $1200 | $662D | |
| 94 | $1374 | $0008 | $B20B | $C404 | $94FC | |
| 95 | $1378 | $0911 | $5600 | $14A4 | $3E18 | |
| 96 | $137C | $0B1D | $B71C | $0005 | $A7FC | |
| 97 | $1380 | $0010 | $BA01 | $4401 | $1393 | |
| 98 | $1384 | $B207 | $D402 | $1607 | $D403 | |
| 99 | $1388 | $1C03 | $02C1 | $1203 | $BA00 | |
| 100 | $138C | $3FF6 | $5600 | $1409 | $3E04 | |
| 101 | $1390 | $B402 | $5600 | $146E | $5600 | |
| 102 | $1394 | $1FA5 | $B600 | $120A | $BE00 | |
| 103 | $1398 | $120B | $4000 | $120C | $4947 | |
| 104 | $139C | $1215 | $0000 | $42F0 | $0000 | RELEASE.SPACE Subroutine |
| 105 | $13A0 | $B600 | $1204 | $6200 | $6E00 | |
| 106 | $13A4 | $1204 | $4200 | $1205 | $7E00 | |
| 107 | $13A8 | $1203 | $4547 | $139D | $0000 | E.BURST.IN Subroutine |
| 108 | $13AC | $0B1D | $B20F | $F20E | $7600 | |
| 109 | $13B0 | $1203 | $0900 | $620F | $620E | |

| | | | | | | |
|---|---|---|---|---|---|---|
| 110 | $13B4 | $5600 | $146E | $BE2D | $0005 | |
| 111 | $13B8 | $B401 | $620F | $4547 | $13AB | |
| 112 | $13BC | $0000 | $B201 | $3C04 | $5600 | S.BURST.IN Subroutine |
| 113 | $13C0 | $14E0 | $13C8 | $0900 | $620F | |
| 114 | $13C4 | $5600 | $13D4 | $4547 | $13BC | |
| 115 | $13C8 | $B402 | $662D | $0003 | $0900 | |
| 116 | $13CC | $5600 | $146E | $BE2D | $0005 | |
| 117 | $13D0 | $B401 | $620F | $4547 | $13BC | |
| 118 | $13D4 | $0000 | $B62D | $000F | $3C04 | S.BUNDLE.IN Subroutine |
| 119 | $13D8 | $5600 | $13EB | $13E4 | $0F1D | |
| 120 | $13DC | $B210 | $D20F | $1602 | $B20F | |
| 121 | $13E0 | $0600 | $620E | $720F | $0F1D | |
| 122 | $13E4 | $0900 | $5600 | $146E | $BE2D | |
| 123 | $13E8 | $0005 | $4547 | $13D4 | $0000 | ASSIGN.SPACE Subroutine |
| 124 | $13EC | $B205 | $94FF | $0600 | $F209 | |
| 125 | $13F0 | $D206 | $4704 | $1403 | $B206 | |
| 126 | $13F4 | $D600 | $1203 | $4702 | $1403 | |
| 127 | $13F8 | $662D | $000F | $0600 | $7600 | |
| 128 | $13FC | $1203 | $0900 | $662D | $0003 | |
| 129 | $1400 | $79EB | $4547 | $13EB | $B401 | |
| 130 | $1404 | $662D | $0003 | $B9E5 | $4557 | |
| 131 | $1408 | $0000 | $0000 | $B71D | $0001 | S.BURST.OUT Subroutine |
| 132 | $140C | $B62D | $0014 | $3812 | $B207 | |
| 133 | $1410 | $D401 | $123E | $B205 | $3C06 | |
| 134 | $1414 | $B20F | $323A | $5600 | $1506 | |
| 135 | $1418 | $3E37 | $0900 | $6207 | $662D | |
| 136 | $141C | $0007 | $5600 | $1456 | $3E30 | |
| 137 | $1420 | $B62D | $0007 | $D402 | $1C10 | |
| 138 | $1424 | $6E2D | $0009 | $B20D | $662D | |
| 139 | $1428 | $000A | $B207 | $D403 | $1C05 | |
| 140 | $142C | $B62D | $0005 | $A410 | $0210 | |
| 141 | $1430 | $1C03 | $B402 | $6207 | $B62D | |

| | | | | | | |
|---|---|---|---|---|---|---|
| 142 | $1434 | $0009 | $0210 | $1C19 | $B207 | |
| 143 | $1438 | $9401 | $3C16 | $B20B | $D205 | |
| 144 | $143C | $1413 | $662D | $0012 | $0900 | |
| 145 | $1440 | $6207 | $B401 | $5600 | $146E | |
| 146 | $1444 | $B403 | $662D | $0007 | $B600 | |
| 147 | $1448 | $1200 | $662D | $0008 | $5600 | |
| 148 | $144C | $1460 | $5600 | $1486 | $4547 | |
| 149 | $1450 | $1409 | $0000 | $B207 | $D401 | E.BURST.OUT Subroutine |
| 150 | $1454 | $120A | $B402 | $6207 | $B62D | |
| 151 | $1458 | $0014 | $3604 | $B402 | $662D | |
| 152 | $145C | $0007 | $51AC | $4547 | $1451 | |
| 153 | $1460 | $0000 | $0F1D | $B212 | $D213 | S.BUNDLE.OUT Subroutine |
| 154 | $1464 | $1802 | $B213 | $0600 | $6211 | |
| 155 | $1468 | $7412 | $0F1D | $4547 | $1460 | |
| 156 | $146C | $0000 | $0000 | $0000 | $61FE | REQSIG Subroutine |
| 157 | $1470 | $69FC | $BE00 | $120D | $B203 | |
| 158 | $1474 | $D202 | $120C | $0B10 | $B1F6 | |
| 159 | $1478 | $6201 | $B1F3 | $6202 | $671D | |
| 160 | $147C | $0003 | $B200 | $BE00 | $120D | |
| 161 | $1480 | $6203 | $4547 | $146E | $0000 | |
| 162 | $1484 | $0000 | $0000 | $0000 | $B207 | REQOUT Subroutine |
| 163 | $1488 | $3C18 | $B401 | $6207 | $B5FD | |
| 164 | $148C | $61F9 | $B206 | $69F5 | $BA0E | |
| 165 | $1490 | $F201 | $61F3 | $B1F2 | $920A | |
| 166 | $1494 | $F209 | $B620 | $0000 | $4501 | |
| 167 | $1498 | $149D | $79EB | $79EB | $19F7 | |
| 168 | $149C | $3E04 | $B9E6 | $6E20 | $0000 | |
| 169 | $14A0 | $4547 | $1486 | $0000 | $0000 | |
| 170 | $14A4 | $0000 | $94FC | $61FC | $69FC | RETREAT Subroutine |
| 171 | $14A8 | $BE2D | $0009 | $B207 | $D401 | |
| 172 | $14AC | $1231 | $0B1D | $B207 | $D403 | |
| 173 | $14B0 | $4701 | $14CF | $D401 | $142A | |

| | | | | | | |
|---|---|---|---|---|---|---|
| 174 | $14B4 | $B20B | $C1ED | $3215 | $3602 | |
| 175 | $14B8 | $F440 | $0600 | $6600 | $1214 | |
| 176 | $14BC | $7211 | $B1E5 | $620B | $0900 | |
| 177 | $14C0 | $6207 | $BA09 | $6207 | $7E00 | |
| 178 | $14C4 | $1214 | $1406 | $B203 | $B620 | |
| 179 | $14C8 | $0001 | $6203 | $3FF9 | $B1L8 | |
| 180 | $14CC | $3C0E | $51B9 | $3E0F | $B1D3 | |
| 181 | $14D0 | $0B1D | $620B | $B1D1 | $3C04 | |
| 182 | $14D4 | $B401 | $5199 | $3E07 | $BA09 | |
| 183 | $14D8 | $B403 | $6207 | $B402 | $662D | |
| 184 | $14DC | $0007 | $4547 | $14A4 | $0000 | |
| 185 | $14E0 | $0000 | $69FE | $BA0E | $B20C | ASSIGN.TRUNK Subroutine |
| 186 | $14E4 | $321E | $0BC0 | $B620 | $0014 | |
| 187 | $14E8 | $620C | $0B1C | $B403 | $6207 | |
| 188 | $14EC | $0900 | $6212 | $6211 | $B9F0 | |
| 189 | $14F0 | $6E2C | $0009 | $B402 | $6207 | |
| 190 | $14F4 | $671C | $0001 | $B20D | $662C | |
| 191 | $14F8 | $000A | $0FCD | $B401 | $5173 | |
| 192 | $14FC | $0BDC | $BE2D | $0005 | $79E1 | |
| 193 | $1500 | $4547 | $14E0 | $B9DE | $4557 | |
| 194 | $1504 | $0000 | $0000 | $0000 | $0900 | RELEASE.TRUNK Subroutine |
| 195 | $1508 | $6201 | $BA0E | $B20C | $662D | |
| 196 | $150C | $0014 | $671D | $000C | $B404 | |
| 197 | $1510 | $662D | $0007 | $B402 | $515B | |
| 198 | $1514 | $B9F1 | $4547 | $1506 | $0000 | |
| 199 | $1518 | $0000 | $0000 | $0000 | $0000 | |
| 200 | $1F60 | $0000 | $0000 | $0000 | $0000 | |
| 201 | $1F64 | $0000 | $0000 | $0000 | $0000 | |
| 202 | $1F68 | $0000 | $0000 | $0000 | $0000 | |
| 203 | $1F6C | $0000 | $0000 | $0000 | $0000 | |
| 204 | $1F70 | $0000 | $0000 | $0000 | $0000 | |
| 205 | $1F74 | $0000 | $0000 | $0000 | $0000 | |

| | | | | | | |
|---|---|---|---|---|---|---|
| 206 | $1F78 | $0000 | $0000 | $0000 | $0000 | |
| 207 | $1F7C | $0000 | $0000 | $0000 | $0000 | |
| 208 | $1F80 | $0000 | $0000 | $0000 | $0000 | |
| 209 | $1F84 | $0000 | $0000 | $0000 | $0000 | |
| 210 | $1F88 | $0000 | $0000 | $0000 | $0000 | |
| 211 | $1F8C | $0000 | $0000 | $0000 | $0000 | |
| 212 | $1F90 | $0000 | $0000 | $0000 | $0000 | |
| 213 | $1F94 | $0000 | $0000 | $0000 | $0000 | |
| 214 | $1F98 | $0000 | $0000 | $0000 | $0000 | |
| 215 | $1F9C | $0000 | $0000 | $0000 | $0000 | |
| 216 | $1FA0 | $0000 | $0000 | $0000 | $0000 | |
| 217 | $1FA4 | $0000 | $0000 | $B9E0 | $0411 | Call Management Routine |
| 218 | $1FA8 | $99E7 | $69DD | $F9B6 | $69D7 | |
| 219 | $1FAC | $BA00 | $4401 | $2060 | $69D2 | |
| 220 | $1FB0 | $B207 | $D401 | $1CAE | $B203 | |
| 221 | $1FB4 | $D204 | $12AB | $B620 | $0003 | |
| 222 | $1FB8 | $61CC | $F484 | $61C9 | $BE20 | |
| 223 | $1FBC | $0000 | $9C03 | $4517 | $1FC0 | |
| 224 | $1FC0 | $1FC4 | $1FD1 | $1FCB | $1FF9 | |
| 225 | $1FC4 | $B9BF | $FC10 | $5600 | $2062 | |
| 226 | $1FC8 | $69B8 | $4507 | $2031 | $B9B8 | |
| 227 | $1FCC | $5600 | $2062 | $69B2 | $4507 | |
| 228 | $1FD0 | $2031 | $B9B2 | $B200 | $F210 | |
| 229 | $1FD4 | $C6F0 | $0200 | $D600 | $1208 | |
| 230 | $1FD8 | $1451 | $B600 | $1207 | $324E | |
| 231 | $1FDC | $5600 | $2062 | $69A2 | $B9A4 | |
| 232 | $1FE0 | $FC10 | $5600 | $2089 | $4406 | |
| 233 | $1FE4 | $2029 | $BE00 | $1207 | $B200 | |
| 234 | $1FE8 | $6600 | $1207 | $B70C | $1F83 | |
| 235 | $1FEC | $5600 | $20D1 | $BC10 | $F7FC | |
| 236 | $1FF0 | $0010 | $5600 | $20D1 | $B990 | |
| 237 | $1FF4 | $B207 | $620F | $4507 | $2031 | |
| 238 | $1FF8 | $0000 | $B98A | $5600 | $2089 | |

| | | | | | |
|---|---|---|---|---|---|
| 239 | $1FFC | $4401 | $2029 | $B207 | $D401 |
| 240 | $2000 | $1260 | $69F7 | $AC10 | $B207 |
| 241 | $2004 | $D401 | $125B | $B70D | $1F83 |
| 242 | $2008 | $B20D | $662D | $0007 | $B20E |
| 243 | $200C | $B620 | $000C | $3805 | $B20E |
| 244 | $2010 | $BE20 | $000E | $3E08 | $BA01 |
| 245 | $2014 | $0411 | $BA00 | $4401 | $201A |
| 246 | $2018 | $B20D | $3DFC | $6966 | $B9DD |
| 247 | $201C | $5600 | $20AC | $AC10 | $5608 |
| 248 | $2020 | $20AC | $9DE0 | $B608 | $1207 |
| 249 | $2024 | $6200 | $6E00 | $1207 | $4507 |
| 250 | $2028 | $2031 | $B958 | $B650 | $0003 |
| 251 | $202C | $6203 | $B957 | $5600 | $139D |
| 252 | $2030 | $3E30 | $B952 | $FC10 | $0900 |
| 253 | $2034 | $0511 | $A200 | $4406 | $2034 |
| 254 | $2038 | $B94B | $6210 | $0900 | $6640 |
| 255 | $203C | $1F82 | $B944 | $0900 | $6207 |
| 256 | $2040 | $B650 | $0003 | $6203 | $D204 |
| 257 | $2044 | $1203 | $5600 | $1486 | $B939 |
| 258 | $2048 | $4401 | $2029 | $B71D | $0004 |
| 259 | $204C | $B402 | $662D | $0002 | $B6F0 |
| 260 | $2050 | $0101 | $7205 | $B132 | $662D |
| 261 | $2054 | $0003 | $B62D | $0000 | $6204 |
| 262 | $2058 | $B207 | $D402 | $1C04 | $5600 |
| 263 | $205C | $1409 | $3E03 | $5600 | $1486 |
| 264 | $2060 | $4547 | $1FA5 | $0000 | $B203 |
| 265 | $2064 | $0368 | $D415 | $120A | $B620 |
| 266 | $2068 | $1000 | $33F7 | $0BD0 | $B620 |
| 267 | $206C | $000E | $6205 | $0B1D | $3E18 |
| 268 | $2070 | $B203 | $94FF | $B620 | $1100 |
| 269 | $2074 | $3C03 | $0B10 | $3234 | $6205 |
| 270 | $2078 | $B204 | $0368 | $B630 | $0008 |
| 271 | $207C | $3C03 | $0B10 | $322C | $6206 |
| 272 | $2080 | $0B10 | $0411 | $BA00 | $4401 |

DECODE.ROUTE Subroutine

| | | | | | | |
|---|---|---|---|---|---|---|
| 273 | $2084 | $20AA | $B20D | $3DFC | $4547 | |
| 274 | $2088 | $2062 | $0000 | $0BD1 | $B600 | TRACE.ROUTE Subroutine |
| 275 | $208C | $1F81 | $B620 | $000E | $6205 | |
| 276 | $2090 | $0B10 | $B620 | $000C | $3806 | |
| 277 | $2094 | $B62D | $0007 | $0BC0 | $FC0D | |
| 278 | $2098 | $3E0B | $B62D | $0004 | $94FF | |
| 279 | $209C | $0BC0 | $BE00 | $1F81 | $BA01 | |
| 280 | $20A0 | $6E2D | $0006 | $0411 | $0BD1 | |
| 281 | $20A4 | $BA00 | $4401 | $20AA | $B20D | |
| 282 | $20A8 | $02C0 | $1DFA | $4547 | $2089 | |
| 283 | $20AC | $0000 | $BA0E | $B214 | $3805 | REMOVE.SUBCHANNEL Subroutine |
| 284 | $20B0 | $B5FF | $7211 | $FC0D | $3E04 | |
| 285 | $20B4 | $B81A | $BA01 | $0411 | $0BC1 | |
| 286 | $20B8 | $BA00 | $D815 | $1DFD | $B200 | |
| 287 | $20BC | $662C | $0000 | $B810 | $B209 | |
| 288 | $20C0 | $7600 | $1209 | $BA03 | $B71C | |
| 289 | $20C4 | $0001 | $B600 | $1208 | $662C | |
| 290 | $20C8 | $0000 | $6E00 | $1208 | $B803 | |
| 291 | $20CC | $4547 | $20AC | $0000 | $0000 | |
| 292 | $20D0 | $0000 | $0000 | $69FC | $B7FC | CREATE.SUBCHANNEL Subroutine |
| 293 | $20D4 | $FFF0 | $D70C | $1F83 | $1203 | |
| 294 | $20D8 | $F7FC | $0020 | $B62C | $0000 | |
| 295 | $20DC | $94FF | $6209 | $61F1 | $B62C | |
| 296 | $20E0 | $0001 | $94FF | $6208 | $B401 | |
| 297 | $20E4 | $620C | $640A | $B62C | $0002 | |
| 298 | $20E8 | $94FF | $D41F | $1408 | $B62C | |
| 299 | $20EC | $0001 | $94FF | $D420 | $1A02 | |
| 300 | $20F0 | $B420 | $620A | $B1DD | $0400 | |
| 301 | $20F4 | $5600 | $2168 | $0B01 | $B9D7 | |
| 302 | $20F8 | $6203 | $6202 | $6204 | $0900 | |
| 303 | $20FC | $6205 | $B402 | $6207 | $B401 | |
| 304 | $2100 | $620F | $C7FC | $0010 | $D70C | |
| 305 | $2104 | $1F83 | $1203 | $F7FC | $0020 | |

| | | | | | | |
|---|---|---|---|---|---|---|
| 306 | $2108 | $B62C | $0005 | $620E | $B620 | |
| 307 | $210C | $000C | $3834 | $B401 | $620B | |
| 308 | $2110 | $6206 | $0900 | $6201 | $D70C | |
| 309 | $2114 | $1F83 | $1C21 | $BA0E | $7A11 | |
| 310 | $2118 | $B71D | $000F | $B71C | $0010 | |
| 311 | $211C | $FC0D | $69B3 | $BA00 | $4401 | |
| 312 | $2120 | $212A | $B20D | $02D0 | $19FA | |
| 313 | $2124 | $02C0 | $17F8 | $02D0 | $1C03 | |
| 314 | $2128 | $04DD | $3FF4 | $6E40 | $20CE | |
| 315 | $212C | $B9A2 | $6E40 | $20D0 | $0B0D | |
| 316 | $2130 | $620D | $B70C | $1F83 | $662C | |
| 317 | $2134 | $0007 | $3E2E | $B62C | $0007 | |
| 318 | $2138 | $620D | $BA0E | $BA0E | $B20D | |
| 319 | $213C | $6640 | $20CE | $B190 | $620D | |
| 320 | $2140 | $3E23 | $B41F | $6206 | $B62C | |
| 321 | $2144 | $0001 | $0368 | $620B | $B62C | |
| 322 | $2148 | $0002 | $0368 | $D41F | $140A | |
| 323 | $214C | $662C | $0006 | $B62C | $0001 | |
| 324 | $2150 | $0368 | $D420 | $1A02 | $B420 | |
| 325 | $2154 | $640C | $B62C | $0006 | $6201 | |
| 326 | $2158 | $B62C | $0004 | $94FF | $620D | |
| 327 | $215C | $BE2C | $0006 | $B201 | $6640 | |
| 328 | $2160 | $20CE | $B16D | $6201 | $B96B | |
| 329 | $2164 | $4547 | $20D1 | $0000 | $0000 | |
| 330 | $2168 | $0000 | $BE00 | $1208 | $69FC | FIND.QUEUE Subroutine Level 1 |
| 331 | $216C | $69FA | $BA00 | $0500 | $35FD | |
| 332 | $2170 | $6E00 | $1208 | $B9F5 | $6E40 | |
| 333 | $2174 | $2166 | $B1F1 | $6201 | $0B01 | |
| 334 | $2178 | $BA00 | $D9EE | $1DFC | $4547 | |
| 335 | $217C | $2168 | $0000 | $0000 | $0000 | |
| 336 | $2220 | $0000 | $0000 | $0000 | $0000 | |
| 337 | $2224 | $0000 | $0000 | $0000 | $0000 | |
| 338 | $2228 | $0000 | $0000 | $0000 | $61F5 | Interrupt Routine Loop A |

| | | | | | | |
|---|---|---|---|---|---|---|
| 339 | $222C | $69F5 | $4100 | $2222 | $7E00 | |
| 340 | $2230 | $1200 | $7E00 | $1201 | $1803 | |
| 341 | $2234 | $28BD | $1517 | $B1ED | $D401 | |
| 342 | $2238 | $4706 | $2263 | $263D | $1517 | |
| 343 | $223C | $96F0 | $5000 | $4501 | $2263 | |
| 344 | $2240 | $B9E4 | $0378 | $B14A | $3641 | Data Input Routine Level 1 |
| 345 | $2244 | $DC7F | $141E | $BE10 | $2190 | |
| 346 | $2248 | $4401 | $2263 | $263D | $1517 | |
| 347 | $224C | $96F0 | $1800 | $3C15 | $0BD1 | |
| 348 | $2250 | $B9D5 | $671D | $0001 | $0900 | |
| 349 | $2254 | $61D1 | $42F0 | $0000 | $B6F0 | |
| 350 | $2258 | $2185 | $6200 | $6E40 | $2185 | |
| 351 | $225C | $6929 | $4200 | $1205 | $20BD | |
| 352 | $2260 | $1517 | $0900 | $61C1 | $263D | |
| 353 | $2264 | $1517 | $96F0 | $4000 | $4506 | |
| 354 | $2268 | $226D | $243D | $1517 | $4507 | |
| 355 | $226C | $2291 | $B91A | $D918 | $1222 | Signal Input Routine Level 1 |
| 356 | $2270 | $69B8 | $243D | $1517 | $61B3 | |
| 357 | $2274 | $6201 | $243D | $1517 | $61B0 | |
| 358 | $2278 | $6202 | $A1AD | $0BC0 | $0328 | |
| 359 | $227C | $0E0C | $3C14 | $B10E | $3605 | |
| 360 | $2280 | $B9A6 | $0378 | $DC7F | $140E | |
| 361 | $2284 | $B71D | $2190 | $461D | $2291 | |
| 362 | $2288 | $9C7F | $B99F | $671D | $0003 | |
| 363 | $228C | $B200 | $6600 | $2187 | $20BD | |
| 364 | $2290 | $1517 | $263D | $1517 | $96F0 | |
| 365 | $2294 | $E000 | $D6F0 | $6000 | $1C25 | |
| 366 | $2298 | $B98D | $4406 | $22A9 | $42F0 | Data Input Routine (Cont'd) Level 1 |
| 367 | $229C | $0000 | $BE00 | $1204 | $6986 | |
| 368 | $22A0 | $4401 | $22A5 | $B200 | $6600 | |
| 369 | $22A4 | $1204 | $4200 | $1205 | $4401 | |

| | | | | | | |
|---|---|---|---|---|---|---|
| 370 | $22A8 | $22BC | $0BA1 | $F7FA | $0004 | |
| 371 | $22AC | $B7FB | $BFEF | $243D | $1517 | |
| 372 | $22B0 | $6174 | $6202 | $243D | $1517 | |
| 373 | $22B4 | $6203 | $A16F | $0BC0 | $0328 | |
| 374 | $22B8 | $0E0C | $3C03 | $B401 | $6168 | |
| 375 | $22BC | $263D | $1517 | $96F0 | $0400 | |
| 376 | $22C0 | $3252 | $BE00 | $2182 | $DE00 | Signal Output Routine Level 1 |
| 377 | $22C4 | $2183 | $4701 | $2312 | $6961 | |
| 378 | $22C8 | $B201 | $4501 | $22E2 | $D401 | |
| 379 | $22CC | $4701 | $22F4 | $B71D | $0002 | |
| 380 | $22D0 | $BA03 | $F20B | $F20C | $060C | |
| 381 | $22D4 | $0BC0 | $23FD | $1517 | $0B0D | |
| 382 | $22D8 | $0168 | $0BD0 | $0E0C | $0368 | |
| 383 | $22DC | $0E0C | $94FF | $060D | $23BD | |
| 384 | $22E0 | $1517 | $3E2E | $BA03 | $B206 | |
| 385 | $22E4 | $F20C | $0BC0 | $23FD | $1517 | |
| 386 | $22E8 | $0362 | $C20E | $016A | $0BD0 | |
| 387 | $22EC | $0E0C | $0368 | $0E0C | $94FF | |
| 388 | $22F0 | $060D | $23BD | $1517 | $3E1C | |
| 389 | $22F4 | $BA03 | $B20B | $F404 | $94FC | |
| 390 | $22F8 | $620B | $B71C | $0014 | $464C | |
| 391 | $22FC | $2300 | $B20A | $0366 | $94FC | |
| 392 | $2300 | $F20C | $0400 | $0BC0 | $23FD | |
| 393 | $2304 | $1517 | $B20A | $0168 | $0BD0 | |
| 394 | $2308 | $0E0C | $0368 | $0E0C | $94FF | |
| 395 | $230C | $060D | $23BD | $1517 | $B119 | |
| 396 | $2310 | $6600 | $2182 | $263D | $1517 | |
| 397 | $2314 | $96F0 | $0400 | $3269 | $BE00 | Data Output Routine Level 1 |
| 398 | $2318 | $2181 | $0411 | $9E00 | $218A | |
| 399 | $231C | $6E00 | $2181 | $B610 | $2210 | |
| 400 | $2320 | $325F | $0BD0 | $0900 | $6610 | |

| | | | | | | |
|---|---|---|---|---|---|---|
| 401 | $2324 | $2210 | $0B1D | $B207 | $D401 | |
| 402 | $2328 | $1C57 | $0900 | $6207 | $B71D | |
| 403 | $232C | $0001 | $461D | $237F | $B62D | |
| 404 | $2330 | $0007 | $3C4E | $B203 | $D204 | |
| 405 | $2334 | $124B | $0BC0 | $B620 | $0000 | |
| 406 | $2338 | $6203 | $B62C | $0002 | $7E2D | |
| 407 | $233C | $0011 | $4706 | $2345 | $3C02 | |
| 408 | $2340 | $B401 | $0B80 | $B401 | $4507 | |
| 409 | $2344 | $2363 | $0B80 | $B203 | $C204 | |
| 410 | $2348 | $4501 | $2363 | $0B91 | $B401 | |
| 411 | $234C | $6207 | $B5FD | $6600 | $2229 | |
| 412 | $2350 | $BA06 | $FE00 | $2181 | $0411 | |
| 413 | $2354 | $9E00 | $218A | $B610 | $2210 | |
| 414 | $2358 | $3205 | $7E08 | $2229 | $19F8 | |
| 415 | $235C | $3E03 | $6719 | $2210 | $0B19 | |
| 416 | $2360 | $0B0C | $3202 | $B401 | $0B1D | |
| 417 | $2364 | $6207 | $B600 | $1200 | $6408 | |
| 418 | $2368 | $B20B | $F404 | $94FC | $620B | |
| 419 | $236C | $F20C | $0808 | $237D | $1517 | |
| 420 | $2370 | $0F1C | $BA03 | $0B81 | $F7F8 | |
| 421 | $2374 | $0004 | $B7F9 | $3FEF | $A203 | |
| 422 | $2378 | $0BD0 | $0368 | $0E0D | $94FF | |
| 423 | $237C | $A203 | $233D | $1517 | $B600 | |
| 424 | $2380 | $2220 | $BE00 | $2221 | $4000 | |
| 425 | $2384 | $2222 | $4946 | $222A | $0000 | |
| 426 | $2388 | $0000 | $0000 | $0000 | $0000 | |
| 427 | $238C | $0000 | $0000 | $0000 | $0000 | |
| 428 | $2430 | $0000 | $0000 | $0000 | $0000 | |
| 429 | $2434 | $0000 | $0000 | $0000 | $0000 | |
| 430 | $2438 | $0000 | $0000 | $0000 | $61F5 | LINE B Interrupt Routine |
| 431 | $243C | $69F5 | $4100 | $2432 | $7E00 | |

| | | | | | | |
|---|---|---|---|---|---|---|
| 432 | $2440 | $1200 | $7E00 | $1201 | $1803 | |
| 433 | $2444 | $20BD | $1517 | $B1ED | $D401 | |
| 434 | $2448 | $4706 | $2473 | $263D | $1517 | |
| 435 | $244C | $96F0 | $8000 | $4501 | $2473 | |
| 436 | $2450 | $B9E4 | $0378 | $B14A | $3641 | Data Input Routine |
| 437 | $2454 | $DC7F | $141E | $BE10 | $23A0 | |
| 438 | $2458 | $4401 | $2473 | $263D | $1517 | |
| 439 | $245C | $96F0 | $1800 | $3C15 | $0BD1 | |
| 440 | $2460 | $B9D5 | $671D | $0001 | $0900 | |
| 441 | $2464 | $61D1 | $42F0 | $0000 | $B6F0 | |
| 442 | $2468 | $2395 | $6200 | $6E40 | $2395 | |
| 443 | $246C | $6929 | $4200 | $1205 | $20BD | |
| 444 | $2470 | $1517 | $0900 | $61C1 | $263D | |
| 445 | $2474 | $1517 | $96F0 | $4000 | $4506 | |
| 446 | $2478 | $247D | $243D | $1517 | $4507 | |
| 447 | $247C | $24A1 | $B91A | $D918 | $1222 | Signal Input Routine |
| 448 | $2480 | $69B8 | $243D | $1517 | $61B3 | |
| 449 | $2484 | $6201 | $243D | $1517 | $61B0 | |
| 450 | $2488 | $6202 | $A1AD | $0BC0 | $0328 | |
| 451 | $248C | $0E0C | $3C14 | $B10E | $3605 | |
| 452 | $2490 | $B9A6 | $0378 | $DC7F | $140E | |
| 453 | $2494 | $B71D | $23A0 | $461D | $24A1 | |
| 454 | $2498 | $9C7F | $B99F | $671D | $0003 | |
| 455 | $249C | $B200 | $6600 | $2397 | $20BD | |
| 456 | $24A0 | $1517 | $263D | $1517 | $96F0 | |
| 457 | $24A4 | $E000 | $D6F0 | $6000 | $1C25 | |
| 458 | $24A8 | $B98D | $4406 | $24B9 | $42F0 | Data Input Routine (Cont'd) Level 1 |
| 459 | $24AC | $0000 | $BE00 | $1204 | $6956 | |
| 460 | $24B0 | $4401 | $24B5 | $B200 | $6600 | |
| 461 | $24B4 | $1204 | $4200 | $1205 | $4401 | |
| 462 | $24B8 | $24CC | $0BA1 | $F7FA | $0004 | |

| | | | | | | |
|---|---|---|---|---|---|---|
| 463 | $24BC | $B7FB | $BFEF | $243D | $1517 | |
| 464 | $24C0 | $6174 | $6202 | $243D | $1517 | |
| 465 | $24C4 | $6203 | $A16F | $0BC0 | $0326 | |
| 466 | $24C8 | $0E0C | $3C03 | $B401 | $6168 | |
| 467 | $24CC | $263D | $1517 | $96F0 | $0400 | |
| 468 | $24D0 | $3252 | $BE00 | $2392 | $DE00 | Signal Output Routine Level 1 |
| 469 | $24D4 | $2393 | $4701 | $2522 | $6961 | |
| 470 | $24D8 | $B201 | $4501 | $24F2 | $D401 | |
| 471 | $24DC | $4701 | $2504 | $B71D | $0002 | |
| 472 | $24E0 | $BA03 | $F20B | $F20C | $080C | |
| 473 | $24E4 | $0BC0 | $23FD | $1517 | $0B0D | |
| 474 | $24E8 | $0168 | $0BD0 | $0E0C | $0368 | |
| 475 | $24EC | $0E0C | $94FF | $080D | $23BD | |
| 476 | $24F0 | $1517 | $3E2E | $BA03 | $B206 | |
| 477 | $24F4 | $F20C | $0BC0 | $23FD | $1517 | |
| 478 | $24F8 | $0362 | $C20E | $016A | $0BD0 | |
| 479 | $24FC | $0E0C | $0368 | $0E0C | $94FF | |
| 480 | $2500 | $080D | $23BD | $1517 | $3E1C | |
| 481 | $2504 | $BA03 | $B20B | $F404 | $94FC | |
| 482 | $2508 | $620B | $B71C | $0014 | $464C | |
| 483 | $250C | $2510 | $B20A | $0366 | $94FC | |
| 484 | $2510 | $F20C | $0400 | $0BC0 | $23FD | |
| 485 | $2514 | $1517 | $B20A | $0168 | $0BD0 | |
| 486 | $2518 | $0E0C | $0368 | $0E0C | $94FF | |
| 487 | $251C | $080D | $23BD | $1517 | $B119 | |
| 488 | $2520 | $6600 | $2392 | $263D | $1517 | |
| 489 | $2524 | $96F0 | $0400 | $3269 | $BE00 | Data Output Routine Level 1 |
| 490 | $2528 | $2391 | $0411 | $9E00 | $239A | |
| 491 | $252C | $6E00 | $2391 | $B610 | $2420 | |
| 492 | $2530 | $325F | $0BD0 | $0900 | $6610 | |
| 493 | $2534 | $2420 | $0B1D | $B207 | $D401 | |

| | | | | | |
|---|---|---|---|---|---|
| 494 | $2538 | $1C57 | $0900 | $6207 | $B71D |
| 495 | $253C | $0001 | $461D | $256F | $B62D |
| 496 | $2540 | $0007 | $3C4E | $B203 | $D204 |
| 497 | $2544 | $124B | $0BC0 | $B620 | $0000 |
| 498 | $2548 | $6203 | $B62C | $0002 | $7E2D |
| 499 | $254C | $0011 | $4706 | $2555 | $3C02 |
| 500 | $2550 | $B401 | $0B60 | $B401 | $4507 |
| 501 | $2554 | $2573 | $0B80 | $B203 | $C204 |
| 502 | $2558 | $4501 | $2573 | $0B91 | $B401 |
| 503 | $255C | $6207 | $B5FD | $6600 | $2439 |
| 504 | $2560 | $BA06 | $FE00 | $2391 | $0411 |
| 505 | $2564 | $9E00 | $239A | $B610 | $2420 |
| 506 | $2568 | $3205 | $7E00 | $2439 | $19F6 |
| 507 | $256C | $3E03 | $6719 | $2420 | $0B19 |
| 508 | $2570 | $0B0C | $3202 | $B401 | $0B1D |
| 509 | $2574 | $6207 | $B600 | $1200 | $6406 |
| 510 | $2578 | $B20B | $F404 | $94FC | $620B |
| 511 | $257C | $F20C | $0606 | $237D | $1517 |
| 512 | $2580 | $0F1C | $BA03 | $0B81 | $F7F6 |
| 513 | $2584 | $0004 | $B7F9 | $3FEF | $A203 |
| 514 | $2588 | $0BD0 | $0368 | $0E0D | $94FF |
| 515 | $258C | $A203 | $233D | $1517 | $B600 |
| 516 | $2590 | $2430 | $BE00 | $2431 | $4000 |
| 517 | $2594 | $2432 | $4946 | $243A | $0000 |
| 518 | $2598 | $0000 | $0000 | $0000 | $0000 |
| 519 | $259C | $0000 | $0000 | $0000 | $0000 |

What is claimed is:

1. A data transmission system for *supporting data cells among* a plurality of digital devices, *a data call being comprised of randomly occurring bursts of data with intervening pauses,* comprising means for virtually allocating transmission paths upon request *preparatory to establishing data calls* from any of said digital devices to any other of said digital [device] *devices by assigning to each call a description of transmission resources to convey the data* and means for activating said virtually allocated transmission for [paths] *path in accordance with the assigned description* only [when] *upon determination that a* data *burst of the call* is actually transmitted.

2. A digital data transmission system *for supporting data calls among a plurality of digital devices, a data call being comprised of randomly occurring bursts of data with intervening pauses* including a plurality of transmission loops, each including at least one digital device, comprising:

means for virtually allocating a transmission path from a digital device in one loop to a digital device in another loop comprising a plurality of asynchronous links *by assigning to each call a description of the links in the path,* and means for activating particular ones of said links *in accordance with the path description* only when *a* data *burst of the call* is actually available at said particular ones for transmission.

3. A data transmission system comprising:

means for receiving requests to virtually allocate communication paths;

means for storing descriptions of requested communication paths; and means for using the stored descriptions to create the requested communication paths only when data is actually available for transmission.

4. A data transmission system comprising:

means for receiving requests to establish communication paths;

means for storing descriptions of requested communication paths comprising a plurality of asynchronous links; and means for activating particular ones of the plurality of links only when data is actually available at the particular ones for transmission.

5. A system for providing data communication between a plurality of digital devices comprising:

means for receiving requests for the use of communication paths from each one of said plurality of digital devices;

means for virtually allocating communication paths in response to said requests and prior to actual use of said paths; and means for actually connecting said virtually allocated communication paths at the time data is actually transmitted.

6. A digital data transmission system comprising:

a first switching unit;

a first digital device attached to said first switching unit;

a second switching unit connected to said first switching unit;

a second digital device attached to said second switching unit;

means for virtually allocating a first transmission path between said first digital device and said first switching unit;

means for virtually allocating a second transmission path between said first switching unit and said second switching unit;

means for virtually allocating a third transmission path between said second switching unit and said second digital device; and means for selectively activating each of said first, second, and third virtually allocated transmission paths.

7. The digital data transmission system of claim 6 wherein each of the three means for virtually allocating a transmission path further comprises:

means for storing parameters characterizing the data which is to be transmitted; and means for initiating the virtual allocation of the next succeeding transmission path.

8. The digital data transmission system of claim 6 wherein said means for selectively activating each of said first, second, and third virtually allocated transmission paths further comprises:

means for activating said first virtually allocated transmission path only when said first digital device is actually transmitting data;

means for activating said second virtually allocated transmission path only when said first switching unit is actually retransmitting data received from said first digital device;

means for activating said third virtually allocated transmission path only when said second switching unit is actually retransmitting that data received from said retransmission by said first switching unit.

9. The digital data transmission system of claim 8 wherein each of the three means for activating a transmission path further comprises:

means for receiving incoming data which is to be retransmitted on said transmission path;

means for storing said incoming data; and means for retransmitting said data on said transmission path.

10. The digital data transmission system of claim 9 wherein said means for storing said incoming data further comprises:

means for selectively limiting the total amount of incoming data which is stored at any time.

11. The digital data transmission system of claim 10 wherein said selectively limiting means further comprises:

means for causing the device that is transmitting said incoming data to cease transmission when the amount of said incoming data that has not been retransmitted on said transmission path reaches a prespecified value.

12. A system for transmitting data between digital devices comprising:

a plurality of interconnected program-controlled switching units;

at least one program-controlled terminal interface unit attached to each one of said plurality of interconnected program-controlled switching units for communication therewith by a digital device.

13. The system of claim 12 further comprising:

means for selectively limiting the amount of buffering that said system provides in each switching unit for each digital device that is attached thereto.

14. The system of claim 13 further comprising:

means for selectively limiting the minimum amount of data that said system permits each digital device attached thereto to transmit in a single burst of transmission.

15. The system of claim 14 further comprising:

means for selectively limiting the minimum amount of data that said system transmits to each digital device attached thereto in a single burst of transmission.

16. The system of claim 14 further comprising:

means for selectively limiting the rate at which said system permits each digital device attached thereto to transmit data.

17. The system of claim 15 further comprising:

means for selectively limiting the rate at which said system transmits data to each digital device attached thereto.

18. The method of transmitting data comprising the steps of:

receiving requests for the use of transmission resources from transmitting devices;

storing descriptions of the transmission resources necessary to honor the received requests;

committing transmission resources to particular transmitting devices in accordance with the stored descriptions only at the time data is actually transmitted.

*19. The method of transmitting data in data calls comprised of randomly occurring bursts of data with intervening pauses, comprising the steps of:*

*receiving requests for the use of transmission resources from transmitting devices;*

*storing a description of the transmission resources necessary to honor each received request; and*

*committing transmission resources to particular transmitting devices in accordance with the stored descriptions only at a time when it is determined that a data burst is actually transmitted.*

* * * * *

UNITED STATES PATENT AND TRADEMARK OFFICE

CERTIFICATE OF CORRECTION

PATENT NO. : RE 31,319

DATED : July 19, 1983

INVENTOR(S) : Alexander G. Fraser

It is certified that error appears in the above—identified patent and that said Letters Patent is hereby corrected as shown below:

Column 165, line 2, "data cells" should read --data calls--; line 11, after "transmission" delete "for".

Signed and Sealed this

*Eighth* Day of *November 1983*

[SEAL]

*Attest:*

GERALD J. MOSSINGHOFF

*Attesting Officer*

*Commissioner of Patents and Trademarks*